(12) United States Patent
Katayama

(10) Patent No.: US 7,787,348 B2
(45) Date of Patent: *Aug. 31, 2010

(54) OPTICAL HEAD APPARATUS AND OPTICAL INFORMATION RECORDING OR REPRODUCING APPARATUS

(75) Inventor: Ryuichi Katayama, Tokyo (JP)

(73) Assignee: NEC Corporation (JP)

( * ) Notice: Subject to any disclaimer, the term of this patent is extended or adjusted under 35 U.S.C. 154(b) by 691 days.

This patent is subject to a terminal disclaimer.

(21) Appl. No.: 10/970,788

(22) Filed: Oct. 21, 2004

(65) Prior Publication Data

US 2005/0087678 A1 Apr. 28, 2005
US 2008/0224028 A9 Sep. 18, 2008

Related U.S. Application Data

(63) Continuation-in-part of application No. 10/244,800, filed on Sep. 16, 2002, now Pat. No. 6,980,505.

(30) Foreign Application Priority Data

Oct. 22, 2003 (JP) ............... 2003-362069
Feb. 13, 2004 (JP) ............... 2004-036884

(51) Int. Cl.
G11B 7/135 (2006.01)

(52) U.S. Cl. ............... 369/112.17; 369/112.28; 369/44.23

(58) Field of Classification Search ............ 369/112.17
See application file for complete search history.

(56) References Cited

U.S. PATENT DOCUMENTS 4,813,032 A * 3/1989 Koyama ............ 369/13.29

(Continued)

FOREIGN PATENT DOCUMENTS

JP 05-100114 4/1993

(Continued)

OTHER PUBLICATIONS

Optical head device JP 11-339307 Kitamura (Oct. 1999) (English translation).*

Primary Examiner—Van N Chow
(74) Attorney, Agent, or Firm—Hayes Soloway, P.C.

(57) ABSTRACT

Light emitted from a light source and having a wavelength of 400 nm is reflected by a beam splitter (BS), and converged on a disk according to a next-generation standard. Reflection light therefrom passes through the BS and is received by a photodetector. Light emitted from a light source and having a wavelength of 660 nm is reflected by the BS and passes through the BS, and converged on a disk according to a DVD standard. Reflection light therefrom passes through the BS and is received by the photodetector. About 50% of light emitted from a light source and having a wavelength of 780 nm is reflected by the BS. The light passes through the BS and is then converged on a disk according to a CD standard. Reflection light therefrom passes through the BS. About 50% of the light passes through the BS and is received by the photodetector. Thus, recording and reproduction can be performed on any of disks according to a next-generation standard, DVD standard, and CD standard. With respect to disks according to the next-generation standard, a high optical output is obtained during recording and a high S/N ratio is obtained during reproduction. With respect to disks according to the CD standard, the amount of light received by the photodetector does not substantially vary even when birefringence of a disk varies.

2 Claims, 42 Drawing Sheets

9a-9c: SEMICONDUCTOR LASER
59a-59c: BEAM SPLITTER
109a: PHOTODETECTOR
201: MIRROR
202: WAVELENGTH PLATE
203: OBJECTIVE LENS
204: DISK

U.S. PATENT DOCUMENTS

| | | | |
|---|---|---|---|
| 6,222,812 B1 * | 4/2001 | Yoo et al. | 369/112.16 |
| 6,370,103 B1 * | 4/2002 | Yamazaki et al. | 369/112.26 |
| 6,449,235 B1 * | 9/2002 | Kim et al. | 369/112.01 |
| 6,449,237 B1 * | 9/2002 | Yoo et al. | 369/112.05 |
| 6,687,209 B2 * | 2/2004 | Ota et al. | 369/112.08 |
| 2001/0017830 A1 * | 8/2001 | Arai et al. | 369/53.2 |
| 2003/0053397 A1 * | 3/2003 | Katayama et al. | 369/112.17 |
| 2005/0135220 A1 | 6/2005 | Katayama | 369/112.16 |
| 2005/0141391 A1 * | 6/2005 | Ueyama et al. | 369/112.1 |
| 2006/0104187 A1 * | 5/2006 | Katayama | 369/112.22 |
| 2006/0221799 A1 * | 10/2006 | Takahashi et al. | 369/112.01 |

FOREIGN PATENT DOCUMENTS

| | | |
|---|---|---|
| JP | 10-134394 | 10/1996 |
| JP | 10-027373 | 1/1998 |
| JP | 11-339307 | * 12/1999 |
| JP | 2000268397 | 9/2000 |
| JP | 2000348376 | 12/2000 |
| JP | 2001-043559 | 2/2001 |
| JP | 2001143297 | 5/2001 |
| JP | 2003-091863 | 3/2003 |
| JP | 2003-023305 | 4/2003 |
| JP | 2003123305 | 4/2003 |
| JP | 2003288733 | 10/2003 |

* cited by examiner

1a–1c: SEMICONDUCTOR LASER
51a–51d: BEAM SPLITTER
101a, 101b: PHOTODETECTOR
201: MIRROR
202: WAVELENGTH PLATE
203: OBJECTIVE LENS
204: DISK

2a–2c: SEMICONDUCTOR LASER
52a–52d: BEAM SPLITTER
102a, 102b: PHOTODETECTOR
201: MIRROR
202: WAVELENGTH PLATE
203: OBJECTIVE LENS
204: DISK

3a–3c: SEMICONDUCTOR LASER
53a–53d: BEAM SPLITTER
103a,103b: PHOTODETECTOR
201: MIRROR
202: WAVELENGTH PLATE
203: OBJECTIVE LENS
204: DISK

4a–4c: SEMICONDUCTOR LASER
54a–54d: BEAM SPLITTER
104a,104b: PHOTODETECTOR
201: MIRROR
202: WAVELENGTH PLATE
203: OBJECTIVE LENS
204: DISK 5a-5c: SEMICONDUCTOR LASER
55a-55c: BEAM SPLITTER
105a: PHOTODETECTOR
201: MIRROR
202: WAVELENGTH PLATE
203: OBJECTIVE LENS
204: DISK 6a-6c: SEMICONDUCTOR LASER
56a-56c: BEAM SPLITTER
106a: PHOTODETECTOR
201: MIRROR
202: WAVELENGTH PLATE
203: OBJECTIVE LENS
204: DISK

7a–7c: SEMICONDUCTOR LASER
57a–57c: BEAM SPLITTER
107a: PHOTODETECTOR
201: MIRROR
202: WAVELENGTH PLATE
203: OBJECTIVE LENS
204: DISK

8a–8c: SEMICONDUCTOR LASER
58a–58c: BEAM SPLITTER
108a: PHOTODETECTOR
201: MIRROR
202: WAVELENGTH PLATE
203: OBJECTIVE LENS
204: DISK 9a-9c: SEMICONDUCTOR LASER
59a-59c: BEAM SPLITTER
109a: PHOTODETECTOR
201: MIRROR
202: WAVELENGTH PLATE
203: OBJECTIVE LENS
204: DISK 10a,10b: SEMICONDUCTOR LASER
60a-60c: BEAM SPLITTER
110a,110b: PHOTODETECTOR
201: MIRROR
202: WAVELENGTH PLATE
203: OBJECTIVE LENS
204: DISK 11a,11b: SEMICONDUCTOR LASER
61a,61b: BEAM SPLITTER
111a: PHOTODETECTOR
201: MIRROR
202: WAVELENGTH PLATE
203: OBJECTIVE LENS
204: DISK 12a,12b: SEMICONDUCTOR LASER   201: MIRROR
62a,62b: BEAM SPLITTER         202: WAVELENGTH PLATE
112a: PHOTODETECTOR            203: OBJECTIVE LENS
                               204: DISK

13a: SEMICONDUCTOR LASER
63a: BEAM SPLITTER
113a: PHOTODETECTOR
201: MIRROR
202: WAVELENGTH PLATE
203: OBJECTIVE LENS
204: DISK 14a,14b: SEMICONDUCTOR LASER
64a-64d: BEAM SPLITTER
114a,114b: PHOTODETECTOR
164a: MODULE
201: MIRROR
202: WAVELENGTH PLATE
203: OBJECTIVE LENS
204: DISK 15a,15b: SEMICONDUCTOR LASER
65a-65d: BEAM SPLITTER
115a,115b: PHOTODETECTOR
165a: MODULE
201: MIRROR
202: WAVELENGTH PLATE
203: OBJECTIVE LENS
204: DISK 16a, 16b: SEMICONDUCTOR LASER
66a-66d: BEAM SPLITTER
116a, 116b: PHOTODETECTOR
166a: MODULE
201: MIRROR
202: WAVELENGTH PLATE
203: OBJECTIVE LENS
204: DISK 17a, 17b: SEMICONDUCTOR LASER
67a-67d: BEAM SPLITTER
117a, 117b: PHOTODETECTOR
167a: MODULE
201: MIRROR
202: WAVELENGTH PLATE
203: OBJECTIVE LENS
204: DISK

- 18a,18b: SEMICONDUCTOR LASER
- 68a-68d: BEAM SPLITTER
- 118a,118b: PHOTODETECTOR
- 168a: MODULE
- 201: MIRROR
- 202: WAVELENGTH PLATE
- 203: OBJECTIVE LENS
- 204: DISK

- 19a,19b: SEMICONDUCTOR LASER
- 69a-69d: BEAM SPLITTER
- 119a,119b: PHOTODETECTOR
- 169a: MODULE
- 201: MIRROR
- 202: WAVELENGTH PLATE
- 203: OBJECTIVE LENS
- 204: DISK

20a: SEMICONDUCTOR LASER
70a-70c: BEAM SPLITTER
120a: PHOTODETECTOR
170a,170b: MODULE
201: MIRROR
202: WAVELENGTH PLATE
203: OBJECTIVE LENS
204: DISK

21a: SEMICONDUCTOR LASER
71a-71c: BEAM SPLITTER
121a: PHOTODETECTOR
171a,171b: MODULE
201: MIRROR
202: WAVELENGTH PLATE
203: OBJECTIVE LENS
204: DISK

22a: SEMICONDUCTOR LASER
72a-72c: BEAM SPLITTER
122a: PHOTODETECTOR
172a, 172b: MODULE
201: MIRROR
202: WAVELENGTH PLATE
203: OBJECTIVE LENS
204: DISK

23a: SEMICONDUCTOR LASER
73a-73c: BEAM SPLITTER
123a: PHOTODETECTOR
173a, 173b: MODULE
201: MIRROR
202: WAVELENGTH PLATE
203: OBJECTIVE LENS
204: DISK

24a: SEMICONDUCTOR LASER
74a-74c: BEAM SPLITTER
124a: PHOTODETECTOR
174a,174b: MODULE
201: MIRROR
202: WAVELENGTH PLATE
203: OBJECTIVE LENS
204: DISK 25a,25b: SEMICONDUCTOR LASER
75a-75c: BEAM SPLITTER
125a: PHOTODETECTOR
175a: MODULE
201: MIRROR
202: WAVELENGTH PLATE
203: OBJECTIVE LENS
204: DISK 26a, 26b: SEMICONDUCTOR LASER
76a-76c: BEAM SPLITTER
126a: PHOTODETECTOR
176a: MODULE

201: MIRROR
202: WAVELENGTH PLATE
203: OBJECTIVE LENS
204: DISK 27a, 27b: SEMICONDUCTOR LASER
77a-77c: BEAM SPLITTER
127a: PHOTODETECTOR
177a: MODULE

201: MIRROR
202: WAVELENGTH PLATE
203: OBJECTIVE LENS
204: DISK 28a,28b: SEMICONDUCTOR LASER
78a-78c: BEAM SPLITTER
128a: PHOTODETECTOR
178a: MODULE
201: MIRROR
202: WAVELENGTH PLATE
203: OBJECTIVE LENS
204: DISK 29a,29b: SEMICONDUCTOR LASER
79a-79c: BEAM SPLITTER
129a: PHOTODETECTOR
179a: MODULE
201: MIRROR
202: WAVELENGTH PLATE
203: OBJECTIVE LENS
204: DISK 80a,80b: BEAM SPLITTER
180a-180c: MODULE
201: MIRROR
202: WAVELENGTH PLATE
203: OBJECTIVE LENS
204: DISK 81a,81b: BEAM SPLITTER      202: WAVELENGTH PLATE
181a-181c: MODULE           203: OBJECTIVE LENS
201: MIRROR                 204: DISK

32a: SEMICONDUCTOR LASER
82a,82b: BEAM SPLITTER
132a: PHOTODETECTOR
182a: MODULE
201: MIRROR
202: WAVELENGTH PLATE
203: OBJECTIVE LENS
204: DISK

33a: SEMICONDUCTOR LASER
83a,83b: BEAM SPLITTER
133a: PHOTODETECTOR
183a: MODULE
201: MIRROR
202: WAVELENGTH PLATE
203: OBJECTIVE LENS
204: DISK

34a: SEMICONDUCTOR LASER
84a,84b: BEAM SPLITTER
134a: PHOTODETECTOR
184a: MODULE

201: MIRROR
202: WAVELENGTH PLATE
203: OBJECTIVE LENS
204: DISK

35a: SEMICONDUCTOR LASER
85a,85b: BEAM SPLITTER
135a: PHOTODETECTOR
185a: MODULE

201: MIRROR
202: WAVELENGTH PLATE
203: OBJECTIVE LENS
204: DISK

86a: BEAM SPLITTER
186a, 186b: MODULE
201: MIRROR
202: WAVELENGTH PLATE
203: OBJECTIVE LENS
204: DISK

187a: MODULE
201: MIRROR
202: WAVELENGTH PLATE
203: OBJECTIVE LENS
204: DISK

211: SEMICONDUCTOR LASER
212a,212b: SEMICONDUCTOR LASER CHIP
213: BEAM SPLITTER
214a,214b: LAMINATED FACE

221: SEMICONDUCTOR LASER
222a,222b,222c: SEMICONDUCTOR LASER CHIP
223: BEAM SPLITTER
224a,224b,224c: LAMINATED FACE

231: MODULE
232a: SEMICONDUCTOR LASER CHIP
235: BEAM SPLITTER
236a,236b: LAMINATED FACE
237: PHOTODETECTOR CHIP

241: MODULE
242a,242b: SEMICONDUCTOR LASER CHIP
243,245: BEAM SPLITTER
244a,244b,246a,246b: LAMINATED FACE
247: PHOTODETECTOR CHIP

251: MODULE
252a-253c: SEMICONDUCTOR LASER CHIP
253, 255: BEAM SPLITTER
254a-254c, 256a-256c: LAMINATED FACE
257: PHOTODETECTOR CHIP

271: OPTICAL LIQUID CRYSTAL ELEMENT
272: OPTICAL LIQUID CRYSTAL ELEMENT FOR FORWARD PATH
273: OPTICAL LIQUID CRYSTAL ELEMENT FOR BACKWARD PATH
274a–274e: REGION

281: APERTURE CONTROL ELEMENT
282: GLASS SUBSTRATE
283a–283c: DIELECTRIC MULTILAYERED FILM

291: PHOTODETECTOR
292a–292c: LIGHT SPOT
293a–293h: LIGHT RECEIVING PORTION

105a: PHOTODETECTOR
55a-55c: BEAM SPLITTER
5a-5c: SEMICONDUCTOR LASER
201: MIRROR
202: WAVELENGTH PLATE
203: OBJECTIVE LENS
204: DISK 311a-311c: MODULE
312a-312c: BEAM SPLITTER
313: MIRROR
314: OBJECTIVE LENS 321a,321b: SEMICONDUCTOR LASER
322a,322b: BEAM SPLITTER
323: PHOTODETECTOR
324: MIRROR
325: WAVELENGTH PLATE
326: OBJECTIVE LENS
327: DISK

US 7,787,348 B2

OPTICAL HEAD APPARATUS AND OPTICAL INFORMATION RECORDING OR REPRODUCING APPARATUS

CROSS REFERENCE TO RELATED APPLICATION

This application is a continuation-in-part of U.S. application Ser. No. 10/244,800 filed Sep. 16, 2002, now U.S. Pat. No. 6,980,505.

BACKGROUND OF THE INVENTION

1. Field of the Invention

The present invention relates to an optical head apparatus and an optical information recording or reproducing apparatus for recording or reproducing information with respect to several types of optical recording mediums having different standards.

2. Description of Related Art

A recording density in an optical information recording or reproducing apparatus is inversely proportional to a square of a diameter of a condensed spot formed on an optical recording medium by an optical head apparatus. That is, the smaller the diameter of the condensed spot is, the higher the recording density becomes. The diameter of the light convergence spot is proportional to a wavelength of a light source in the optical head apparatus, and is inversely proportional to a numerical aperture of the objective lens. That is, when the wavelength of the light source is shorter, and the numerical aperture of the objective lens is greater, the diameter of the condensed spot is reduced. According to the Compact Disk (CD) standard having a capacity of 650 MB, the wavelength of the light source is about 780 nm and the numerical aperture of the objective lens is 0.45. According to the Digital Versatile Disk (DVD) standard having a capacity of 4.7 GB, the wavelength of the light source is about 660 nm and the numerical aperture of the objective lens is 0.6.

To further improve the recording density, hence, a next-generation standard has been proposed or practiced in recent years with a light source having a much shorter wavelength and with an objective lens having a much grater numerical aperture. For example, according to an Advanced optical Disk (AOD) standard for the capacity of 20 GB, the wavelength of the light source is about 400 nm and the numerical aperture of the objective lens is 0.65. According to a Blue Ray Disk (BRD) standard for the capacity of 23.3 GB, the wavelength of the light source is about 400 nm and the numerical aperture of the objective lens is 0.85.

From these backgrounds, there have been demands for an optical head apparatus and optical information recording or reproducing apparatus which have a good compatibility and are capable of recording or reproduction data on/from plural kinds of disks based on different standards. An optical head apparatus capable of recording or reproducing data on/from disks based on any of the DVD and CD standards has already been put to practical use. In addition, another optical head apparatus capable of recording or reproducing data on/from disks based on any of the next-generation standard, DVD and CD standards has been proposed.

An optical head apparatus described in JP-A-2001-43559 is an example of a conventional optical head apparatus capable of recording or reproducing data on/from disks based on any of the next-generation standard, DVD and CD standards. FIG. 83 schematically shows the structure of the optical head apparatus. Modules 311a, 311b, and 311c each comprise a semiconductor laser, a photodetector, and a hologram optical element. The hologram optical element transmits part of light emitted from the semiconductor laser and guide the part of light to a disk. The element further diffracts reflection light from the disk, to guide the reflection light to the photo-detector. The semiconductor lasers of the modules 311a, 311b, and 311c have wavelengths of 780 nm, 660 nm, and 400 nm, respectively. A beam splitter 312a transmits the light having wavelengths of 400 nm and 660 nm but reflects the light having the wavelength of 780 nm. Also, the beam splitter 312b transmits the light having wavelength of 400 nm but reflects the light having the wavelength of 660 nm.

Light emitted from the semiconductor laser from the module 311c passes through the beam splitters 312a and 312b and is reflected by a mirror 313. The light is then converged onto the disk 315 based on the next-generation standard by the objective lens 314. Reflection light from the disk 315 passes through the objective lens 314 in a reverse direction, and is reflected by the mirror 313. This light then passes through the beam splitters 312a and 312b and is received by the photo-detector in the module 311c.

Light emitted from the semiconductor laser in the module 311b is reflected by the beam splitter 312b and passes through the beam splitter 312a. This light is then reflected by the mirror 313 and is converged onto the disk 315 based on the DVD standard by the objective lens 314. Reflection light from the disk 315 passes through the objective lens in a reverse direction, and is reflected by the mirror 313. This light then passes through the beam splitter 312a, is then reflected by the beam splitter 312b, and is received by the photodetector in the module 311b.

Light emitted from the semiconductor laser in the module 311a is reflected by the beam splitter 312a and reflected by the mirror 313. The reflection light is converged onto the disk 315 based on the CD standard by the objective lens 314. Reflection light form the disk 315 passes through the objective lens 314 in a reverse direction and is reflected by the mirror 313. The reflection light is then reflected by the beam splitter 312a and is received by the photodetector in the module 311a.

On the other side, an example of a conventional optical head apparatus capable of recording or reproducing data on/from disks based on any of the DVD standard and CD standard is an optical head apparatus described in JP-A-2003-123305. FIG. 84 schematically shows the structure of this optical head apparatus. The wavelengths of semiconductor lasers 321a and 321b are 780 nm and 680 nm, respectively. A beam splitter 322a transmits almost all of both of P-polarized and S-polarized components with respect to light having a wavelength of 660 nm. This beam splitter 322a transmits about 25% of each of P-polarized and S-polarized components and reflects about 75% thereof, with respect to light having a wavelength of 780 nm. Another beam splitter 322b transmits almost all of the P-polarized component with respect to light having a wavelength of 660 nm and reflects almost all of the S-polarized component thereof. This beam splitter 322b transmits almost all of both of the P-polarized and S-polarized components, with respect to light having a wavelength of 780 nm.

Light emitted from the semiconductor laser 321b enters as an S-polarized component into the beam splitter 322b. Almost all of the light is reflected, passes through the beam splitter 332a, and is reflected by a mirror 324, and then is transformed from linearly polarized light into circularly polarized light by a wavelength plate 325, and converged onto a disk 327 based on the DVD standard by an objective lens 326. Reflection light from the disk 327 passes through the objective lens 326 in a reverse direction, and is transformed from the circularly polarized light into linearly polarized light which has a polarization direction at right angles to that of the linearly polarized light approaching in its way toward the disk, by the wavelength plate 325. The linearly polarized light is reflected by the mirror 324 and almost all light passes through the beam splitter 322a, then enters as a P-polarized component into the beam splitter 322a. The beam splitter 322a transmits almost all of light. Then a photodetector 323 receives the linearly polarized light.

Light emitted from the semiconductor laser 321a enters as an S-polarized component into the beam splitter 322a. About 75% of the light is reflected, is reflected by the mirror 324, and is transformed from linearly polarized light into circularly polarized light by the wavelength plate 325, and the converged onto the disk 327 based on the CD standard by the objective lens 326. Reflection light from the disk 327 passes through the objective lens 326 in a reverse direction, and is transformed from the circularly polarized light into linearly polarized light which has a polarization direction at right angles to that of the linearly polarized light approaching in its way toward the disk, by the wavelength plate 325. The linearly polarized light is reflected by the mirror 324 and enters as a P-polarized component into the beam splitter 322a. About 25% of the light transmits through the beam splitter 322a. Almost all of the penetrating light passes through the beam splitter 322b and is received by the photodetector 323.

In the conventional optical head apparatus shown in FIG. 83, all of the light having wavelengths of 400 nm, 660 nm, and 780 nm causes loss of the light amount when the light passes through a hologram optical element in a module, in the forward path of the light toward the disk, and when the light is diffracted by the hologram optical element, in the backward path of the light. Under a condition that the product of the penetration rate in the forward path and the diffraction efficiency in the backward path is maximized, the former rate is only 50% and the latter efficiency is only 40.5%. Loss of the light amount in the forward path causes a reduction in the light output during recording. Loss of the light amount in the backward path causes a reduction of the S/N ratio during reproducing. Disks of the next-generation standard have no margins for the light output during recording or the S/N ratio during reproducing Therefore, this is a serious problem. Similarly, disks of the DVD standard have no margins for the light output during recording or the S/N ratio during reproducing. This can also be a serious problem for the disks of the DVD standard. However, disks of the CD standard have margins for both the light output during recording or the S/N ratio during reproducing. Therefore, this cannot be a serious problem for the disks of the CD standard.

On the other aide, in the other conventional optical head apparatus shown in FIG. 84, the light amount of light having a wavelength of 660 nm is not substantially lost when the light is reflected by the beam splitter 322b or when the light passes through the beam splitter 322a, in the forward path of light toward the disk. In the backward path of light, the light having the wavelength of 660 nm is not substantially lost when the light passes through the beam splitter 322a or 322b. Therefore, with respect to disks of the DVD standard, a high light output is obtained during recording and a high S/N ratio is obtained during reproducing. Light having a wavelength of 780 nm is reflected at a predetermined rate by the beam splitter 322a in the forward path, substantially independently from the polarization state. In the backward path, the light having a wavelength of 780 nm passes through the beam splitters 322a and 322b at a predetermined rate, substantially independently from the polarization state. Therefore, with respect to disks of the CD standard, the birefringence of the disk varies, so that the light amount received by the photodetector does not substantially vary even when the polarization state of the reflection light from the disk varies.

In some kinds of optical system of the optical head apparatus, there is a case that the light amount received by the photodetector varies due to changes of the birefringence of the disk. If the light amount is too small, a sufficient S/N ratio cannot be obtained in a circuit in a rear stage. On the contrary, if the light amount is too great, the circuit in the rear stage is saturated. With respect to disks of the CD standard, the birefringence of the disk varies greatly and thereby causes a serious problem. In the conventional optical head apparatus shown in FIG. 84, however, this problem has been solved. With respect to disks of the DVD standard, changes of the birefringence of the disk cannot be said to be sufficiently small and therefore can be a serious problem. With respect to disks of the next-generation standard, changes of the birefringence of the disk are small and therefore cannot be a serious problem. However, in the conventional optical head apparatus shown in FIG. 84, recording or reproducing cannot be performed with respect to disks of the next-generation standard.

SUMMARY OF THE INVENTION

An object of the present invention is to solve the above-described problems in the conventional optical head apparatus, and to provide an optical head apparatus and an optical information recording or reproducing apparatus which is capable of: recording or reproducing data on/from any kind of optical recording medium that uses light having first to third wavelengths; achieving a high light output during recording and a high S/N ratio during reproducing with respect to at least one kind of optical recording medium including an optical recording medium using the light having the first wavelength, such as a disk according to a next-generation standard; and achieving such a light amount received by a photodetector that does not substantially vary even when birefringence of the disk varies, at least one kind of optical recording medium including an optical recording medium using the light having the third wavelength, such as a disk according to the CD standard.

According to the present invention, there is provided an optical head apparatus comprising: a first light source which emits light having a first wavelength; a second light source which emits light having a second wavelength; a third light source which emits light having a third wavelength; at least one photodetector which receives the light having the first wavelength, the light having the second wavelength, and the light having the third wavelength, which have been reflected by an optical recording medium; an objective lens provided, opposed to the optical recording medium; and a optical wave synthesizing/separating system which synthesizes/separates the light having the first, second, and third wavelengths and traveling toward the objective lens from the first, second, and third light sources, and the light having the first, second, and third wavelengths and traveling toward the photodetector from the objective lens, wherein (a) with respect to at least one light including the light having the first wavelength, among the light having the first, second, and third wavelengths, the optical wave synthesizing/separating system emits light, applied from the side of the first light source, to the side of the objective lens with a quantity of light larger than 50% of a quantity of incident light, and emits light, applied from the side of the objective lens to the side of the photodetector with a quantity of light larger than 50% of a quantity of incident light, and (b) with respect to at least one light including the light having the third wavelength, among the light having the first, second, and third wavelengths, the optical wave synthesizing/separating system emits light entering from the side of the objective lens to the side of the photodetector with a predetermined ratio substantially independent of a polarization state of the entering light.

Moreover, according to the present invention, there is provided an optical information recording or reproducing apparatus according to the present invention comprises: the optical head apparatus according to the present invention; a first circuit system which drives the first, second, and third light sources, a second circuit system which generates a reproduction signal and an error signal, from an output of the photodetector; and a third circuit system which drives the objective lens, based on the error signal.

In the optical head apparatus according to the present invention and the optical information recording or reproducing apparatus, light including the light having at least the first wavelength causes loss of only 50% or less when the light passes through an optical wave synthesizing/separating system in both of approaching and backward paths. Further, light having at least the third wavelength passes through the optical wave synthesizing/separating system at a predetermined ratio, substantially independent of the polarization state. Therefore, according to the present invention, it is possible to realize an optical head apparatus and an optical information recording or reproducing apparatus as follows. That is, recording and reproducing can be performed on any of disks according to the next-generation standard (AOD standard, BRD standard, or the like), DVD standard, and CD standard, by setting the first, second, and third wavelengths to 400 nm, 600 nm, and 780 nm, respectively. With respect to disks according to the next-generation standard, a high optical output can be obtained during recording and a high S/N ratio can be obtained during reproducing. With respect to disks according to the CD standard, the amount of light received by the photodetector does not substantially vary even when the birefringence of a disk varies.

As has been described above, the optical head apparatus and optical information recording or reproducing apparatus according to the present invention achieve the following advantages. That is, recording and reproducing can be performed on any of disks used with light having the first, second, and third wavelengths. With respect to disks used with light having the first wavelength (e.g., disks according to the AOD standard, BRD standard, or the like which defines use of light having a wavelength of 400 nm), a high optical output can be obtained during recording, and a high S/N ratio can be obtained during reproduction. With respect to disks used with light having the third wavelength (e.g., disks according to the CD standard which defines use of light having a wavelength of 780 nm), the amount of light received by the photodetector does not substantially vary even when birefringence of a disk varies. This is based on the grounds that the light having the first wavelength causes loss of only 50% or less in the amount of light when the light passes through the optical wave synthesizing/separating system in both the forward and backward paths, and that the light having the third wavelength passes through the optical wave synthesizing/separating system in the backward path, substantially independent of the polarization state.

BRIEF DESCRIPTION OF THE DRAWINGS

In the accompanying drawings:

FIG. 78 is a diagram showing a constitution of a optical liquid crystal element used in the embodiments of the optical head apparatus according to the present invention, where

DETAILED DESCRIPTION OF THE PREFERRED EMBODIMENTS

Figure 1:
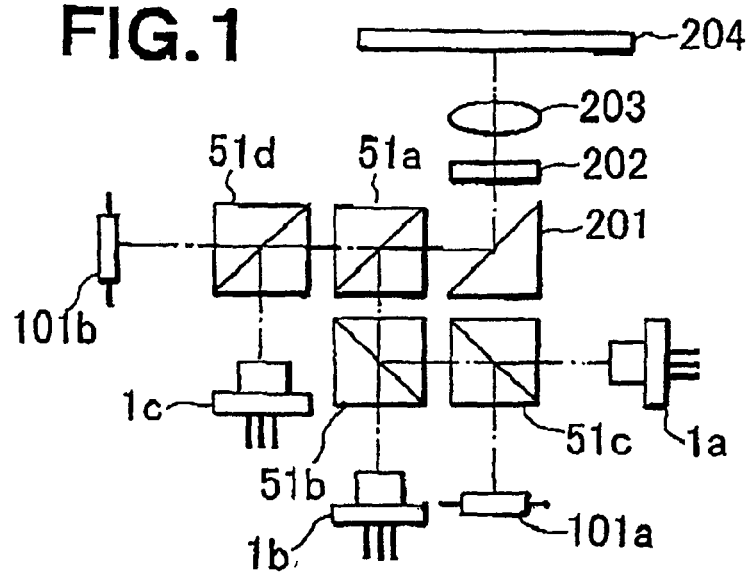
FIG. 1 is a diagram showing the first embodiment of the optical bead apparatus according to the present invention.

Embodiments of the present invention will be described below with reference to the drawings.

A description will first be made of characteristics of a beam splitter and a wavelength plate which form part of a optical wave synthesizing/separating system used in an optical head apparatus of the present invention.

1. Characteristics of Beam Splitters

Characteristics of beam splitters used in the embodiments of the optical head apparatus of the present invention will be described first. The beam splitter is constructed in a structure in which two triangular prisms of glass are adhered to each other forming a cubic shape and a dielectric multilayered film is formed between the adhered surfaces. Alternatively, another structure may be considered in which a dielectric multilayered film is formed on a glass plate, etc. In case of using plural beam splitters, the plural splitters can be integrated with each other.

FIGS. 38 to 71 show respectively wavelength dependencies of the penetration efficiencies of beam splitters A to Y, and h, k, o, p, s, u, v, x, and y used in the embodiments of the optical head apparatus according to the present invention. In the figures, continuous and broken lines respectively indicate characteristics of the P-polarized component (the electric field component of a light wave parallel to the plane defined by incident light and reflection light) and S-polarized component (the electric field component of a light wave perpendicular to the plane defined by incident light and reflection light).

Each beam splitter has first to fourth wavelength ranges. In the first wavelength range, almost all of both the P-polarized component and S-polarized component is transmitted. In the second wavelength range in which the beam splitter serves really as a beam splitter, almost all of the P-polarized component is transmitted, and almost all of the S-polarized component is reflected. In the third wavelength range, almost all of both the P-polarized component and S-polarized component is reflected. In the fourth wavelength range in which the beam splitter serves as a non-polarization beam splitter, both of the P-polarized component and S-polarized component are transmitted and reflected, at predetermined rates. The dielectric multilayered film can be designed as follows. That is, the wavelength of 400 nm is included in any of the first to third wavelength ranges. The wavelength of 660 nm is included in any of the first to fourth wavelength ranges. The wavelength of 780 nm is included in any of the first, third, and fourth wavelength ranges.

The term of "almost all" used above means, for example, 90% or more. Also, the "predetermined rates" means, for example, a transmittance of 50% and a reflection rate of 50%. Alternatively, the transmittance and the reflection rate may respectively be 75% and 25% or 25% and 75%. The predetermined rates need not always be strictly uniform for both the P-polarized component and S-polarized component. For example, the transmittance and the reflection rate may respectively be 55% and 45% for the P-polarized component while the transmittance and the reflection rate may respectively be 45% and 55% for the S-polarized component. As long as the ratio between the transmittance and the reflection rate for the P-polarized component and S-polarized component falls within a range of 0.5 to 2, the light amount received by the photodetector is neither reduced half or more nor is increased twice or more even when the birefringence of a disk changes. Since a circuit in a rear stage can respond to changes within this range, no problem is caused by such changes in practical use.

(Beam Splitter A)

Figure 38:
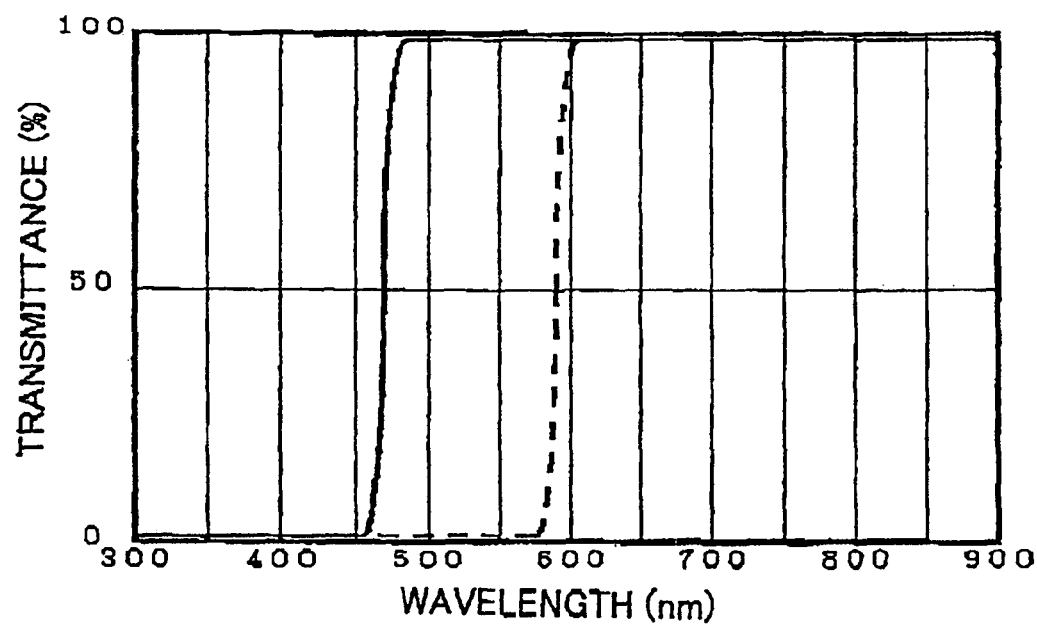
FIG. 38 is a graph showing the wavelength dependence of the transmittance of a beam splitter used in the embodiments of the optical head apparatus according to the present invention.

As shown in FIG. 38, the beam splitter A reflects almost all of both the P-polarized component and S-polarized component of light having a wavelength of 400 nm, transmits almost all of both the P-polarized component and S-polarized component of light having a wavelength of 660 nm, and also transmits almost all of both the P-polarized component and S-polarized component of light having a wavelength of 780 nm.

(Beam Splitter B)

Figure 39:
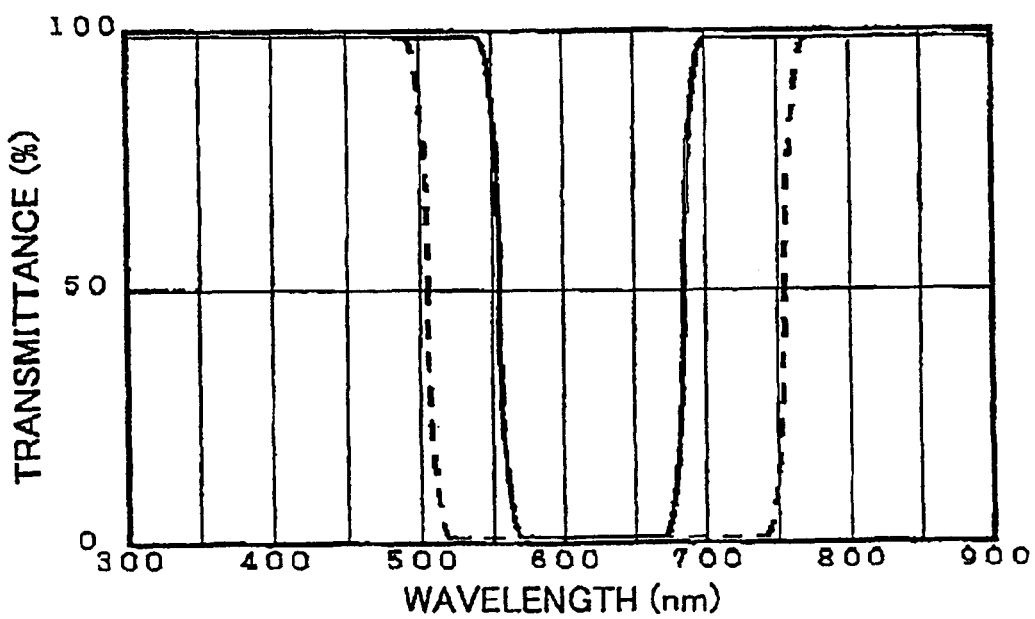
FIG. 39 is a graph showing the wavelength dependence of the transmittance of a beam splitter used in the embodiments of the optical head apparatus according to the present invention.

As shown in FIG. 39, the beam splitter B transmits almost all of both the P-polarized component and S-polarized component of light having a wavelength of 400 nm, reflects almost all of both the P-polarized component and S-polarized component of light having a wavelength of 660 nm, and transmits almost all of both the P-polarized component and S-polarized component of light having a wavelength of 780 nm.

(Beam Splitter C)

Figure 40:
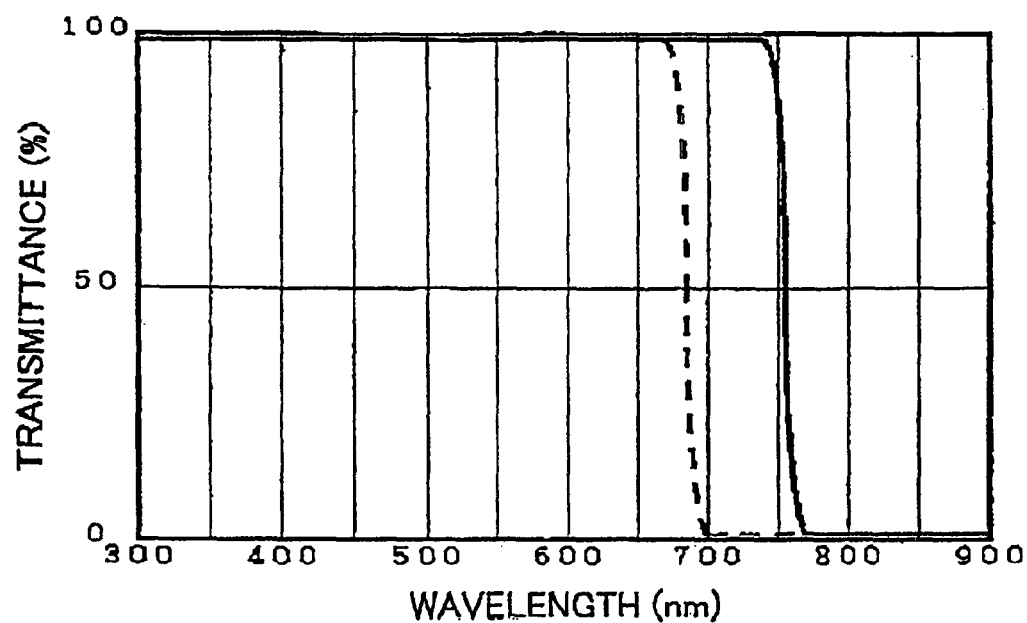
FIG. 40 is a graph showing the wavelength dependence of the transmittance of a beam splitter used in the embodiments of the optical head apparatus according to the present invention.

As shown in FIG. 40, the beam splitter C transmits almost all of both the P-polarized component and S-polarized component of light having a wavelength of 400 nm, also transmits almost all of both the P-polarized component and S-polarized component of light having a wavelength of 660 nm, and reflects almost all of both the P-polarized component and S-polarized component of light having a wavelength of 780 nm.

(Beam Splitter D)

Figure 41:
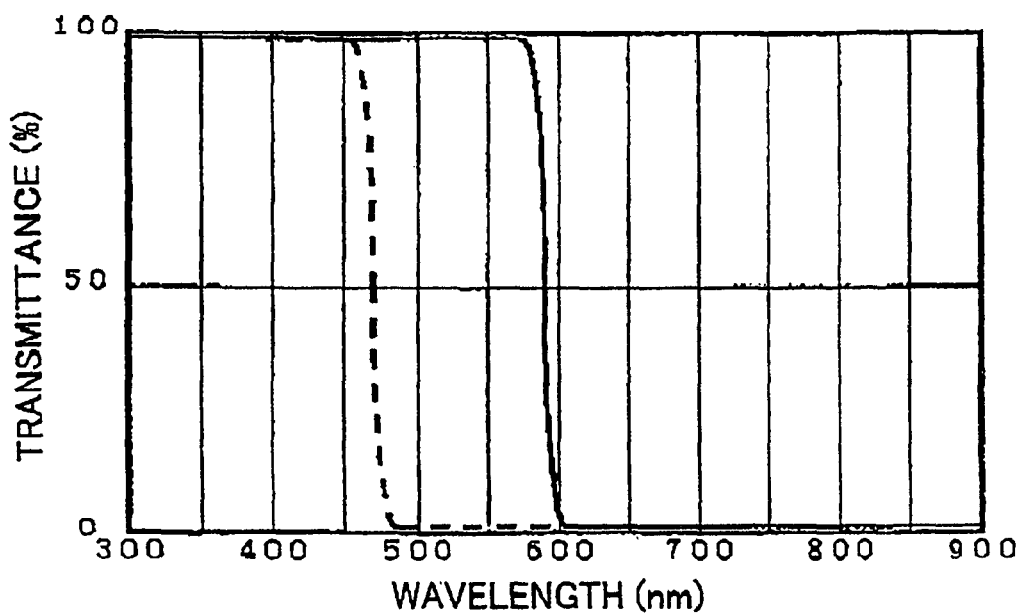
FIG. 41 is a graph showing the wavelength dependence of the transmittance of a beam splitter used in the embodiments of the optical head apparatus according to the present invention.

As shown in FIG. 41, the beam splitter D transmits almost all of both the P-polarized component and S-polarized component of light having a wavelength of 400 nm, reflects almost all of both the P-polarized component and S-polarized component of light having a wavelength of 660 nm, and also reflects almost all of both the P-polarized component and S-polarized component of light having a wavelength of 780 nm.

(Beam Splitter E)

Figure 42:
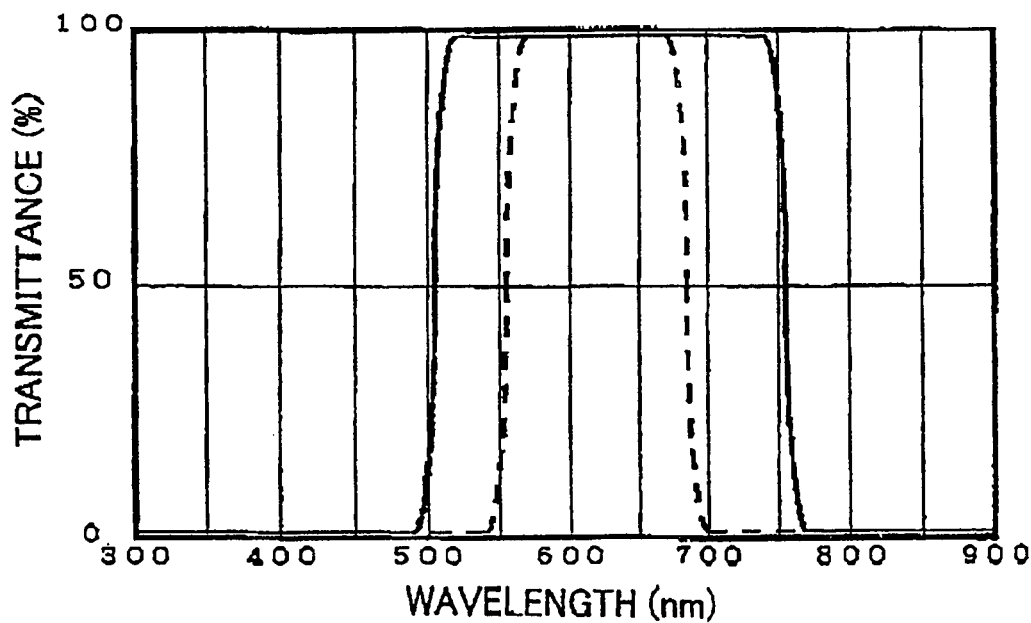
FIG. 42 is a graph showing the wavelength dependence of the transmittance of a beam splitter used in the embodiments of the optical head apparatus according to the present invention.

As shown in FIG. 42, the beam splitter E reflects almost all of both the P-polarized component and S-polarized component of light having a wavelength of 400 nm, transmits almost all of both the P-polarized component and S-polarized component of light having a wavelength of 660 nm, and reflects almost all of both the P-polarized component and S-polarized component of light having a wavelength of 780 nm.

(Beam Splitter F)

Figure 43:
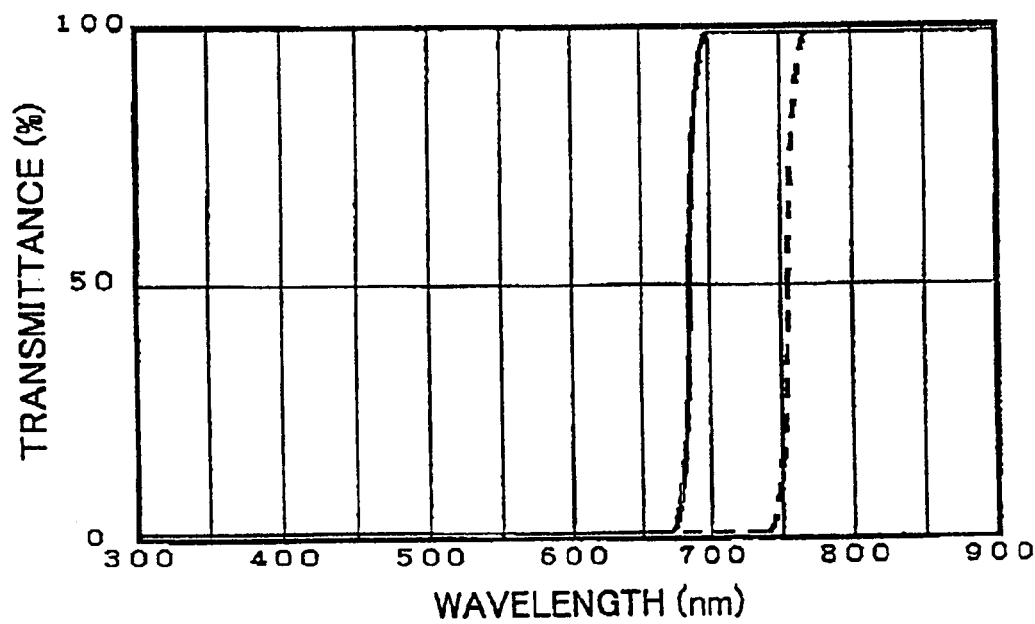
FIG. 43 is a graph showing the wavelength dependence of the transmittance of a beam splitter used in the embodiments of the optical head apparatus according to the present invention.

As shown in FIG. 43, the beam splitter F reflects almost all of both the P-polarized component and S-polarized component of light having a wavelength of 400 nm, reflects almost all of both the P-polarized component and S-polarized component of light having a wavelength of 660 nm, and transmits almost all of both the P-polarized component and S-polarized component of light having a wavelength of 780 nm.

(Beam Splitter G)

Figure 44:
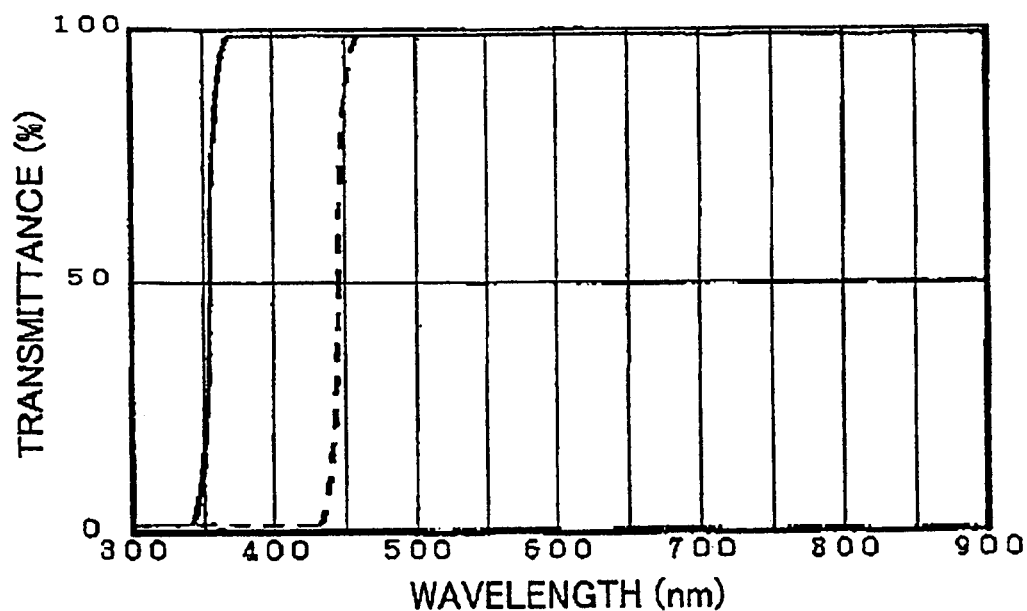
FIG. 44 is a graph showing the wavelength dependence of the transmittance of a beam splitter used in the embodiments of the optical head apparatus according to the present invention.

As shown in FIG. 44, the beam splitter G transmits almost all of the P-polarized component of light having a wavelength of 400 nm, reflects almost all of the S-polarized component of the light having a wavelength of 400 nm, transmits almost all of both the P-polarized component and S-polarized component of light having a wavelength of 660 nm, and transmits almost all of both the P-polarized component and S-polarized component of light having a wavelength of 780 nm.

(Beam Splitter H)

Figure 45:
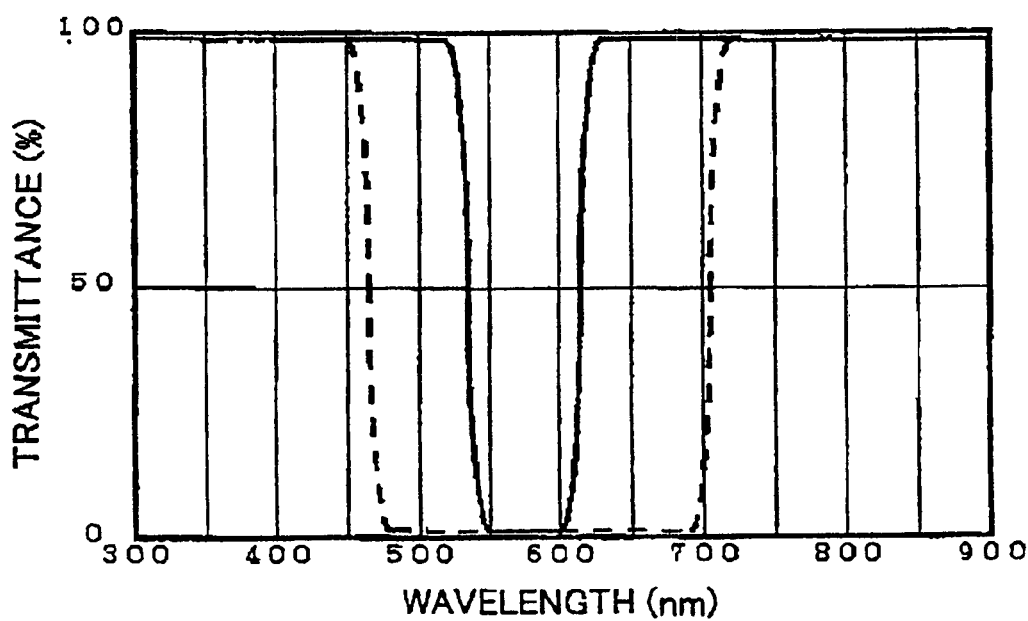
FIG. 45 is a graph showing the wavelength dependence of the transmittance of a beam splitter used in the embodiments of the optical head apparatus according to the present invention.

As shown in FIG. 45, the beam splitter H transmits almost all of both the P-polarized component and S-polarized component of light having a wavelength of 400 nm, transmits almost all of the P-polarized component of light having a wavelength of 660 nm, reflects almost all of the S-polarized component of the light having a wavelength of 660 nm, and transmits almost all of both the P-polarized component and S-polarized component of light having a wavelength of 780 nm.

(Beam Splitter I)

Figure 46:
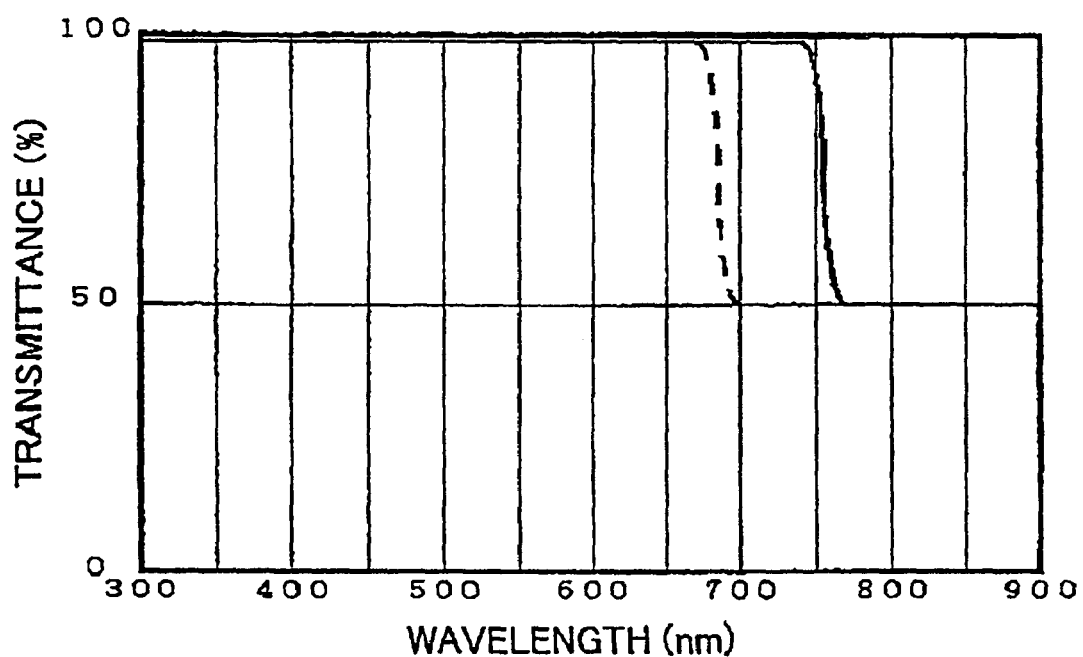
FIG. 46 is a graph showing the wavelength dependence of the transmittance of a beam splitter used in the embodiments of the optical head apparatus according to the present invention.

As shown in FIG. 46, the beam splitter I transmits almost all of both the P-polarized component and S-polarized component of light having a wavelength of 400 nm, also transmits almost all of both the P-polarized component and S-polarized component of light having a wavelength of 660 nm, transmits about 50% of both the S-polarized component and the P-polarized component of the light having a wavelength of 780 nm, and reflects about 50% of both.

(Beam Splitter J)

Figure 47:
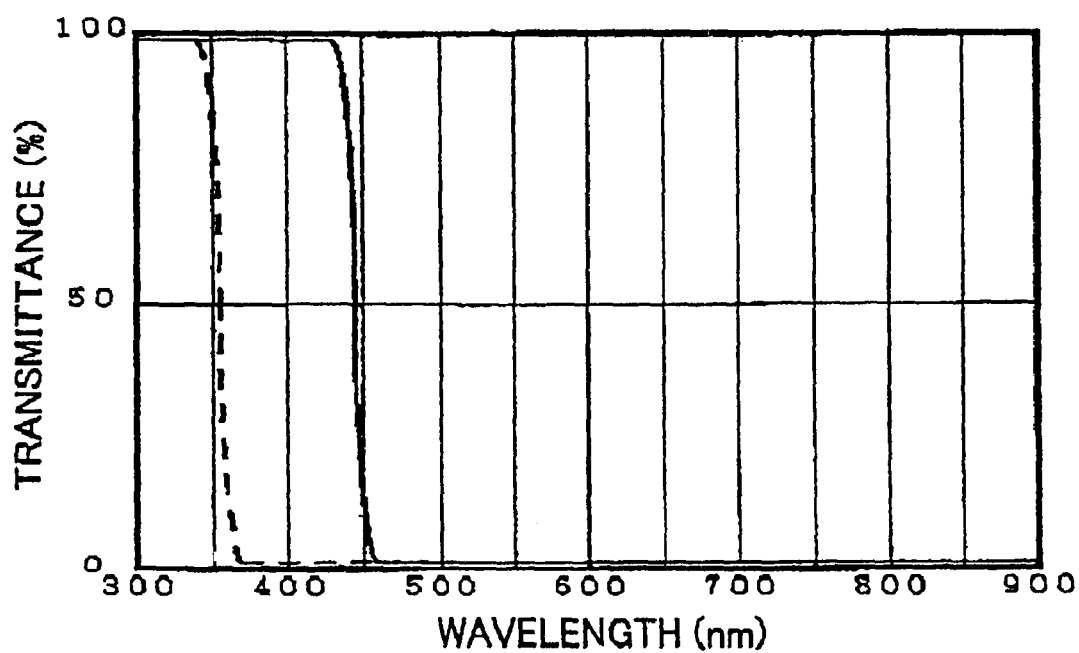
FIG. 47 is a graph showing the wavelength dependence of the transmittance of a beam splitter used in the embodiments of the optical head apparatus according to the present invention.

As shown in FIG. 47, the beam splitter J transmits almost all of the P-polarized component of light having a wavelength of 400 nm, reflects almost all of the S-polarized component thereof, also reflects almost all of both the P-polarized component and S-polarized component of light having a wavelength of 660 nm, and reflects almost all of both the S-polarized component and P-polarized component of the light having a wavelength of 780 nm.

(Beam Splitter K)

Figure 48:
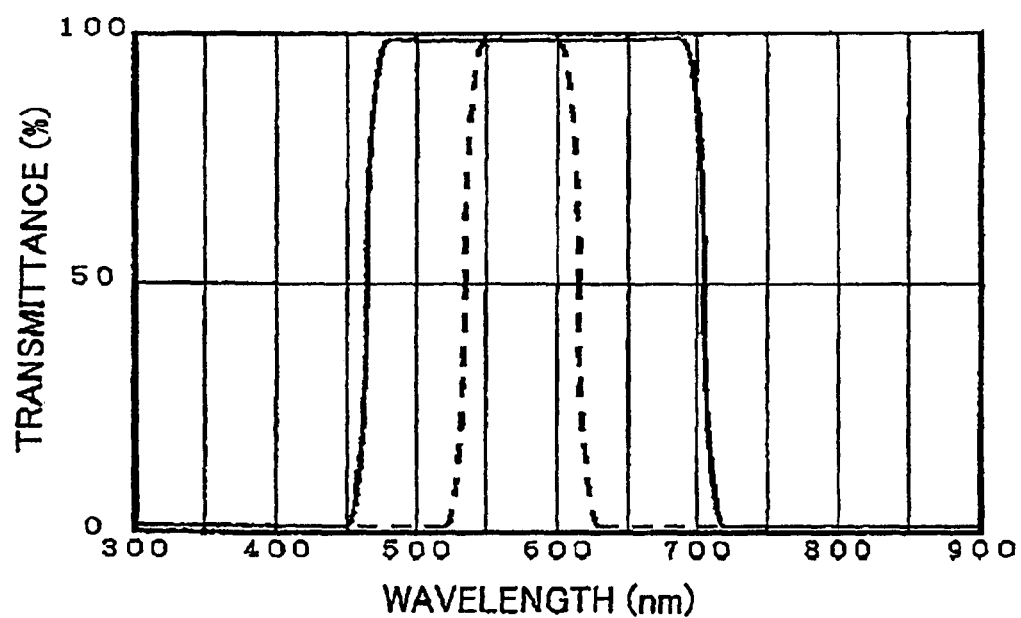
FIG. 48 is a graph showing the wavelength dependence of the transmittance of a beam splitter used in the embodiments of the optical head apparatus according to the present invention.

As shown in FIG. 48, the beam splitter K reflects almost all of both the P-polarized component and S-polarized component of light having a wavelength of 400 nm, transmits almost all of the P-polarized component of light having a wavelength of 660 nm, reflects almost all of the S-polarized component thereof, and reflects almost all of both the S-polarized component and the P-polarized component of light having a wavelength of 780 nm.

(Beam Splitter L)

Figure 49:
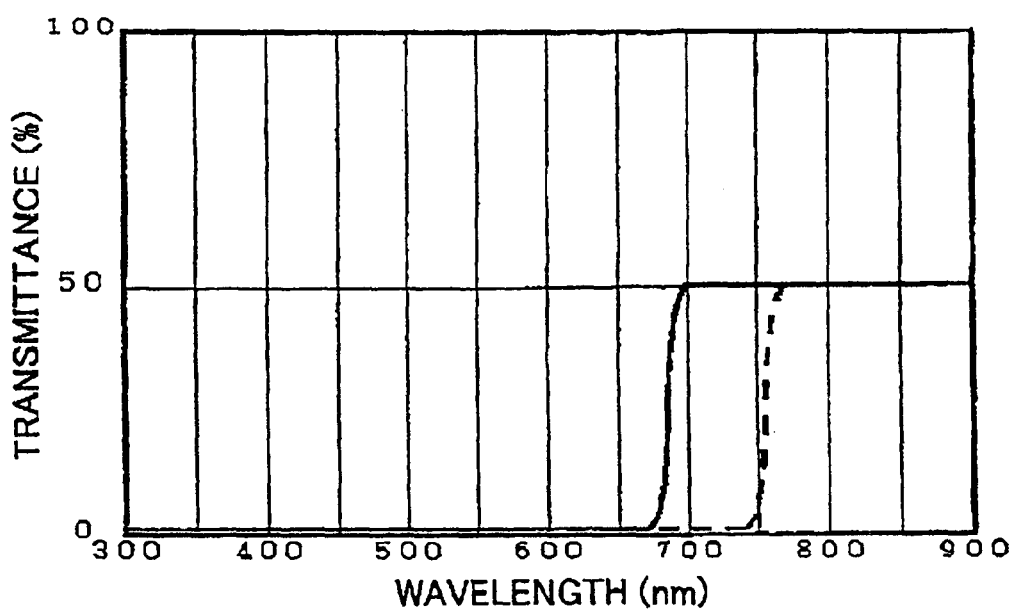
FIG. 49 is a graph showing the wavelength dependence of the transmittance of a beam splitter used in the embodiments of the optical head apparatus according to the present invention.

As shown in FIG. 49, the beam splitter L reflects almost all of both the P-polarized component and the S-polarized component of light having a wavelength of 400 nm, reflects almost all of both the P-polarized component and S-polarized component of light having a wavelength of 660 nm, transmits about 50% of both the P-polarized component and S-polarized component of light having a wavelength of 780 nm, and reflects about 50% of both.

(Beam Splitter M)

Figure 50:
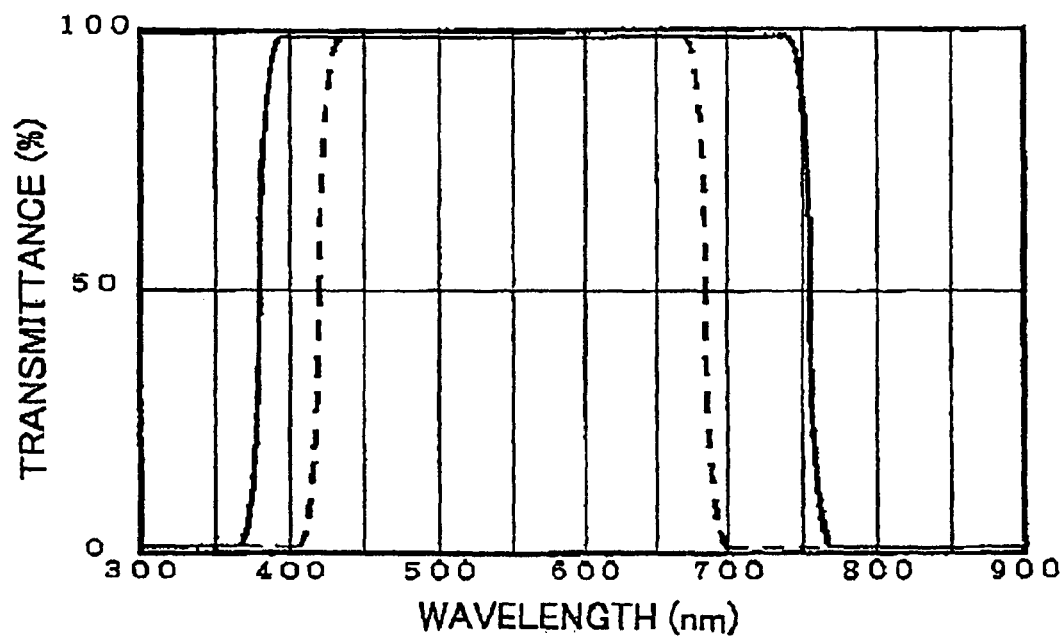
FIG. 50 is a graph showing the wavelength dependence of the transmittance of a beam splitter used in the embodiments of the optical head apparatus according to the present invention.

As shown in FIG. 50, the beam splitter M transmits almost all of the P-polarized component of light having a wavelength of 400 nm, reflects almost all of the S-polarized component thereof, transmits almost all of both the P-polarized component and S-polarized component of light having a wavelength of 660 nm, and reflects almost all of both the P-polarized component and S-polarized component of light having a wavelength of 780 nm.

(Beam Splitter N)

Figure 51:
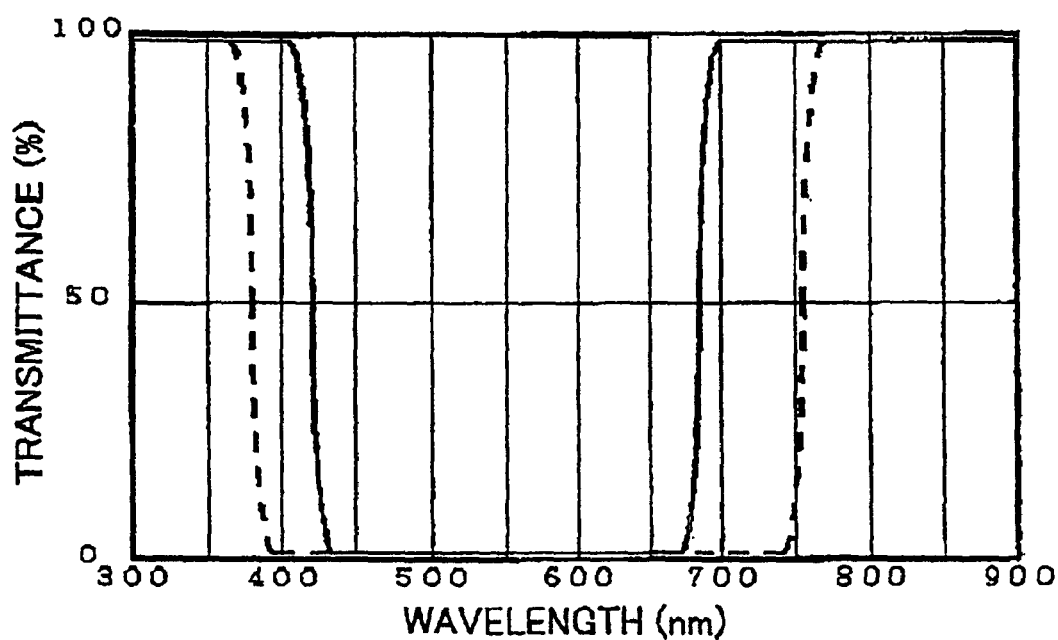
FIG. 51 is a graph showing the wavelength dependence of the transmittance of a beam splitter used in the embodiments of the optical head apparatus according to the present invention.

As shown in FIG. 51, the beam splitter N transmits almost all of the P-polarized component of light having a wavelength of 400 nm, reflects almost all of the S-polarized component thereof, reflects almost all of both the P-polarized component and S-polarized component of light having a wavelength of 660 nm, and transmits almost all of both the P-polarized component and S-polarized component of light having a wavelength of 780 nm.

(Beam Splitter O)

Figure 52:
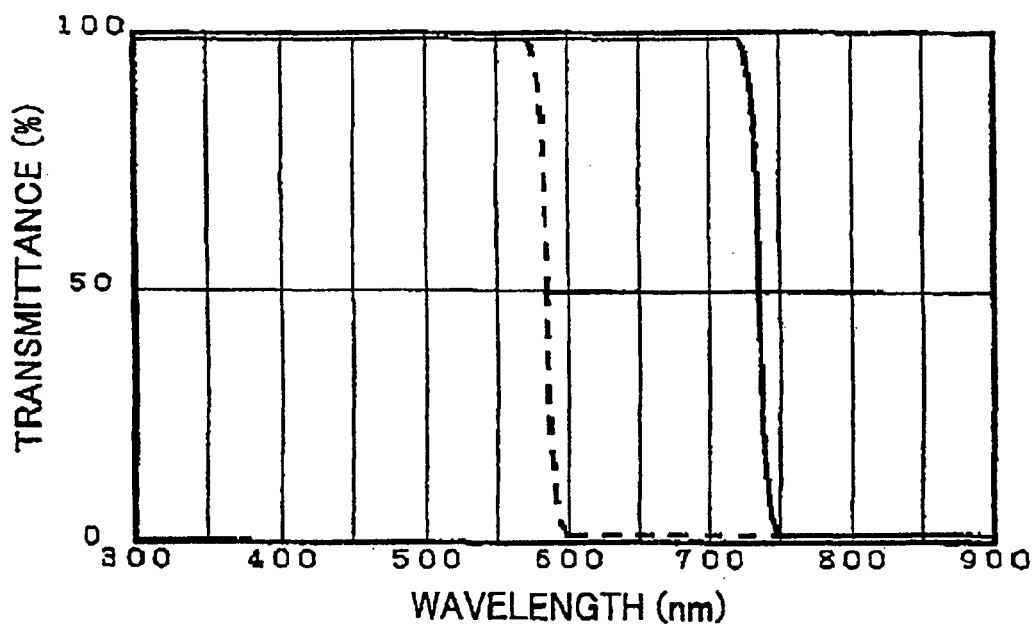
FIG. 52 is a graph showing the wavelength dependence of the transmittance of a beam splitter used in the embodiments of the optical head apparatus according to the present invention.

As shown in FIG. 52, the beam splitter O transmits almost all of both the P-polarized component and S-polarized component of light having a wavelength of 400 nm, transmits almost all of the P-polarized component of light having a wavelength of 660 nm, reflects almost all of the S-polarized component thereof, and reflects almost all of both the P-polarized component and S-polarized component of light having a wavelength of 780 nm.

(Beam Splitter P)

Figure 53:
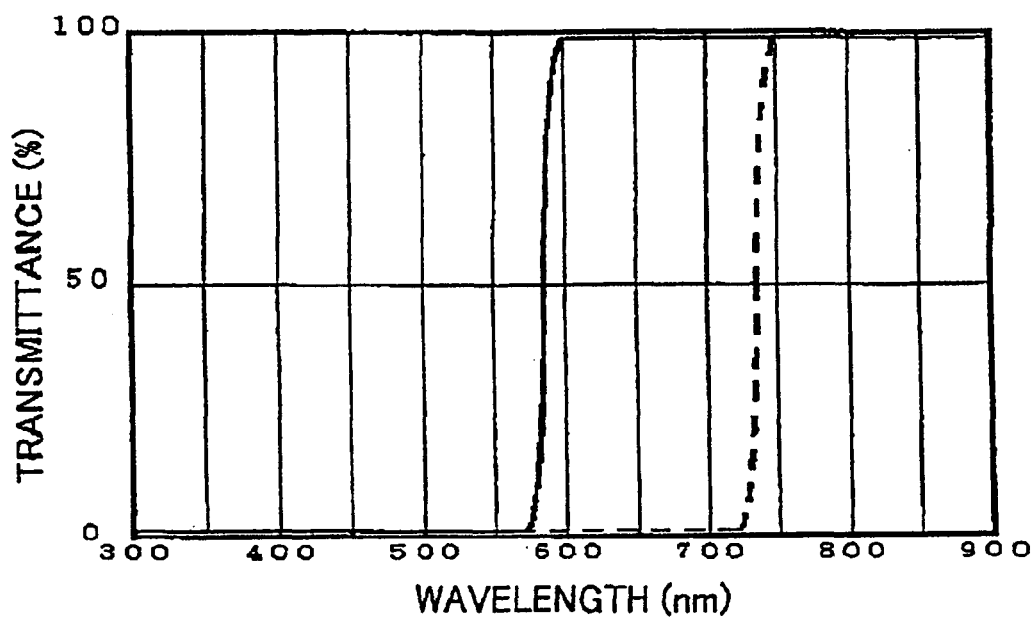
FIG. 53 is a graph showing the wavelength dependence of the transmittance of a beam splitter used in the embodiments of the optical head apparatus according to the present invention.

As shown in FIG. 53, the beam splitter P reflects almost all of both the P-polarized component and S-polarized component of light having a wavelength of 400 nm, transmits almost all of the P-polarized component of light having a wavelength of 660 nm, reflects almost all of the S-polarized component thereof, and transmits almost all of both the P-polarized component and S-polarized component of light having a wavelength of 780 nm.

(Beam splitter Q)

Figure 54:
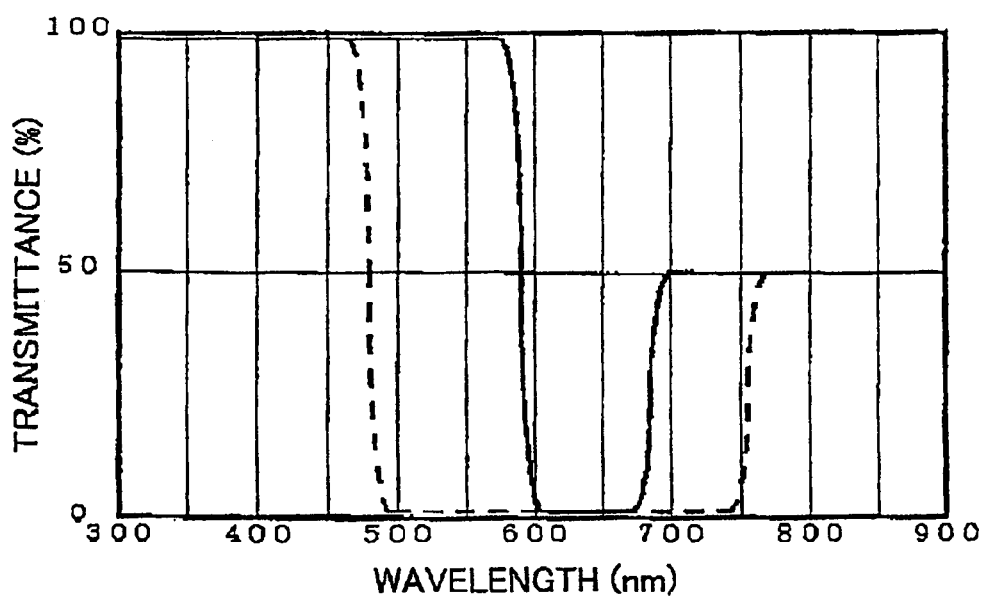
FIG. 54 is a graph showing the wavelength dependence of the transmittance of a beam splitter used in the embodiments of the optical head apparatus according to the present invention.

As shown in FIG. 54, the beam splitter Q transmits almost all of both the P-polarized component and S-polarized component of light having a wavelength of 400 nm, reflects almost all of both the P-polarized component and S-polarized component of light having a wavelength of 660 nm, transmits about 50% of both the P-polarized component and S-polarized component of light having a wavelength of 780 nm, and reflects about 50% of both.

(Beam Splitter R)

Figure 55:
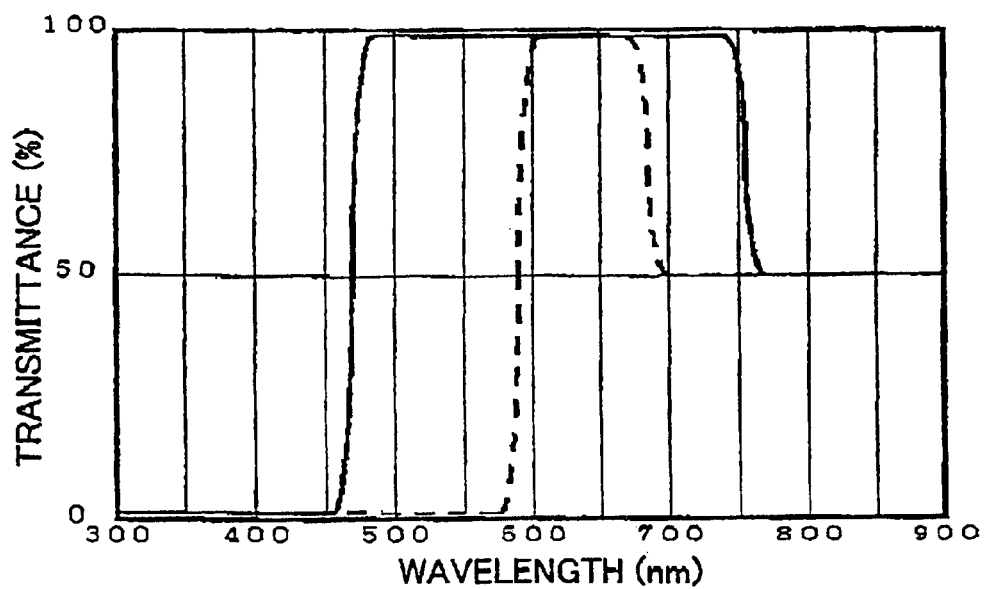
FIG. 55 is a graph showing the wavelength dependence of the transmittance of a beam splitter used in the embodiments of the optical head apparatus according to the present invention.

As shown in FIG. 55, the beam splitter R reflects almost all of both the P-polarized component and S-polarized component of light having a wavelength of 400 nm, transmits almost all of both the P-polarized component and S-polarized component of light having a wavelength of 660 nm, transmits about 50% of both the P-polarized component and S-polarized component of light having a wavelength of 780 nm, and reflects about 50% of both.

(Beam Splitter S)

Figure 56:
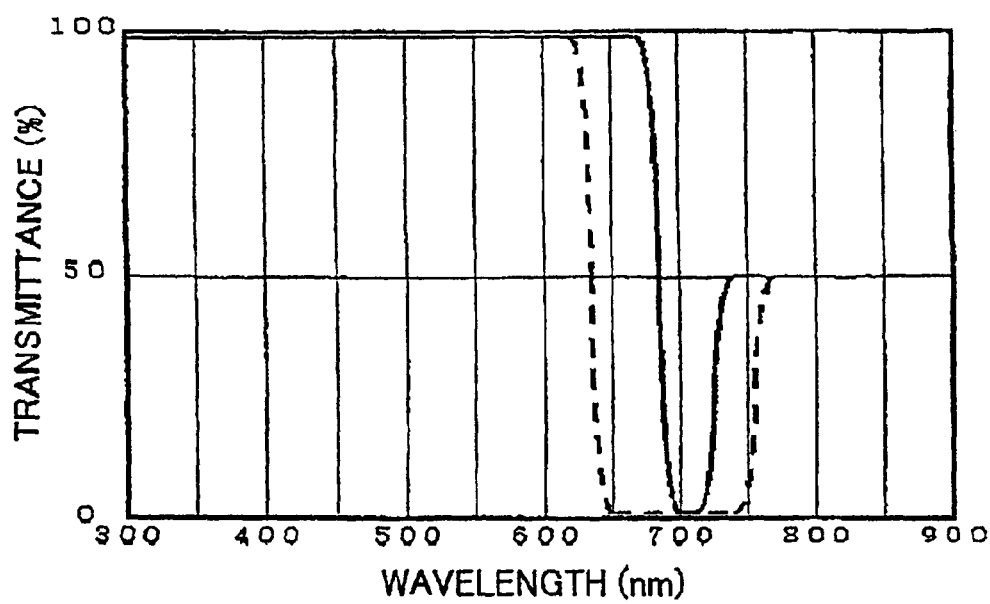
FIG. 56 is a graph showing the wavelength dependence of the transmittance of a beam splitter used in the embodiments of the optical head apparatus according to the present invention.

As shown in FIG. 56, the beam splitter S transmits almost all of both the P-polarized component and S-polarized component of light having a wavelength of 400 nm, transmits almost all of the P-polarized component of light having a wavelength of 660 nm, reflects almost all of the S-polarized component thereof, transmits about 50% of both the P-polarized component and S-polarized component of light having a wavelength of 780 nm, and reflects about 50% of both.

(Beam Splitter T)

Figure 57:
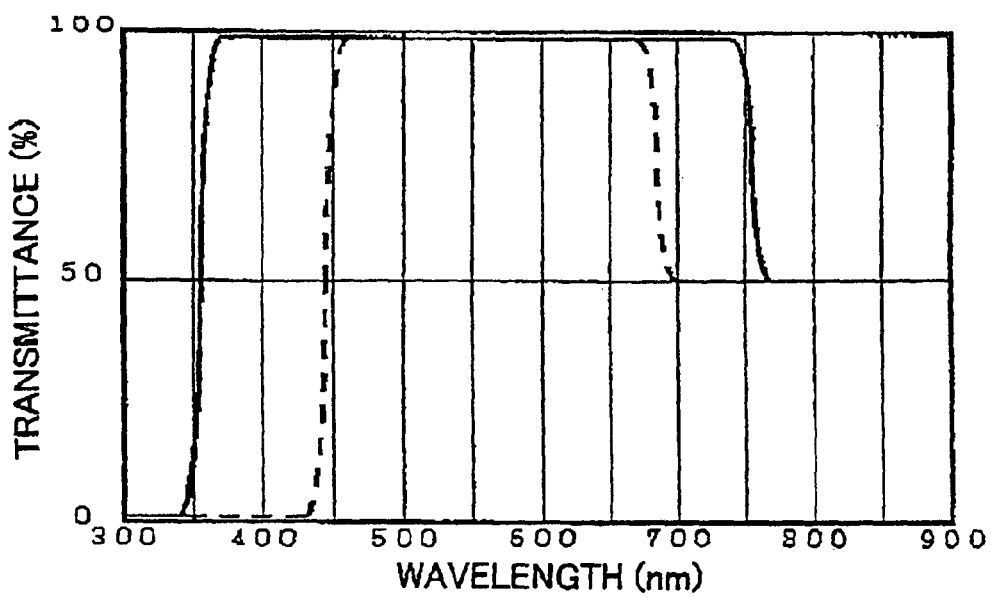
FIG. 57 is a graph showing the wavelength dependence of the transmittance of a beam splitter used in the embodiments of the optical head apparatus according to the present invention.

As shown in FIG. 57, the beam splitter T transmits almost all of the P-polarized component of light having a wavelength of 400 nm, reflects almost all of the S-polarized component thereof, transmits almost all of both the P-polarized component and S-polarized component of light having a wavelength of 660 nm, transmits about 50% of both the P-polarized component and S-polarized component of light having a wavelength of 780 nm, and reflects about 50% of both.

(Beam Splitter U)

Figure 58:
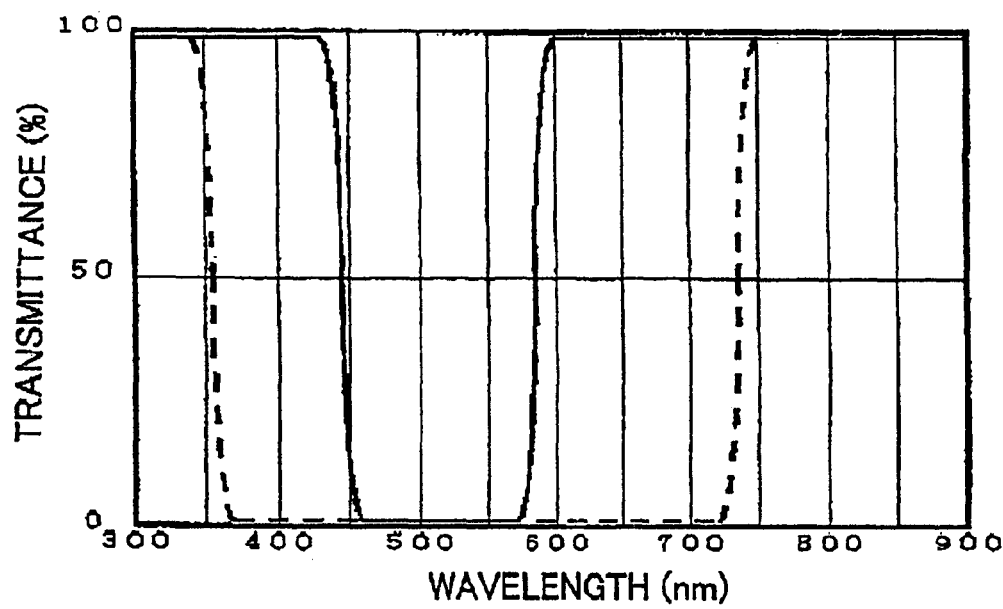
FIG. 58 is a graph showing the wavelength dependence of the transmittance of a beam splitter used in the embodiments of the optical head apparatus according to the present invention.

As shown in FIG. 58, the beam splitter U transmits almost all of the P-polarized component of light having a wavelength of 400 nm, reflects almost all of the S-polarized component thereof, transmits almost all of the P-polarized component of light having a wavelength of 660 nm, reflects almost all of the S-polarized component thereof, transmits almost all of both the P-polarized component and S-polarized component of light having a wavelength of 780 nm.

(Beam Splitter V)

Figure 59:
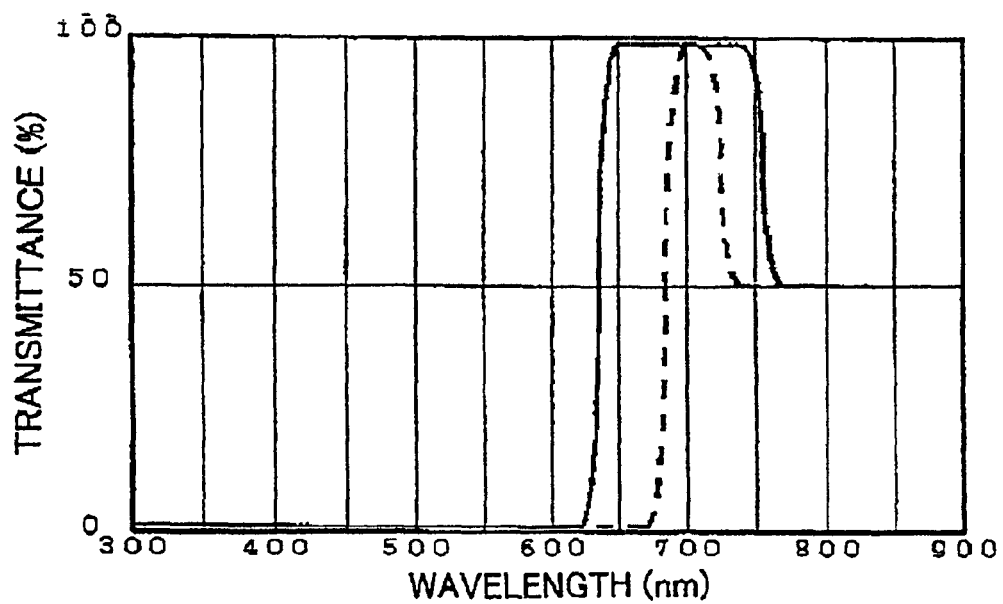
FIG. 59 is a graph showing the wavelength dependence of the transmittance of a beam splitter used in the embodiments of the optical head apparatus according to the present invention.

As shown in FIG. 59, the beam splitter V reflects almost all of both the P-polarized component and S-polarized component of light having a wavelength of 400 nm, transmits almost all of the P-polarized component of light having a wavelength of 660 nm, reflects almost all of the S-polarized component thereof, transmits about 50% of both the P-polarized component and S-polarized component of light having a wavelength of 780 nm, and reflects about 50% of both.

(Beam Splitter W)

Figure 60:
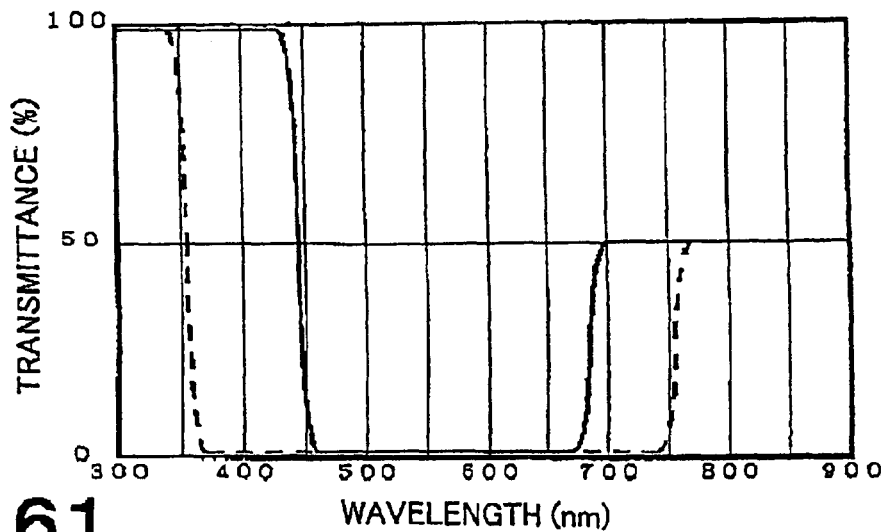
FIG. 60 is a graph showing the wavelength dependence of the transmittance of a beam splitter used in the embodiments of the optical head apparatus according to the present invention.

As shown in FIG. 60, the beam splitter W transmits almost all of the P-polarized component of light having a wavelength of 400 nm, reflects almost all of the S-polarized component thereof, reflects almost all of both the P-polarized component and S-polarized component of light having a wavelength of 660 nm, transmits about 50% of both the P-polarized component and S-polarized component of light having a wavelength of 780 nm, and reflects about 50% of both.

(Beam Splitter X)

Figure 61:
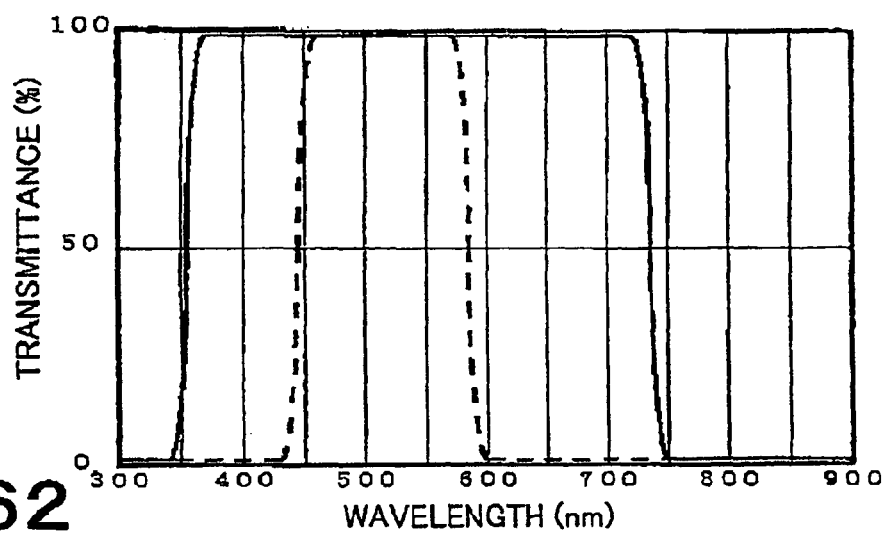
FIG. 61 is a graph showing the wavelength dependence of the transmittance of a beam splitter used in the embodiments of the optical head apparatus according to the present invention.

As shown in FIG. 61, the beam splitter X transmits almost all of the P-polarized component of light having a wavelength of 400 nm, reflects almost all of the S-polarized component thereof, transmits almost all of the P-polarized component of light having a wavelength of 660 nm, reflects almost all of the S-polarized component thereof, and reflects almost all of both the P-polarized component and S-polarized component of light having a wavelength of 780 nm.

(Beam Splitter Y)

Figure 62:
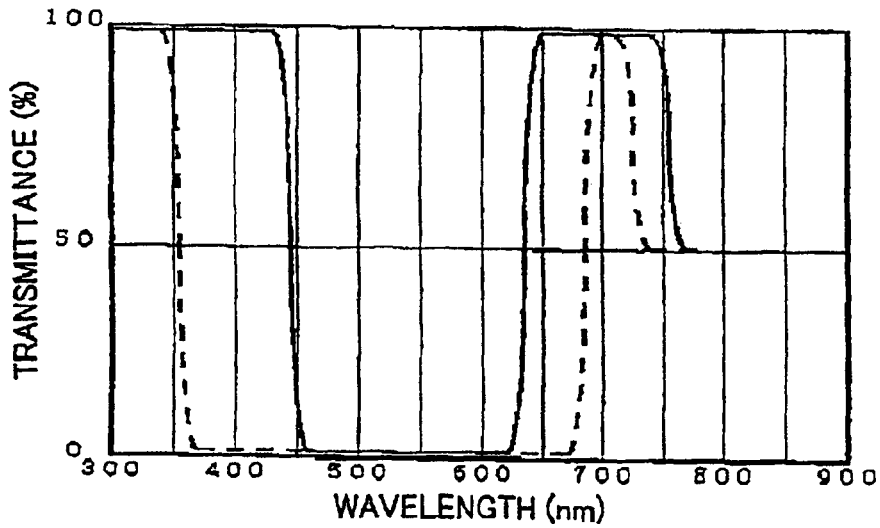
FIG. 62 is a graph showing the wavelength dependence of the transmittance of a beam splitter used in the embodiments of the optical head apparatus according to the present invention.

As shown in FIG. 62, the beam splitter Y transmits almost all of the P-polarized component of light having a wavelength of 400 nm, reflects almost all of the S-polarized component thereof, transmits almost all of the P-polarized component of light having a wavelength of 660 nm, reflects almost all of the S-polarized component thereof, transmits about 50% of both the P-polarized component and S-polarized component of light having a wavelength of 780 nm, and reflects about 50% of both.

(Beam Splitter h)

Figure 63:
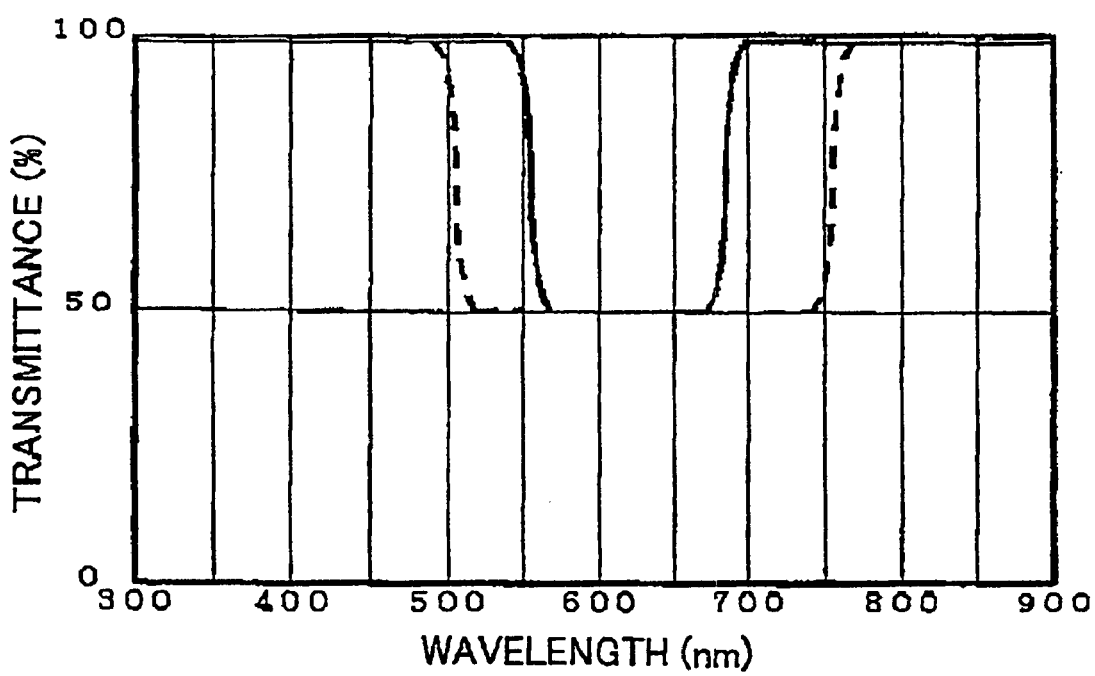
FIG. 63 is a graph showing the wavelength dependence of the transmittance of a beam splitter used in the embodiments of the optical head apparatus according to the present invention.

As shown in FIG. 63, the beam splitter h transmits almost all of both the P-polarized component and S-polarized component of light having a wavelength of 400 nm, transmits about 50% of both the P-polarized component and S-polarized component of light having a wavelength of 660 nm, reflects about 50% of both, and transmits almost all of both the P-polarized component and S-polarized component of light having a wavelength of 780 nm.

(Beam Splitter k)

Figure 64:
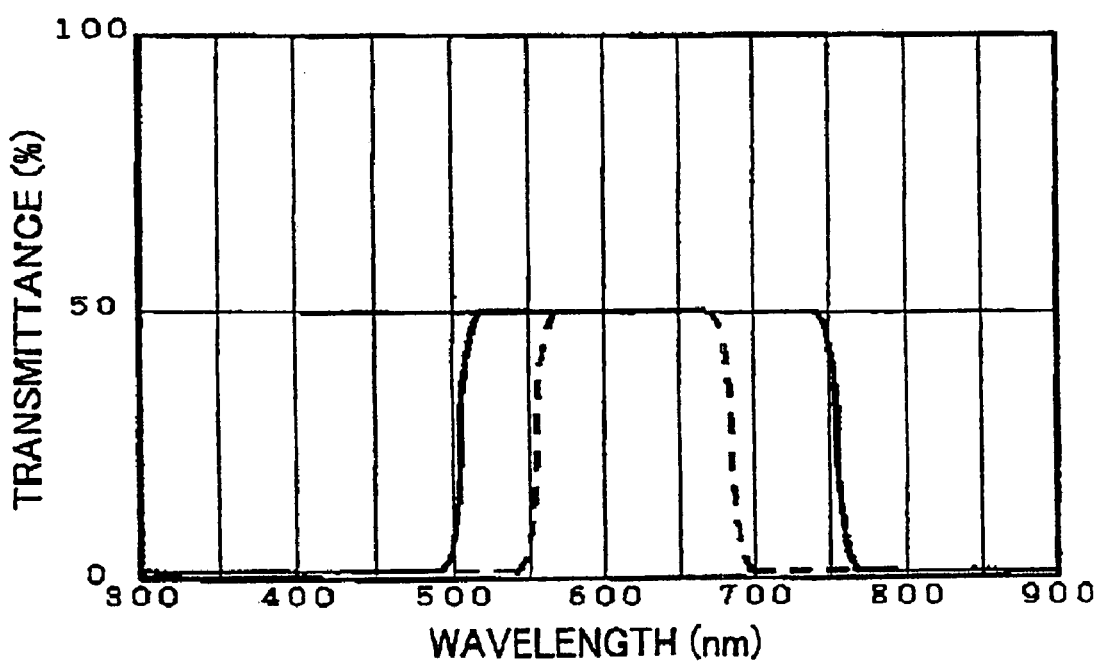
FIG. 64 is a graph showing the wavelength dependence of the transmittance of a beam splitter used in the embodiments of the optical head apparatus according to the present invention.

As shown in FIG. 64, the beam splitter k reflects almost all of both the P-polarized component and S-polarized component of light having a wavelength of 400 nm, transmits about 50% of both the P-polarized component and S-polarized component of light having a wavelength of 660 nm, reflects about 50% of both, and reflects almost all of both the P-polarized component and S-polarized component of light having a wavelength of 780 nm.

(Beam Splitter o)

Figure 65:
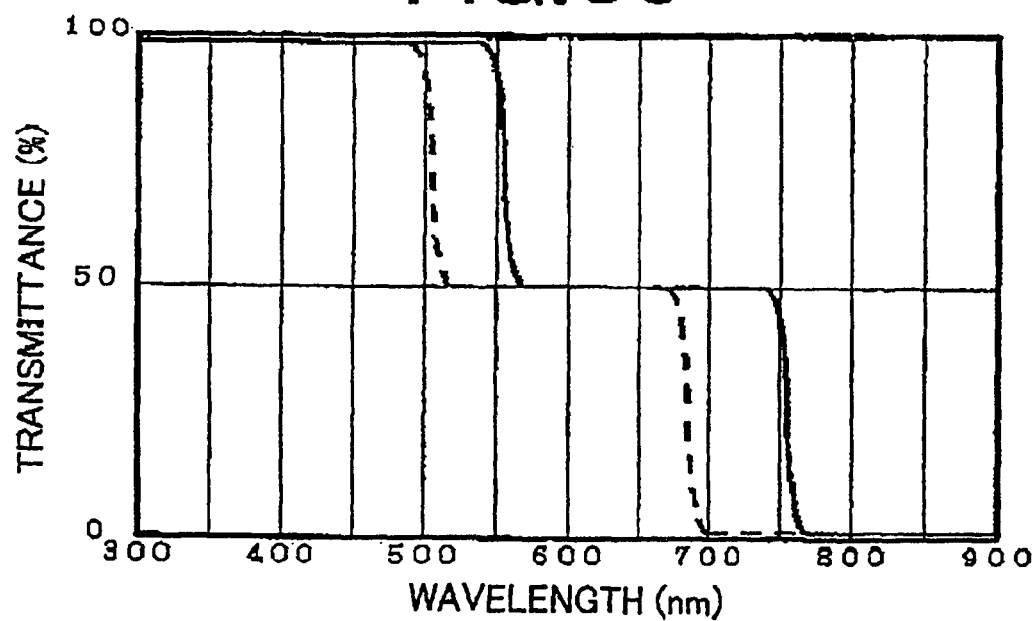
FIG. 65 is a graph showing the wavelength dependence of the transmittance of a beam splitter used in the embodiments of the optical head apparatus according to the present invention.

As shown in FIG. 65, the beam splitter o transmits almost all of both the P-polarized component and S-polarized component of light having a wavelength of 400 nm, transmits about 50% of both the P-polarized component and S-polarized component of light having a wavelength of 660 nm, reflects about 50% of both, and reflects almost all of both the P-polarized component and S-polarized component of light having a wavelength of 780 nm.

(Beam Splitter p)

Figure 66:
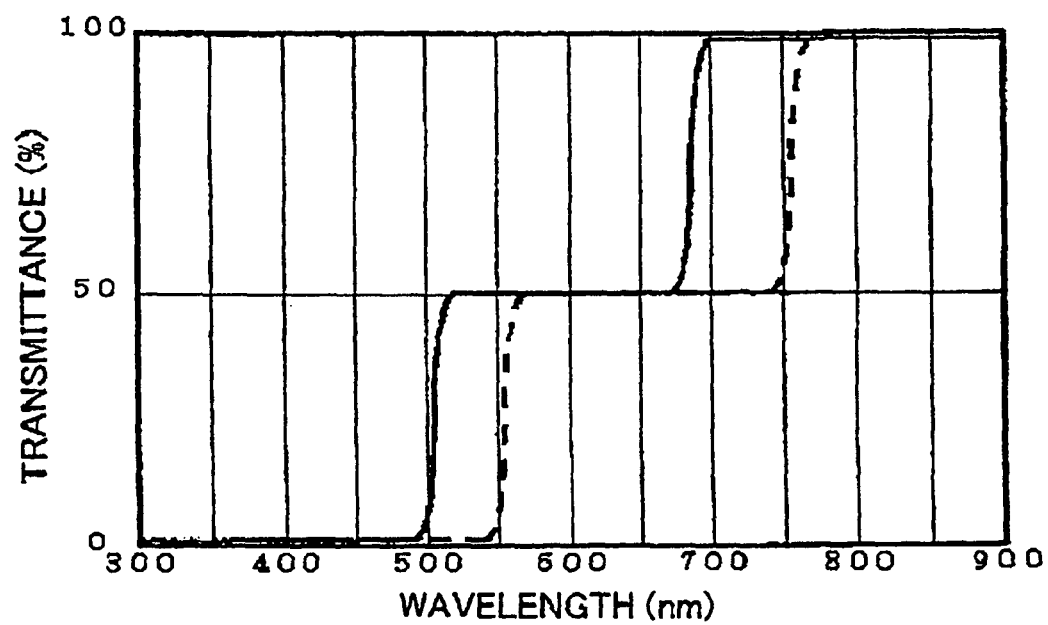
FIG. 66 is a graph showing the wavelength dependence of the transmittance of a beam splitter used in the embodiments of the optical head apparatus according to the present invention.

As shown in FIG. 66, the beam splitter p reflects almost all of both the P-polarized component and S-polarized component of light having a wavelength of 400 nm, transmits about 50% of both the P-polarized component and S-polarized component of light having a wavelength of 660 nm, reflects about 50% of both, and transmits almost all of both the P-polarized component and S-polarized component of light having a wavelength of 780 nm.

(Beam Splitter s)

Figure 67:
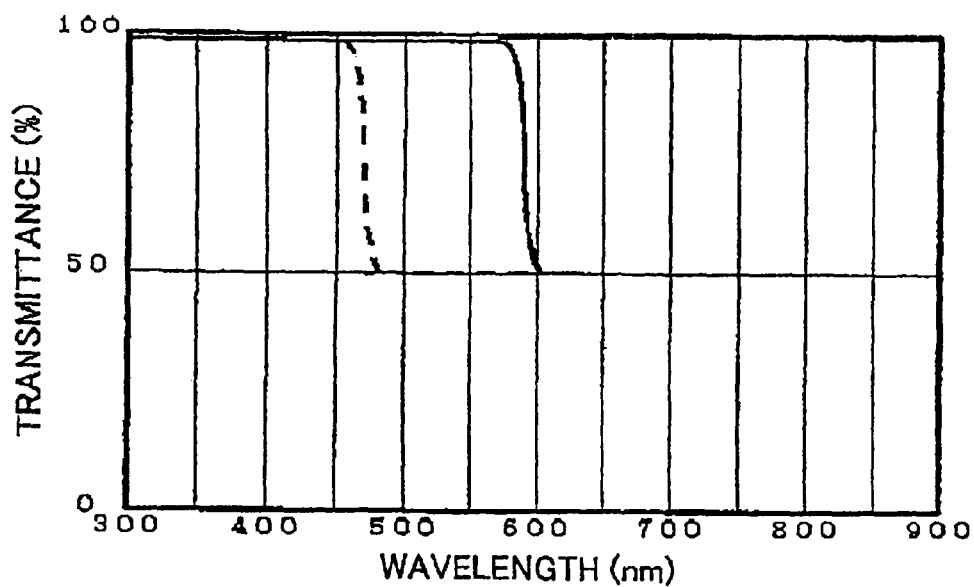
FIG. 67 is a graph showing the wavelength dependence of the transmittance of a beam splitter used in the embodiments of the optical head apparatus according to the present invention.

As shown in FIG. 67, the beam splitter s transmits almost all of both the P-polarized component and S-polarized component of light having a wavelength of 400 nm, transmits about 50% of both the P-polarized component and S-polarized component of light having a wavelength of 660 nm, reflects about 50% of both, transmits about 50% of both the P-polarized component and S-polarized component of light having a wavelength of 780 nm, and reflects about 50% of both.

(Beam Splitter u)

Figure 68:
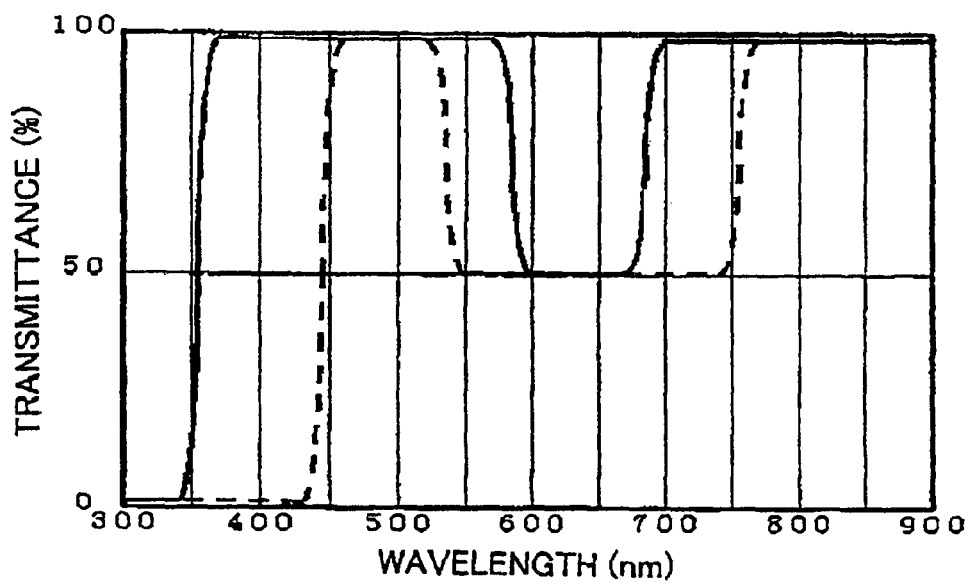
FIG. 68 is a graph showing the wavelength dependence of the transmittance of a beam splitter used in the embodiments of the optical head apparatus according to the present invention.

As shown in FIG. 68, the beam splitter u transmits almost all of the P-polarized component of light having a wavelength of 400 nm, reflects almost all of the S-polarized component thereof, transmits about 50% of both the P-polarized component and S-polarized component of light having a wavelength of 660 nm, reflects about 50% of both, and transmits almost all of both the P-polarized component and S-polarized component of light having a wavelength of 780 nm.

(Beam Splitter v)

Figure 69:
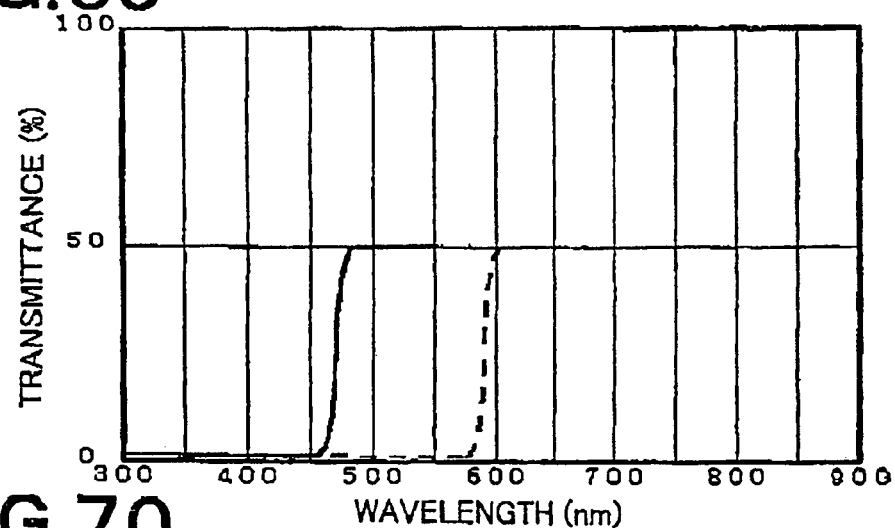
FIG. 69 is a graph showing the wavelength dependence of the transmittance of a beam splitter used in the embodiments of the optical head apparatus according to the present invention.

As shown in FIG. 69, the beam splitter v reflects almost all of both the P-polarized component and S-polarized component of light having a wavelength of 400 nm, transmits about 50% of both the P-polarized component and S-polarized component of light having a wavelength of 660 nm, reflects about 50% of both, transmits about 50% of both the P-polarized component and S-polarized component of light having a wavelength of 780 nm, and reflects about 50% of both.

(Beam splitter x)

Figure 70:
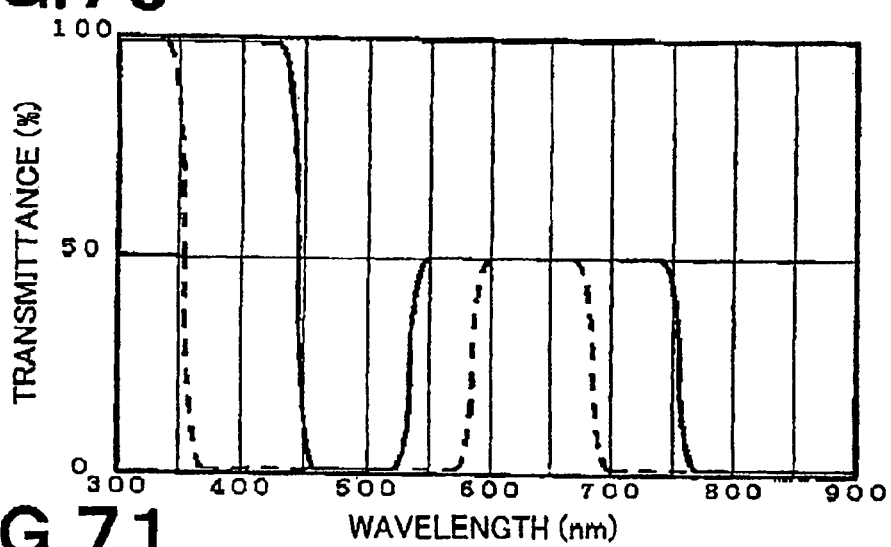
FIG. 70 is a graph showing the wavelength dependence of the transmittance of a beam splitter used in the embodiments of the optical head apparatus according to the present invention.

As shown in FIG. 70, the beam splitter x transmits almost all of the P-polarized component of light having a wavelength of 400 nm, reflects almost all of the S-polarized component thereof, transmits about 50% of both the P-polarized component and S-polarized component of light having a wavelength of 660 nm, reflects about 50% of both, and reflects almost all of both the P-polarized component and S-polarized component of light having a wavelength of 780 nm.

(Beam Splitter y)

Figure 71:
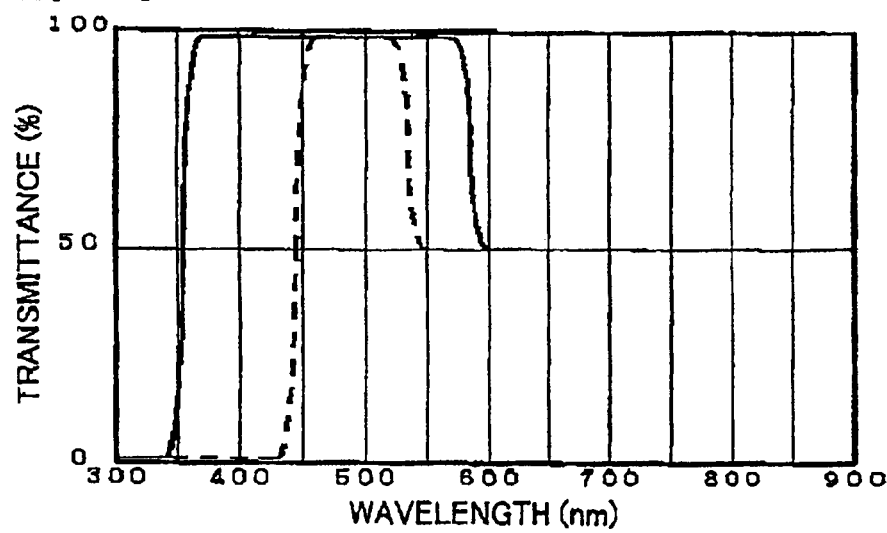
FIG. 71 is a graph showing the wavelength dependence of the transmittance of a beam splitter used in the embodiments of the optical head apparatus according to the present invention.

As shown in FIG. 71, the beam splitter y transmits almost all of the P-polarized component of light having a wavelength of 400 nm, reflects almost all of the S-polarized component thereof, transmits about 50% of both the P-polarized component and S-polarized component of light having a wavelength of 660 nm, reflects about 50% of both, transmits about 50% of both the P-polarized component and S-polarized component of light having a wavelength of 780 nm, and reflects about 50% of both.

Tables 1 and 2 show the characteristics of the beam splitters A to Y, h, k, o, p, s, u, v, x, and y described above.

TABLE 1

| | Light having a wavelength of 400 nm | | Light having a wavelength of 660 nm | | Light having a wavelength of 780 nm | |
|---|---|---|---|---|---|---|
| | p-polarized component | s-polarized component | p-polarized component | s-polarized component | p-polarized component | s-polarized component |
| Beam splitter A | Reflect | | Transmit | | Transmit | |
| Beam splitter B | Transmit | | Reflect | | Transmit | |
| Beam splitter C | Transmit | | Transmit | | Reflect | |
| Beam splitter D | Transmit | | Reflect | | Reflect | |
| Beam splitter E | Reflect | | Transmit | | Reflect | |
| Beam splitter F | Reflect | | Reflect | | Transmit | |
| Beam splitter G | Transmit | Reflect | Transmit | | Transmit | |
| Beam splitter H | Transmit | | Transmit | Reflect | Transmit | |
| Beam splitter I | Transmit | | Transmit | | About 50% transmit, About 50% reflect | |
| Beam splitter J | Transmit | Reflect | Reflect | | Reflect | |
| Beam splitter K | Reflect | | Transmit | Reflect | Reflect | |
| Beam splitter L | Reflect | | Reflect | | About 50% transmit, About 50% reflect | |

TABLE 1-continued

| | Light having a wavelength of 400 nm | | Light having a wavelength of 660 nm | | Light having a wavelength of 780 nm | |
|---|---|---|---|---|---|---|
| | p-polarized component | s-polarized component | p-polarized component | s-polarized component | p-polarized component | s-polarized component |
| Beam splitter M | Transmit | Reflect | Transmit | Transmit | Reflect | Reflect |
| Beam splitter N | Transmit | Reflect | Reflect | Reflect | Transmit | Transmit |
| Beam splitter O | Transmit | Transmit | Transmit | Reflect | Reflect | Reflect |
| Beam splitter P | Reflect | Reflect | Transmit | Reflect | Transmit | Transmit |
| Beam splitter Q | Transmit | Transmit | Reflect | Reflect | About 50% transmit, About 50% reflect | About 50% transmit, About 50% reflect |
| Beam splitter R | Reflect | Reflect | Transmit | Transmit | About 50% transmit, About 50% reflect | About 50% transmit, About 50% reflect |
| Beam splitter S | Transmit | Transmit | Transmit | Reflect | About 50% transmit, About 50% reflect | About 50% transmit, About 50% reflect |
| Beam splitter T | Transmit | Reflect | Transmit | Transmit | About 50% transmit, About 50% reflect | About 50% transmit, About 50% reflect |
| Beam splitter U | Transmit | Reflect | Transmit | Reflect | Transmit | Transmit |
| Beam splitter V | Reflect | Reflect | Transmit | Reflect | About 50% transmit, About 50% reflect | About 50% transmit, About 50% reflect |
| Beam splitter W | Transmit | Reflect | Reflect | Reflect | About 50% transmit, About 50% reflect | About 50% transmit, About 50% reflect |
| Beam splitter X | Transmit | Reflect | Transmit | Reflect | Reflect | Reflect |
| Beam splitter Y | Transmit | Reflect | Transmit | Reflect | About 50% transmit, About 50% reflect | About 50% transmit, About 50% reflect |

TABLE 2

| | Light having a wavelength of 400 nm | | Light having a wavelength of 660 nm | | Light having a wavelength of 780 nm | |
|---|---|---|---|---|---|---|
| | p-polarized component | s-polarized component | p-polarized component | s-polarized component | p-polarized component | s-polarized component |
| Beam splitter h | Transmit | Transmit | About 50% transmit, About 50% reflect | About 50% transmit, About 50% reflect | Transmit | Transmit |
| Beam splitter k | Reflect | Reflect | About 50% transmit, About 50% reflect | About 50% transmit, About 50% reflect | Reflect | Reflect |
| Beam splitter o | Transmit | Transmit | About 50% transmit, About 50% reflect | About 50% transmit, About 50% reflect | Reflect | Reflect |
| Beam splitter p | Reflect | Reflect | About 50% transmit, About 50% reflect | About 50% transmit, About 50% reflect | Transmit | Transmit |
| Beam splitter s | Transmit | Transmit | About 50% transmit, About 50% reflect | About 50% transmit, About 50% reflect | About 50% transmit, About 50% reflect | About 50% transmit, About 50% reflect |
| Beam splitter u | Transmit | Reflect | About 50% transmit, About 50% reflect | About 50% transmit, About 50% reflect | Transmit | Transmit |
| Beam splitter v | Reflect | Reflect | About 50% transmit, About 50% reflect | About 50% transmit, About 50% reflect | About 50% transmit, About 50% reflect | About 50% transmit, About 50% reflect |
| Beam splitter x | Transmit | Reflect | About 50% transmit, About 50% reflect | About 50% transmit, About 50% reflect | Reflect | Reflect |
| Beam splitter y | Transmit | Reflect | About 50% transmit, About 50% reflect | About 50% transmit, About 50% reflect | About 50% transmit, About 50% reflect | About 50% transmit, About 50% reflect |

2. Characteristics of the Wavelength Plate

Described next will be a wavelength plate (corresponding to the wavelength plate 202 shown in FIGS. 1 to 37 and 82 described later) used in the embodiments of the optical head apparatus according to the present invention. The wavelength plate used in the embodiments of the optical head apparatus according to the present invention is a quarter-wave plate covering a wide band corresponding to light having wavelengths of 400 nm, 660 nm, and 780 nm. A wide-band quarter-wave plate of this type is, for example, described in JP-A-H05 (1993)-100114.

In the embodiments of the optical head apparatus according to the present invention, a optical wave synthesizing/separating system is constructed by combining a polarizing beam splitter for light having a wavelength of 400 nm, a polarizing beam splitter or non-polarization beam splitter for light having a wavelength of 660 nm, at least one beam splitter including a non-polarization beam splitter for light having a wavelength of 780 nm, and a wavelength plate. The wavelength plate is provided at the closest position to an objective lens in the optical wave synthesizing/separating system.

Thus, with respect to the light having a wavelength of 400 nm, incident light onto the beam splitter has only one of P- and S-polarized components. With respect to light having a wavelength of 660 nm, incident light onto the beam splitter has only one of P- and S-polarized components in case of combining a polarizing beam splitter and a wavelength plate. In case where a beam splitter transmits both the P-polarized component and S-polarized component or reflects both, a phase difference occurs between the P-polarized component and S-polarized component which have been transmitted or reflected by the beam splitter. Therefore, if incident light onto a beam splitter has both the P-polarized component and S-polarized component, the state of polarization is disturbed when light is transmitted or reflected by the beam splitter, so that the optical wave synthesizing/separating system does not function properly. However, when the incident light onto the beam splitter contains only one of the P-polarized component and S-polarized component, the state of polarization is not disturbed when light is transmitted or reflected by the beam splitter, so that the optical wave synthesizing/separating system functions properly. Meanwhile, with respect to light having a wavelength of 780 nm, incident light onto the beam splitter has both the P-polarized component and S-polarized component if birefringence is effected by a disk. With respect to light having a wavelength of 660 nm in case of using a non-polarization beam splitter, incident light onto the beam splitter also has both the P-polarized component and S-polarized component if birefringence is effected by a disk. Therefore, if incident light onto the beam splitter has both the P-polarized component and S-polarized component, the state of polarization is disturbed when light is transmitted or reflected by the beam splitter. However, the characteristics of the optical wave synthesizing/separating system do not substantially depend on the state of polarization. The optical wave synthesizing/separating system hence functions properly even when the state of polarization is disturbed.

At this time, the efficiency at which light passes the optical wave synthesizing/separating system in both the forward path and the backward path can be raised to be higher than 50%, with respect to light having wavelengths of 400 nm and 660 nm, by combining the polarizing beam splitter and the wavelength plate. With respect to light having wavelengths of 660 nm and 780 nm, the efficiency at which light passes through the optical wave synthesizing/separating system in the backward path can be made substantially independent from the polarization state, by using the non-polarization beam splitter. Further, if birefringence is not effected by a disk, the polarization direction of light which has been reflected by the disk and returns to the light source is perpendicular to the polarization direction of light emitted from the light source, so that noise from the light source due to interference between the light of both polarization directions can be suppressed, by using a wavelength plate.

In the following, descriptions will be made of embodiments of the optical head apparatus according to the present invention using the optical wave synthesizing/separating system (e.g., beam splitters and a wavelength plate) having the characteristics as described above.

In the descriptions, the optical head apparatus capable of recording and reproducing data on disks according to any of the next generation standard (the AOD standard, BRD standard, or the like), DVD standard, and CD standard needs a light source of a wavelength of 400 nm for the next-generation standard, a light source of a wavelength of 660 nm for the DVD standard, a light source of a wavelength of 780 nm for the CD standard, a photodetector for the next-generation standard, a photodetector for the DVD standard, and a photodetector for the CD standard. That is, this kind of optical head apparatus needs three light sources and three photodetectors.

To downsize this optical head apparatus, these devices should desirably be integrated or shared as much as possible. More specifically, there can be a method of integrating light sources and photodetectors as modules, a method of integrating plural light sources, or a method of sharing plural photodetectors. Each of the following embodiments will be described with reference to a case of using semiconductor lasers as light sources.

3. First to Fourth Embodiments

Type 1

Each of the first to fourth embodiments of the present invention has a form which has three light sources and two photodetectors.

First Embodiment

FIG. 1 shows the first embodiment of the optical head apparatus according to the present invention. Wavelengths of the semiconductor lasers $1a$, $1b$, and $1c$ are 780 nm, 660 nm, and 400 nm, respectively. The beam splitter D is used as a beam splitter $51a$. Any of the beam splitters K, O, and X is used as a beam splitter $51b$. Any of the beam splitters L, Q, W, S, V, and Y is used as the beam splitter $51c$. Any of the beam splitters G, J, M, N, T, U, W, X, and Y is used as the beam splitter $51d$.

Light having a wavelength of 400 nm and emitted from the semiconductor laser $1c$ enters, as S-polarized, into the beam splitter $51d$. Almost all of the light is reflected therefrom and passes through the beam splitter $51a$. This light is then reflected by a mirror 201 and transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that of the forward path. The light is then reflected by the mirror 201, and almost all of the light passes through the beam splitter $51a$. The light further enters, as P-polarized, into the beam splitter $51d$. Almost all of the light passes through the beam splitter $51d$ and is received by the photodetector $101b$.

Light having a wavelength of 660 nm and emitted from the semiconductor laser $1b$ enters, as P-polarized into the beam splitter $51b$. Almost all of the light passes through the beam splitter $51b$ and is reflected by the beam splitter $51a$. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is then reflected by the beam splitter $51a$ and enters, as S-polarized, into the beam splitter $51b$ and is reflected therefrom. Almost all of the light enters into the beam splitter $51c$ as S-polarized, is reflected therefrom, and is received by the photodetector $101a$.

About 50% of light having a wavelength of 780 nm and emitted from the semiconductor laser $1a$ enters as P-polarized into and passes through the beam splitter 51c. Almost all of the light is reflected by the beam splitter 51b and by the beam splitter 51a, and is also reflected by the mirror 201. The light is then transformed into circularly polarized light from linearly polarized light by the wavelength plate 202, and is converged onto a disk 204 according to the CD standard by the objective lens 203. Reflection light from the disk 204 passes through the objective lens 203 in a reverse direction, and is transformed from circularly polarized light into linearly polarized light whose polarization direction is perpendicular to that in the forward path. The light is then reflected by the mirror 201. Almost all of the light is reflected by the beam splitter 51a and by the beam splitter 51b, and enters as S-polarized into the beam splitter 51c. About 50% of the light is reflected and is received by the photodetector 101a.

In the present embodiment, the wavelengths of the semiconductor lasers 1a, 1b, and 1c may be 660 nm, 780 nm, and 400 nm, respectively. At this time, the beam splitter D is used as the beam splitter 51a. Any of the beam splitters L, Q, and W is used as the beam splitter 51b. Any of the beam splitters K, O, and X is used as the beam splitter 51c. Any of the beam splitters G, J, M, N, T, U, W, X, and Y is used as the beam splitter 51d.

In the present embodiment, the wavelengths of the semiconductor lasers 1a, 1b, and 1c may be 780 nm, 400 nm, and 660 nm, respectively. At this time, the beam splitter E is used as the beam splitter 51a. Any of the beam splitters J, M, and X is used as the beam splitter 51b. Any of the beam splitters L, R, V, T, W, and Y is used as the beam splitter 51c. Any of the beam splitters H, K, O, P, S, U, V, X and Y is used as the beam splitter 51d.

In the present embodiment, the wavelengths of the semiconductor lasers 1a, 1b, and 1c may be 400 nm, 780 nm, and 660 nm, respectively. At this time, the beam splitter E is used as the beam splitter 51a. Any of the beam splitters L, R, and v is used as the beam splitter 51b. Any of the beam splitters J, M, and X is used as the beam splitter 51c. Any of the beam splitters H, K, O, P, S, U, V, X, and Y is used as the beam splitter 51d.

In the present embodiment, the wavelengths of the semiconductor lasers 1a, 1b, and 1c may be 660 nm, 400 nm, and 780 nm, respectively. At this time, the beam splitter F is used as the beam splitter 51a. Any of the beam splitters J, N, and W is used as the beam splitter 51b. Any of the beam splitters K, P, V, U, X, and Y is used as the beam splitter 51c. Any of the beam splitters I, L, Q, R, S, T, V, W, and Y is used as the beam splitter 51d.

In the present embodiment, the wavelengths of the semiconductor lasers 1a, 1b, and 1c may be 400 nm, 660 nm, and 780 nm, respectively. At this time, the beam splitter F is used as the beam splitter 51a. Any of the beam splitters K, P, and V is used as the beam splitter 51b. Any of the beam splitters J, N, W, U, X, and Y is used as the beam splitter 51c. Any of the beam splitters I, L, Q, R, S, T, V, W, and Y is used as the beam splitter 51d.

Further, the semiconductor laser 1c can be replaced with a photodetector 101b in the present embodiment. Also, in the present embodiment, any one of the semiconductor lasers 1a and 1b can be replaced with a photodetector 101a.

In the present embodiment in which the semiconductor laser 1a is replaced with the photodetector 101a, a half-wave plate for turning, by 90°, the polarization direction of the light which has been emitted from the semiconductor laser 1b and then reflected by a disk 204 and then by the beam splitter 51b, may be inserted between the beam splitters 51b and 51c, if necessary, in order that the light passes through the beam splitter 51c.

In the present embodiment in which the semiconductor laser 1b is replaced with the photodetector 101a, a half-wave plate for turning, by 90°, the polarization direction of the light which has been emitted from the semiconductor laser 1a and has then passed through the beam splitter 51c, may be inserted between the beam splitters 51c and 51b, if necessary, in order that the light is reflected by the beam splitter 51b.

In the first embodiment of the optical head apparatus according to the present invention, the semiconductor lasers 1a, 1b, and 1c are not integrated with other light sources or photodetectors. Therefore, the semiconductor lasers 1a, 1b, and 1c can have a high heat radiation characteristic. Also, the total number of elements, i.e., the light sources and photodetectors is only five. Therefore, the optical head apparatus can be downsized. In addition, the photodetector 101b can be defined to have an optimal sensitivity or the like for the wavelength of the semiconductor laser 1c, and the photodetector 101a can be designed to have an optimal sensitivity or the like for the wavelengths of the semiconductor lasers 1a and 1b.

Second Embodiment

Figure 2:
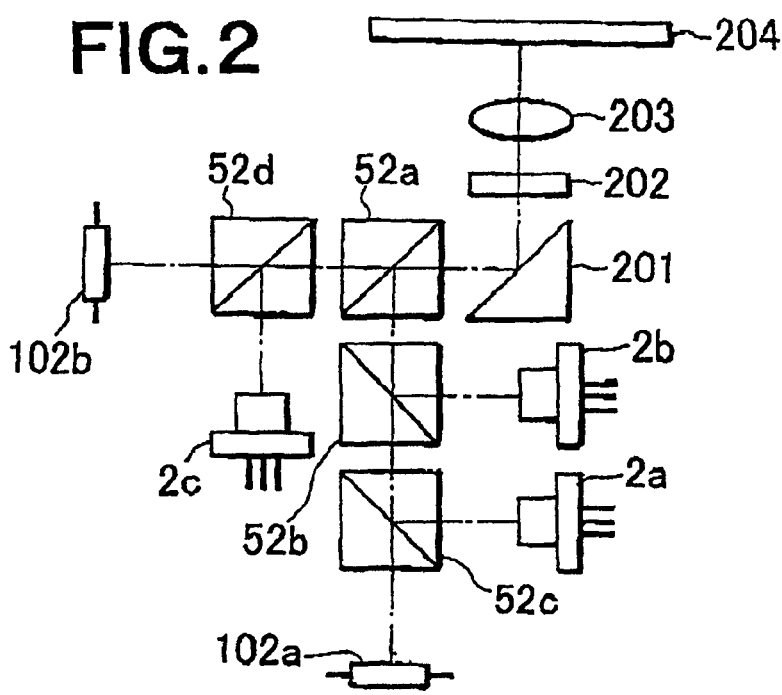
FIG. 2 is a diagram showing the second embodiment of the optical head apparatus according to the present invention.

FIG. 2 shows the second embodiment of the optical head apparatus according to the present invention The wavelengths of the semiconductor lasers 2a, 2b, and 2c are 780 nm, 660 nm, and 400 nm, respectively. The beam splitter D is used as a beam splitter 52a. Any of the beam splitters H, P, and U is used as a beam splitter 52b. Any of the beam splitters I, R, T, S, V, and Y is used as the beam splitter 52c. Any of the beam splitters G, J, M, N, T, U, W, X, and Y is used as the beam splitter 52d.

Light having a wavelength of 400 nm and emitted from the semiconductor laser 2c enters, as S-polarized, into the beam splitter 52d. Almost all of the light is reflected therefrom and passes through the beam splitter 52a. This light is then reflected by a mirror 201 and transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that of the forward path. The light is then reflected by the mirror 201, and almost all of the light passes through the beam splitter 52a. The light further enters, as P-polarized, into the beam splitter 52d. Almost all of the light passes through the beam splitter 52d and is received by the photodetector 102b.

Light having a wavelength of 660 nm and emitted from the semiconductor laser 2b enters, as S-polarized, into the beam splitter 52b. Almost all of the light is reflected by the beam splitter 52b and is further reflected by the beam splitter 52a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is then reflected by the beam splitter 52a and enters, as P-polarized, into and passes through the beam splitter 52b. Almost all of the light then enters, as P-polarized, into and passes through the beam splitter 52c and is received by the photodetector 102a.

Light having a wavelength of 780 nm and emitted from the semiconductor laser 2a enters, as S-polarized, into the beam splitter 52c. About 50% of the light is reflected by the beam splitter 52c. Almost all of the light then passes through the beam splitter 52b and is then reflected by the beam splitter 52a and by the mirror 201. The light is further transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is then reflected by the beam splitter 52a and passes through the beam splitter 52b. The light then enters, as P-polarized, into the beam splitter 52c. About 50% thereof passes through the beam splitter 52c, and is received by the photodetector 102a.

In the present embodiment, the wavelengths of the semiconductor lasers 2a, 2b, and 2c may be 660 nm, 780 nm, and 400 nm, respectively. At this time, the beam splitter D is used as the beam splitter 52a. Any of the beam splitters I, R, and T is used as the beam splitter 52b. Any of the beam splitters H, P, and U is used as the beam splitter 52c. Any of the beam splitters G, J, M, N, T, U, W, X, and Y is used as the beam splitter 52d.

In the present embodiment, the wavelengths of the semiconductor lasers 2a, 2b, and 2c may be 780 nm, 400 nm, and 660 nm, respectively. At this time, the beam splitter E is used as the beam splitter 52a. Any of the beam splitters G, N, and U is used as the beam splitter 52b. Any of the beam splitters I, Q, S, T, W, and Y is used as the beam splitter 52c. Any of the beam splitters H, K, O, P, S, U, V, X and Y is used as the beam splitter 52d.

In the present embodiment, the wavelengths of the semiconductor lasers 2a, 2b, and 2c may be 400 nm, 780 nm, and 660 nm, respectively. At this time, the beam splitter E is used as the beam splitter 52a. Any of the beam splitters I, Q, and S is used as the beam splitter 52b. Any of the beam splitters G, N, and U is used as the beam splitter 52c. Any of the beam splitters H, K, O, P, S, U, V, X and Y is used as the beam splitter 52d.

In the present embodiment, the wavelengths of the semiconductor lasers 2a, 2b, and 2c may be 660 nm, 400 nm, and 780 nm, respectively. At this time, the beam splitter F is used as the beam splitter 52a. Any of the beam splitters G, M, and T is used as the beam splitter 52b. Any of the beam splitters H, O, S, U, X, and Y is used as the beam splitter 52c. Any of the beam splitters I, L, Q, R, S, T, V, W, and Y is used as the beam splitter 52d.

In the present embodiment, the wavelengths of the semiconductor lasers 2a, 2b, and 2c may be 400 nm, 660 nm, and 780 nm, respectively. At this time, the beam splitter F is used as the beam splitter 52a. Any of the beam splitters H, O, and S is used as the beam splitter 52b. Any of the beam splitters G, M, T, U, X, and Y is used as the beam splitter 52c. Any of the beam splitters I, L, Q, R, S, T, V, W, and Y is used as the beam splitter 52d.

Further, the semiconductor laser 2c can be replaced with a photodetector 102b, in the present embodiment Also, in the present embodiment, any one of the semiconductor lasers 2a and 2b can be replaced with a photodetector 102a.

In the present embodiment in which the semiconductor laser 2a is replaced with the photodetector 102a, a half-wave plate for turning, by 90°, the polarization direction of the light which has been emitted from the semiconductor laser 2b, reflected by a disk 204 and then passed through the beam splitter 52b, may be inserted between the beam splitters 52b and 52c, if necessary, in order that the light is reflected by the beam splitter 52c.

In the present embodiment in which the semiconductor laser 2b is replaced with the photodetector 102a, a half-wave plate for turning, by 90°, the polarization direction of the light which has been emitted from the semiconductor laser 2a and then reflected by the beam splitter 52c, may be inserted between the beam splitters 52c and 52b, if necessary, in order that the light passes through the beam splitter 52b.

In the second embodiment of the optical head apparatus according to the present invention, the semiconductor lasers 2a, 2b, and 2c are not integrated with other light sources or photodetectors. Therefore, the semiconductor lasers 2a, 2b, and 2c can have a high heat radiation characteristic. In addition, the total number of elements, i.e., the light sources and photodetectors is only five. Therefore, the optical head apparatus can be downsized. Further, the photodetector 102b can be designed to have an optimal sensitivity or the like for the wavelength of the semiconductor laser 2c, and the photodetector 102a can be designed to have an optimal sensitivity or the like for the wavelengths of the semiconductor lasers 2a and 2b.

Third Embodiment

Figure 3:
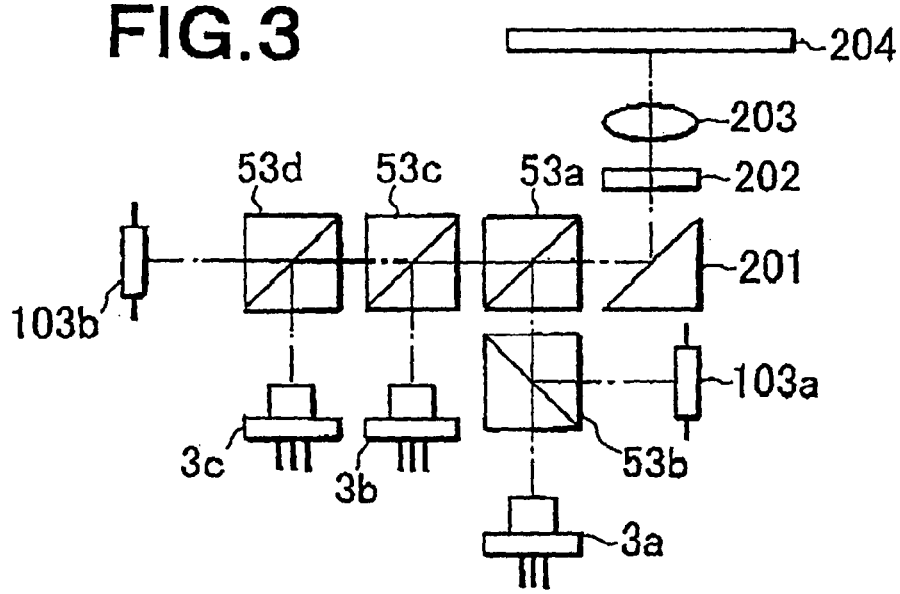
FIG. 3 is a diagram showing the third embodiment of the optical head apparatus according to the present invention.

FIG. 3 shows the third embodiment of the optical head apparatus according to the present invention. The wavelengths of the semiconductor lasers 3a, 3b, and 3c are 400 nm, 660 nm, and 780 nm, respectively. The beam splitter A is used as a beam splitter 53a. Any of the beam splitters G, J, M, N, T, U, W, X, and Y is used as a beam splitter 53b. Any of the beam splitters H, P, and U is used as the beam splitter 53c. Any of the beam splitters I, R, T, S, V, and Y is used as the beam splitter 53d.

Light having a wavelength of 400 nm and emitted from the semiconductor laser 3a enters, as P-polarized, into the beam splitter 53b. Almost all of the light passes through the beam splitter 53b and is reflected by the beam splitter 53a. This light is then reflected by a mirror 201 and transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201, and almost all of the light passes through the beam splitter 53a. The light further enters, as S-polarized, into the beam splitter 53b. Almost all of the light is reflected therefrom and is received by the photodetector 103a.

Light having a wavelength of 660 nm and emitted from the semiconductor laser 3b enters, as S-polarized, into the beam splitter 53c. Almost all of the light is reflected by the beam splitter 53c and further passes through the beam splitter 53a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light then passes through the beam splitter 53a and enters, as P-polarized, into and passes through the beam splitter 53c. Almost all of the light then enters, as P-polarized, into and passes through the beam splitter 53d and is received by the photodetector 103b.

Light having a wavelength of 780 nm and emitted from the semiconductor laser 3c enters, as S-polarized, into the beam splitter 53d. About 50% of the light is reflected by the beam splitter 53d. Almost all of the light then passes through the beam splitter 53c and then the beam splitter 53a, and is further reflected by the mirror 201. The light is further transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light then passes through the beam splitter 53a and the beam splitter 53c. The light then enters, as P-polarized, into the beam splitter 53d. About 50% thereof passes through the beam splitter 53d, and is received by the photodetector 103b.

In the present embodiment, the wavelengths of the semiconductor lasers 3a, 3b, and 3c may be 400 nm, 780 nm, and 660 nm, respectively. At this time, the beam splitter A is used as the beam splitter 53a. Any of the beam splitters G, J, M, N, T, U, W, X, and Y is used as the beam splitter 53b. Any of the beam splitters I, R, and T is used as the beam splitter 53c. Any of the beam splitters H, P, and U is used as the beam splitter 53d.

In the present embodiment, the wavelengths of the semiconductor lasers 3a, 3b, and 3c may be 660 nm, 400 nm, and 780 nm, respectively. At this time, the beam splitter B is used as the beam splitter 53a. Any of the beam splitters H, K, O, P, S, U, V, X, and Y is used as the beam splitter 53b. Any of the beam splitters G, N, and U is used as the beam splitter 53c. Any of the beam splitters I, Q, S, T, W, and Y is used as the beam splitter 53d.

In the present embodiment, the wavelengths of the semiconductor lasers 3a, 3b, and 3c may be 660 nm, 780 nm, and 400 nm, respectively. At this time, the beam splitter B is used as the beam splitter 53a. Any of the beam splitters H, K, O, P, S, U, V, X, and Y is used as the beam splitter 53b. Any of the beam splitters I, Q, and S is used as the beam splitter 53c. Any of the beam splitters G, N, and U is used as the beam splitter 53d.

In the present embodiment, the wavelengths of the semiconductor lasers 3a, 3b, and 3c may be 780 nm, 400 nm, and 660 nm, respectively. At this time, the beam splitter C is used as the beam splitter 53a. Any of the beam splitters I, L, Q, R, S, T, V, W, and Y is used as the beam splitter 53b. Any of the beam splitters G, M, and T is used as the beam splitter 53c. Any of the beam splitters H, O, S, U, X, and Y is used as the beam splitter 53d.

In the present embodiment, the wavelengths of the semiconductor lasers 3a, 3b, and 3c may be 780 nm, 660 nm, and 400 mm, respectively. At this time, the beam splitter C is used as the beam splitter 53a. Any of the beam splitters I, L, Q, R, S, T, V, W, and Y is used as the beam splitter 53b. Any of the beam splitters H, O, and S is used as the beam splitter 53c. Any of the beam splitters G, M, T, U, X, and Y is used as the beam splitter 53d.

Further, the semiconductor laser 3a can be replaced with a photodetector 103a, in the present embodiment. Also, in the present embodiment, any one of the semiconductor lasers 3b and 3c can be replaced with a photodetector 103b.

In the present embodiment in which the semiconductor laser 3c is replaced with the photodetector 103b, a half-wave plate for turning, by 90°, the polarization direction of the light which has been emitted from the semiconductor laser 3c and then reflected by a disk 204 and then by the beam splitter 53d, may be inserted between the beam splitters 53d and 53c, if necessary, in order that the light passes through the beam splitter 53c.

In the present embodiment in which the semiconductor laser 3c is replaced with the photodetector 103b, a half-wave plate for turning, by 90°, the polarization direction of the light which has been emitted from the semiconductor laser 3b, then reflected by a disk 204 and passed through the beam splitter 53c, may be inserted between the beam splitters 53c and 53d, if necessary, in order that the light is reflected by the beam splitter 53d.

In the third embodiment of she optical head apparatus according to the present invention, the semiconductor lasers 3a, 3b, and 3c are not integrated with other light sources or photodetectors. Therefore, the semiconductor lasers 3a, 3b, and 3c can have a high heat radiation characteristic. In addition, the total number of elements, i.e., the light sources and photodetectors is only five. Therefore, the optical head apparatus can be downsized. Further, the photodetector 103a can be designed to have an optimal sensitivity or the like for the wavelength of the semiconductor laser 3a, and the photodetector 103b can be designed to have an optimal sensitivity or the like for the wavelengths of the semiconductor lasers 3b and 3c.

Fourth Embodiment

Figure 4:
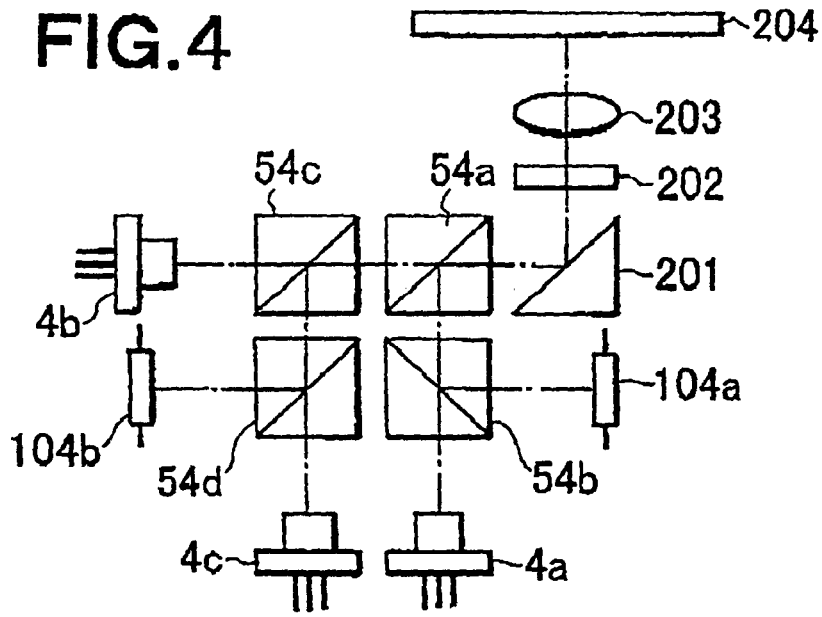
FIG. 4 is a diagram showing the fourth embodiment of the optical head apparatus according to the present invention.

FIG. 4 shows the fourth embodiment of the optical head apparatus according to the present invention. The wavelengths of the semiconductor lasers 4a, 4b, and 4c are 400 nm, 660 nm, and 780 nm, respectively. The beam splitter A is used as a beam splitter 54a. Any of the beam splitters G, J, N, N, T, U, W, X, and Y is used as a beam splitter 54b. Any of the beam splitters K, O, and X is used as the beam splitter 54c. Any of the beam splitters L, Q, W, S, V, and Y is used as the beam splitter 54d.

Light having a wavelength of 400 nm and emitted from the semiconductor laser 4a enters, as P-polarized, into the beam splitter 54b. Almost all of the light passes through the beam splitter 54b and is reflected by the beam splitter 54a. This light is then reflected by a mirror 201 and transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201, and almost all of the light is reflected by the beam splitter 54a. The light further enters, as S-polarized, into the beam splitter 54b. Almost all of the light is reflected therefrom and is received by the photodetector 104a.

Light having a wavelength of 660 nm and emitted from the semiconductor laser 4b enters, as P-polarized, into the beam splitter 54c. Almost all of the light passes through the beam splitter 54c and passes through beam splitter 54a. The light is then reflected by the mirror 201. The light is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light then passes through the beam splitter 54a and enters, as S-polarized, into the beam splitter 54c and is reflected by the beam splitter 54c. Almost all of the light then enters, as S-polarized, into and passes through the beam splitter 54d and is reflected by the beam splitter 54d. The light is then received by the photodetector 104b.

Light having a wavelength of 780 nm and emitted from the semiconductor laser 4c enters, as P-polarized, into the beam splitter 54d. About 50% of the light passes through the beam splitter 54d. Almost all of the light is then reflected by the beam splitter 54c and passes through the beam splitter 54a, and is further reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light then passes through the beam splitter 54a and is reflected by the beam splitter 54c. The light then enters, as S-polarized, into the beam splitter 54d. About 50% of the light is reflected therefrom, and is received by the photodetector 104b.

In the present embodiment, the wavelengths of the semiconductor lasers 4a, 4b, and 4c may be 400 nm, 780 nm, and 660 nm, respectively. At this time, the beam splitter A is used as the beam splitter 54a. Any of the beam splitters G, J, M, N, T, U, W, X, and Y is used as the beam splitter 54b. Any of the beam splitters L, Q, and W is used as the beam splitter 54c. Any of the beam splitters K, O, and X is used as the beam splitter 54d.

In the present embodiment, the wavelengths of the semiconductor lasers 4a, 4b, and 4c may be 660 nm, 400 nm, and 780 nm, respectively. At this time, the beam splitter B is used as the beam splitter 54a. Any of the beam splitters H, K, O, P, S, U, V, X, and Y is used as the beam splitter 54b. Any of the beam splitters J, M, and X is used as the beam splitter 54c. Any of the beam splitters L, R, V, T, W, and Y is used as the beam splitter 54d.

In the present embodiment, the wavelengths of the semiconductor lasers 4a, 4b, and 4c may be 660 nm, 780 nm, and 400 nm, respectively. At this time, the beam splitter B is used as the beam splitter 54a. Any of the beam splitters H, K, O, P, S, U, V, X, and Y is used as the beam splitter 54b. Any of the beam splitters L, R, and V is used as the beam splitter 54c. Any of the beam splitters J, M, and X is used as the beam splitter 54d.

In the present embodiment, the wavelengths of the semiconductor lasers 4a, 4b, and 4c may be 780 nm, 400 nm, and 660 nm, respectively. At this time, the beam splitter C is used as the beam splitter 54a. Any of the beam splitters I, L, Q, R, S, T, V, W, and Y is used as the beam splitter 54b. Any of the beam splitters J, N, and W is used as the beam splitter 54c. Any of the beam splitters K, P, V, U, X, and Y is used as the beam splitter 54d.

In the present embodiment, the wavelengths of the semiconductor lasers 4a, 4h, and 4c may be 780 nm, 660 nm, and 400 nm, respectively. At this time, the beam splitter C is used as the beam splitter 54a. Any of the beam splitters I, L, Q, R, S, T, V, W, and Y is used as the beam splitter 54b. Any of the beam splitters R, P, and V is used as the beam splitter 54c. Any of the beam splitters J, N, W, U, X, and Y is used as the beam splitter 54d.

Further, the semiconductor laser 4a can be replaced with a photodetector 104a, in the present embodiment. Also, in the present embodiment, any one of the semiconductor lasers 4b and 4c can be replaced with a photodetector 104b.

In the present invention in which the semiconductor laser 4b is replaced with the photodetector 104b, a half-wave plate for turning, by 90°, the polarization direction of the light which has been emitted from the semiconductor laser 4c and has then passed through the beam splitter 54d, may be inserted between the beam splitters 54d and 54c, if necessary, in order that the light is reflected by the beam splitter 54c.

In the present embodiment in which the semiconductor laser 4c is replaced with the photodetector 104b, a half-wave plate for turning, by 90°, the polarization direction of the light which has been emitted from the semiconductor laser 4b, then reflected by a disk 204 and reflected by the beam splitter 54c, may be inserted between the beam splitters 54c and 54d, if necessary, in order that the light passes through the beam splitter 54d.

In the fourth embodiment of the optical head apparatus according to the present invention, the semiconductor lasers 4a, 4b, and 4c are not integrated with other light sources or photodetectors. Therefore, the semiconductor lasers 4a, 4b, and 4c can have a high heat radiation characteristic. In addition, the total number of elements, i.e., the light sources and photodetectors is only five. Therefore, the optical head apparatus can be downsized. Further, the photodetector 104a can be designed to have an optimal sensitivity or the like for the wavelength of the semiconductor laser 4a, and the photodetector 104b can be designed to have art optimal sensitivity or the like for the wavelengths of the semiconductor lasers 4b and 4c.

4. Fifth to Ninth Embodiments

Type 2

The fifth to ninth embodiments of the present invention each have three light sources and one photodetector.

Fifth Embodiment

Figure 5:
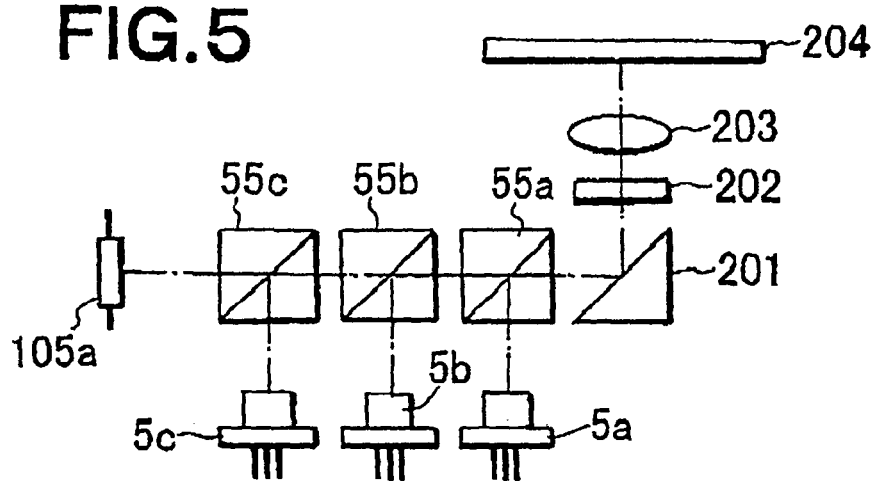
FIG. 5 is a diagram showing the fifth embodiment of the optical head apparatus according to the present invention.

FIG. 5 shows the fifth embodiment of the optical head apparatus according to the present invention. The wavelengths of the semiconductor lasers 5a, 5b, and 5c are 400 nm, 660 nm, and 780 nm, respectively. The beam splitter G is used as a beam splitter 55a. Any of the beam splitters H and U is used as a beam splitter 55b. Any of the beam splitters I, S, T, and Y is used as the beam splitter 55c.

Light having a wavelength of 400 nm and emitted from the semiconductor laser 5a enters, as S-polarized, into the beam splitter 55a. Almost all of the light is reflected therefrom and further reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201, and enters, as P-polarized, into the beam splitter 55a. Almost all of the light passes through the beam splitter 55a and enters, as P-polarized, into the beam splitter 55b. Almost all of the light passes through the beam splitter 55b and enters, as P-polarized, into the beam splitter 55c. Almost all of the light passes through the beam splitter 55c, and the light is then received by the photodetector 105a.

Light having a wavelength of 660 nm and emitted from the semiconductor laser 5b enters, as S-polarized, into the beam splitter 55b. Almost all of the light is reflected therefrom and passes through the beam splitter 55a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light then passes through the beam splitter 55a and enters, as P-polarized, into the beam splitter 55b. Almost all of the light passes through the beam splitter 55b, and enters, as P-polarized, into the beam splitter 55c. Almost all of the light passes through the beam splitter 55c, and is received by the photodetector 105a.

Light having a wavelength of 780 nm and emitted from the semiconductor laser 5c enters, as S-polarized, into the beam splitter 55c. About 50% of the light is reflected therefrom. Almost all of the light then passes through the beam splitter 55b and passes through the beam splitter 55a. The light is further reflected by the mirror 201, and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 55a and also the beam splitter 55b. The light then enters, as P-polarized, into the beam splitter 55c. About 50% of the light passes through the beam splitter 55c, and is received by the photodetector 105a.

In the present embodiment, the wavelengths of the semiconductor lasers 5a, 5b, and 5c may be 400 nm, 780 nm, and 660 nm, respectively. At this time, the beam splitter G is used as the beam splitter 55a. Any of the beam splitters I and T is used as the beam splitter 55b. Any of the beam splitters H and U is used as the beam splitter 55c.

In the present embodiment, the wavelengths of the semiconductor lasers 5a, 5b, and 5c may be 660 nm, 400 nm, and 780 nm, respectively. At this time, the beam splitter H is used as the beam splitter 55a. Any of the beam splitters G and U is used as the beam splitter 55b. Any of the beam splitters I, S, T, and Y is used as the beam splitter 55c.

In the present embodiment, the wavelengths of the semiconductor lasers 5a, 5b, and 5c may be 660 nm, 780 nm, and 400 nm, respectively. At this time, the beam splitter H is used as the beam splitter 55a. Any of the beam splitters I and S is used as the beam splitter 55b. Any of the beam splitters G and U is used as the beam splitter 55c.

In the present embodiment, the wavelengths of the semiconductor lasers 5a, 5b, and 5c may be 780 nm, 400 nm, and 660 nm, respectively. At this time, the beam splitter I is used as the beam splitter 55a. The beam splitter G is used as the beam splitter 55b. Any of the beam splitters H and U is used as the beam splitter 55c.

In the present embodiment, the wavelengths of the semiconductor lasers 5a, 5b, and 5c may be 780 nm, 660 nm, and 400 nm, respectively. At this time, the beam splitter I is used as the beam splitter 55a. The beam splitter H is used as the beam splitter 55b. Any of the beam splitters G and U is used as the beam splitter 55c.

Further, any of the semiconductor lasers 5a, 5b, and 5c can be replaced with a photodetector 105a, in the present embodiment.

In the present embodiment in which the semiconductor laser 5c is replaced with the photodetector 105a, a half-wave plate for turning, by 90°, the polarization direction of the light which has been emitted from the semiconductor lasers 5a and 5b, reflected by the disk 204, and has then passed through the beam splitter 55b, may be inserted between the beam splitters 55b and 55c, if necessary, in order that the light is reflected by the beam splitter 55c.

In the present embodiment in which the semiconductor laser 5b is replaced with the photodetector 105a, a half-wave plate for turning, by 90°, the polarization direction of the light which has been emitted from the semiconductor laser 5a, reflected by the disk 204, and has then passed through the beam splitter 55a, may be inserted between the beam splitters 55a and 55b, if necessary, in order that the light is reflected by the beam splitter 55b. In addition, a half-wave plate for turning, by 90°, the polarization direction of the light which has been emitted from the semiconductor laser 5c and reflected by the beam splitter 55c, may be inserted between the beam splitters 55c and 55b, if necessary, in order that the light passes through the beam splitter 55b.

In the present embodiment in which the semiconductor laser 5a is replaced with the photodetector 105a, a half-wave plate for turning, by 90°, the polarization direction of the light which has been emitted from the semiconductor laser 5b and reflected by the beam splitter 55b, may be inserted between the beam splitters 55b and 55a, if necessary, in order that the light passes through the beam splitter 55a. In addition, a half-wave plate for turning, by 90°, the polarization direction of the light which has been emitted from the semiconductor laser 5c and reflected by the beam splitter 55c, may be inserted between the beam splitters 55c and 55b, if necessary, in order that the light passes through the beam splitter 55b.

In the fifth embodiment of the optical head apparatus according to the present invention, the semiconductor lasers 5a, 5b, and 5c are not integrated with other light sources or photodetectors. Therefore, the semiconductor lasers 5a, 5b, and 5c can have a high heat radiation characteristic. In addition, the total number of elements, i.e., the light sources and photodetectors is only four. Therefore, the optical head apparatus can be downsized.

Sixth Embodiment

Figure 6:
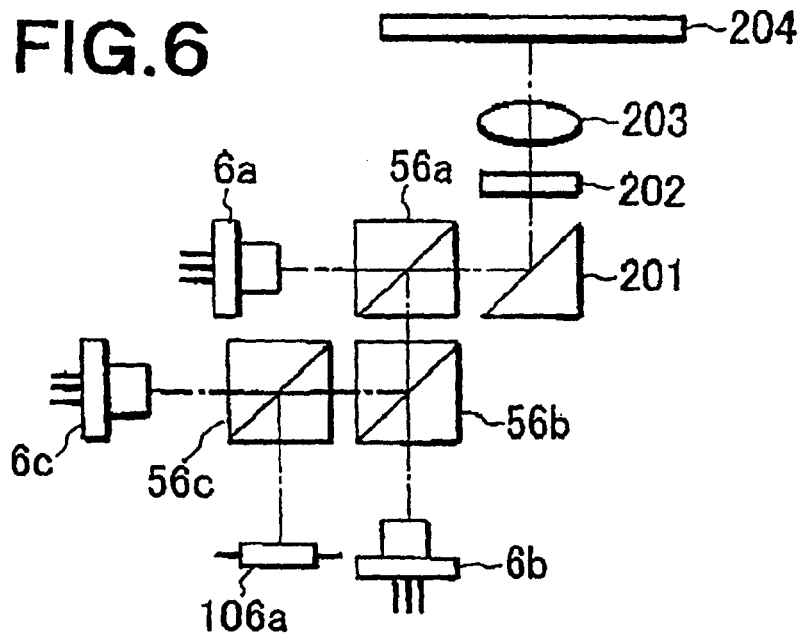
FIG. 6 is a diagram showing the sixth embodiment of the optical head apparatus according to the present invention.

FIG. 6 shows the sixth embodiment of the optical head apparatus according to the present invention. The wavelengths of the semiconductor lasers 6a, 6b, and 6c are 400 nm, 660 nm, and 780 nm, respectively. The beam splitter J is used as a beam splitter 56a. Any of the beam splitters K and X is used as a beam splitter 56b. Any of the beam splitters L, V, W, and Y is used as the beam splitter 56c.

Light having a wavelength of 400 nm and emitted from the semiconductor laser 6a enters, as P-polarized, into the beam splitter 56a. Almost all of the light passes through the beam splitter 56a and is further reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201, and enters, as S-polarized, into the beam splitter 56a. Almost all of the light is reflected by the beam splitter 56a and enters, as S-polarized, into the beam splitter 56b. Almost all of the light is reflected by the beam splitter 56b and enters, as S-polarized, into the beam splitter 56c. Almost all of the light is reflected by the beam splitter 56c, and is then received by the photodetector 106a.

Light having a wavelength of 660 nm and emitted from the semiconductor laser 6b enters, as P-polarized, into the beam splitter 56b. Almost all of the light passes through the beam splitter 56b and is reflected by the beam splitter 56a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is then reflected by the beam splitter 56a and enters, as S-polarized, into the beam splitter 56b. Almost all of the light is reflected therefrom and enters, as S-polarized, into the beam splitter 56c. Almost all of the light is reflected therefrom and is received by the photodetector 106a.

Light having a wavelength of 780 nm and emitted from the semiconductor laser 6c enters, as P-polarized, into the beam splitter 56c. About 50% of the light passes through the beam splitter 56c. Almost all of the light is then reflected by the beam splitter 56b and by the beam splitter 56a. The light is further reflected by the mirror 201, and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 56a and also by the beam splitter 56b. The light then enters, as S-polarized, into the beam splitter 56c. About 50% of the light is reflected therefrom and is received by the photodetector 106a.

In the present embodiment, the wavelengths of the semiconductor lasers 6a, 6b, and 6c may be 400 nm, 780 nm, and 660 nm, respectively. At this time, the beam splitter a is used as the beam splitter 56a. Any of the beam splitters L and W is used as the beam splitter 56b. Any of the beam splitters K and X is used as the beam splitter 56c.

In the present embodiment, the wavelengths of the semiconductor lasers 6a, 6b, and 6c may be 660 nm, 400 nm, and 780 nm, respectively. At this time, the beam splitter K is used as the beam splitter 56a. Any of the beam splitters J and X is used as the beam splitter 56b. Any of the beam splitters L, V, W, and Y is used as the beam splitter 56c.

In the present embodiment, the wavelengths of the semiconductor lasers 6a, 6b, and 6c may be 660 nm, 780 nm, and 400 nm, respectively. At this time, the beam splitter K is used as the beam splitter 56a. Any of the beam splitters L and V is used as the beam splitter 56b. Any of the beam splitters J and X is used as the beam splitter 56c.

In the present embodiment, the wavelengths of the semiconductor lasers 6a, 6b, and 6c may be 780 nm, 400 nm, and 660 nm, respectively. At this time, the beam splitter L is used as the beam splitter 56a. The beam splitter J is used as the beam splitter 56b. Any of the beam splitters K and X is used as the beam splitter 56c.

In the present embodiment, the wavelengths of the semiconductor lasers 6a, 6b, and 6c may be 780 nm, 660 nm, and 400 nm, respectively. At this time, the beam splitter L is used as the beam splitter 56a. The beam splitter K is used as the beam splitter 56b. Any of the beam splitters J and X is used as the beam splitter 56c.

Further, any of the semiconductor lasers 6a, 6b, and 6c can be replaced with a photodetector 106a, in the present embodiment.

In the present embodiment in which the semiconductor laser 6c is replaced with the photodetector 106a, a half-wave plate for turning, by 90°, the polarization direction of the light which has been emitted from the semiconductor lasers 6a and 6b, reflected by the disk 204, and then reflected by the beam splitter 5b, may be inserted between the beam splitters 56b and 56c, if necessary, in order that the light passes through the beam splitter 56c.

In the present embodiment in which the semiconductor laser 6b is replaced with the photodetector 106a, a half-wave plate for turning, by 90°, the polarization direction of the light which has been emitted from the semiconductor laser 6a, reflected by the disk 204, and then reflected by the beam splitter 56a, may be inserted between the beam splitters 56a and 56b, if necessary, in order that the light passes through the beam splitter 56b. In addition, a half-wave plate for turning, by 90°, the polarization direction of the light which has been emitted from the semiconductor laser 6c and has passed through the beam splitter 56c, may be inserted between the beam splitters 56c and 56b, if necessary, in order that the light is reflected by the beam splitter 56b.

In the present embodiment in which the semiconductor laser 6a is replaced with the photodetector 106a, a half-wave plate for turning, by 90°, the polarization direction of the light which has been emitted from the semiconductor laser 6b and passed through the beam splitter 56b, may be inserted between the beam splitters 56b and 56a, if necessary, in order that the light is reflected by the beam splitter 56a. In addition, a half-wave plate for turning, by 90°, the polarization direction of the light which has been emitted from the semiconductor laser 6c and passed through the beam splitter 56c, may be inserted between the beam splitters 56c and 56b, if necessary, in order that the light is reflected by the beam splitter 56b.

In the sixth embodiment of the optical head apparatus according to the present invention, the semiconductor lasers 6a, 6b, and 6c are not integrated with other light sources or photodetectors. Therefore, the semiconductor lasers 6a, 6b, and 6c can have a high heat radiation characteristic. In addition, the total number of elements, i.e., the light sources and photodetectors is only four Therefore, the optical head apparatus can be downsized.

Seventh Embodiment

Figure 7:
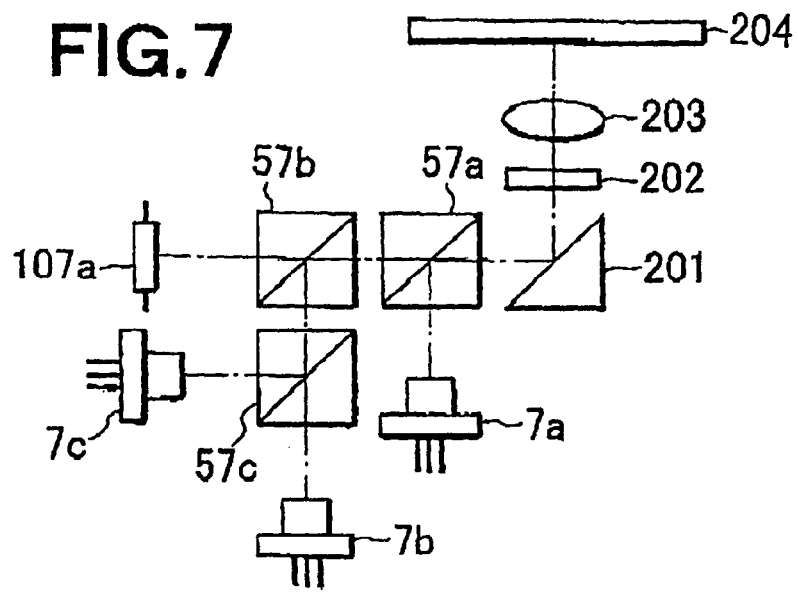
FIG. 7 is a diagram showing the seventh embodiment of the optical head apparatus according to the present invention.

FIG. 7 shows the seventh embodiment of the optical head apparatus according to the present invention. The wavelengths of the semiconductor lasers 7a, 7b, and 7c are 400 nm, 660 nm, and 780 nm, respectively. The beam splitter G is used as a beam splitter 57a. Any of the beam splitters S and Y is used as a beam splitter 57b. Any of the beam splitters C, E, M, K, O, and X is used as a beam splitter 57c.

Light having a wavelength of 400 nm and emitted from the semiconductor laser 7a enters, as S-polarized, into the beam splitter 57a. Almost all of the light is reflected therefrom and is further reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201, and enters, as P-polarized, into the beam splitter 57a. Almost all of the light passes through the beam splitter 57a and enters, as P-polarized, into the beam splitter 57b. Almost all of the light passes through the beam splitter 57b and is then received by the photodetector 107a.

Almost all of light having a wavelength of 660 nm and emitted from the semiconductor laser 7b passes through the beam splitter 57c and enters, as S-polarized, into the beam splitter 57b. Almost all of the light is reflected therefrom, and passes through the beam splitter 57a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 57a and enters, as P-polarized, into the beam splitter 57b. Almost all of the light passes through the beam splitter 57b, and is received by the photodetector 107a.

In case of using any of the beam splitters K, O, and X as the beam splitter 57c, a half-wave plate for turning, by 90°, the polarization direction of the light which has been emitted from the semiconductor laser 7b and passed through the beam splitter 57c, may be inserted between the beam splitters 57c and 57b, in order that the light is reflected by the beam splitter 57b.

Light having a wavelength of 780 nm and emitted from the semiconductor laser 7c enters, as S-polarized, into the beam splitter 57c. Almost all of the light is reflected therefrom and enters, as S-polarized, into the beam splitter 57b. About 50% of the light is reflected therefrom. Almost all of the light then passes through the beam splitter 57a and is reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 57a and enters, as P-polarized, into the beam splitter 57b. About 50% of the light passes there and is received by the photodetector 107a.

In the present embodiment, the wavelengths of the semiconductor lasers 7a, 7b, and 7c may be 400 nm, 780 nm, and 660 nm, respectively. At this time, the beam splitter G is used as the beam splitter 57a. Any of the beam splitters S and Y is used as the beam splitter 57b. Any of the beam splitters B, F, N, H, P, and U is used as the beam splitter 57c.

In the present embodiment, the wavelengths of the semiconductor lasers 7a, 7b, and 7c may be 660 nm, 400 nm, and 780 nm, respectively. At this time, the beam splitter H is used as the beam splitter 57a. Any of the beam splatters T and Y is used as the bean splitter 57b. Any of the beam splitters C, D, O, J, M, and X is used as the beam splitter 57c.

In the present embodiment, the wavelengths of the semiconductor lasers 7a, 7b, and 7c may be 660 nm, 780 nm, and 400 nm, respectively. At this time, the beam splitter H is used as the beam splitter 57a. Any of the beam splitters T and Y is used as the beat splitter 57b. Any of the beam splitters A, F, P, X, N, and U is used as the beam splitter 57c.

In the present embodiment, the wavelengths of the semiconductor lasers 7a, 7b, and 7c may be 780 nm, 400 nm, and 660 nm, respectively. At this time, the beam splitter I is used as the beam splitter 57a. The beam splitter U is used as the beam splitter 57b. Any of the beam splitters B, D, Q, H, O, S, J, N, W, U, X, and Y is used as the beam splitter 57c.

In the present embodiment, the wavelengths of the semiconductor lasers 7a, 7b, and 7c may be 780 nm, 660 nm, and 400 nm, respectively. At this time, the beam splitter I is used as the beam splitter 57a. The beam splitter U is used as the beam splitter 57b. Any of the beam splitters A, E, R, G, M, T, K, P, V, U, X, and Y is used as the beam splitter 57c.

Further, any of the semiconductor lasers 7a, 7b, and 7c can be replaced with a photodetector 107a, in the present embodiment.

In the present embodiment in which the semiconductor laser 7c is replaced with the photodetector 107a, a half-wave plate for turning, by 90°, the polarization direction of the light which has been emitted from the semiconductor laser 7a, reflected by the disk 204, and has then passed through the beam splitter 57a, may be inserted between the beam splitters 57a and 57b, if necessary, in order that the light is reflected by the beam splitter 57b.

In the present embodiment in which the semiconductor laser 7b is replaced with the photodetector 107a, a half-wave plate for turning, by 90°, the polarization direction of the light which has been emitted from the semiconductor laser 7a, reflected by the disk 204, and has then passed through the beam splitter 57a, may be inserted between the beam splitters 57a and 57b, if necessary, in order that the light is reflected by the beam splitter 57b. In addition, a half-wave plate for turning, by 90°, the polarization direction of the light which has been emitted from the semiconductor lasers 7a and 7b, reflected by the disk 204, and then reflected by the beam splitter 57b, may be inserted between the beam splitters 57b and 57c, if necessary, in order that the light passes through the beam splitter 57c.

In the present embodiment in which the semiconductor laser 7a is replaced with the photodetector 107a, a half-wave plate for turning, by 90°, the polarization direction of the light which has been emitted from the semiconductor laser 7b, and has passed through the beam splitter 57c, may be inserted between the beam splitters 57c and 57b, if necessary, in order that the light is reflected by the beam splitter 57b. In addition, a half-wave plate for turning, by 90°, the polarization direction of the light which has been emitted from the semiconductor lasers 7b and 7c and reflected by the beam splitter 57b, may be inserted between the beam splatters 57b and 57a, if necessary, in order that the light passes through the beam splitter 57a.

In the seventh embodiment of the optical head apparatus according to the present invention, the semiconductor lasers 7a, 7b, and 7c are not integrated with other light sources or photodetectors. Therefore, the semiconductor lasers 7a, 7b, and 7c can have a high heat radiation characteristic. In addition, the total number of elements, i.e., the light sources and photodetectors is only four. Therefore, the optical head apparatus can be downsized.

Eighth Embodiment

Figure 8:
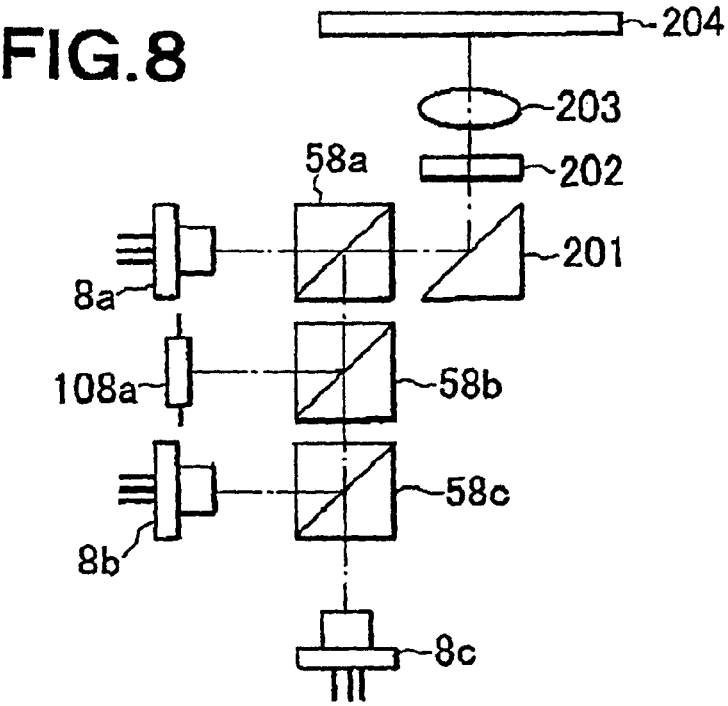
FIG. 8 is a diagram showing the eighth embodiment of the optical head apparatus according to the present invention.

FIG. 8 shows the eighth embodiment of the optical head apparatus according to the present invention. The wavelengths of the semiconductor lasers 8a, 8b, and 8c are 400 nm, 660 nm, and 780 nm, respectively. The beam splitter J is used as a beam splitter 58a. Any of the beam splitters V and Y is used as a beam splitter 58b. Any of the beam splitters B, F, N, H, P, and U is used as a beam splitter 58c.

Light having a wavelength of 400 nm and emitted from the semiconductor laser 8a enters, as P-polarized, into the beam splitter 58a. Almost all of the light passes through the beam splitter 58a and is further reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and it transformed, by the wavelength plate 202, from the circularly polarized light into linearly polarized light whose polarization direction is perpendicular to that in the forward path. The light is then reflected by the mirror 201, and enters, as S-polarized, into the beam splitter 58a. Almost all of the light is reflected therefrom, and enters, as S-polarized, into the beam splitter 58b. Almost all of the light is reflected therefrom, and is then received by the photodetector 108a.

Almost all of light having a wavelength of 660 nm and emitted from the semiconductor laser 8b is reflected by the beam splitter 58c and enters, as P-polarized, into the beam splitter 58b. Almost all of the light passes through the beam splitter 58b and is reflected by the beam splitter 58a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 58a and enters, as S-polarized, into the beam splitter 58b. Almost all of the light is reflected therefrom, and is received by the photodetector 108a.

In case of using any of the beam splitters H, P, and U as the beam splitter 58c, a half-wave plate for turning, by 90°, the polarization direction of the light which has been emitted from the semiconductor laser 8b and reflected by the beam splitter 58c, may be inserted between the beam splitters 58c and 58b, in order that the light passes through the beam splitter 58b.

Light having a wavelength of 780 nm and emitted from the semiconductor laser 8c enters, as P-polarized, into the beam splitter 58c. Almost all of the light passes through the beam splitter 58c and enters, as P-polarized, into the beam splitter 58b. About 50% of the light passes through the beam splitter 58b. Almost all of the light is then reflected by the beam splitter 58a and is reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 58a and enters, as S-polarized, into the beam splitter 58b. About 50% of the light is reflected therefrom and is received by the photodetector 108a.

In the present embodiment, the wavelengths of the semiconductor lasers 8a, 8b, and 8c may be 400 nm, 780 nm, and 660 nm, respectively. At this time, the beam splitter J is used as the beam splitter 58a. Any of the beam splitters V and Y is used as the beam splitter 58b. Any of the beam splitters C, E, M, K, O, and X is used as the beam splitter 58c.

In the present embodiment, the wavelengths of the semiconductor lasers 8a, 8b, and 8c may be 660 nm, 400 nm, and 780 nm, respectively. At this time, the beam splitter K is used as the beam splitter 58a. Any of the beam splitters W and Y is used as the beam splitter 58b. Any of the beam splitters A, F, P, G, N, and U is used as the beam splitter 58c.

In the present embodiment, the wavelengths of the semiconductor lasers 8a, 8b, and 8c may be 660 nm, 780 nm, and 400 nm, respectively. At this time, the beam splitter K is used as the beam splitter 58a. Any of the beam splitters W and Y is used as the beam splitter 58b. Any of the beam splitters C, D, O, J, M, and X is used as the beam splitter 58c.

In the present embodiment, the wavelengths of the semiconductor lasers 8a, 8b, and 8c may be 780 nm, 400 nm, and 660 nm, respectively. At this time, the beam splitter L is used as the beam splitter 58a. The beam splitter X is used as the beam splitter 58b. Any of the beam splitters A, E, R, K, P, V, G, M, T, U, X and Y is used as the beam splitter 58c.

In the present embodiment, the wavelengths of the semiconductor lasers 8a, 8b, and 8c may be 780 nm, 660 nm, and 400 nm, respectively. At this time, the beam splitter L is used as the beam splitter 58a. The beam splitter X is used as the beam splitter 58b. Any of the beam splitters B, D, Q, J, N, W, H, O, S, U, X, and Y is used as the beam splitter 58c.

Further, any of the semiconductor lasers 8a, 8b, and 8c can be replaced with a photodetector 101a, in the present embodiment.

In the present embodiment in which the semiconductor laser 8c is replaced with the photodetector 108a, a half-wave plate for turning, by 90°, the polarization direction of the light which has been emitted from the semiconductor laser 8a, reflected by the disk 204, and reflected by the beam splitter 58a, may be inserted between the beam splitters 58a and 58b, if necessary, in order that the light passes through the beam splitter 58b.

In the present embodiment in which the semiconductor laser 8b is replaced with the photodetector 108a, a half-wave plate for turning, by 90°, the polarization direction of the light which has been emitted from the semiconductor laser 8a, reflected by the disk 204, and then reflected by the beam splitter 58a, may be inserted between the beam splitters 58a and 58b, if necessary, in order that the light passes through the beam splitter 58b. In addition, a half-wave plate for turning, by 90°, the polarization direction of the light which has been emitted from the semiconductor lasers 8a and 8b, reflected by the disk 204, and has then passed through the beam splitter 58b, may be inserted between the beam splitters 58b and 58c, if necessary, in order that the light is reflected by the beam splitter 58c.

In the present embodiment in which the semiconductor laser 8a is replaced with the photodetector 108a, a half-wave plate for turning, by 90°, the polarization direction of the light which has been emitted from the semiconductor lasers 8b and reflected by the beam splitter 58c, may be inserted between the beam splitters 58c and 58b, if necessary, in order that the light passes through the beam splitter 58b. In addition, a half-wave plate for turning, by 90°, the polarization direction of the light which has been emitted from the semiconductor lasers 8b and 8c and has passed through the beam splitter 58b, may be inserted between the beam splitters 58b and 58a, if necessary, in order that the light is reflected by the beam splitter 58a.

In the eighth embodiment of the optical head apparatus according to the present invention, the semiconductor lasers 8a, 8b, and 8c are not integrated with other light sources or photodetectors. Therefore, the semiconductor lasers 8a, 8b, and 8c can have a high neat radiation characteristic. In addition, the total number of elements, i.e., the light sources and photodetectors is only four. Therefore, the optical head apparatus can be downsized.

Ninth Embodiment

Figure 9:
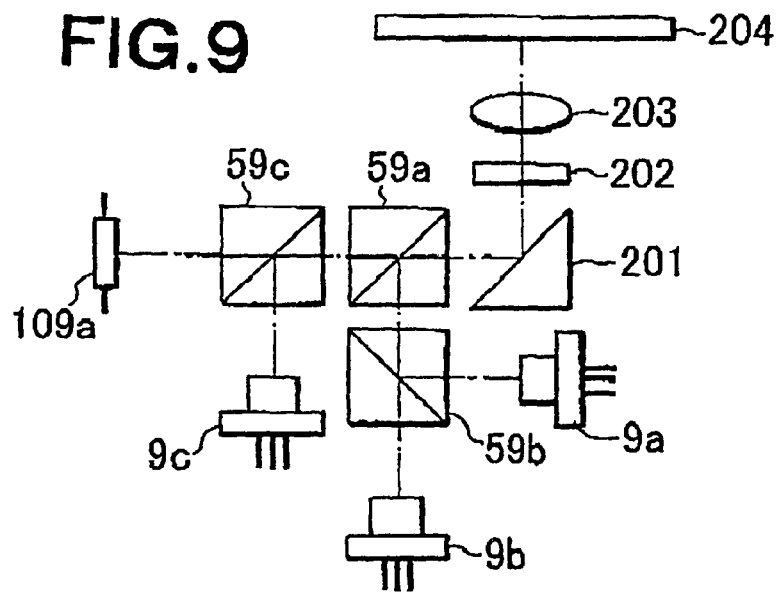
FIG. 9 is a diagram showing the ninth embodiment of the optical head apparatus according to the present invention.

FIG. 9 shows the ninth embodiment of the optical head apparatus according to the present invention. The wavelengths of the semiconductor lasers 9a, 9b, and 9c are 400 nm, 660 nm, and 780 nm, respectively. The beam splitter U is used as a beam splitter 59a. Any of the beam splitters A, E, R, G, M, T, K, P, V, U, X, and Y is used as a beam splitter 59b. Any of the beam splitters I, S, T and Y is used as a beam splitter 59c.

Light having a wavelength of 400 nm and emitted from the semiconductor laser 9a enters, as S-polarized, into the beam splitter 59b. Almost all of the light is reflected therefrom and enters, as S-polarized, into the beam splitter 59a. Almost all of the light is reflected therefrom and is further reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201, and enters, as P-polarized, into the beam splitter 59a. Almost all of the light passes through the beam splitter 59a and enters, as P-polarized, into the beam splitter 59c. Almost all of the light passes through the beam splitter 59c, and is then received by the photodetector 109a.

Almost all of light having a wavelength of 660 nm and emitted from the semiconductor laser 9b passes through the beam splitter 59b and enters, as S-polarized, into the beam splitter 59a. Almost all of the light is reflected therefrom and is further reflected by the mirror 201. The light is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201 and enters, as P-polarized, into the beam splitter 59a. Almost all of the light passes through the beam splitter 59a and enters, as P-polarized, into the beam splitter 59c. Almost all of the light passes through the beam splitter 59c, and is received by the photodetector 109a.

In case of using any of the beam splitters K, P, V, U, X, and Y as the beam splitter 59b, a half-wave plate for turning, by 90°, the polarization direction of the light which has been emitted from the semiconductor laser 9b and has passed through the beam splitter 59b, may be inserted between the beam splitters 59b and 59a, in order that the light is reflected by the beam splitter 59a.

Light having a wavelength of 780 nm and emitted from the semiconductor laser 9c enters, as S-polarized, into the beam splitter 59c. About 50% of the light is reflected therefrom. Almost all of the light passes through the beam splitter 59a and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 59a and enters, as P-polarized, into the beam splitter 59c. About 50% of the light passes there, and is received by the photodetector 109a.

In the present embodiment, the wavelengths of the semiconductor lasers 9a, 9b, and 9c may be 400 nm, 780 nm, and 660 nm, respectively. At this time, the beam splitter T is used as the beam splitter 59a. Any of the beam splitters A, F, P, G, N, and U is used as the beam splitter 59b. Any of the beam splitters H and U is used as the beam splitter 59c.

In the present embodiment, the wavelengths of the semiconductor lasers 9a, 9b, and 9c may be 660 nm, 400 nm, and 780 nm, respectively. At this time, the beam splitter U is used as the beam splitter 59a. Any of the beam splitters B, D, Q, H, O, S, J, N, W, U, X, and Y is used as the beam splitter 59b. Any of the beam splitters I, S, T, and Y is used as the beam splitter 59c.

In the present embodiment, the wavelengths of the semiconductor lasers 9a, 9b, and 9c may be 660 nm, 780 nm, and 400 nm, respectively. At this time, the beam splitter S is used as the beam splitter 59a. Any of the beam splitters B, F, N, H, P, and U is used as the beam splitter 59b. Any of the beam splitters G and U is used as the beam splitter 59c.

In the present embodiment, the wavelengths of the semiconductor lasers 9a, 9b, and 9c may be 780 nm, 400 nm, and 660 nm, respectively. At this time, the beam splitter T is used as the beam splitter 59a. Any of the beam splitters C, D, O, J, M, and X is used as the beam splitter 59b. Any of the beam splitters H and U is used as the beam splitter 59c.

In the present embodiment, the wavelengths of the semiconductor lasers 9a, 9b, and 9c may be 780 nm, 660 nm, and 400 nm, respectively. At this time, the beam splitter S is used as the beam splitter 59a. Any of the beam splitters C, E, M, K, O, and X is used as the beam splitter 59b. Any of the beam splatters G and U is used as the beam splitter 59c.

Further, any of the semiconductor lasers 9a, 9b, and 9c can be replaced with a photodetector 109a, in the present embodiment.

In the present embodiment in which the semiconductor laser 9a is replaced with the photodetector 109a, a half-wave plate for turning, by 90°, the polarization direction of the light which has been emitted from the semiconductor laser 9c and reflected by the beam splitter 59c, may be inserted between the beam splitters 59c and 59a, if necessary, in order that the light passes through the beam splitter 59a.

In the present embodiment in which the semiconductor laser 9b is replaced with the photodetector 109a, a half-wave plate for turning, by 90°, the polarization direction of the light which has been emitted from the semiconductor laser 9c and reflected by the beam splitter 59c, may be inserted between the beam splitters 59c and 59a, if necessary, in order that the light passes through the beam splitter 59a. In addition, a half-wave plate for turning, by 90°, the polarization direction of the light which has been emitted from the semiconductor lasers 9b and 9c, reflected by the disk 204, and then reflected by the beam splitter 59a, may be inserted between the beam splitters 59a and 59b, if necessary, in order that the light passes through the beam splitter 59b.

In the present embodiment in which the semiconductor laser 9c is replaced with the photodetector 109a, a half-wave plate for turning, by 90°, the polarization direction of the light which has been emitted from the semiconductor lasers 9b and has passed through the beam splitter 59b, may be inserted between the beam splitters 59b and 59a, if necessary, in order that the light is reflected by the beam splitter 59a. In addition, a half-wave plate for turning, by 90°, the polarization direction of the light which has been emitted from the semiconductor lasers 9a and 9b, reflected by the disk 204, and has passed through the beam splitter 59a, may be inserted between the beam splitters 59a and 59c, if necessary, in order that the light is reflected by the beam splitter 59c.

In the ninth embodiment of the optical head apparatus according to the present invention, the semiconductor lasers 9a, 9b, and 9c are not integrated with other light sources or photodetectors. Therefore, the semiconductor lasers 9a, 9b, and 9c can have a high heat radiation characteristic. In addition, the total number of elements, i.e., the light sources and photodetectors is only four. Therefore, the optical head apparatus can be downsized.

5. Tenth Embodiment

Type 3

The tenth embodiment of the optical head apparatus according to the present invention has two light sources and two photodetectors. However, one of the two light sources is constructed by integrating two light sources.

Figure 10:
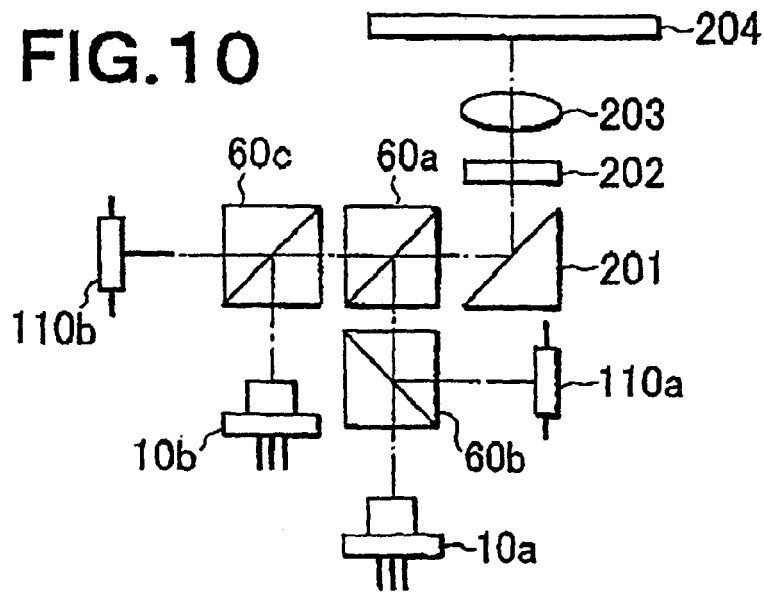
FIG. 10 is a diagram showing the tenth embodiment of the optical head apparatus according to the present invention.

FIG. 10 shows the tenth embodiment of the optical head apparatus according to the present invention. The semiconductor laser 10b is a semiconductor laser which integrates two semiconductor lasers. The structure of the laser will be described later with reference to FIG. 72. The wavelength of the semiconductor laser 10a is 400 nm, and the semiconductor laser 10b has wavelengths of 660 nm and 780 nm. The beam splitter A is used as a beam splitter 60a. Any of the beam splitters G, J, M, N, T, U, W, X, and Y is used as a beam splitter 60b. Any of the beam splitters S, V, and Y is used as a beam splitter 60c.

Light having a wavelength of 400 nm and emitted from the semiconductor laser 10a enters, as P-polarized, into the beam splitter 60b. Almost all of the light passes through the beam splitter 60b and is then reflected by the beam splitter 60a. The light is further reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 60a, and enters, as S-polarized, into the beam splitter 60b. The light is then received by the photodetector 110a.

Light having a wavelength of 660 nm and emitted from the semiconductor laser 10b enters, as S-polarized, into the beam splitter 60c. Almost all of the light is reflected therefrom and passes through the beam splitter 60a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 60a and enters, as P-polarized, into the beam splitter 60c. Almost all of the light passes there and is received by the photodetector 110b.

Light having a wavelength of 780 nm and emitted from the semiconductor laser 10b enters, as S-polarized, into the beam splitter 60c. About 50% of the light is reflected therefrom. Almost all of the light passes through the beam splitter 60a and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 60a and enters, as P-polarized, into the beam splitter 60c. About 50% of the light passes there, and is received by the photodetector 110b.

In the present embodiment, the wavelength of the semiconductor laser 10a may be 660 nm and the wavelengths of the semiconductor laser 10b may be 400 nm and 780 nm. At this time, the beam splitter B is used as the beam splitter 60a. Any of the beam splitters H, K, O, P, S, U, V, x and Y is used as the beam splitter 60b. Any of the beam splitters T, W, and Y is used as the beam splitter 60c.

In the present embodiment, the wavelength of the semiconductor laser 10a may be 780 nm and the wavelengths of the semiconductor laser 10b may be 400 nm and 660 nm. At this time, the beam splitter C is used as the beam splitter 60a. Any of the beam splitters I, L, Q, R, S, T, V, W, and Y is used as the beam splitter 60b. Any of the beam splitters U, X, and Y is used as the beam splitter 60c.

Further, the semiconductor laser 10a can be replaced with a photodetector 110a, in the present embodiment. Also, the semiconductor laser 10b can be replaced with a photodetector 10b, in the present embodiment.

In the tenth embodiment of the optical head apparatus according to the present invention, the semiconductor laser 10a is not integrated with other light sources or photodetectors. Therefore, the semiconductor laser 10a can have a high heat radiation characteristic. In addition, the total number of elements, i.e., the light sources and photodetectors is only four. Therefore, the optical head apparatus can be downsized. Further, the photodetector 110a can be designed to have a sensitivity or the like which is optimal for the wavelength of the semiconductor laser 10a. The photodetector 110b can be designed to have a sensitivity or the like which is optimal for the wavelengths of the semiconductor laser 10b.

6. Eleventh and Twelfth Embodiments

Type 4

Each of the eleventh and twelfth embodiments of the optical head apparatus according to the present invention has two light sources and one photodetector. However, one of the two light sources is constructed by integrating two light sources.

Eleventh Embodiment

Figure 11:
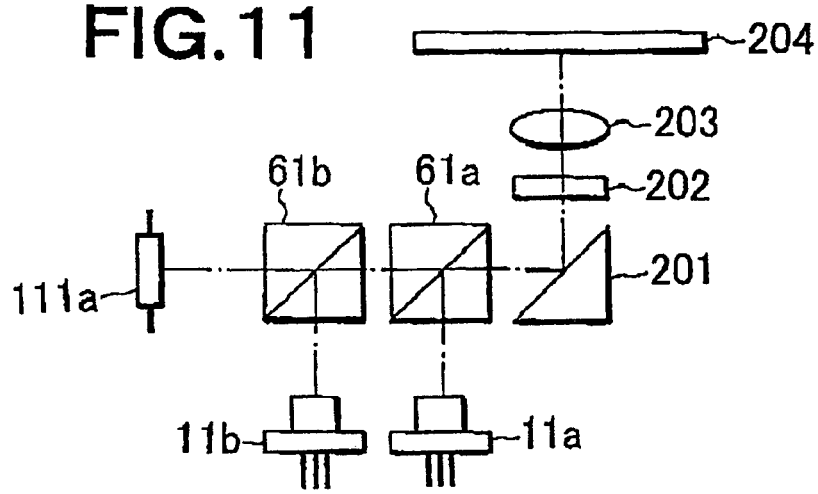
FIG. 11 is a diagram showing the eleventh embodiment of the optical head apparatus according to the present invention.

FIG. 11 shows the eleventh embodiment of the optical head apparatus according to the present invention. The semiconductor laser 11b is a semiconductor laser which integrates two semiconductor lasers. The structure of the laser will be described later with reference to FIG. 72 the wavelength of the semiconductor laser 11a is 400 nm, and the semiconductor laser 11b has wavelengths of 660 nm and 780 nm. The beam splitter G is used as a beam splitter 61a. Any of the beam splitters S and Y is used as a beam splitter 61b.

Light having a wavelength of 400 nm and emitted from the semiconductor laser 11a enters, as S-polarized, into the beam splitter 61a. Almost all of the light is reflected therefrom and is then reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularity polarized light into linearly polarized light whose polarization direction is perpendicular to that in the forward path. The light is then reflected by the mirror 201 and enters, as P-polarized, into the beam splitter 61a. Almost all of the light passes through the beam splitter 61a, and enters, as P-polarized, into the beam splitter 61b. Almost all of the light passes through the beam splitter 61b and is then received by the photodetector 111a.

Light having a wavelength of 660 nm and emitted from the semiconductor laser 11b enters, as S-polarized, into the beam splitter 61b. Almost all of the light is reflected therefrom and passes through the beam splitter 61a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 61a and enters, as P-polarized, into the beam splatter 61b. Almost all of the light passes through the beam splitter 61b and is received by the photodetector 111a.

Light having a wavelength of 780 nm and emitted from the semiconductor laser 11b enters, as S-polarized, into the beam splitter 61b. About 50% of the light is reflected therefrom. Almost all of the light passes through the beam splitter 61a and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 61a and enters, as P-polarized, into the beam splitter 61b. About 50% of the light passes through the beam splitter 61b, and is received by the photodetector 111a.

In the present embodiment, the wavelength of the semiconductor laser 11a may be 660 nm and the wavelengths of the semiconductor laser 11b may be 400 nm and 780 nm. At this time, the beam splitter H is used as the beam splitter 61a. Any of the beam splitters T and Y is used as the beam splitter 61b.

In the present embodiment, the wavelength of the semiconductor laser 11a may be 780 nm and the wavelengths of the semiconductor laser 11b may be 400 nm and 660 nm. At this time, the beam splitter I is used as the beam splitter 61a. The beam splitter U is used as the beam splitter 61b.

Further, one of the semiconductor lasers 11a and 11b can be replaced with a photodetector 111a, in the present embodiment.

In the present embodiment in which the semiconductor laser 11b is replaced with the photodetector 111a, a half-wave plate for turning, by 90°, the polarization direction of the light which has been emitted from the semiconductor laser 11a, reflected by the disk 204, and has passed through the beam splitter 61a, may be inserted between the beam splitters 61a and 61b, if necessary, in order that the light is reflected by the beam splitter 61b.

In the present embodiment in which the semiconductor laser 11a is replaced with the photodetector 111a, a half-wave plate for turning, by 90°, the polarization direction of the light which has been emitted from the semiconductor laser 11b and reflected by the beam splitter 61b, may be inserted between the beam splitters 61b and 61a, if necessary, in order that the light passes through the beam splitter 61a.

In the present embodiment, the semiconductor laser 11a may be a semiconductor laser integrating two semiconductor lasers. The wavelengths of the semiconductor laser 11a may be 660 nm and 780 nm, and the wavelength of the semiconductor laser 11b may be 400 nm. At this time, the beam splitter S is used as the beam splitter 61a. Any of the beam splitters G end U is used as the beam splitter 61b.

In the present embodiment, the semiconductor laser 11a may be a semiconductor laser integrating two semiconductor lasers. The wavelengths of the semiconductor laser 11a may be 400 nm and 780 nm, and the wavelength of the semiconductor laser 11b may be 660 nm. At this time, the beam splitter T is used as the beam splitter 61a. Any of the beam splitters H and U is used as the beam splitter 61b.

In the present embodiment, the semiconductor laser 11a may be a semiconductor laser integrating two semiconductor lasers. The wavelengths of the semiconductor laser 11a may be 400 nm and 660 nm, and the wavelength of the semiconductor laser 11b may be 780 nm. At this time, the beam splitter U is used as the beam splitter 61a. Any of the beam splitters I, S, T, and Y is used as the beam splitter 61b.

Further, the semiconductor laser 11a may be a semiconductor laser integrating two semiconductor lasers, and one of the semiconductor lasers 11a and 11b may be replaced with the photodetector 111a, in the present embodiment.

In the present embodiment in which the semiconductor laser 11b is replaced with the photodetector 111a, a half-wave plate for turning, by 90°, the polarization direction of the light which has been emitted from the semiconductor laser 11b, reflected by the disk 204, and has passed through the beam splitter 61a, may be inserted between the beam splitters 61a and 61b, if necessary, in order that the light is reflected by the beam splitter 61b.

In the present embodiment in which the semiconductor laser 11a is replaced with the photodetector 111a, a half-wave plate for turning, by 90°, the polarization direction of the light which has been emitted from the semiconductor laser 11b and reflected by the beam splitter 61b, may be inserted between the beam splitters 61b and 61a, if necessary, in order that the light passes through the beam splitter 61a.

In the eleventh embodiment of the optical head apparatus according to the present invention, the semiconductor laser 11a is not integrated with other light sources or photodetectors. Therefore, the semiconductor laser 11a can have a high heat radiation characteristic. In addition, the total number of elements, i.e., the light sources and photodetectors is only three. Therefore, the optical head apparatus can be downsized.

Twelfth Embodiment

Figure 12:
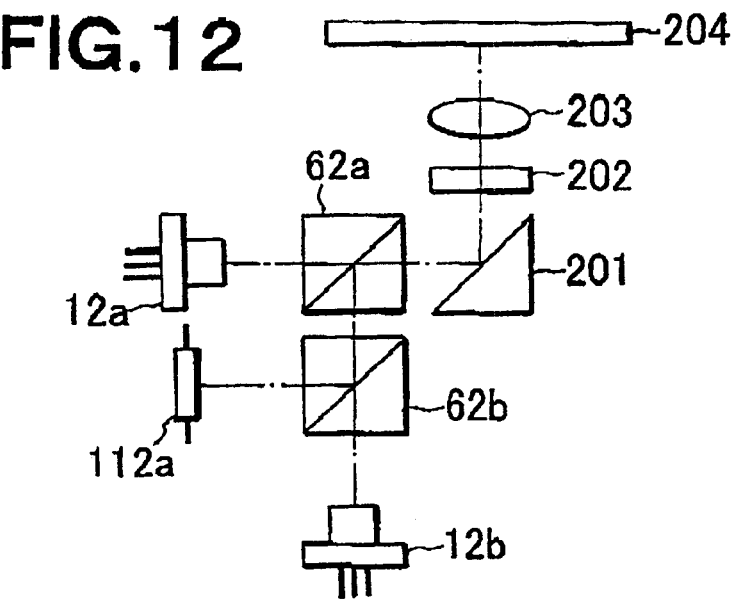
FIG. 12 is a diagram showing the twelfth embodiment of the optical head apparatus according to the present invention.

FIG. 12 shows the twelfth embodiment of the optical head apparatus according to the present invention. The semiconductor laser 12b is a semiconductor laser which integrates two semiconductor lasers. The structure of the laser will be described later with reference to FIG. 72. The wavelength of the semiconductor laser 12a is 400 nm, and the semiconductor laser 12b has wavelengths of 660 nm and 780 nm. The beam splitter J is used as a beam splitter 62a. Any of the beam splitters V and Y is used as a beam splitter 62b.

Light having a wavelength of 400 nm and emitted from the semiconductor laser 12a enters, as P-polarized, into the beam splitter 62a. Almost all of the light passes through the beam splitter 62a and is then reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201 and enters, as S-polarized, into the beam splitter 62a. Almost all of the light is reflected therefrom and enters, as S-polarized, into the beam splitter 62b. Almost all of the light is reflected therefrom and is then received by the photodetector 112a.

Light having a wavelength of 660 nm and emitted from the semiconductor laser 12b enters, as P-polarized, into the beam splitter 62b. Almost all of the light passes through the beam splitter 62b and is reflected by the beam splitter 62a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 62a and enters, as S-polarized, into the beam splitter 62b. Almost all of the light is reflected therefrom and is received by the photodetector 112a.

Light having a wavelength of 780 nm and emitted from the semiconductor laser 12b enters, as P-polarized, into the beam splitter 62b. About 50% of the light passes through the beam splitter 62b. Almost all of the light is reflected by the beam splitter 62a and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 62a and enters, as S-polarized, into the beam splitter 62b. About 50% of the light is reflected therefrom, and is received by the photodetector 112a.

In the present embodiment, the wavelength of the semiconductor laser 12a may be 660 nm, and the wavelengths of the semiconductor laser 12b may be 400 nm and 780 nm. At this time, the beam splitter K is used as the beam splitter 62a. Any of the beam splitters W and Y is used as the beam splitter 62b.

In the present embodiment, the wavelength of the semiconductor laser 12a may be 780 nm, and the wavelengths of the semiconductor laser 12b may be 400 nm and 660 nm. At this time, the beam splitter L is used as the beam splitter 62a. The beam splitter X is used as the beam splitter 62b.

Further, one of the semiconductor lasers 12a and 12b can be replaced with a photodetector 112a, in the present embodiment.

In the present embodiment in which the semiconductor laser 12b is replaced with the photodetector 112a, a half-wave plate for turning, by 90°, the polarization direction of the light which has been emitted from the semiconductor laser 12a, reflected by the disk 204, and reflected by the beam splitter 62a, may be inserted between the beam splitters 62a and 62b, if necessary, in order that the light passes through the beam splitter 62b.

In the present embodiment in which the semiconductor laser 12a is replaced with the photodetector 112a, a half-wave plate for turning, by 90°, the polarization direction of the light which has been emitted from the semiconductor laser 12b and has passed through the beam splitter 62b, may be inserted between the beam splitters 62b and 62a, if necessary, in order that the light is reflected by the beam splitter 62a.

In the present embodiment, the semiconductor laser 12a may be a semiconductor laser integrating two semiconductor lasers. The wavelengths of the semiconductor laser 12a may be 660 nm and 780 nm, and the wavelength of the semiconductor laser 12b may be 400 nm. At this time, the beam splitter V is used as the beam splitter 62a. Any of the beam splitters J and X is used as the beam splitter 62b.

In the present embodiment, the semiconductor laser 12a may be a semiconductor laser integrating two semiconductor lasers. The wavelengths of the semiconductor laser 12a may be 400 nm and 780 nm, and the wavelength of the semiconductor laser 12b may be 660 nm. At this time, the beam splitter W is used as the beam splitter 62a. Any of the beam splitters K and X is used as the beam splitter 62b.

In the present embodiment, the semiconductor laser 12a may be a semiconductor laser integrating two semiconductor lasers. The wavelengths of the semiconductor laser 12a may be 400 nm and 660 nm, and the wavelength of the semiconductor laser 12b may be 780 nm. At this time, the beam splitter X is used as the beam splitter 62a. Any of the beam splitters L, V, W, and Y is used as the beam splitter 62b.

Further, the semiconductor laser 12a may be a semiconductor laser integrating two semiconductor lasers, and one of the semiconductor lasers 12a and 12b may be replaced with the photodetector 112a, in the present embodiment.

In the present embodiment in which the semiconductor laser 12b is replaced with the photodetector 112a, a half-wave plate for turning, by 90°, the polarization direction of the light which has been emitted from the semiconductor laser 12a, reflected by the disk 204, and reflected by the beam splitter 62a, may be inserted between the beam splitters 62a and 62b, if necessary, in order that the light passes through the beam splitter 62b.

In the present embodiment in which the semiconductor laser 12a is replaced with the photodetector 112a, a half-wave plate for turning, by 90°, the polarization direction of the light which has been emitted from the semiconductor laser 12b and passed through the beam splitter 62b, may be inserted between the beam splitters 62b and 62a, if necessary, in order that the light is reflected by the beam splitter 62a.

In the twelfth embodiment of the optical head apparatus according to the present invention, the semiconductor laser 12a is not integrated with other light sources or photodetectors. Therefore, the semiconductor laser 12a can have a high heat radiation characteristic. In addition, the total number of elements, i.e., the light sources and photodetectors is only three. Therefore, the optical head apparatus can be downsized.

7. Thirteenth Embodiment

Type 5

The thirteenth embodiment of the optical head apparatus according to the present invention has one light source and one photodetector. However, the one light source integrates three light sources.

Figure 13:
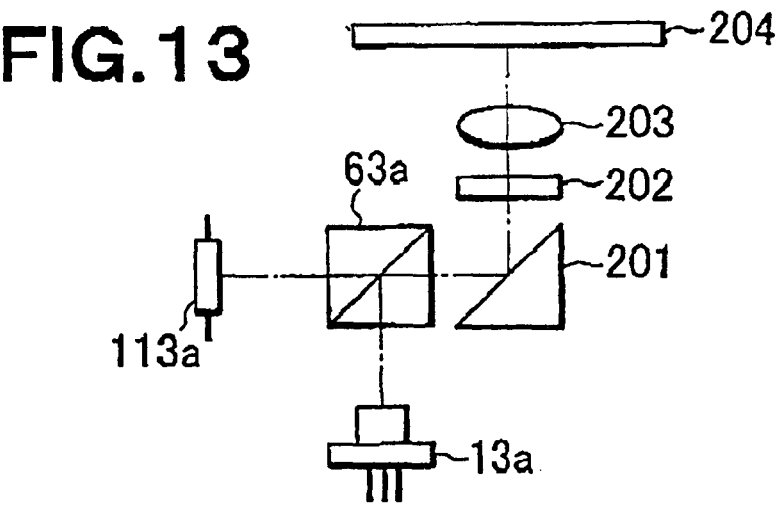
FIG. 13 is a diagram showing the thirteenth embodiment of the optical head apparatus according to the present invention.

FIG. 13 shows the thirteenth embodiment of the optical head apparatus according to the prevent invention. The semiconductor laser 13a is a semiconductor laser which integrates three semiconductor lasers. The structure of the laser will be described later with reference to FIG. 73. The wavelengths of the semiconductor laser 13a are 400 nm, 660 nm, and 780 nm. The beam splitter Y is used as a beam splitter 63a.

Light having a wavelength of 400 nm and emitted from the semiconductor laser 13a enters, as S-polarized, into the beam splitter 63a. Almost all of the light is reflected therefrom and is then reflected by the mirror 201. This light is transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201 and enters, as P-polarized, into the beam splitter 63a. Almost all of the light passes through the beam splitter 63a and is then received by the photodetector 113a.

Light having a wavelength of 660 nm and emitted from the semiconductor laser 13a enters, as S-polarized, into the beam splitter 63a. Almost all of the light is reflected therefrom. The light is further reflected by the mirror 201 and is transformed from linearly polarized light into circularly polarized light by the wavelength plate 202. The light is then converged on a disk 204 according to the DVD standard by the objective lens 203. Reflection light front the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201 and enters, as P-polarized, into the beam splitter 63a. Almost all of the light passes through the beam splitter 63a and is received by the photodetector 113a.

Light having a wavelength of 780 nm and emitted from the semiconductor laser 13a enters, as S-polarized, into the beam splitter 63a. About 50% of the light is reflected therefrom. The light is reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. The light enters, as P-polarized, into the beam splitter 63a. About 50% of the light passes there, and is received by the photodetector 113a.

In the thirteenth embodiment of the optical head apparatus according to the present invention, the total number of elements, i.e., the light source and photodetector is only two. Therefore, the optical head apparatus can be downsized.

8. Fourteenth to Nineteenth Embodiments

Type 6

The fourteenth to nineteenth embodiments of the optical head apparatus according to the present invention each have two light sources, two photodetectors, and one module. However, one module integrates one light source and one photodetector.

Fourteenth Embodiment

Figure 14:
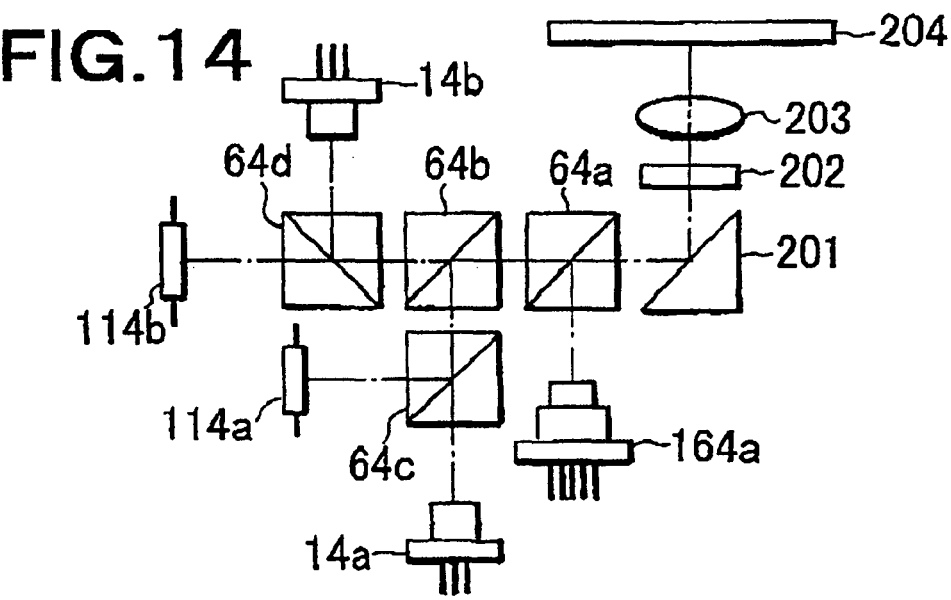
FIG. 14 is a diagram showing the fourteenth embodiment of the optical head apparatus according to the present invention.

FIG. 14 shows the fourteenth embodiment of the optical head apparatus according to the present invention. The module 164a is a module which integrates one semiconductor laser and one photodetector. The structure of the module will be described later with reference to FIG. 74. The wavelength of the semiconductor laser integrated in the module 164a is 400 nm. The wavelengths of the semiconductor lasers 14a and 14b are 660 nm and 780 nm, respectively. The beam splitter A is used as a beam splitter 64a. Any of the beam splitters B, F, and N is used as a beam splitter 64b. Any of the beam splitters H, K, O, P, S, U, V, X, and Y is used as a beam splitter 64c. Any of the beam splitters I, L, Q, R, S, T, V, W, and Y is used as a beam splitter 64d.

Almost all of light having a wavelength of 400 nm and emitted from the semiconductor laser integrated in the module 164a is reflected by the beam splitter 64a and then reflected by the mirror 201. The light is then transformed into circularly polarized light from linearly polarized light by a wavelength plate 202, and is converged on a disk 204 according to the next-generation standard by an objective lens 203.

Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 64a, and is then received by the photodetector integrated in the module 164a.

Light having a wavelength of 660 nm and emitted from the semiconductor laser 14a enters, as P-polarized, into the beam splitter 64c. Almost all of the light passes there and is reflected by the beam splitter 64b. Almost all of the light further passes through the beam splitter 64a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 64a and is reflected by the beam splitter 64b. The light then enters, as S-polarized, into the beam splitter 64c. Almost all of the light is reflected therefrom and is received by the photodetector 114a.

Light having a wavelength of 780 nm and emitted from the semiconductor laser 14b enters, as S-polarized, into the beam splitter 64d. About 50% of the light is reflected therefrom. Almost all of the light passes through the beam splitters 64b and 64a. The light is then reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected, by the mirror 201. Almost all of the light passes through the beam splitters 64a and 64b, and enters, as P-polarized, into the beam splitter 64d. About 50% of the light passes through the beam splitter 64d, and is received by the photodetector 114b.

In the present embodiment, the wavelength of the semiconductor laser integrated in the module 164a may be 400 nm and the wavelengths of the semiconductor lasers 14a and 14b may be 780 nm and 660 nm, respectively. At this time, the beam splitter A is used as the beam splitter 64a. Any of the beam splitters C, E, and M is used as the beam splitter 64b. Any of the beam splitters I, L, Q, R, S, T, V, W, and Y is used as the beam splitter 64c. Any of the beam splitters H, K, O, P, S, U, V, X, and Y is used as the beam splitter 64d.

In the present embodiment, the wavelength of the semiconductor laser integrated in the module 164a may be 660 nm, and the wavelengths of the semiconductor lasers 14a and 14b may be 400 nm and 780 nm, respectively. At this time, the beam splitter B is used as the beam splitter 64a. Any of the beam splitters A, F, and P is used as the beam splitter 64b. Any of the beam splitters G, J, M, N, T, U, W, X, and Y is used as the beam splitter 64c. Any of the beam splitters I, L, Q, R, S, T, V, W, and Y is used as the beam splitter 64d.

In the present embodiment, the wavelength of the semiconductor laser integrated in the module 164a may be 660 nm, and the wavelengths of the semiconductor lasers 14a and 14b may be 780 nm and 400 nm, respectively. At this time, the beam splitter B is used as the beam splitter 64a. Any of the beam splitters C, D, and O is used as the beam splitter 64b. Any of the beam splitters I, L, Q, R, S, T, V, W, and Y is used as the beam splitter 64c. Any of the beam splitters G, J, M, N, T, U, W, X, and Y is used as the beam splitter 64d.

In the present embodiment, the wavelength of the semiconductor laser integrated in the module 164a may be 780 nm, and the wavelengths of the semiconductor lasers 14a and 14b may be 400 nm and 660 nm, respectively. At this time, the beam splitter C is used as the beam splitter 64a. Any of the beam splitters A, E, and R is used as the beam splitter 64b. Any of the beam splitters G, J, M, N, T, U, W, X, and Y is used as the beam splitter 64c. Any of the beam splitters H, K, O, P, S, U, V, X, and Y is used as the beam splitter 64d.

In the present embodiment, the wavelength of the semiconductor laser integrated in the module 164a may be 780 nm, and the wavelengths of the semiconductor lasers 14a and 14b may be 660 nm and 400 nm, respectively. At this time, the beam splitter C is used as the beam splitter 64a. Any of the beam splitters B, D, and Q is used as the beam splitter 64b. Any of the beam splitters H, K, O, P, S, U, V, X, and Y is used as the beam splitter 64c. Any of the beam splitters G, J, M, N, T, U, W, X, and Y is used as the beam splitter 64d.

Further, the semiconductor laser 14a can be replaced with a photodetector 114a, in the present embodiment. Also, in the present embodiment, the semiconductor laser 14b can be replaced with a photodetector 114b.

In the fourteenth embodiment of the optical head apparatus according to the present invention, the semiconductor lasers 14a and 14b are not integrated with other light sources or photodetectors. Therefore, the semiconductor lasers 14a and 14b can have a high heat radiation characteristic. In addition, the total number of elements, i.e., the module, light sources, and photodetectors is only five. Therefore, the optical head apparatus can be downsized. Further, the photodetector integrated in the module 164a can be designed to have an optimal sensitivity or the like for the wavelength of the semiconductor laser integrated also in the module 164a, and the photodetectors 114a and 114b can respectively be designed to have optimal sensitivities or the like for the wavelengths of the semiconductor lasers 14a and 14b.

Fifteenth Embodiment

Figure 15:
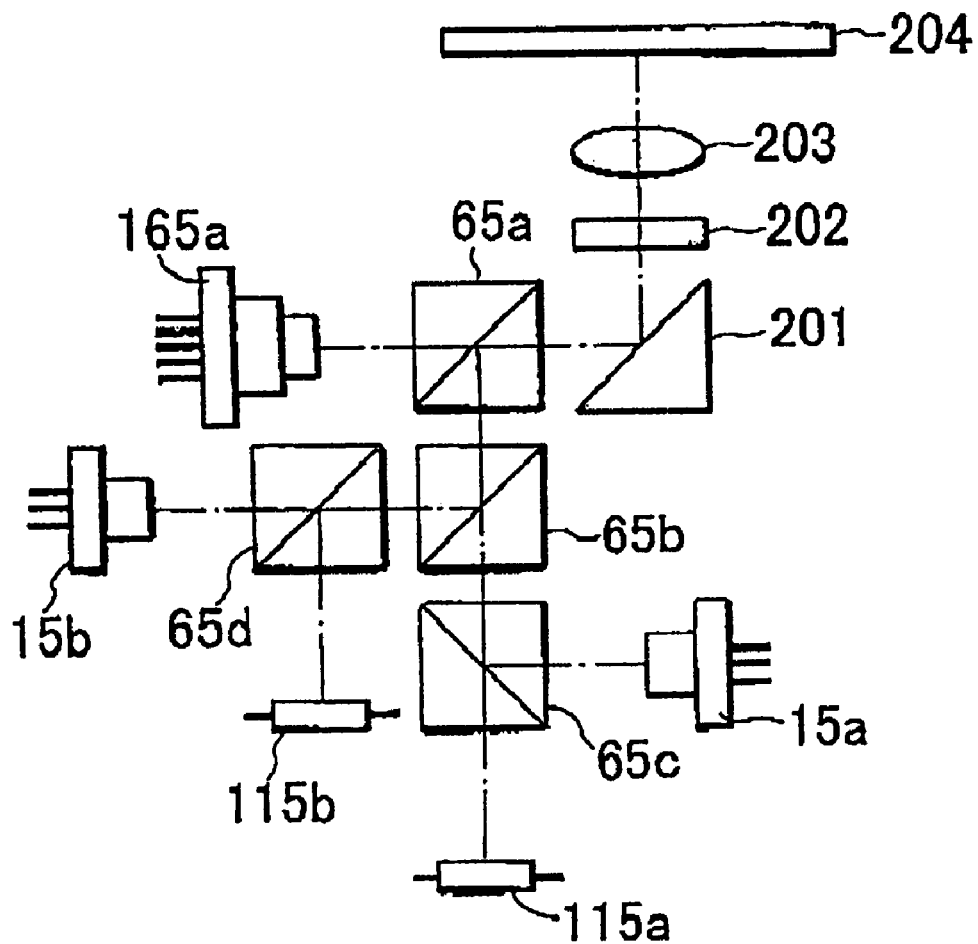
FIG. 15 is a diagram showing the fifteenth embodiment of the optical head apparatus according to the present invention.

FIG. 15 shows the fifteenth embodiment of the optical head apparatus according to the present invention. The module 165a is a module which integrates one semiconductor laser and one photodetector. The structure of the module will be described later with reference to FIG. 74. The wavelength of the semiconductor laser integrated in the module 165a is 400 nm. The wavelengths of the semiconductor lasers 15a and 15b are 660 nm and 780 nm, respectively. The beam splitter D is used as a beam splitter 65a. Any of the beam splitters C, E, and M is used as a beam splitter 65b. Any of the beam splitters H, K, O, P, S, U, V, X, and Y is used as a beam splitter 65c. Any of the beam splitters I, L, Q, R, S, T, V, W, and Y is used as a beam splitter 65d.

Almost all of light having a wavelength of 400 nm and emitted from the semiconductor laser integrated in the module 165a passes through the beam splitter 65a and is then reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 65a, and is then received by the photodetector integrated in the module 165a.

Light having a wavelength of 660 nm and emitted from the semiconductor laser 15a enters, as S-polarized, into the beam splitter 65c. Almost all of the light is reflected therefrom and passes through the beam splitter 65b. Almost all of the light is then reflected by the beam splitter 65a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 65a and passes through the beam splitter 65b The light then enters, as P-polarized, into the beam splitter 65c. Almost all of the light passes through the beam splitter 65c and is received by the photodetector 115a.

Light having a wavelength of 780 nm and emitted from the semiconductor laser 15b enters, as P-polarized, into the beam splitter 65a. About 50% of the light passes there. Almost all of the light is reflected by the beam splitters 65b and 65a. The light is then reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitters 65a and 65b, and enters, as P-polarized, into the beam splitter 65d. About 50% of the light passes through the beam splitter 65d, and is received by the photodetector 115b.

In the present embodiment, the wavelength of the semiconductor laser integrated in the module 165a may be 400 nm, and the wavelengths of the semiconductor lasers 15a and 15b may be 780 nm and 660 nm, respectively. At this time, the beam splitter D is used as the beam splitter 65a. Any of the beam splitters B, F, and N is used as the beam splitter 65b. Any of the beam splitters I, L, O, R, S, T, V, W, and Y is used as the beam splitter 65c. Any of the beam splitters H, K, O, P, S, U, V, X, and Y is used as the beam splitter 65d.

In the present embodiment, the wavelength of the semiconductor laser integrated in the module 165a may be 660 nm, and the wavelengths of the semiconductor lasers 15a and 15b may be 400 nm and 780 nm, respectively. At this time, the beam splitter E is used as the beam splitter 65a. Any of the beam splitters C, D, and O is used as the beam splitter 65b. Any of the beam splitters G, J, M, N, T, U, W, X, and Y is used as the beam splitter 65c. Any of the beam splitters I, L, Q, R, S, T, V, W, and Y is used as the beam splitter 65d.

In the present embodiment, the wavelength of the semiconductor laser integrated in the module 165a may be 660 nm, and the wavelengths of the semiconductor lasers 15a and 15b may be 780 nm and 400 nm, respectively. At this time, the beam splitter E is used as the beam splitter 65a. Any of the beam splitters A, F, and P is used as the beam splitter 65b. Any of the beam splitters I, L, Q, R, S, T, V, W, and Y is used as the beam splitter 65c. Any of the beam splitters G, J, M, N, T, U, W, X, and Y is used as the beam splitter 65d.

In the present embodiment, the wavelength of the semiconductor laser integrated in the module 165a may be 780 nm, and the wavelengths of the semiconductor lasers 15a and 15b may be 400 nm and 660 nm, respectively. At this time, the beam splitter F is used as the beam splitter 65a. Any of the beam splitters B, D, and Q is used as the beam splitter 65b. Any of the beam splitters G, J, M, N, T, U, W, X, and Y is used as the beam splitter 65c. Any of the beam splitters H, K, O, P, S, U, V, X, and Y is used as the beam splitter 65d.

In the present embodiment, the wavelength of the semiconductor laser integrated in the module 165a may be 780 nm and the wavelengths of the semiconductor lasers 15a and 15b may respectively be 660 nm and 400 nm. At this time, the beam splitter F is used as the beam splitter 65a. Any of the beam splitters A, E, and R is used as the beam splitter 65b. Any of the beam splitters H, K, O, P, S, U, V, X, and Y is used as the beam splitter 65c. Any of the beam splitters G, J, M, N, T, U, W, X, and Y is used as the beam splitter 65d.

Further, the semiconductor laser 15a can be replaced with a photodetector 115a in the present embodiment. Also, in the present embodiment, the semiconductor laser 15b can be replaced with a photodetector 115b.

In the fifteenth embodiment of the optical head apparatus according to the present invention, the semiconductor lasers 15a and 15b are not integrated with other light sources or photodetectors. Therefore, the semiconductor lasers 15a and 15b can have a high heat radiation characteristic. In addition, the total number of elements, i.e., the module, light sources, and photodetectors is only five. Therefore, the optical head apparatus can be downsized. Further, the photodetector integrated in the module 165a can be designed to have an optimal sensitivity or the like for the wavelength of the semiconductor laser integrated also in the module 165a, and the photodetectors 115a and 115b can respectively be designed to have optimal sensitivities or the like for the wavelengths of the semiconductor lasers 15a and 15b.

Sixteenth Embodiment

Figure 16:
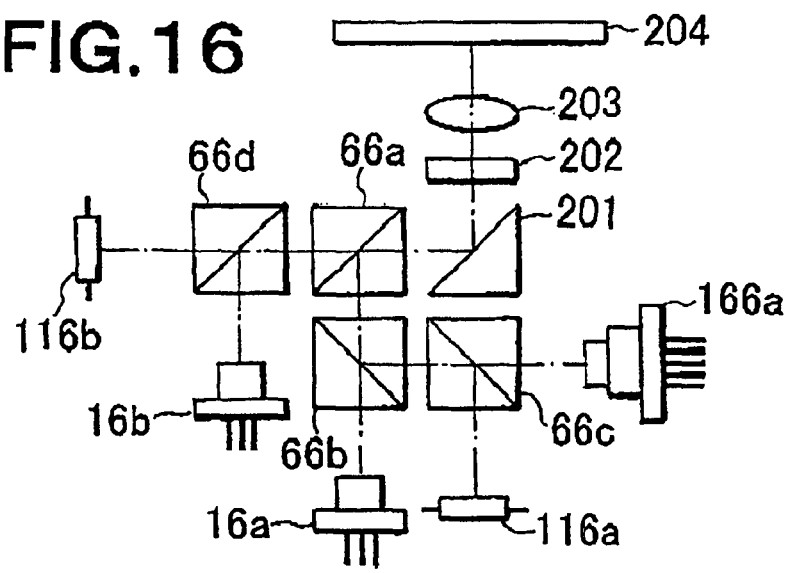
FIG. 16 is a diagram showing the sixteenth embodiment of the optical head apparatus according to the present invention.

FIG. 16 shows the sixteenth embodiment of the optical head apparatus according to the present invention. The module 166a is a module which integrates one semiconductor laser and one photodetector. The structure of the module will be described later with reference to FIG. 74. The wavelength of the semiconductor laser integrated in the module 166a is 780 nm. The wavelengths of the semiconductor lasers 16a and 16b are 660 nm and 400 nm, respectively. The beam splitter D is used as a beam splitter 66a. Any of the beam splitters K, O, and X is used as a beam splitter 66b. Any of the beam splitters B, F, N, H, P, and U is used as a beam splitter 66c. Any of the beam splitters G, J, M, N, T, U, W, X, and Y is used as a beam splitter 66d.

Light having a wavelength of 400 nm and emitted from the semiconductor laser 16b enters, as S-polarized, into the beam splitter 66d. Almost all of the light is reflected therefrom and passes through the beam splitter 66a. The light is reflected by the mirror 201 and is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201.

Almost all of the light passes through the beam splitter 66a, and enters, as P-polarized, into the beam splitter 66d. Almost all of the light passes through the beam splitter 66d and is then received by the photodetector 116b.

Light having a wavelength of 660 nm and emitted from the semiconductor laser 16a enters, as P-polarized, into the beam splitter 66b. Almost all of the light passes through the beam splitter 66b and is then reflected by the beam splitter 66a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 66a and enters, as S-polarized, into the beam splitter 66b. Almost all of the light is reflected therefrom and enters, as S-polarized, into the beam splitter 66c. Almost all of the light is reflected therefrom and is received by the photodetector 116a.

Almost all of light having a wavelength of 780 nm and emitted from the semiconductor laser integrated in the module 166a passes through the beam splitter 66c and is reflected by the beam splitter 66b. Almost all of the light is then reflected by the beam splitter 66a. The light is then reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitters 66a and 66b and passes through the beam splitter 66c. The light is then received by the photodetector integrated in the module 166a.

In the present embodiment, the wavelength of the semiconductor laser integrated in the module 166a may be 660 nm, and the wavelengths of the semiconductor lasers 16a and 16b may be 780 nm and 400 nm, respectively. At this time, the beam splitter D is used as the beam splitter 66a. Any of the beam splitters L, Q, and W is used as the beam splitter 66b. Any of the beam splitters C, E, and M is used as the beam splitter 66c. Any of the beam splitters G, J, M, N, T, U, W, X, and Y is used as the beam splitter 66d.

In the present embodiment, the wavelength of the semiconductor laser integrated in the module 166a may be 780 nm, and the wavelengths of the semiconductor lasers 16a and 16b may be 400 nm and 660 nm, respectively. At this time, the beam splitter E is used as the beam splitter 66a. Any of the beam splitters J, M, and X is used as the beam splitter 66b. Any of the beam splitters A, F, P, G, N, and U is used as the beam splitter 66c. Any of the beam splitters H, K, O, P, S, U, V, X, and Y is used as the beam splitter 66d.

In the present embodiment, the wavelength of the semiconductor laser integrated in the module 166a may be 400 nm, and the wavelengths of the semiconductor lasers 16a and 16b may be 780 nm and 660 nm, respectively. At this time, the beam splitter B is used as the beam splitter 66a. Any of the beam splitters L, R, and V is used as the beam splitter 66b. Any of the beam splitters C, D, and O is used as the beam splitter 66c. Any of the beam splitters H, K, O, P, S, U, V, X, and Y is used as the beam splitter 66d.

In the present embodiment, the wavelength of the semiconductor laser integrated in the module 166a may be 660 nm, and the wavelengths of the semiconductor lasers 16a and 16b may be 400 nm and 780 nm, respectively. At this time, the beam splitter F is used as the beam splitter 66a. Any of the beam splitters J, N, and W is used as the beam splitter 66b. Any of the beam splitters A, E, R, G, M, and T is used as the beam splitter 66c. Any of the beam splitters I, L, Q, R, S, T, V, W, and Y is used as the beam splitter 66d.

In the present embodiment, the wavelength of the semiconductor laser integrated in the module 166a may be 400 nm and the wavelengths of the semiconductor lasers 16a, and 16b may be 660 nm and 780 nm, respectively. At this time, the beam splitter F is used as the beam splitter 66a. Any of the beam splitters K, P, and V is used as the beam splitter 66b. Any of the beam splitters B, D, Q, H, O, and S is used as the beam splitter 66c. Any of the beam splitters I, L, Q, R, S, T, V, W and Y is used as the beam splitter 66d.

Further, the semiconductor laser 16b can be replaced with a photodetector 116b in the present embodiment. Also, in the present embodiment, the module 166a, semiconductor laser 16a, and photodetector 116a can be replaced with each other.

In the present embodiment in which the module 166a, semiconductor laser 16a, and photodetector 116a are respectively replaced with the photodetector 116a, semiconductor laser 16a, and module 166a, a half-wave plate for turning, by 90°, the polarization direction of the light which has been emitted from the semiconductor laser 16a, reflected by the disk 204, and reflected by the beam splitter 66b, may be inserted between the beam splitters 66b and 66c, if necessary, in order that the light passes through the beam splitter 66c.

In the present embodiment in which the module 166a, semiconductor laser 16a, and photodetector 116a are respectively replaced with the semiconductor laser 16a, photodetector 116a, and module 166a, a half-wave plate for turning, by 90°, the polarization direction of the light which has been emitted from the semiconductor laser 16a and passed through the beam splitter 66c, may be inserted between the beam splitters 66c and 66b, if necessary, in order that the light is reflected by the beam splitter 66b.

In the sixteenth embodiment of the optical head apparatus according to the present invention, the semiconductor lasers 16a and 16b are not integrated with other light sources or photodetectors. Therefore, the semiconductor lasers 16a and 16b can have a high heat radiation characteristic. In addition, the total number of elements, i.e., the module, light sources, and photodetectors is only five. Therefore, the optical head apparatus can be downsized. Further, the photodetector integrated in the module 166a can be designed to have an optimal sensitivity or the like for the wavelength of the semiconductor laser integrated also in the module 166a, and the photodetectors 116a and 116b can respectively be designed to have optimal sensitivities or the like for the wavelengths of the semiconductor lasers 16a and 16b.

Seventeenth Embodiment

Figure 17:
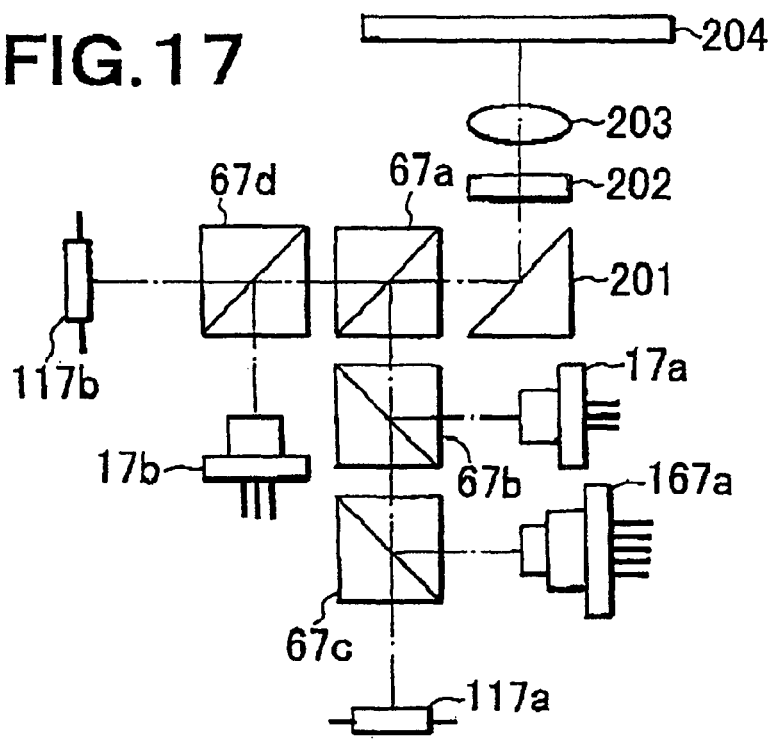
FIG. 17 is a diagram showing the seventeenth embodiment of the optical head apparatus according to the present invention.

FIG. 17 shows the seventeenth embodiment of the optical head apparatus according to the present invention The module 167a is a module which integrates one semiconductor laser and one photodetector. The structure of the module will be described later with reference to FIG. 74. The wavelength of the semiconductor laser integrated in the module 167a is 780 nm. The wavelengths of the semiconductor lasers 17a and 17b are 660 nm and 400 nm, respectively. The beam splitter D is used as a bean splitter 67a. Any of the beam splitters H, P, and U is used as a beam splitter 67b. Any of the beam splitters C, E, M, K, O, and X is used as a beam splitter 67c. Any of the beam splitters G, J, M, N, T, U, W, X, and Y is used as a beam splitter 67d.

Light having a wavelength of 400 nm and emitted from the semiconductor laser 17b enters, as S-polarized, into the beam splitter 67d. Almost all of the light is reflected therefrom and passes through the beam splitter 67a. The light is reflected by the mirror 201 and is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 67a, and enters, as P-polarized, into the beam splitter 67d. Almost all of the light passes through the beam splitter 67d and is then received by the photodetector 117b.

Light having a wavelength of 660 nm and emitted from the semiconductor laser 17a enters, as S-polarized, into the beam splitter 67b. Almost all of the light is reflected therefrom and is then reflected by the beam splitter 67a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 67a and enters, as P-polarized, into the beam splitter 67b. Almost all of the light passes through the beam splitter 67b and enters, as P-polarized, into the beam splitter 67c. Almost all of the light passes through the beam splitter 67c and is received by the photodetector 117a.

Almost all of light having a wavelength of 780 nm and emitted from the semiconductor laser integrated in the module 167a is reflected by the beam splitter 67c and passes through the beam splitter 67b. Almost all of the light is then reflected by the beam splitter 67a. The light is then reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 67a and passes through the beam splitter 67b. Almost all of the light is then reflected by the beam splitter 67c and is then received by the photodetector integrated in the module 167a.

In the present embodiment, the wavelength of the semiconductor laser integrated in the module 167a may be 660 nm, and the wavelengths of the semiconductor lasers 17a and 17b may be 780 nm and 400 nm, respectively. At this time, the beam splitter D is used as the beam splitter 67a. Any of the beam splitters I, R and T is used as the beam splitter 67b. Any of the beam splitters B, F, and N is used as the beam splitter 67c. Any of the beam splitters G, J, M, N, T, U, W, X and Y is used as the beam splitter 67d.

In the present embodiment, the wavelength of the semiconductor laser integrated in the module 167a may be 780 nm, and the wavelengths of the semiconductor lasers 17a and 17b may be 400 nm and 660 nm, respectively. At this time, the beam splitter E is used as the beam splitter 67a. Any of the beam splitters G, N, and U is used as the beam splitter 67b. Any of the beam splitters C, D, O, J, M, and X is used as the beam splitter 67c. Any of the beam splitters H, K, O, P, S, U, V, X, and Y is used as the beam splitter 67d.

In the present embodiment, the wavelength of the semiconductor laser integrated in the module 167a may be 400 nm, and the wavelengths of the semiconductor lasers 17a and 17b may be 780 nm and 660 nm, respectively. At this time, the beam splitter E is used as the beam splitter 67a. Any of the beam splitters I, Q and S is used as the beam splitter 67b. Any of the beam splitters A, F and P is used as the beam splitter 67c. Any of the beam splitters H, K, O, P, S, U, V, X and Y is used as the beam splitter 67d.

In the present embodiment, the wavelength of the semiconductor laser integrated in the module 167a may be 660 nm, and the wavelengths of the semiconductor lasers 17a and 17b may be 400 nm and 780 nm, respectively. At this time, the beam splitter P is used as the beam splitter 67a. Any of the beam splitters G, M, and T is used as the beam splitter 67b. Any of the beam splitters B, D, Q, J, N and W is used as the beam splitter 67c. Any of the beam splitters I, L, Q, R, S, T, V, W and Y is used as the beam splitter 67d.

In the present embodiment, the wavelength of the semiconductor laser integrated in the module 167a may be 400 nm, and the wavelengths of the semiconductor lasers 17a and 17b may be 660 nm and 780 nm, respectively. At this time, the beam splitter F is used as the beam splitter 67a. Any of the beam splitters H, O, and S is used as the beam splitter 67b. Any of the beam splitters A, E, R, K, P, and V is used as the beam splitter 67c. Any of the beam splitters I, L, Q, R, S, T, V, W, and Y is used as the beam splitter 67d.

Further, the semiconductor laser 17b can be replaced with a photodetector 117b in the present embodiment. Also, in the present embodiment, the module 167a, semiconductor laser 17a, and photodetector 117a can be replaced with each other.

In the present embodiment in which the module 167a, semiconductor laser 17a, and photodetector 117a are respectively replaced with the photodetector 117a, semiconductor laser 17a, and module 117a, a half-wave plate for turning, by 90°, the polarization direction of the light which has been emitted from the semiconductor laser 17a and reflected by the disk 204 and passed through the beam splitter 67b, may be inserted between the beam splitters 67b and 67c, if necessary, in order that the light is reflected by the beam splitter 67c.

In the present embodiment in which the module 167a, semiconductor laser 17a, and photodetector 117a are respectively replaced with the semiconductor laser 17a, photodetector 117a, and module 167a, a half-wave plate for turning, by 90°, the polarization direction of the light which has been emitted from the semiconductor laser 17a and reflected by the beam splitter 67c, may be inserted between the beam splitters 67c and 67b, if necessary, in order that the light passes through the beam splitter 67b.

In the seventeenth embodiment of the optical head apparatus according to the present invention, the semiconductor lasers 17a and 17b are not integrated with other light sources or photodetectors. Therefore, the semiconductor lasers 17a and 17b can have a high heat radiation characteristic. In addition, the total number of elements, i.e., the module, light sources, and photodetectors is only five. Therefore, the optical head apparatus can be downsized. Further, the photodetector integrated in the module 167a can be designed to have an optimal sensitivity or the like for the wavelength of the semiconductor laser integrated also in the module 167a, and the photodetectors 117a and 117b can respectively be designed to have optimal sensitivities or the like for the wavelengths of the semiconductor lasers 17a and 17b.

Eighteenth Embodiment

Figure 18:
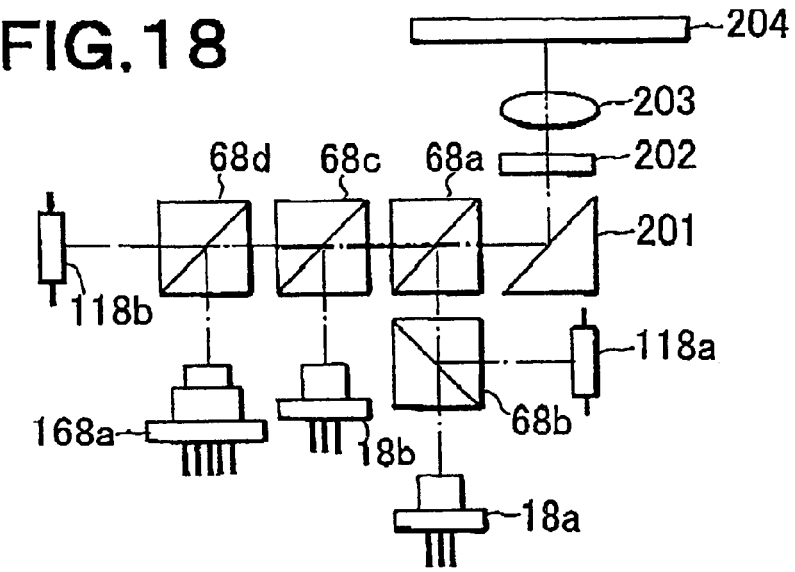
FIG. 18 is a diagram showing the eighteenth embodiment of the optical head apparatus according to the present invention.

FIG. 18 shows the eighteenth embodiment of the optical head apparatus according to the present invention. The module 168a is a module which integrates one semiconductor laser and one photodetector. The structure of the module will be described later with reference to FIG. 74. The wavelength of the semiconductor laser integrated in the module 168a is 780 nm. The wavelengths of the semiconductor lasers 18a and 18b are 400 nm and 660 nm, respectively. The beam splitter A is used as a beam splitter 68a. Any of the beam splitters G, J, M, N, T, U, W, X, and Y is used as a beam splitter 68b. Any of the beam splitters H, P, and U is used as a beam splitter 68c. Any of the beam splitters C, E, M, K, O, and X is used as a beam splitter 68d.

Light having a wavelength of 400 nm and emitted from the semiconductor laser 18a enters, as P-polarized, into the beam splitter 68b. Almost all of the light passes through the beam splitter 68b and is reflected by the beam splitter 68a. The light is reflected by the mirror 201 and is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 68a, and enters, as S-polarized, into the beam splitter 68b. Almost all of the light is reflected therefrom and is then received by the photodetector 118a.

Light having a wavelength of 660 nm and emitted from the semiconductor laser 18b enters, as S-polarized, into the beam splitter 68c. Almost all of the light is reflected therefrom and passes through the beam splitter 68a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 68a and enters, as P-polarized, into the beam splitter 68c. Almost all of the light passes through the beam splitter 68c and enters, as P-polarized, into the beam splitter 68d. Almost all of the light passes through the beam splitter 66d and is received by the photodetector 118b.

Almost all of light having a wavelength of 780 nm and emitted from the semiconductor laser integrated in the module 168a is reflected by the beam splitter 68d and passes through the beam splitter 68c. Almost all of the light then passes through the beam splitter 68a. The light is then reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 68a and passes through the beam splitter 68c. Almost all of the light is then reflected by the beam splitter 68d and is then received by the photodetector integrated in the module 168a.

In the present embodiment, the wavelength of the semiconductor laser integrated in the module 168a may be 660 nm, and the wavelengths of the semiconductor lasers 18a and 18b may be 400 nm and 780 nm, respectively. At this time, the beam splitter A is used as the beam splitter 68a. Any of the beam splitters G, J, M, N, T, U, W, X, and Y is used as the beam splitter 68b. Any of the beam splitters I, R, and T is used as the beam splitter 68c. Any of the beam splitters B, F, and N is used as the beam splitter 68d.

In the present embodiment, the wavelength of the semiconductor laser integrated in the module 168a may be 780 nm, and the wavelengths of the semiconductor lasers 18a and 18b may be 660 nm and 400 nm, respectively. At this time, the beam splitter B is used as the beam splitter 68a. Any of the beam splitters H, K, O, P, S, U, V, X, and Y is used as the beam splitter 68b. Any of the beam splitters G, N, and U is used as the beam splitter 68c. Any of the beam splitters C, D, O, J, M, and X is used as the beam splitter 68d.

In the present embodiment, the wavelength of the semiconductor laser integrated in the module 168a may be 400 nm, and the wavelengths of the semiconductor lasers 18a and 18b may be 660 nm and 790 nm, respectively. At this time, the beam splitter B is used as the beam splitter 68a. Any of the beam splitters H, K, O, P, S, U, V, X, and Y is used as the beam splitter 68b. Any of the beam splatters I, Q, and S is used as the beam splitter 68c. Any of the beam splitters A, F, and P is used as the beam splitter 68d.

In the present embodiment, the wavelength of the semiconductor laser integrated in the module 168a may be 660 nm, and the wavelengths of the semiconductor lasers 18a and 18b may be 780 nm and 400 nm, respectively. At this time, the beam splitter C is used as the beam splitter 68a. Any of the beam splitters I, L, Q, R, S, T, V, W, and Y is used as the beam splitter 68b. Any of the beam splitters G, M, and T is used as the beam splitter 68c. Any of the beam splitters D, D, Q, J, N, and W is used as the beam splitter 68d.

In the present embodiment, the wavelength of the semiconductor laser integrated in the module 168a may be 400 nm, and the wavelengths of the semiconductor lasers 18a and 18b may be 780 nm and 660 nm, respectively. At this time, the beam splitter C is used as the beam splitter 68a. Any of the beam splitters I, L, Q, R, S, T, V, W, and Y is used as the beam splitter 68b. Any of the beam splitters H, O, and S is used as the beam splitter 68c. Any of the beam splitters A, E, R, K, P, and V is used as the beam splitter 68d.

Further, the semiconductor laser 18a can be replaced with a photodetector 118a in the present embodiment. Also, in the present embodiment, the module 168a, semiconductor laser 18b, and photodetector 118b can be replaced with each other.

In the present embodiment in which the module 168a, semiconductor laser 18b, and photodetector 118b are respectively replaced with the photodetector 118b, semiconductor laser 18b, and module 168a, a half-wave plate for turning, by 90°, the polarization direction of the light which has been emitted from the semiconductor laser 18b, reflected by the disk 204, and has passed through the beam splitter 68c, may be inserted between the beam splitters 68c and 68a, if necessary, in order that the light is reflected by the beam splitter 68d.

In the present embodiment in which the module 168a, semiconductor laser 18b, and photodetector 118b are respectively replaced with the semiconductor laser 18b, photodetector 118b, and module 168a, a half-wave plate for turning, by 90°, the polarization direction of the light which has been emitted from the semiconductor laser 18b and reflected by the beam splitter 68d, may be inserted between the beam splitters 68d and 68c, if necessary, in order that the light passes through the beam splitter 68c.

In the eighteenth embodiment of the optical head apparatus according to the present invention, the semiconductor lasers 18a and 18b are not integrated with other light sources or photodetectors. Therefore, the semiconductor lasers 18a and 18b can have a high heat radiation characteristic. In addition, the total number of elements, i.e., the module, light sources, and photodetectors is only five. Therefore, the optical head apparatus can be downsized. Further, the photodetector integrated in the module 168a can be designed to have an optimal sensitivity or the like for the wavelength of the semiconductor laser integrated in the module 168a, and the photodetectors 118a and 118b can respectively be designed to have optimal sensitivities or the like for the wavelengths of the semiconductor lasers 18a and 18b.

Nineteenth Embodiment

Figure 19:
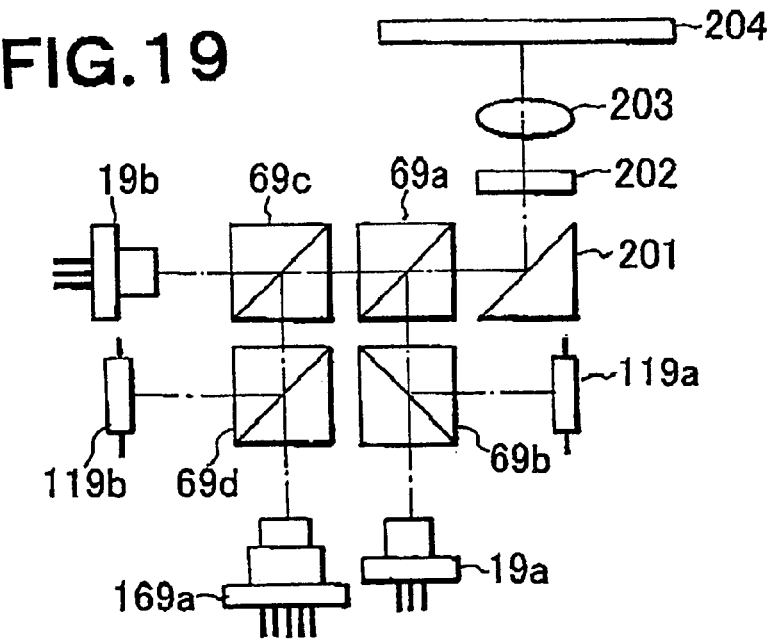
FIG. 19 is a diagram showing the nineteenth embodiment of the optical head apparatus according to the present invention.

FIG. 19 shows the nineteenth embodiment of the optical head apparatus according to the present invention. The module 169a is a module which integrates one semiconductor laser and one photodetector. The structure of the module will be described later with reference to FIG. 74. The wavelength of the semiconductor laser integrated in the module 169a is 780 nm. The wavelengths of the semiconductor lasers 19a and 19b are 400 nm and 660 nm, respectively. The beam splitter A is used as a beam splitter 69a. Any of the beam splitters G, J, M, N, T, U, W, X and Y is used as a beam splitter 69b. Any of the beam splitters K, O, and X is used as a beam splitter 69c. Any of the beam splitters B, F, N, H, P and U is used as a beam splitter 69d.

Light having a wavelength of 400 nm and emitted from the semiconductor laser 19a enters, as P-polarized, into the beam splitter 69b. Almost all of the light passes through the beam splitter 69b and is reflected by the beam splitter 69a. The light is reflected by the mirror 201 and is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 69a, and enters, as S-polarized, into the beam splitter 69b. Almost all of the light is reflected therefrom and is then received by the photodetector 119a.

Light having a wavelength of 660 nm and emitted from the semiconductor laser 19b enters, as S-polarized, into the beam splitter 69c. Almost all of the light passes through the beam splitter 69c and further passes through the beam splitter 69a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 69a and enters, as S-polarized, into the beam splitter 69c. Almost all of the light is reflected therefrom and enters, as S-polarized, into the beam splitter 69d. Almost all of the light is reflected therefrom and is received by the photodetector 119b.

Almost all of light having a wavelength of 780 nm and emitted from the semiconductor laser integrated in the module 169a passes through the beam splitter 69d and is reflected by the beam splitter 69c. Almost all of the light then passes through the beam splitter 69a. The light is then reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 69a and is reflected by the beam splitter 69c. Almost all of the light then passes through the beam splitter 69d and is then received by the photodetector integrated in the module 169a.

In the present embodiment, the wavelength of the semiconductor laser integrated in the module 169a may be 660 nm, and the wavelengths of the semiconductor lasers 19a and 19b may be 400 nm and 780 nm, respectively. At this time, the beam splitter A is used as the beam splitter 69a. Any of the beam splitters G, J, M, N, T, U, W, X, and Y is used as the beam splitter 69b. Any of the beam splitters L, Q, and W is used as the beam splitter 69c. Any of the beam splitters C, E, and M is used as the beam splitter 69d.

In the present embodiment, the wavelength of the semiconductor laser integrated in the module 169a may be 780 nm, and the wavelengths of the semiconductor lasers 19a and 19b may be 660 nm and 400 nm, respectively. At this time, the beam splitter B is used as the beam splitter 69a. Any of the beam splitters H, K, O, P, S, U, V, X, and Y is used as the beam splitter 69b. Any of the beam splitters J, M, and X is used as the beam splitter 69c. Any of the beam splitters A, F, P, G, N, and U is used as the beam splitter 69d.

In the present embodiment, the wavelength of the semiconductor laser integrated in the module 169a may be 400 nm, and the wavelengths of the semiconductor lasers 19a and 19b may be 660 nm and 780 nm, respectively. At this time, the beam splitter B is used as the beam splitter 69a. Any of the beam splitters H, K, O, P, S, U, V, X, and Y is used as the beam splitter 69b. Any of the beam splitters L, R, and V is used as the beam splitter 69c. Any of the beam splitters C, D, and O is used as the beam splitter 69d.

In the present embodiment, the wavelength of the semiconductor laser integrated in the module 169a may be 660 nm, and the wavelengths of the semiconductor lasers 19a and 19b may be 780 nm and 400 nm, respectively. At this time, the beam splitter C is used as the beam splitter 69a. Any of the beam splitters I, L, Q, R, S, T, V, W and Y is used as the beam splitter 69b. Any of the beam splitters J, N, and W is used as the beam splitter 69c. Any of the beam splitters A, E, R, G, M and T is used as the beam splitter 69d.

In the present embodiment, the wavelength of the semiconductor laser integrated in the module 169a may be 400 nm, and the wavelengths of the semiconductor lasers 19a and 19b may be 780 nm and 660 nm, respectively. At this time, the beam splitter C is used as the beam splitter 69a. Any of the beam splitters I, L, Q, R, S, T, V, W and Y is used as the beam splitter 69b. Any of the beam splitters K, P, and V is used as the beam splitter 69c. Any of the beam splitters B, D, Q, H, O, and S is used as the beam splitter 69d.

Further, the semiconductor laser 19a can be replaced with a photodetector 119a in the present embodiment. Also, in the present embodiment, the module 169a, semiconductor laser 19b, and photodetector 119b can be replaced with each other.

In the present embodiment in which the module 169a, semiconductor laser 19b, and photodetector 119b are respectively replaced with the photodetector 119b, semiconductor laser 19b, and module 169a, a half-wave plate for turning, by 90°, the polarization direction of the light which has been emitted from the semiconductor laser 19b, reflected by the disk 204, and reflected by the beam splitter 69c, may be inserted between the beam splitters 69c and 69d, if necessary, in order that the light passes through the beam splitter 69d.

In the present embodiment in which the module 169a, semiconductor laser 19b, and photodetector 119b are respectively replaced with the semiconductor laser 19b, photodetector 119b, and module 169a, a half-wave plate for turning, by 90°, the polarization direction of the light which has been emitted from the semiconductor laser 19b and has passed through the beam splitter 69d, may be inserted between the beam splitters 69d and 69c, if necessary, in order that the light is reflected by the beam splitter 69c.

In the nineteenth embodiment of the optical head apparatus according to the present invention, the semiconductor lasers 19a and 19b are not integrated with other light sources or photodetectors. Therefore, the semiconductor lasers 19a and 19b can have a high heat radiation characteristic. In addition, the total number of elements, i.e., the module, light sources, and photodetectors is only five. Therefore, the optical head apparatus can be downsized. Further, the photodetector integrated in the module 169a can be designed to have an optimal sensitivity or the like for the wavelength of the semiconductor later integrated also in the module 169a, and the photodetectors 119a and 119b can respectively be designed to have optimal sensitivities or the like for the wavelengths of the semiconductor lasers 19a and 19b.

9. Twentieth to Twenty-Fourth Embodiments

Type 7

The twentieth to twenty-fourth embodiments of the optical head apparatus according to the present invention each have one light source, one photodetector, and two modules. However, each of the two modules integrates one light source and one photodetector.

Twentieth Embodiment

Figure 20:
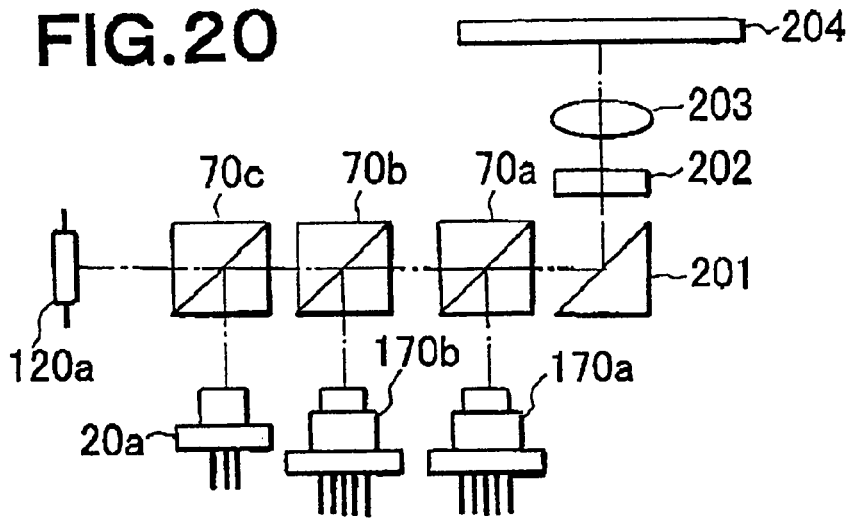
FIG. 20 is a diagram showing the twentieth embodiment of the optical head apparatus according to the present invention.

FIG. 20 shows the twentieth embodiment of the optical head apparatus according to the present invention. The modules 170a and 170b are modules each of which integrates one semiconductor laser and one photodetector. The structure of each module will be described later with reference to FIG. 74. The wavelengths of the semiconductor lasers integrated in the modules 170a and 170b are 780 nm and 660 nm, respectively. The wavelength of the semiconductor laser 20a is 400 nm. The beam splitter C is used as a beam splitter 70a. Any of the beam splitters B, D, and Q is used as a beam splitter 70b. Any of the beam splitters G, J, M, N, T, U, W, X, and Y is used as a beam splitter 70c.

Almost all of light having a wavelength of 400 nm and emitted from the semiconductor laser 20a enters, as S-polarized, into the beam splitter 70c. Almost all of the light is reflected therefrom and passes through the beam splitter 70b. Almost all of the light further passes through the beam splitter 70a and is then reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 70a and then the beam splitter 70b. The light then enters, as P-polarized, into the beam splitter 70c. Almost all of the light passes through the beam splitter 70c and is received by the photodetector 120a.

Almost all of light having a wavelength of 660 nm and emitted from the semiconductor laser in the module 170b is reflected by the beam splitter 70b and passes through the beam splitter 70a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 70a and is reflected by the beam splitter 70b. The light is then received by the photodetector in the module 170b.

Almost all of light having a wavelength of 780 nm and emitted from the semiconductor laser in the module 170a is reflected by the beam splitter 70a and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 70a and is received by the photodetector in the module 170a.

In the present embodiment, the wavelengths of the semiconductor lasers integrated in the modules 170a and 170b may be 660 nm and 780 nm, respectively, and the wavelength of the semiconductor laser 20a may be 400 nm. At this time, the beam splitter B is used as the beam splitter 70a. Any of the beam splitters C, D and O is used as the beam splitter 70b. Any of the beam splitters G, J, M, N, T, U, W, X and Y is used as the beam splitter 70c.

In the present embodiment, the wavelengths of the semiconductor lasers in the modules 170a and 170b may be 780 nm and 400 nm, respectively, and the wavelength of the semiconductor laser 20a may be 660 nm. At this time, the beam splitter C is used as the beam splitter 70a. Any of the beam splitters A, E, and R is used as the beam splitter 70b. Any of the beam splitters H, K, O, P, S, U, V, X and Y is used as the beam splitter 70c.

In the present embodiment, the wavelengths of the semiconductor lasers in the modules 170a and 170b may be 400 nm and 780 nm, respectively, and the wavelength of the semiconductor laser 20a may be 660 nm. At this time, the beam splitter A is used as the beam splitter 70a. Any of the beam splitters C, E, and M is used as the beam splitter 70b. Any of the beam splitters H, K, O, P, S, U, V, X and Y is used as the beam splitter 70c.

In the present embodiment, the wavelengths of the semiconductor lasers in the modules 170a and 170b may be 660 nm and 400 nm, respectively, and the wavelength of the semiconductor laser 20a may be 780 nm. At this time, the beam splitter B is used as the beam splitter 70a. Any of the beam splitters A, F and P is used as the beam splitter 70b. Any of the beam splitters I, L, Q, R, S, T, V, W and Y is used as the beam splitter 70c.

In the present embodiment, the wavelengths of the semiconductor lasers in the modules 170a and 170b may be 400 nm and 660 nm, respectively, and the wavelengths of the semiconductor laser 20a may be 780 nm. At this time, the beam splitter A is used as the beam splitter 70a. Any of the beam splitters B, F, and N is used as the beam splitter 70b. Any of the beam splitters I, L, Q, R, S, T, V, W and Y is used as the beam splitter 70c.

Further, the modules 170a and 170b, semiconductor laser 20a, and photodetector 120a can be replaced with each other, in the present embodiment.

In the present embodiment in which the module 170a, module 170b, semiconductor laser 20a, and photodetector 120a are respectively replaced with the module 170a, semiconductor laser 20a, photodetector 120a, and module 170b, a half-wave plate for turning, by 90°, the polarization direction of the light which has been emitted from the semiconductor laser 20a, reflected by the disk 204, and has passed through the beam splitter 70b, may be inserted between the beam splitters 70b and 70c, if necessary, in order that the light is reflected by the beam splitter 70c.

In the present embodiment in which the module 170a, module 170b, semiconductor laser 20a, and photodetector 120a are respectively replaced with the module 170a, photodetector 120a, semiconductor laser 20a, and module 170b, a half-wave plate for turning, by 90°, the polarization direction of the light which has been emitted from the semiconductor laser 20a and reflected by the beam splitter 70c, may be inserted between the beam splitters 70c and 70b, if necessary, in order that the light passes through the beam splitter 70b.

In the present embodiment in which the module 170a, module 170b, semiconductor laser 20a, and photodetector 120a are respectively replaced with the semiconductor laser 20a, module 170b, photodetector 120a, and module 170a, a half-wave plate for turning, by 90°, the polarization direction of the light which has been emitted from the semiconductor laser 20a, reflected by the disk 204, and has passed through the beam splitter 70b, may be inserted between the beam splitters 70b and 70c, if necessary, in order that the light is reflected by the beam splitter 70c.

In the present embodiment in which the module 170a, module 170b, semiconductor laser 20a, and photodetector 120a are respectively replaced with the photodetector 120a, module 170b, semiconductor laser 20a, and module 170a, a half-wave plate for turning, by 90°, the polarization direction of the light which has been emitted from the semiconductor laser 20a and reflected by the beam splitter 70c, may be inserted between the beam splitters 70c and 70b, if necessary, in order that the light passes through the beam splitter 70b.

In the present embodiment in which the module 170a, module 170b, semiconductor laser 20a, and photodetector 120a are respectively replaced with the semiconductor laser 20a, photodetector 120a, module 170a or 170b, and module 170b or 170a, a half-wave plate for turning, by 90°, the polarization direction of the light which has been emitted from the semiconductor laser 20a, reflected by the disk 204, and has passed through the beam splitter 70a, may be inserted between the beam splitters 70a and 70b, if necessary, in order that the light is reflected by the beam splitter 70b.

In the present embodiment in which the module 170a, module 170b, semiconductor laser 20a, and photodetector 120a are respectively replaced with the photodetector 120a, semiconductor laser 20a, module 170a or 170b, and module 170b or 170a, a half-wave plate for turning, by 90°, the polarization direction of the light which has been emitted from the semiconductor laser 20a, and reflected by the beam splitter 70b, may be inserted between the beam splitters 70b and 70a, if necessary, in order that the light passes through the beam splitter 70a.

In the twentieth embodiment of the optical head apparatus according to the present invention, the semiconductor laser 20a is not integrated with other light sources or photodetectors. Therefore, the semiconductor laser 20a can have a high heat radiation characteristic. In addition, the total number of elements, i.e., the modules, light source, and photodetector is only four. Therefore, the optical head apparatus can be downsized. Further, the photodetectors integrated in the modules 170a and 170b can respectively be designed to have optimal sensitivities or the like for the wavelengths of the semiconductor lasers integrated also in the modules 170a and 170b, and the photodetector 120a can be designed to have an optimal sensitivity or the like for the wavelength of the semiconductor laser 20a.

Twenty-First Embodiment

Figure 21:
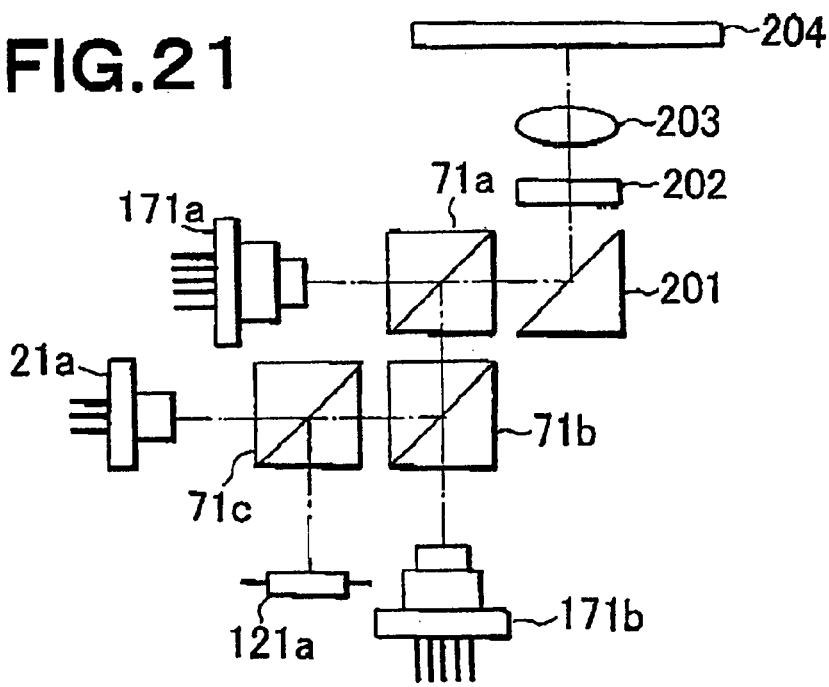
FIG. 21 is a diagram showing the twenty-first embodiment of the optical head apparatus according to the present invention.

FIG. 21 shows the twenty-first embodiment of the optical head apparatus according to the present invention. The modules 171a and 171b are modules each of which integrates one semiconductor laser and one photodetector. The structure of each module will be described later with reference to FIG. 74. The wavelengths of the semiconductor lasers integrated in the modules 171a and 171b are 780 nm and 660 nm. The wavelength of the semiconductor laser 21a is 400 nm. The beam splitter F is used as a beam splitter 71a. Any of the beam splitters A, E, and R is used as a beam splitter 71b. Any of the beam splitters G, J, M, N, T, U, W, X, and Y is used as a beam splitter 71c.

Light having a wavelength of 400 nm and emitted from the semiconductor laser 21a enters, as P-polarized, into the beam splitter 71c. Almost all of the light passes through the beam splitter 71c and is reflected by the beam splitter 71b. Almost all of the light is reflected by the beam splitter 71a and is then reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 71a and then by the beam splitter 71b, and enters, as S-polarized, into the beam splitter 71*c*. Almost all of the light is reflected by the beam splitter 71*c* and is received by the photodetector 121*a*.

Almost all of light having a wavelength of 660 nm and emitted from the semiconductor laser in the module 171*b* passes through the beam splitter 71*b* and is reflected by the beam splitter 71*a*. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 71*a* and passes through the beam splitter 71*b*. The light is then received by the photodetector in the module 171*b*.

Almost all of light having a wavelength of 780 nm and emitted from the semiconductor laser in the module 171*a* passes through the beam splitter 71*a* and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 71*a* and is received by the photodetector in the module 171*a*.

In the present embodiment, the wavelengths of the semiconductor lasers integrated in the modules 171*a* and 171*b* may be 660 nm and 780 nm, respectively, and the wavelength of the semiconductor laser 21*a* may be 400 nm. At this time, the beam splitter E is used as the beam splitter 71*a*. Any of the beam splitters A, F, and P is used as the beam splitter 71*b*. Any of the beam splitters G, J, M, N, T, U, W, X and Y is used as the beam splitter 71*c*.

In the present embodiment, the wavelengths of the semiconductor lasers integrated in the modules 171*a* and 171*b* may be 780 nm and 400 nm, respectively, and the wavelength of the semiconductor laser 21*a* may be 660 nm. At this time, the beam splitter F is used as the beam splitter 71*a*. Any of the beam splitters B, D, and Q is used as the beam splitter 71*b*. Any of the beam splitters H, K, O, F, S, U, V, X and Y is used as the beam splitter 71*c*.

In the present embodiment, the wavelengths of the semiconductor lasers in the modules 171*a* and 171*b* may be 400 nm and 780 nm, respectively, and the wavelength of the semiconductor laser 21*a* may be 660 nm. At this time, the beam splitter D is used as the beam splitter 71*a*. Any of the beam splitters B, F, and N is used as the beam splitter 71*b*. Any of the beam splitters H, K, O, P, S, U, V, X and Y is used as the beam splitter 71*c*.

In the present embodiment, the wavelengths of the semiconductor lasers in the modules 171*a* and 171*b* may be 660 nm and 400 nm, respectively, and the wavelength of the semiconductor laser 21*a* may be 780 nm. At this time, the beam splitter E is used as the beam splitter 71*a*. Any of the beam splitters C, D, and O is used as the beam splitter 71*b*. Any of the beam splitters I, L, Q, R, S, T, V, W and Y is used as the beam splitter 71*c*.

In the present embodiment, the wavelengths of the semiconductor lasers 171*a* and 171*b* may be 400 nm and 660 nm, respectively, and the wavelength of the semiconductor laser 21*a* may be 780 nm. At this time, the beam splitter D is used as the beam splitter 71*a*. Any of the beam splitters C, E, and M is used as the beam splitter 71*b*. Any of the beam splitters I, L, Q, R, S, T, V, W and Y is used as the beam splitter 71*c*.

Further, the modules 171*a* and 171*b*, semiconductor laser 21*a*, and photodetector 121*a* can be replaced with each other, in the present embodiment.

In the present embodiment in which the module 171*a*, module 171*b*, semiconductor laser 21*a*, and photodetector 121*a* are respectively replaced with the module 171*a*, semiconductor laser 21*a*, photodetector 121*a*, and module 171*b*, a half-wave plate for turning, by 90°, the polarization direction of the light which has been emitted from the semiconductor laser 21*a*, reflected by the disk 204, and reflected by the beam splitter 71*b*, may be inserted between the beam splitters 71*b* and 71*c*, if necessary, in order that the light passes through the beam splitter 71*c*.

In the present embodiment in which the module 171*a*, module 171*b*, semiconductor laser 21*a*, and photodetector 121*a* are respectively replaced with the module 171*a*, photodetector 121*a*, semiconductor laser 21*a*, and module 171*b*, a half-wave plate for turning, by 90°, the polarization direction of the light which has been emitted from the semiconductor laser 21*a* and passed through the beam splitter 71*c*, may be inserted between the beam splitters 71*c* and 71*b*, if necessary, in order that the light is reflected by the beam splitter 71*b*.

In the present embodiment in which the module 171*a*, module 171*b*, semiconductor laser 21*a*, and photodetector 121*a* are respectively replaced with the semiconductor laser 21*a*, module 171*b*, photodetector 121*a*, and module 171*a*, a half-wave plate for turning, by 90°, the polarization direction of the light which has been emitted from the semiconductor laser 21*a*, reflected by the disk 204, and reflected by the beam splitter 71*b*, may be inserted between the beam splitters 70*b* and 70*c*, if necessary, in order that the light passes through the beam splitter 71*c*.

In the present embodiment in which the module 171*a*, module 171*b*, semiconductor laser 21*a*, and photodetector 121*a* are respectively replaced with the photodetector 121*a*, module 171*b*, semiconductor laser 21*a*, and module 171*a*, a half-wave plate for turning, by 90°, the polarization direction of the light which has been emitted from the semiconductor laser 21*a* and passed through the beam splitter 71*c*, may be inserted between the beam splitters 71*c* and 71*b*, if necessary, in order that the light is reflected by the beam splitter 71*b*.

In the present embodiment in which the module 171*a*, module 171*b*, semiconductor laser 21*a*, and photodetector 121*a* are respectively replaced with the semiconductor laser 21*a*, photodetector 121*a*, module 171*a* or 171*b*, and module 171*b* or 171*a*, a half-wave plate for turning, by 90°, the polarization direction of the light which has been emitted from the semiconductor laser 21*a*, reflected by the disk 204, and reflected by the beam splitter 71*a*, may be inserted between the beam splitters 71*a* and 71*b*, if necessary, in order that the light passes through the beam splitter 71*b*.

In the present embodiment in which the module 171*a*, module 171*b*, semiconductor laser 21*a*, and photodetector 121*a* are respectively replaced with the photodetector 121*a*, semiconductor laser 21*a*, module 171*a* or 171*b*, and module 171*b* or 171*a*, a half-wave plate for turning, by 90°, the polarization direction of the light which has been emitted from the semiconductor laser 21*a*, and passed through the beam splitter 71*b*, may be inserted between the beam splitters 71*b* and 71*a*, if necessary, in order that the light is reflected by the beam splitter 71*a*.

In the twenty-first embodiment of the optical head apparatus according to the present invention, the semiconductor laser 21*a* is not integrated with other light sources or photodetectors. Therefore, the semiconductor laser 21*a* can have a high heat radiation characteristic. In addition, the total number of elements, i.e., the modules, light source, and photodetector is only four. Therefore, the optical head apparatus can be downsized. Further, the photodetectors integrated in the modules 171*a* and 171*b* can respectively be designed to have optimal sensitivities or the like for the wavelengths of the semiconductor lasers integrated also in the modules 171*a* and 171*b*, and the photodetector 121*a* can be designed to have an optimal sensitivity or the like for the wavelength of the semiconductor laser 21*a*.

Twenty-Second Embodiment

Figure 22:
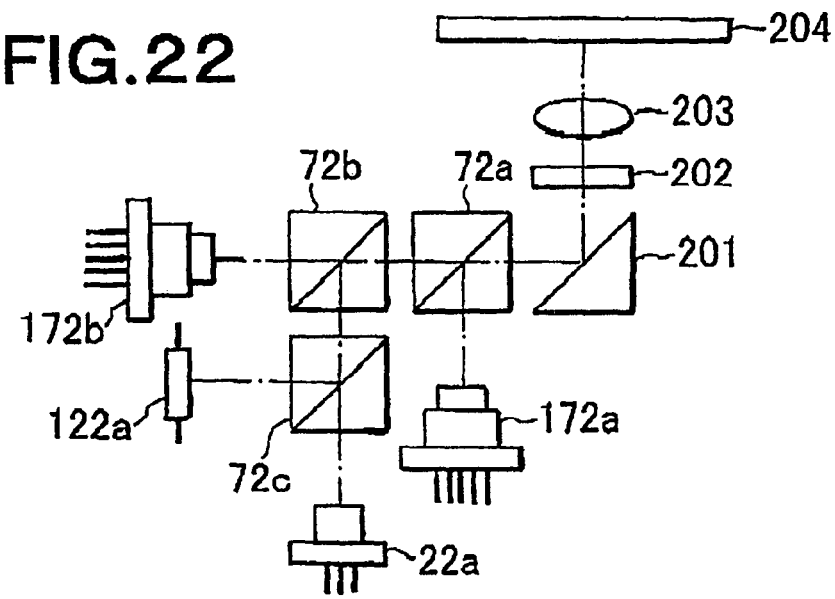
FIG. 22 is a diagram showing the twenty-second embodiment of the optical head apparatus according to the present invention.

FIG. 22 shows the twenty-second embodiment of the optical head apparatus according to the present invention. The modules 172*a* and 172*b* are modules each of which integrates one semiconductor laser and one photodetector. The structure of each module will be described later with reference to FIG. 74. The wavelengths of the semiconductor lasers integrated in the modules 172*a* and 172*b* are 780 nm and 660 nm, respectively. The wavelength of the semiconductor laser 22*a* is 400 nm The beam splitter C is used as a beam splitter 72*a*. Any of the beam splitters A, E, and R is used as a beam splitter 72*b*. Any of the beam splitters G, J, M, N, T, U, W, X and Y is used as a beam splitter 72*c*.

Light having a wavelength of 400 nm and emitted from the semiconductor laser 22*a* enters, as P-polarized, into the beam splitter 72*c*. Almost all of the light passes through the beam splitter 72*c* and is reflected by the beam splitter 72*b*. Almost all of the light passes through the beam splitter 72*a* and is then reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 72*a* and is then reflected by the beam splitter 72*b*, and enters, as S-polarized, into the beam splitter 72*c*. Almost all of the light is reflected by the beam splitter 72*c* and is received by the photodetector 122*a*.

Almost all of light having a wavelength of 660 nm and emitted from the semiconductor laser in the module 172*b* passes through the beam splitter 72*b* and also passes through the beam splitter 72*a*. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 72*a* and also passes through the beam splitter 72*b*. The light is then received by the photodetector in the module 172*b*.

Almost all of light having a wavelength of 780 nm and emitted from the semiconductor laser in the module 172*a* is reflected by the beam splitter 72*a* and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 72*a* and is received by the photodetector in the module 172*a*.

In the present embodiment, the wavelengths of the semiconductor lasers integrated in the modules 172*a* and 172*b* may be 660 nm and 780 nm, respectively, and the wavelength of the semiconductor laser 22*a* may be 400 nm. At this time, the beam splitter B is used as the beam splitter 72*a*. Any of the beam splitters A, F, and P is used as the beam splitter 72*b*. Any of the beam splitters G, J, M, N, T, U, W, X, and Y is used as the beam splitter 72*c*.

In the present embodiment, the wavelengths of the semiconductor lasers integrated in the modules 172*a* and 172*b* may be 780 nm and 400 nm, respectively, and the wavelength of the semiconductor laser 22*a* may be 660 nm. At this time, the beam splitter C is used as the beam splitter 72*a*. Any of the beam splitters B, D, and Q is used as the beam splitter 72*b*. Any of the beam splitters H, K, O, P, S, U, V, X, and Y is used as the beam splitter 72*c*.

In the present embodiment, the wavelengths of the semiconductor lasers in the modules 172*a* and 172*b* may be 400 nm and 780 nm, respectively, and the wavelength of the semiconductor laser 22*a* may be 660 nm. At this time, the beam splitter A is used as the beam splitter 72*a*. Any of the beam splitters B, F, and N is used as the beam splitter 72*b*. Any of the beam splitters H, K, O, P, S, U, V, X, and Y is used as the beam splitter 72*c*.

In the present embodiment, the wavelengths of the semiconductor lasers 172*a* and 172*b* may be 660 nm and 400 nm, respectively, and the wavelength of the semiconductor laser 22*a* may be 780 nm. At this time, the beam splitter B is used as the beam splitter 72*a*. Any of the beam splitters C, D, and O is used as the beam splitter 72*b*. Any of the beam splitters I, L, Q, R, S, T, V, W and Y is used as the beam splitter 72*c*.

In the present embodiment, the wavelengths of the semiconductor lasers 172*a* and 172*b* may be 400 nm and 660 nm, respectively, and the wavelength of the semiconductor laser 22*a* may be 780 nm. At this time, the beam splitter A is used as the beam splitter 72*a*. Any of the beam splitters C, E, and M is used as the beam splitter 72*b*. Any of the beam splitters I, L, Q, R, S, T, V, W and Y is used as the beam splitter 72*c*.

Further, the modules 172*a* and 172*b*, semiconductor laser 22*a*, and photodetector 122*a* can be replaced with each other, in the present embodiment.

In the present embodiment in which the module 172*a*, module 172*b*, semiconductor laser 22*a*, and photodetector 122*a* are respectively replaced with the module 172*a*, semiconductor laser 22*a*, photodetector 122*a*, and module 172*b*, a half-wave plate for turning, by 90°, the polarization direction of the light which has been emitted from the semiconductor laser 22*a*, reflected by the disk 204, and reflected by the beam splitter 72*b*, may be inserted between the beam splitters 72*b* and 72*c*, if necessary, in order that the light passes through the beam splitter 72*c*.

In the present embodiment in which the module 172*a*, module 172*b*, semiconductor laser 22*a*, and photodetector 122*a* are respectively replaced with the module 172*a*, photodetector 122*a*, semiconductor laser 22*a*, and module 172*b*, a half-wave plate for turning, by 90°, the polarization direction of the light which has been emitted from the semiconductor laser 22*a* and passed through the beam splitter 72*c*, may be inserted between the beam splitters 72*c* and 72*b*, if necessary, in order that the light is reflected by the beam splitter 72*b*.

In the present embodiment in which the module 172*a*, module 172*b*, semiconductor laser 22*a*, and photodetector 122*a* are respectively replaced with the semiconductor laser 22*a*, module 172*b*, module 172*a*, and photodetector 122*a*, a half-wave plate for turning, by 90°, the polarization direction of the light which has been emitted from the semiconductor laser 22*a*, reflected by the disk 204, and has passed through the beam splitter 72*a*, may be inserted between the beam splitters 72*a* and 72*b*, if necessary, in order that the light is reflected by the beam splitter 72*b*.

In the present embodiment in which the module 172*a*, module 172*b*, semiconductor laser 22*a*, and photodetector 122*a* are respectively replaced with the photodetector 122*a*, module 172*b*, module 172*a*, and semiconductor laser 22*a*, a half-wave plate for turning, by 90°, the polarization direction of the light which has been emitted from the semiconductor laser 22*a* and reflected by the beam splitter 72*b*, may be inserted between the beam splitters 72*b* and 72*a*, if necessary, in order that the light passes through the beam splitter 72*a*.

In the present embodiment in which the module 172*a*, module 172*b*, semiconductor laser 22*a*, and photodetector 122*a* are respectively replaced with the semiconductor laser 22*a*, module 172*b*, photodetector 122*a*, and module 172*a*, a half-wave plate for turning, by 90°, the polarization direction of the light which has been emitted from the semiconductor laser 22*a*, reflected by the disk 204, and has passed through the beam splitter 72*a*, may be inserted between the beam splitters 72*a* and 72*b*, if necessary, in order that the light is reflected by the beam splitter 72*b*. In addition, a half-wave plate for turning, by 90°, the polarization direction of the light which has been emitted from the semiconductor laser 22*a*, reflected by the disk 204, and reflected by the beam splitter 72*b*, may be inserted between the beam splitters 72*b* and 72*c*, if necessary, in order that the light passes through the beam splitter 72*c*.

In the present embodiment in which the module 172*a*, module 172*b*, semiconductor laser 22*a*, and photodetector 122*a* are respectively replaced with the photodetector 122*a*, module 172*b*, semiconductor laser 22*a*, and module 172*a*, a half-wave plate for turning, by 90°, the polarization direction of the light which has been emitted from the semiconductor laser 22*a* and passed through the beam splitter 72*c*, may be inserted between the beam splitters 72*c* and 72*b*, if necessary, in order that the light is reflected by the beam splitter 72*b*. In addition, a half-wave plate for turning, by 90°, the polarization direction of the light which has been emitted from the semiconductor laser 22*a* and reflected by the beam splitter 72*b*, may be inserted between the beam splitters 72*b* and 72*a*, if necessary, in order that the light passes through the beam splitter 72*a*.

In the twenty-second embodiment of the optical head apparatus according to the present invention, the semiconductor laser 22*a* is not integrated with other light sources or photodetectors. Therefore, the semiconductor lasers 22*a* can have a high heat radiation characteristic. In addition, the total number of elements, i.e., the modules, light source, and photodetector is only four. Therefore, the optical head apparatus can be downsized. Further, the photodetectors integrated in the modules 172*a* and 172*b* can respectively be designed to have optimal sensitivities or the like for the wavelengths of the semiconductor lasers integrated also in the modules 172*a* and 172*b*, and the photodetector 122*a* can be designed to have an optimal sensitivity or the like for the wavelength of the semiconductor laser 22*a*.

Twenty-Third Embodiment

Figure 23:
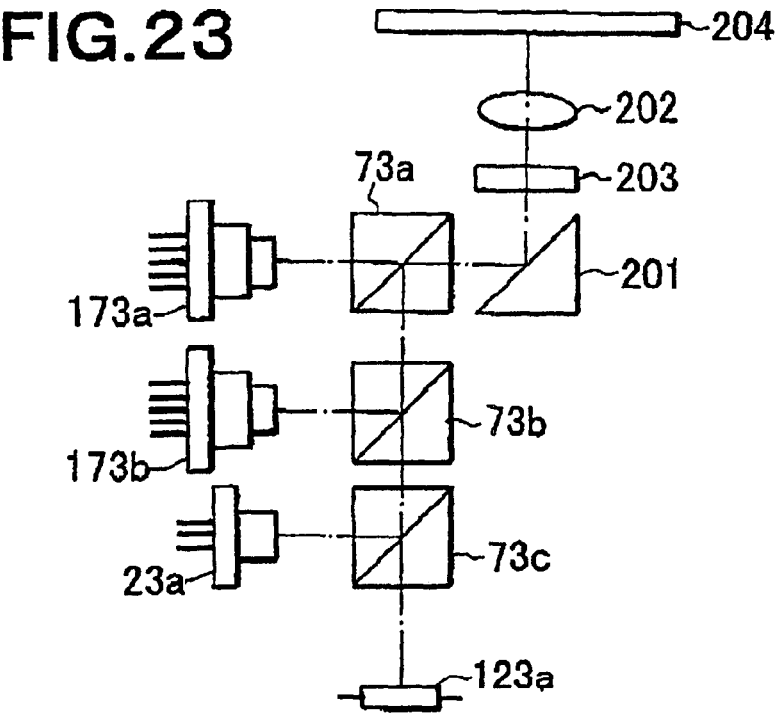
FIG. 23 is a diagram showing the twenty-third embodiment of the optical head apparatus according to the present invention.

FIG. 23 shows the twenty-third embodiment of the optical head apparatus according to the present invention. The modules 173*a* and 173*b* are modules each of which integrates one semiconductor laser and one photodetector. The structure of each module will be described later with reference to FIG. 74. The wavelengths of the semiconductor lasers integrated in the modules 173*a* and 173*b* are 780 nm and 660 nm, respectively. The wavelength of the semiconductor laser 23*a* is 400 nm. The beam splitter F is used as a beam splitter 73*a*. Any of the beam splitters B, D and Q is used as a beam splitter 73*b*. Any of the beam splitters G, J, M, N, T, U, W, X and Y is used as a beam splitter 73*c*.

Light having a wavelength of 400 nm and emitted from the semiconductor laser 23*a* enters, as S-polarized, into the beam splitter 73*c*. Almost all of the light is reflected therefrom and passes through the beam splitter 73*b*. Almost all of the light is reflected by the beam splitter 73*a* and is then reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 73*a* and then passes through the beam splitter 73*b*, and enters, as P-polarized, into the beam splitter 73*c*. Almost all of the light passes through the beam splitter 73*c* and is received by the photodetector 123*a*.

Almost all of light having a wavelength of 660 nm and emitted from the semiconductor laser in the module 173*b* is reflected by the beam splitter 73*b* and also by the beam splitter 73*a*. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 73*a* and also by the beam splitter 73*b*. The light is then received by the photodetector in the module 173*b*.

Almost all of light having a wavelength of 780 nm and emitted from the semiconductor laser in the module 173*a* passes through the beam splitter 73*a* and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 73*a* and is received by the photodetector in the module 173*a*.

In the present embodiment, the wavelengths of the semiconductor lasers integrated in the modules 173*a* and 173*b* may be 660 nm and 780 nm, respectively, and the wavelength of the semiconductor laser 23*a* may be 400 nm. At this time, the beam splitter E is used as the beam splitter 73*a*. Any of the beam splitters C, D and O is used as the beam splitter 73*b*. Any of the beam splitters G, J, M, N, T, U, W, X and Y is used as the beam splitter 73*c*.

In the present embodiment, the wavelengths of the semiconductor lasers integrated in the modules 173*a* and 173*b* may be 780 nm and 400 nm, respectively, and the wavelength of the semiconductor laser 23*a* may be 660 nm. At this time, the beam splitter F is used as the beam splitter 73*a*. Any of the beam splitters A, E and R is used as the beam splitter 73*b*. Any of the beam splitters H, K, O, P, S, U, V, X and Y is used as the beam splitter 73*c*.

In the present embodiment, the wavelengths of the semiconductor lasers in the modules 173*a* and 173*b* may be 400 nm and 780 nm, respectively, and the wavelength of the semiconductor laser 23*a* may be 660 nm. At this time, the beam splitter D is used as the beam splitter 73*a*. Any of the beam splitters C, E, and M is used as the beam splitter 73*b*. Any of the beam splitters H, K, O, P, S, U, V, X and Y is used as the beam splitter 73*c*.

In the present embodiment, the wavelengths of the semiconductor lasers 173*a* and 173*b* may be 660 nm and 400 nm, respectively, and the wavelength of the semiconductor laser 23*a* may be 780 nm. At this time, the beam splitter E is used as the beam splitter 73*a*. Any of the beam splitters A, F and P is used as the beam splitter 73*b*. Any of the beam splitters I, L, Q, R, S, T, V, W and Y is used as the beam splitter 73*c*.

In the present embodiment, the wavelengths of the semiconductor lasers 173*a* and 173*b* may be 400 nm and 660 nm, respectively, and the wavelength of the semiconductor laser 23*a* may be 780 nm. At this time, the beam splitter D is used as the beam splitter 73*a*. Any of the beam splitters B, F and N is used as the beam splitter 73*b*. Any of the beam splitters I, L, Q, R, S, T, V, W and Y is used as the beam splitter 73*c*.

Further, the modules 173*a* and 173*b*, semiconductor laser 23*a*, and photodetector 123*a* can be replaced with each other, in the present embodiment.

In the present embodiment in which the module 173*a*, module 173*b*, semiconductor laser 23*a*, and photodetector 123*a* are respectively replaced with the module 173*a*, semiconductor laser 23*a*, photodetector 123*a*, and module 173*b*, a half-wave plate for turning, by 90°, the polarization direction of the light which has been emitted from the semiconductor laser 23*a*, reflected by the disk 204, and has passed through the beam splitter 73*b*, may be inserted between the beam splitters 73*b* and 73*c*, if necessary, in order that the light is reflected by the beam splitter 73*c*.

In the present embodiment in which the module 173*a*, module 173*b*, semiconductor laser 23*a*, and photodetector 123*a* are respectively replaced with the module 173*a*, photodetector 123*a*, semiconductor laser 23*a*, and module 173*b*, a half-wave plate for turning, by 90°, the polarization direction of the light which has been emitted from the semiconductor laser 23*a* and reflected by the beam splitter 73*c*, may be inserted between the beam splitters 73*c* and 73*b*, if necessary, in order that the light passes through the beam splitter 73*b*.

In the present embodiment in which the module 173*a*, module 173*b*, semiconductor laser 23*a*, and photodetector 123*a* are respectively replaced with the semiconductor laser 23*a*, module 173*b*, module 173*a*, and photodetector 123*a*, a half-wave plate for turning, by 90°, the polarization direction of the light which has been emitted from the semiconductor laser 23*a*, reflected by the disk 204, and reflected by the beam splitter 73*a*, may be inserted between the beam splitters 73*a* and 73*b*, if necessary, in order that the light passes through the beam splitter 73*b*.

In the present embodiment in which the module 173*a*, module 173*b*, semiconductor laser 23*a*, and photodetector 123*a* are respectively replaced with the photodetector 123*a*, module 173*b*, module 173*a*, and semiconductor laser 23*a*, a half-wave plate for turning, by 90°, the polarization direction of the light which has been emitted from the semiconductor laser 23*a* and passed through the beam splitter 73*b*, may be inserted between the beam splitters 73*b* and 73*a*, if necessary, in order that the light is reflected by the beam splitter 73*a*.

In the present embodiment in which the module 173*a*, module 173*b*, semiconductor laser 23*a*, and photodetector 123*a* are respectively replaced with the semiconductor laser 23*a*, module 173*b*, photodetector 123*a*, and module 173*a*, a half-wave plate for turning, by 90°, the polarization direction of the light which has been emitted from the semiconductor laser 23*a*, reflected by the disk 204, and reflected by the beam splitter 73*a*, may be inserted between the beam splitters 73*a* and 73*b*, if necessary, in order that the light passes through the beam splitter 73*b*. In addition, a half-wave plate for turning, by 90°, the polarization direction of the light which has been emitted from the semiconductor laser 23*a*, reflected by the disk 204, and has passed through the beam splitter 73*b*, may be inserted between the beam splitters 73*b* and 73*c*, if necessary, in order that the light is reflected by the beam splitter 73*c*.

In the present embodiment in which the module 173*a*, module 173*b*, semiconductor laser 23*a*, and photodetector 123*a* are respectively replaced with the photodetector 123*a*, module 173*b*, semiconductor laser 23*a*, and module 173*a*, a half-wave plate for turning, by 90°, the polarization direction of the light which has been emitted from the semiconductor laser 23*a* and reflected by the beam splitter 73*c*, may be inserted between the beam splitters 73*c* and 73*b*, if necessary, in order that the light passes through the beam splitter 73*b*. In addition, a half-wave plate for turning, by 90°, the polarization direction of the light which has been emitted from the semiconductor laser 23*a* and passed through the beam splitter 73*b*, may be inserted between the beam splitters 73*b* and 73*a*, if necessary, in order that the light is reflected by the beam splitter 73*a*.

In the twenty-third embodiment of the optical head apparatus according to the present invention, the semiconductor laser 23*a* is not integrated with other light sources or photodetectors. Therefore, the semiconductor lasers 23*a* can have a high heat radiation characteristic. In addition, the total number of elements, i.e., the modules, light source, and photodetector is only four. Therefore, the optical head apparatus can be downsized. Further, the photodetectors integrated in the modules 173*a* and 173*b* can respectively be designed to have optimal sensitivities or the like for the wavelengths of the semiconductor lasers integrated also in the modules 173*a* and 173*b*, and the photodetector 123*a* can be designed to have an optimal sensitivity or the like for the wavelength of the semiconductor laser 23*a*.

Twenty-Fourth Embodiment

Figure 24:
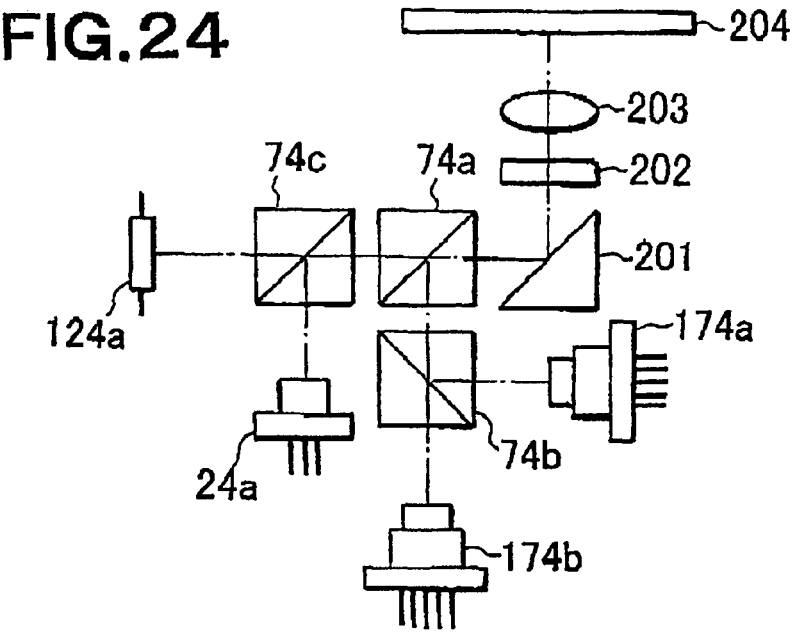
FIG. 24 is a diagram showing the twenty-fourth embodiment of the optical head apparatus according to the present invention.

FIG. 24 shows the twenty-fourth embodiment of the optical head apparatus according to the present invention. The modules 174*a* and 174*b* are modules each of which integrates one semiconductor laser and one photodetector. The structure of each module will be described later with reference to FIG. 74. The wavelengths of the semiconductor lasers integrated in the modules 174*a* and 174*b* are 780 nm and 660 nm, respectively. The wavelength of the semiconductor laser 24*a* is 400 nm. The beam splitter D is used as a beam splitter 74*a*. Any of the beam splitters C, E, and M is used as a beam splitter 74*b*. Any of the beam splitters G, J, M, N, T, U, W, X, and Y is used as a beam splitter 74*c*.

Light having a wavelength of 400 nm and emitted from the semiconductor laser 24*a* enters, as S-polarized, into the beam splitter 74*c*. Almost all of the light is reflected therefrom and passes through the beam splitter 74*a*. The light is then reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 74*a* and enters, as P-polarized, into the beam splitter 74*c*. Almost all of the light passes through the beam splitter 74*c* and is received by the photodetector 124*a*.

Almost all of light having a wavelength of 660 nm and emitted from the semiconductor laser in the module 174*b* passes through the beam splitter 74*b* and is reflected by the beam splitter 74*a*. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 74*a* and passes through the beam splitter 74*b*. The light is then received by the photodetector in the module 174*b*.

Almost all of light having a wavelength of 780 nm and emitted from the semiconductor laser in the module 174*a* is reflected by the beam splitter 74*b* and by the beam splitter 74*a*, and is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 74*a* and by the beam splitter 74*b*, and is received by the photodetector in the module 174*a*.

In the present embodiment, the wavelengths of the semiconductor lasers integrated in the modules 174*a* and 174*b* may be 660 nm and 780 nm, respectively, and the wavelength of the semiconductor laser 24*a* may be 400 nm. At this time, the beam splitter D is used as the beam splitter 74*a*. Any of the beam splitters B, F, and N is used as the beam splitter 74*b*. Any of the beam splitters G, J, M, N, T, U, W, X, and Y is used as the beam splitter 74*c*.

In the present embodiment, the wavelengths of the semiconductor lasers integrated in the modules 174*a* and 174*b* may be 780 nm and 400 nm, respectively, and the wavelength of the semiconductor laser 24*a* may be 660 nm. At this time, the beam splitter E is used as the beam splitter 74*a*. Any of the beam splitters C, D, and O is used as the beam splitter 74*b*. Any of the beam splitters H, K, O, P, S, U, V, X, and Y is used as the beam splitter 74*c*.

In the present embodiment, the wavelengths of the semiconductor lasers in the modules 174*a* and 174*b* may be 400 nm and 780 nm, respectively, and the wavelength of the semiconductor laser 24*a* may be 660 nm. At this time, the beam splitter E is used as the beam splitter 74*a*. Any of the beam splitters A, F, and P is used as the beam splitter 74*b*. Any of the beam splatters H, K, O, P, S, U, V, X, and Y is used as the beam splitter 74*c*.

In the present embodiment, the wavelengths of the semiconductor lasers 174*a* and 174*b* may be 660 nm and 400 nm, respectively, and the wavelength of the semiconductor laser 24*a* may be 780 nm. At this time, the beam splitter F is used as the beam splitter 74*a*. Any of the beam splitters B, P, and Q is used as the beam splitter 74*b*. Any of the beam splitters I, L, Q, R, S, T, V, W and Y is used as the beam splitter 74*c*.

In the present embodiment, the wavelengths of the semiconductor lasers 174*a* and 174*b* may be 400 nm and 660 nm, respectively, and the wavelength of the semiconductor laser 24*a* may be 780 nm. At this time, the beam splitter F is used as the beam splitter 74*a*. Any of the beam splitters A, E and R is used as the beam splitter 74*b*. Any of the beam splitters I, L, Q, R, S, T, V, W and Y is used as the beam splitter 74*c*.

Further, the semiconductor laser 24*a* and the photodetector 124*a* can be replaced with each other, in the present embodiment. Also, one of the modules 174*a* and 174*b* can be replaced with the semiconductor laser 24*a*, and the other one of the modules 174*a* and 174*b* can be replaced with the photodetector 124*a*, in the present embodiment.

In the twenty-fourth embodiment of the optical head apparatus according to the present invention, the semiconductor laser 24*a* is not integrated with other light sources or photodetectors. Therefore, the semiconductor lasers 24*a* can have a high heat radiation characteristic. In addition, the total number of elements, i.e., the modules, light source, and photodetector is only four. Therefore, the optical head apparatus can be downsized. Further, the photodetectors integrated in the modules 174*a* and 174*b* can respectively be designed to have optimal sensitivities or the like for the wavelengths of the semiconductor lasers integrated also in the modules 174*a* and 174*b*, and the photodetector 124*a* can be designed to have an optimal sensitivity or the like for the wavelength of the semiconductor laser 24*a*.

10. Twenty-Fifth to Twenty-Ninth Embodiments

Type 8

The twenty-fifth to twenty-ninth embodiments of the optical head apparatus according to the present invention each have two light sources, one photodetector, and one module. However, the one module integrates one light source and one photodetector.

Twenty-Fifth Embodiment

Figure 25:
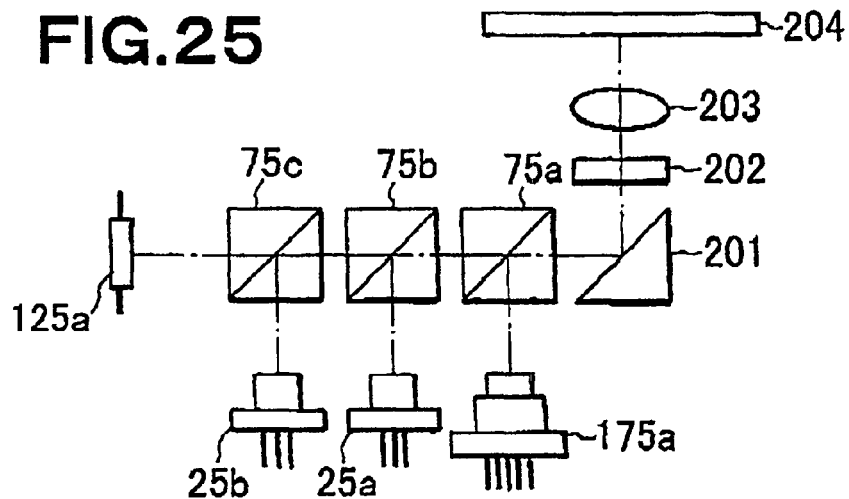
FIG. 25 is a diagram showing the twenty-fifth embodiment of the optical head apparatus according to the present invention.

FIG. 25 shows the twenty-fifth embodiment of the optical head apparatus according to the present invention. The module 175*a* integrates one semiconductor laser and one photodetector The structure of the module will be described later with reference to FIG. 74. The wavelength of the semiconductor laser integrated in the module 175*a* is 400 nm. The wavelengths of the semiconductor lasers 25*a* and 25*b* are 660 nm and 780 nm, respectively. The beam splitter A is used as a beam splitter 75*a*. Any of the beam splitters H, P, and U is used as a beam splitter 75b. Any of the beam splitters I, R, T, S, V and Y is used as a beam splitter 75c.

Almost all of light having a wavelength of 400 nm and emitted from the semiconductor laser in the module 175a is reflected by the beam splitter 75a and by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 75a and is received by the photodetector in the module 175a.

Light having a wavelength of 660 nm and emitted from the semiconductor laser 25a enters, as S-polarized, into the beam splitter 75b. Almost all of the light is reflected therefrom and passes through the beam splitter 75a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 75a and enters, as P-polarized, into the beam splitter 75b. Almost all of the light passes through the beam splitter 75b, and enters, as P-polarized, into the beam splitter 75c. Almost all of the light passes through the beam splitter 75c and is received by the photodetector 125a.

Light having a wavelength of 780 nm and emitted from the semiconductor laser 25b enters, as S-polarized, into the beam splitter 75c. About 50% of the light is reflected therefrom, and passes through the beam splitter 75b. Almost all of the light then passes through the beam splitter 75a and is reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 75a and also passes through the beam splitter 75b. The light enters, as P-polarized, into the beam splitter 75c. About 50% passes through the beam splitter 75c and is received by the photodetector 125a.

In the present embodiment, the wavelength of the semiconductor laser integrated in the module 175a may be 400 nm, and the wavelengths of the semiconductor lasers 25a and 25b may be 780 nm and 660 nm, respectively. At this time, the beam splitter A is used as the beam splitter 75a. Any of the beam splitters I, R and T is used as the beam splitter 75b. Any of the beam splitters H, P, and U is used as the beam splitter 75c.

In the present embodiment, the wavelength of the semiconductor laser integrated in the module 175a may be 660 nm, and the wavelengths of the semiconductor lasers 25a and 25b may be 400 nm and 780 nm, respectively. At this time, the beam splitter B is used as the beam splitter 75a. Any of the beam splitters G, N, and U is used as the beam splitter 75b. Any of the beam splitters I, Q, S, T, W and Y is used as the beam splitter 75c.

In the present embodiment, the wavelength of the semiconductor laser integrated in the module 175a may be 660 nm, and the wavelengths of the semiconductor lasers 25a and 25b may be 780 nm and 400 nm, respectively. At this time, the beam splitter B is used as the beam splitter 75a. Any of the beam splitters I, Q and S is used as the beam splitter 75b. Any of the beam splitters G, N, and U is used as the beam splitter 75c.

In the present embodiment, the wavelength of the semiconductor laser integrated in the module 175a may be 780 nm, and the wavelengths of the semiconductor lasers 25a and 25b may be 400 nm and 660 nm, respectively. At this time, the beam splitter C is used as the beam splitter 75a. Any of the beam splitters C, M and T is used as the beam splitter 75b. Any of the beam splitters H, O, S, U, X and Y is used as the beam splitter 75c.

In the present embodiment, the wavelength of the semiconductor laser integrated in the module 175a may be 780 nm, and the wavelengths of the semiconductor lasers 25a and 25b may be 660 nm and 400 nm, respectively. At this time, the beam splitter C is used as the beam splitter 75a. Any of the beam splitters I, O, and S is used as the beam splitter 75b. Any of the beam splitters C, M, T, U, X, and Y is used as the beam splitter 75c.

Further, the module 175a, semiconductor lasers 25a and 25b, and photodetector 125a can be replaced with each other, in the present embodiment.

In the present embodiment in which the module 175a, semiconductor laser 25a, semiconductor laser 25b, and photodetector 125a are respectively replaced with the module 175a, semiconductor laser 25a, photodetector 125a, and semiconductor laser 25b, a half-wave plate for turning, by 90°, the polarization direction of the light which has been emitted from the semiconductor laser 25a, reflected by the disk 204, and has passed through the beam splitter 75b, may be inserted between the beam splitters 75b and 75c, if necessary, in order that the light is reflected by the beam splitter 75c.

In the present embodiment in which the module 175a, semiconductor laser 25a, semiconductor laser 25b, and photodetector 125a are respectively replaced with the semiconductor laser 25a or 25b, module 175a, photodetector 125a, and semiconductor laser 25b or 25a, a half-wave plate for turning, by 90°, the polarization direction of the light which has been emitted from the semiconductor laser 25a or 25b, reflected by the disk 204, and has passed through the beam splitter 75b, may be inserted between the beam splitters 75b and 75c, if necessary, in order that the light is reflected by the beam splitter 75c.

In the present embodiment in which the module 175a, semiconductor laser 25a, semiconductor laser 25b, and photodetector 125a are respectively replaced with the semiconductor laser 25a or 25b, photodetector 125a, module 175a, and semiconductor laser 25b or 25a, a half-wave plate for turning, by 90°, the polarization direction of the light which has been emitted from the semiconductor laser 25a or 25b, reflected by the disk 204, and has passed through the beam splitter 75a, may be inserted between the beam splitters 75a and 75b, if necessary, in order that the light is reflected by the beam splitter 75b.

In the present embodiment in which the module 175a, semiconductor laser 25a, semiconductor laser 25b, and photodetector 125a are respectively replaced with the semiconductor laser 25b, semiconductor laser 25a, photodetector 15a, and module 175a, a half-wave plate for turning, by 90°, the polarization direction of the light which has been emitted from the semiconductor laser 25a and 25b, reflected by the disk 204, and has passed through the beam splitter 75b, may be inserted between the beam splitters 75b and 75c, if necessary, in order that the light is reflected by the beam splitter 75c.

In the present embodiment in which the module 175a, semiconductor laser 25a, semiconductor laser 25b, and photodetector 125a are respectively replaced with the module 175a, photodetector 125a, semiconductor laser 25b, and semiconductor laser 25a, a half-wave plate for turning, by 90°, the polarization direction of the light which has been emitted from the semiconductor laser 25b and reflected by the beam splitter 75c, may be inserted between the beam splitters 75c and 75b, if necessary, in order that the light passes through the beam splitter 75b.

In the present embodiment in which the module 175a, semiconductor laser 25a, semiconductor laser 25b, and photodetector 125a are respectively replaced with the photodetector 125a, module 175a, semiconductor laser 25b, and semiconductor laser 25a, a half-wave plate for turning, by 90°, the polarization direction of the light which has been emitted from the semiconductor laser 25b and reflected by the beam splitter 75c, may be inserted between the beam splitters 75c and 75b, if necessary, in order that the light passes through the beam splitter 75b.

In the present embodiment in which the module 175a, semiconductor laser 25a, semiconductor laser 25b, and photodetector 125a are respectively replaced with the photodetector 125a, semiconductor laser 25a, module 175a, and semiconductor laser 25b, a half-wave plate for turning, by 90°, the polarization direction of the light which has been emitted from the semiconductor laser 25a and reflected by the beam splitter 75b, may be inserted between the beam splitters 75b and 75a, if necessary, in order that the light passes through the beam splitter 75a.

In the present embodiment in which the module 175a, semiconductor laser 25a, semiconductor laser 25b, and photodetector 125a are respectively replaced with the photodetector 125a, semiconductor laser 25a, semiconductor laser 25b, and module 175a, a half-wave plate for turning, by 90°, the polarization direction of the light which has been emitted from the semiconductor laser 25a and reflected by the beam splitter 75b, may be inserted between the beam splitters 75b and 75a, if necessary, in order that the light passes through the beam splitter 75a. In addition, a half-wave plate for turning, by 90°, the polarization direction of the light which has been emitted from the semiconductor laser 25b and reflected by the beam splitter 75c, may be inserted between the beam splitters 75c and 75b, it necessary, in order that the light passes through the beam splitter 75b.

In the present embodiment in which the module 175a, semiconductor laser 25a, semiconductor laser 25b, and photodetector 125a are respectively replaced with the semiconductor laser 25a, photodetector 125a, semiconductor laser 25b, and module 175a, a half-wave plate for turning, by 90°, the polarization direction of the light which has been emitted from the semiconductor laser 25a, reflected by the disk 204, and has passed through the beam splitter 75a, may be inserted between the beam splitters 75a and 75b, if necessary, in order that the light is reflected by the beam splitter 75b. In addition, a half-wave plate for turning, by 90°, the polarization direction of the light which has been emitted from the semiconductor laser 25b and reflected by the beam splitter 75c, may be inserted between the beam splitters 75c and 75b, if necessary, in order that the light passes through the beam splitter 75b.

In the twenty-fifth embodiment of the optical head apparatus according to the present invention, the semiconductor lasers 25a and 25b are not integrated with other light sources or photodetectors Therefore, the semiconductor lasers 25a and 25b can have a high heat radiation characteristic. In addition, the total number of elements, i.e., the module, light sources, and photodetector is only four. Therefore, the optical head apparatus can be downsized. Further, the photodetector integrated in the module 175a can be designed to have an optimal sensitivity or the like for the wavelength of the semiconductor laser integrated also in the module 175a, and the photodetector 125a can be designed to have an optimal sensitivity or the like for the wavelengths of the semiconductor lasers 25a and 25b.

Twenty-Sixth Embodiment

Figure 26:
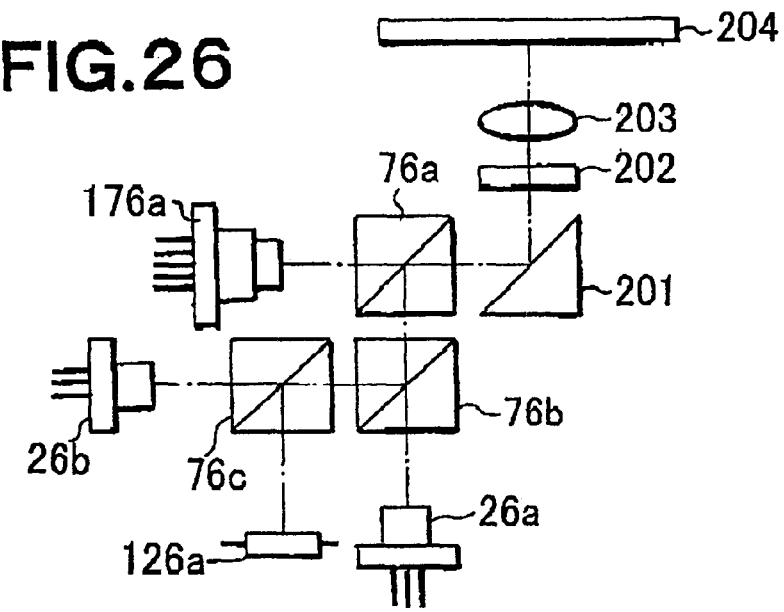
FIG. 26 is a diagram showing the twenty-sixth embodiment of the optical head apparatus according to the present invention.

FIG. 26 shows the twenty-sixth embodiment of the optical head apparatus according to the present invention. The modules 176a integrates one semiconductor laser and one photodetector. The structure of the module will be described later with reference to FIG. 74. The wavelength of the semiconductor laser integrated in the module 176a is 400 nm. The wavelengths of the semiconductor lasers 26a and 26b are 660 nm and 780 nm, respectively. The beam splitter D is used as a beam splitter 76a. Any of the beam splitters K, O, and X is used as a beam splitter 76b. Any of the beam splitters L, Q, W, S, V, and Y is used as a beam splitter 76c.

Almost all of light having a wavelength of 400 nm and emitted from the semiconductor laser in the module 176a passes through the beam splitter 76a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 76a and is received by the photodetector in the module 176a.

Light having a wavelength of 660 nm and emitted from the semiconductor laser 26a enters, as P-polarized, into the beam splitter 76b. Almost all of the light passes through the beam splitter 76b and is reflected by the beam splitter 76a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 76a. Almost all of the light enters, as S-polarized, into the beam splitter 76b is reflected therefrom and enters, as S-polarized, into the beam splitter 76c. Almost all of the light is reflected therefrom, and is received by the photodetector 126a.

Light having a wavelength of 780 nm and emitted from the semiconductor laser 26b enters, as P-polarized, into the beam splitter 76c. About 50% of the light passes through the beam splitter 76c and is reflected by the beam splitter 76b. Almost all of the light is reflected by the beam splitter 76a and is reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 76a and also by the beam splitter 76b. The light enters, as S-polarized, into the beam splitter 76c. About 50% is reflected therefrom and is received by the photodetector 126a.

In the present embodiment, the wavelength of the semiconductor laser integrated in the module 176a may be 400 nm, and the wavelengths of the semiconductor lasers 26a and 26b may be 780 nm and 660 nm, respectively. At this time, the beam splitter D is used as the beam splitter 76a. Any of the beam splitters L, Q, and W is used as the beam splitter 76b. Any of the beam splitters K, O and X is used as the beam splitter 76c.

In the present embodiment, the wavelength of the semiconductor laser integrated in the module 176a may be 660 nm, and the wavelengths of the semiconductor lasers 26a and 26b may be 400 nm and 780 nm, respectively. At this time, the beam splitter E is used as the beam splitter 76a. Any of the beam splitters J, M and X is used as the beam splitter 76b. Any of the beam splitters L, R, V, T, W and Y is used as the beam splitter 76c.

In the present embodiment, the wavelength of the semiconductor laser integrated in the module 176a may be 660 nm, and the wavelengths of the semiconductor lasers 26a and 26b may be 780 nm and 400 nm, respectively. At this time, the beam splitter E is used as the beam splitter 76a. Any of the beam splitters L, R, and V is used as the beam splitter 76b. Any of the beam splitters J, M and X is used as the beam splitter 76c.

In the present embodiment, the wavelength of the semiconductor laser integrated in the module 176a may be 780 nm, and the wavelengths of the semiconductor lasers 26a and 26b may be 400 nm and 660 nm, respectively. At this time, the beam splitter F is used as the beam splitter 76a. Any of the beam splitters J, N, and W is used as the beam splitter 76b. Any of the beam splitters K, P, V, U, X and Y is used as the beam splitter 76c.

In the present embodiment, the wavelength of the semiconductor laser integrated in the module 176a may be 780 nm, and the wavelengths of the semiconductor lasers 26a and 26b may be 660 nm and 400 nm, respectively. At this time, the beam splitter F is used as the beam splitter 76a. Any of the beam splitters K, P, and V is used as the beam splitter 76b. Any of the beam splitters J, N, W, U, X, and Y is used as the beam splitter 76c.

Further, the modules 176a, semiconductor lasers 26a and 26b, and photodetector 126a can be replaced with each other, in the present embodiment.

In the present embodiment in which the module 176a, semiconductor laser 26a, semiconductor laser 26b, and photodetector 126a are respectively replaced with the module 176a, semiconductor laser 26a, photodetector 126a, and semiconductor laser 26b, a half-wave plate for turning, by 90°, the polarization direction of the light which has been emitted from the semiconductor laser 26a, reflected by the disk 204, and reflected by the beam splitter 76b, may be inserted between the beam splitters 76b and 76c, if necessary, in order that the light passes through the beam splitter 76c.

In the present embodiment in which the module 176a, semiconductor laser 26a, semiconductor laser 26b, and photodetector 126a are respectively replaced with the semiconductor laser 26a or 26b, module 176a, photodetector 126a, and semiconductor laser 26b or 26a, a half-wave plate for turning, by 90°, the polarization direction of the light which has been emitted from the semiconductor laser 26a or 26b, reflected by the disk 204, and has been reflected by the beam splitter 76b, may be inserted between the beam splitters 76b and 76c, if necessary, in order that the light passes through the beam splitter 76c.

In the present embodiment in which the module 176a, semiconductor laser 26a, semiconductor laser 26b, and photodetector 126a are respectively replaced with the semiconductor laser 26a or 26b, photodetector 126a, module 176a, and semiconductor laser 26b or 26a, a half-wave plate for turning, by 90°, the polarization direction of the light which has been emitted from the semiconductor laser 26a or 26b, reflected by the disk 204, and reflected by the beam splitter 76a, may be inserted between the beam splitters 76a and 76b, if necessary, in order that the light passes through the beam splitter 76b.

In the present embodiment in which the module 176a, semiconductor laser 26a, semiconductor laser 26b, and photodetector 126a are respectively replaced with the semiconductor laser 26b, semiconductor laser 26a, photodetector 126a, and module 176a, a half-wave plate for turning, by 90°, the polarization direction of the light which has been emitted from the semiconductor lasers 26a and 26b, reflected by the disk 204, and reflected by the beam splitter 76b, may be inserted between the beam splitters 76b and 76c, if necessary, in order that the light is reflected by the beam splitter 76c.

In the present embodiment in which the module 176a, semiconductor laser 26a, semiconductor laser 26b, and photodetector 126a are respectively replaced with the module 176a, photodetector 126a, semiconductor laser 26b, and semiconductor laser 26a, a half-wave plate for turning, by 90°, the polarization direction of the light which has been emitted from the semiconductor laser 26b and passed through the beam splitter 76c, may be inserted between the beam splitters 76c and 76b, if necessary, in order that the light is reflected by the beam splitter 76b.

In the present embodiment in which the module 176a, semiconductor laser 26a, semiconductor laser 26b, and photodetector 126a are respectively replaced with the photodetector 126a, module 176a, semiconductor laser 26b, and semiconductor laser 26a, a half-wave plate for turning, by 90°, the polarization direction of the light which has been emitted from the semiconductor laser 26b and passed through the beam splitter 76c, may be inserted between the beam splitters 76c and 76b, if necessary, in order that the light is reflected by the team splitter 76b.

In the present embodiment in which the module 176a, semiconductor laser 26a, semiconductor laser 26b, and photodetector 126a are respectively replaced with the photodetector 126a, semiconductor laser 26a, module 176a, and semiconductor laser 26b, a half-wave plate for turning, by 90°, the polarization direction of the light which has been emitted from the semiconductor laser 26a and passed through the beam splitter 76b, may be inserted between the beam splitters 76b and 76a, if necessary, in order that the light is reflected by the beam splitter 76a.

In the present embodiment in which the module 176a, semiconductor laser 26a, semiconductor laser 26b, and photodetector 126a are respectively replaced with the photodetector 126a, semiconductor laser 26a, semiconductor laser 26b, and module 176a, a half-wave plate for turning, by 90°, the polarization direction of the light which has been emitted from the semiconductor laser 26a and passed through the beam splitter 76b, may be inserted between the beam splitters 76b and 76a, if necessary, in order that the light is reflected by the beam splitter 76a. In addition, a half-wave plate for turning, by 90°, the polarization direction of the light which has been emitted from the semiconductor laser 26b and passed through the beam splitter 76c, may be inserted between the beam splitter 76c and 76b, if necessary, in order that the light passes through the beam splitter 76b.

In the present embodiment in which the module 176a, semiconductor laser 26a, semiconductor laser 26b, and photodetector 126a are respectively replaced with the semiconductor laser 26a, photodetector 126a, semiconductor laser 26b, and module 176a, a half-wave plate for turning, by 90°, the polarization direction of the light which has been emitted from the semiconductor laser 26a, reflected by the disk 204, and reflected by the beam splitter 76a, may be inserted between the beam splitters 76a and 76b, if necessary, in order that the light passes through the beam splitter 76b. In addition, a half-wave plate for turning, by 90°, the polarization direction of the light which has been emitted from the semiconductor laser 26b and passed through the beam splitter 76c, may be inserted between the beam splitters 76c and 76b, if necessary, in order that the light is reflected by the beam splitter 76b.

In the twenty-sixth embodiment of the optical head apparatus according to the present invention, the semiconductor lasers 26a and 26b are not integrated with other light sources or photodetectors. Therefore, the semiconductor lasers 26a and 26b can have a high heat radiation characteristic. In addition, the total number of elements, i.e., the module, light sources, and photodetector is only four. Therefore, the optical head apparatus can be downsized. Further, the photodetector integrated in the module 176a can be designed to have an optimal sensitivity or the like for the wavelength of the semiconductor laser integrated also in the module 176a, and the photodetector 126a can be designed to have an optimal sensitivity or the like for the wavelengths of the semiconductor lasers 26a and 26b.

Twenty-Seventh Embodiment

Figure 27:
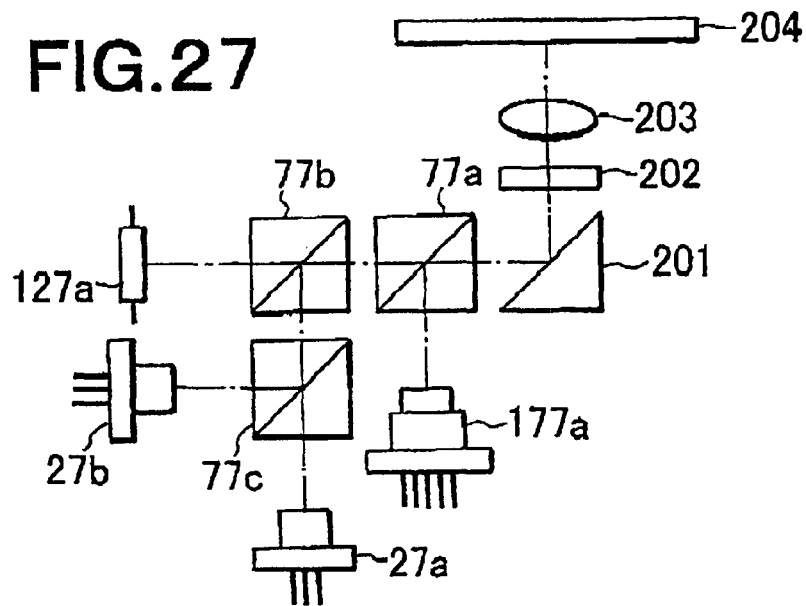
FIG. 27 is a diagram showing the twenty-seventh embodiment of the optical head apparatus according to the present invention.

FIG. 27 shows the twenty-seventh embodiment of the optical head apparatus according to the present invention. The module 177a integrates one semiconductor laser and one photodetector. The structure of the module will be described later with reference to FIG. 74. The wavelength of the semiconductor laser integrated in the module 177a is 400 nm. The wavelengths of the semiconductor lasers 27a and 27b are 660 nm and 780 nm, respectively. The beam splitter A is used as a beam splitter 77a. Any of the beam splitters S, V, and Y is used as a beam splitter 77b. Any of the beam splitters C, E, M, K, O, and X is used as a beam splitter 77c.

Almost all of light having a wavelength of 400 nm and emitted from the semiconductor laser in the module 177a is reflected by the beam splitter 77a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 77a and is received by the photodetector in the module 177a.

Light having a wavelength of 660 nm and emitted from the semiconductor laser 27a passes through the beam splitter 77c and enters, as S-polarized, into the beam splitter 77b. Almost all of the light passes through the beam splitter 77b and passes through the beam splitter 77a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 77a and enters, as P-polarized, into the beam splitter 77b. Almost all of the light passes through the beam splitter 77b and is received by the photodetector 17a.

In case of using any of the beam splitters K, O, and X as the beam splitter 77c, a half-wave plate for turning, by 90°, the polarization direction of the light which has been emitted from the semiconductor laser 27a and passed through the beam splitter 77c, may be inserted between the beam splitters 77c and 77b, in order that the light is reflected by the beam splitter 77b.

Light having a wavelength of 780 nm and emitted from the semiconductor laser 27b enters, as S-polarized, into the beam splitter 77c. Almost all of the light is reflected therefrom and enters, as S-polarized, into the beam splitter 77b. About 50% of the light is reflected therefrom, and passes through the beam splitter 77a. The light is reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 77a and enters, as P-polarized, into the beam splitter 77b. About 50% of the light passes through the beam splitter 77b and is received by the photodetector 127a.

In the present embodiment, the wavelength of the semiconductor laser integrated in the module 177a may be 400 nm and the wavelengths of the semiconductor lasers 27a and 27b may respectively be 780 nm and 660 nm. At this time, the beam splitter A is used as the beam splitter 77a. Any of the beam splitters S, V, and Y is used as the beam splitter 77b. Any of the beam splitters B, F, N, H, P, and U is used as the beam splitter 77c.

In the present embodiment, the wavelength of the semiconductor laser integrated in the module 177a may be 660 nm, and the wavelengths of the semiconductor lasers 27a and 27b may be 400 nm and 780 nm, respectively. At this time, the beam splitter B is used as the beam splitter 77a. Any of the beam splitters T, W, and Y is used as the beam splitter 77b. Any of the beam splitters C, D, O, J, M, and X is used as the beam splitter 77c.

In the present embodiment, the wavelength of the semiconductor laser integrated in the module 177a may be 660 nm, and the wavelengths of the semiconductor lasers 27a and 27b may be 780 nm and 400 nm, respectively. At this time, the beam splitter B is used as the beam splitter 77a. Any of the beam splitters T, W, and Y is used as the beam splitter 77b. Any of the beam splitters A, F, P, G, N, and U is used as the beam splitter 77c.

In the present embodiment, the wavelength of the semiconductor laser integrated in the module 177a may be 780 nm, and the wavelengths of the semiconductor lasers 27a and 27b may be 400 nm and 660 nm, respectively. At this time, the beam splitter C is used as the beam splitter 77a. Any of the beam splitters U, X, and Y is used as the beam splitter 77b. Any of the beam splitters B, D, Q, H, O, S, J, N, W, U, X, and Y is used as the beam splitter 77c.

In the present embodiment, the wavelength of the semiconductor laser integrated in the module 177a may be 780 nm, and the wavelengths of the semiconductor lasers 27a and 27b may be 660 nm and 400 nm, respectively. At this time, the beam splitter C is used as the beat splitter 77a. Any of the beam splitters U, X, and Y is used as the beam splitter 77b. Any of the beam splitters A, E, R, G, M, T, K, P, V, U, X, and Y is used as the beam splitter 77c.

Further, the modules 177a, semiconductor lasers 27a and 27b, and photodetector 127a can be replaced with each other, in the present embodiment.

In the present embodiment in which the module 177a, semiconductor laser 27a, semiconductor laser 27b, and photodetector 127a are respectively replaced with the module 177a, photodetector 127a, semiconductor laser 27b, and semiconductor laser 27a, a half-wave plate for turning, by 90°, the polarization direction of the light which has been emitted from the semiconductor laser 27a, reflected by the disk 204, and reflected by the beam splitter 77b, may be inserted between the beam splitters 77b and 77c, if necessary, in order that the light passes through the beam splitter 77c.

In the present embodiment in which the module 177a, semiconductor laser 27a, semiconductor laser 27b, and photodetector 127a are respectively replaced with the semiconductor laser 27b, semiconductor laser 27a, photodetector 127a, and module 177a, a half-wave plate for turning, by 90°, the polarization direction of the light which has been emitted from the semiconductor laser 27b, reflected by the disk 204, and has passed through the beam splitter 77a, may be inserted between the beam splitters 77a and 77b, if necessary, in order that the light is reflected by the beam splitter 77b.

In the present embodiment in which the module 177a, semiconductor laser 27a, semiconductor laser 27b, and photodetector 127a are respectively replaced with the semiconductor laser 27a or 27b, module 177a, photodetector 127a, and semiconductor laser 27b or 27a, a half-wave plate for turning, by 90°, the polarization direction of the light which has been emitted from the semiconductor laser 27a or 27b, reflected by the disk 204, and has passed through the beam splitter 77a, may be inserted between the beam splitters 77a and 77b, if necessary, in order that the light passes through the beam splitter 77b.

In the present embodiment in which the module 177a, semiconductor laser 27a, semiconductor laser 27b, and photodetector 127a are respectively replaced with the semiconductor laser 27a, photodetector 127a, semiconductor laser 27b, and module 177a, a half-wave plate for turning, by 90°, the polarization direction of the light which has been emitted from the semiconductor laser 27a, reflected by the disk 204, and has passed through the beam splitter 77a, may be inserted between the beam splitters 77a and 77b, if necessary, in order that the light is reflected by the beam splitter 77b. In addition, a half-wave plate for turning, by 90°, the polarization direction of the light which has been emitted from the semiconductor laser 27a, reflected by the disk 204, and reflected by the beam splitter 77b, may be inserted between the beam splitters 77b and 77c, if necessary, in order that the light passes through the beam splitter 77c.

In the present embodiment in which the module 177a, semiconductor laser 27a, semiconductor laser 27b, and photodetector 177a are respectively replaced with the semiconductor laser 27a or 27b, photodetector 127a, module 177a, and semiconductor laser 27b or 27a, a half-wave plate for turning, by 90°, the polarization direction of the light which has been emitted from the semiconductor laser 27a or 27b, reflected by the disk 204, and has passed through the beam splitter 77a, may be inserted between the beam splitters 77a and 77b, if necessary, in order that the light is reflected by the beam splitter 77b. In addition, a half-wave plate for turning, by 90°, the polarization direction of the light which has been emitted from the semiconductor laser 27a or 27b, reflected by the disk 204, and reflected by the beam splitter 77b, may be inserted between the beam splitters 77b and 77c, if necessary, in order that the light passes through the beam splitter 77c.

In the present embodiment in which the module 177a, semiconductor laser 27a, semiconductor laser 27b, and photodetector 127a are respectively replaced with the semiconductor laser 27b, semiconductor laser 27a, module 177a, and photodetector 127a, a half-wave plate for turning, by 90°, the polarization direction of the light which has been emitted from the semiconductor laser 27a and passed through the beam splitter 77c, may be inserted between the beam splitters 77c and 77b, if necessary, in order that the light is reflected by the beam splitter 77b.

In the present embodiment in which the module 177a, semiconductor laser 27a, semiconductor laser 27b, and photodetector 127a are respectively replaced with the photodetector 127a, module 177a, semiconductor laser 27b, and semiconductor laser 27a, a half-wave plate for turning, by 90°, the polarization direction of the light which has been emitted from the semiconductor laser 27b and reflected by the beam splitter 77b, may be inserted between the beam splitters 77b and 77a, if necessary, in order that the light passes through the beam splitter 77a.

In the present embodiment in which the module 177a, semiconductor laser 27a, semiconductor laser 27b, and photodetector 127a are respectively replaced with the photodetector 127a, semiconductor laser 27a, module 177a, and semiconductor laser 27b, a half-wave plate for turning, by 90°, the polarization direction of the light which has been emitted from the semiconductor laser 27a and passed through the beam splitter 77c, may be inserted between the beam splitters 77c and 77b, if necessary, in order that the light is reflected by the beam splitter 77b. In addition, a half-wave plate for turning, by 90°, the polarization direction of the light which has been emitted from the semiconductor laser 27a and reflected by the beam splitter 77b, may be inserted between the beam splitters 77b and 77a, if necessary in order that the light passes through the beam splitter 77a.

In the present embodiment in which the module 177a, semiconductor laser 27a, semiconductor laser 27b, and photodetector 127a are respectively replaced with the photodetector 127a, semiconductor laser 27a, semiconductor laser 27b, and module 177a, a half-wave plate for turning, by 90°, the polarization direction of the light which has been emitted from the semiconductor laser 27a and passed through the beam splitter 77c, may be inserted between the beam splitters 77c and 77b, if necessary, in order that the light is reflected by the beam splitter 77b. In addition, a half-wave plate for turning, by 90°, the polarization direction of the light which has been emitted from the semiconductor laser 27a and 27b and reflected by the beam splitter 77b, may be inserted between the beam splitters 77b and 77a, if necessary, in order that the light passes through the beam splitter 77a.

In the twenty-seventh embodiment of the optical head apparatus according to the present invention, the semiconductor lasers 27a and 27b are not integrated with other light sources or photodetectors. Therefore, the semiconductor lasers 27a and 27b can have a high heat radiation characteristic. In addition, the total number of elements, i.e., the module, light sources, and photodetector is only four. Therefore, the optical head apparatus can be downsized. Further, the photodetector integrated in the module 177a can be designed to have an optimal sensitivity or the like for the wavelength of the semiconductor laser integrated also in the module 177a, and the photodetector 127a can be designed to have an optimal sensitivity or the like for the wavelengths of the semiconductor lasers 27a and 27b.

Twenty-Eighth Embodiment

Figure 28:
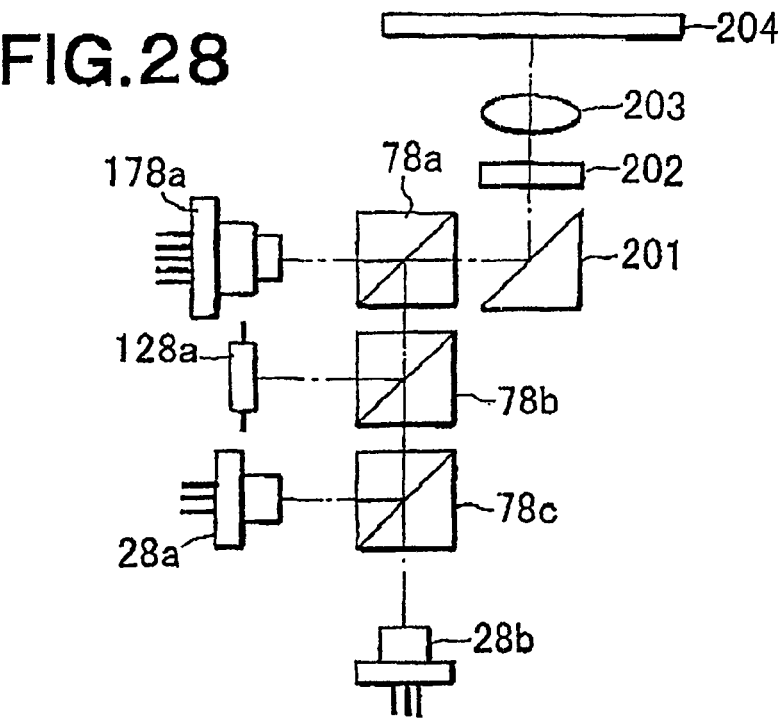
FIG. 28 is a diagram showing the twenty-eighth embodiment of the optical head apparatus according to the present invention.

FIG. 28 shows the twenty-eighth embodiment of the optical head apparatus according to the present invention, the modules 178a integrates one semiconductor laser and one photodetector. The structure of the module will be described later with reference to FIG. 74. The wavelength of the semiconductor laser integrated in the module 178a is 400 nm. The wavelengths of the semiconductor lasers 28a and 28b are 660 nm and 780 nm, respectively. The beam splitter D is used as a beam splitter 78a. Any of the beam splitters S, V, and Y is used as a beam splitter 78b. Any of the beam splitters B, F, N, H, P, and U is used as a beam splitter 78c.

Almost all of light having a wavelength of 400 nm and emitted from the semiconductor laser in the module 178a passes through the beam splitter 78d and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 78a and is received by the photodetector in the module 178a.

Almost all of light having a wavelength of 660 nm and emitted from the semiconductor laser 28a is reflected by the beam splitter 78a and enters, as P-polarized, into the beam splitter 78b. Almost all of the light passes through the beam splitter 78b and is reflected by the beam splitter 78a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 78a and enters, as S-polarized, into the beam splitter 78b. Almost all or the light is reflected therefrom and is received by the photodetector 128a.

In case of using any of the beam splitters H, P, and U as the beam splitter 78c, a half-wave plate for turning, by 90°, the polarization direction of the light which has been emitted from the semiconductor laser 28a and reflected by the beam splitter 78c, may be inserted between the beam splitters 78c and 78b, in order that the light passes through the beam splitter 78b.

Light having a wavelength of 780 nm and emitted from the semiconductor laser 28b enters, as P-polarized, into the beam splitter 78c. Almost all of the light passes through the beam splitter 78c and enters, as P-polarized, into the beam splitter 78b. About 50% of the light passes through the beam splitter 78b. Almost all of the light is then reflected by the beam splitter 78a. The light is reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 78a, and enters, as S-polarized, into the beam splitter 78b. About 50% of the light is reflected therefrom and is received by the photodetector 128a.

In the present embodiment, the wavelength of the semiconductor laser integrated in the module 178a may be 400 nm, and the wavelengths of the semiconductor lasers 28a and 28b may be 780 nm and 660 nm, respectively. At this time, the beam splitter D is used as the beam splitter 70a. Any of the beam splitters S, V, and Y is used as the beam splitter 78b. Any of the beam splitters C, E, M, K, O, and X is used as the beam splitter 78c.

In the present embodiment, the wavelength of the semiconductor laser integrated in the module 178a may be 660 nm, and the wavelengths of the semiconductor lasers 28a and 28b may be 400 nm and 780 nm, respectively. At this time, the beam splitter E is used as the beam splitter 78a. Any of the beam splitters T, W, and Y is used as the beam splitter 78b. Any of the beam splitters A, F, P, G, N, and U is used as the beam splitter 78c.

In the present embodiment, the wavelength of the semiconductor laser integrated in the module 178a may be 660 nm, and the wavelengths of the semiconductor lasers 28a and 28b may be 780 nm and 400 nm, respectively. At this time, the beam splitter E is used as the beam splitter 78a. Any of the beam splitters T, W, and Y is used as the beam splitter 78b. Any of the beam splitters C, D, O, J, M, and X is used as the beam splitter 78c.

In the present embodiment, the wavelength of the semiconductor laser integrated in the module 178a may be 780 nm, and the wavelengths of the semiconductor lasers 28a and 28b may be 400 nm and 660 nm, respectively. At this time, the beam splitter F is used as the beam splitter 78a. Any of the beam splitters U, X, and Y is used as the beam splitter 78b. Any of the beam splitters A, E, R, K, P, V, G, M, T, U, X, and Y is used as the beam splitter 78c.

In the present embodiment, the wavelength of the semiconductor laser integrated in the module 178a may be 780 nm, and the wavelengths of the semiconductor lasers 28a and 28b may be 660 nm and 400 nm, respectively. At this time, the beam splitter F is used as the beam splitter 78a. Any of the beam splitters U, X, and Y is used as the beam splitter 78b. Any of the beam splitters B, D, Q, J, N, W, H, O, S, U, X, and Y is used as the beam splitter 78c.

Further, the modules 178a, semiconductor lasers 28a and 28b, and photodetector 128a can be replaced with each other, in the present embodiment.

In the present embodiment in which the module 178*a*, semiconductor laser 28*a*, semiconductor laser 28*b*, and photodetector 128*a* are respectively replaced with the module 178*a*, photodetector 128*a*, semiconductor laser 28*b*, and semiconductor laser 28*a*, a half-wave plate for turning, by 90°, the polarization direction of the light which has been emitted from the semiconductor laser 26*a*, reflected by the disk 204, and passed through the beam splitter 76*b*, may be inserted between the beam splitters 78*b* and 78*c*, if necessary, in order that the light is reflected by the beam splitter 78*c*.

In the present embodiment in which the module 178*a*, semiconductor laser 28*a*, semiconductor laser 28*b*, and photodetector 128*a* are respectively replaced with the semiconductor laser 28*b*, semiconductor laser 28*a*, photodetector 128*a*, and module 178*a*, a half-wave plate for turning, by 90°, the polarization direction of the light which has been emitted from the semiconductor laser 28*b*, reflected by the disk 204, and reflected by the beam splitter 78*a*, may be inserted between the beam splitters 78*a* and 78*b*, if necessary, in order that the light passes through the beam splitter 78*b*.

In the present embodiment in which the module 178*a*, semiconductor laser 28*a*, semiconductor laser 28*b*, and photodetector 128*a* are respectively replaced with the semiconductor laser 28*a* or 28*b*, module 178*a*, photodetector 128*a*, and semiconductor laser 28*b* or 29*a*, a half-wave plate for turning, by 90°, the polarization direction of the light which has been emitted from the semiconductor laser 28*a* or 28*b*, reflected by the disk 204, and reflected by the beam splitter 78*a*, may be inserted between the beam splitters 78*a* and 78*b*, if necessary, in order that the light passes through the beam splitter 78*b*.

In the present embodiment in which the module 178*a*, semiconductor laser 28*a*, semiconductor laser 28*b*, and photodetector 128*a* are respectively replaced with the semiconductor laser 28*a*, photodetector 128*a*, semiconductor laser 28*b*, and module 178*a*, a half-wave plate for turning, by 90°, the polarization direction of the light which has been emitted from the semiconductor laser 28*a*, reflected by the disk 204, and reflected by the beam splitter 78*a*, may be inserted between the bean splitters 78*a* and 78*b*, if necessary, in order that the light passes through the beam splitter 78*b*. In addition, a half-wave plate for turning, by 90°, the polarization direction of the light which has been emitted from the semiconductor laser 28*a*, reflected by the disk 204, and passed through the beam splitter 78*b*, may be inserted between the beam splitters 78*b* and 78*c*, if necessary, in order that the light is reflected by the beam splitter 78*c*.

In the present embodiment in which the module 178*a*, semiconductor laser 28*a*, semiconductor laser 28*b*, and photodetector 128*a* are respectively replaced with the semiconductor laser 28*a* or 28*b*, photodetector 128*a*, module 178*a*, and semiconductor laser 28*b* or 28*a*, a half-wave plate for turning, by 90°, the polarization direction of the light which has been emitted from the semiconductor laser 28*a* or 28*b*, reflected by the disk 204, and reflected by the beam splitter 78*a*, may be inserted between the beam splitters 78*a* and 78*b*, if necessary, in order that the light passes through the beam splitter 78*b*. In addition, a half wave plate for turning, by 90°, the polarization direction of the light which has been emitted from the semiconductor laser 28*a* and 28*b*, reflected by the disk 204, and passed through the beam splitter 78*b*, may be inserted between the beam splitters 78*b* and 78*c*, if necessary, in order that the light is reflected by the beam splitter 78*c*.

In the present embodiment in which the module 178*a*, semiconductor laser 28*a*, semiconductor laser 28*b*, and photodetector 128*a* are respectively replaced with the semiconductor laser 28*b*, semiconductor laser 28*a*, module 178*a*, and photodetector 128*a*, a half-wave plate for turning, by 90°, the polarization direction of the light which has been emitted from the semiconductor laser 28*a* and reflected from the beam splitter 78*c*, may be inserted between the beam splitters 78*c* and 78*b*, if necessary, in order that the light passes through the beam splitter 78*b*.

In the present embodiment in which the module 178*a*, semiconductor laser 28*a*, semiconductor laser 28*b*, and photodetector 128*a* are respectively replaced with the photodetector 128*a*, module 178*a*, semiconductor laser 28*b*, and semiconductor laser 28*a*, a half-wave plate for turning, by 90°, the polarization direction of the light which has been emitted from the semiconductor laser 26*b* and passed through the beam splitter 78*b*, may be inserted between the beam splitters 78*b* and 78*a*, if necessary, in order that the light is reflected by the beam splitter 78*a*.

In the present embodiment in which the module 178*a*, semiconductor laser 28*a*, semiconductor laser 28*b*, and photodetector 128*a* are respectively replaced with the photodetector 128*a*, semiconductor laser 28*a*, module 178*a*, and semiconductor laser 28*b*, a half-wave plate for turning, by 90°, the polarization direction of the light which has been emitted from the semiconductor laser 20*a* and reflected by the beam splitter 78*c*, may be inserted between the beam splitters 78*c* and 78*b*, if necessary, in order that the light passes through the beam splitter 78*b*. In addition, a half-wave plate for turning, by 90°, the polarization direction of the light which has been emitted from the semiconductor laser 28*a* and passed through the beam splitter 78*b*, may be inserted between the beam splitters 78*b* and 78*a*, if necessary, in order that the light is reflected by the beam splitter 78*a*.

In the present embodiment in which the module 178*a*, semiconductor laser 28*a*, semiconductor laser 28*b*, and photodetector 128*a* are respectively replaced with the photodetector 128*a*, semiconductor laser 28*a*, semiconductor laser 28*b*, and module 178*a*, a half-wave plate for turning, by 90°, the polarization direction of the light which has been emitted from the semiconductor laser 28*a* and reflected by the beam splitter 78*c*, may be inserted between the beam splitters 78*c* and 78*b*, if necessary, in order that the light passes through the beam splitter 78*b*. In addition, a half-wave plate for turning, by 90°, the polarization direction of the light which has been emitted from the semiconductor lasers 28*a* and 28*b* and passed through the beam splitter 78*b*, may be inserted between the beam splitters 78*b* and 78*a*, if necessary, in order that the light is reflected by the beam splitter 78*a*.

In the twenty-eighth embodiment of the optical head apparatus according to the present invention, the semiconductor lasers 28*a* and 28*b* are not integrated with other light sources or photodetectors. Therefore, the semiconductor lasers 28*a* and 28*b* can have a high heat radiation characteristic. In addition, the total number of elements, i.e., the module, light sources, and photodetector is only four. Therefore, the optical head apparatus can be downsized. Further, the photodetector integrated in the module 178*a* can be designed to have an optimal sensitivity or the like for the wavelength of the semiconductor laser integrated also in the module 178*a*, and the photodetector 128*a* can be designed to have an optimal sensitivity or the like for the wavelengths of the semiconductor lasers 28*a* and 28*b*.

Twenty-Ninth Embodiment

Figure 29:
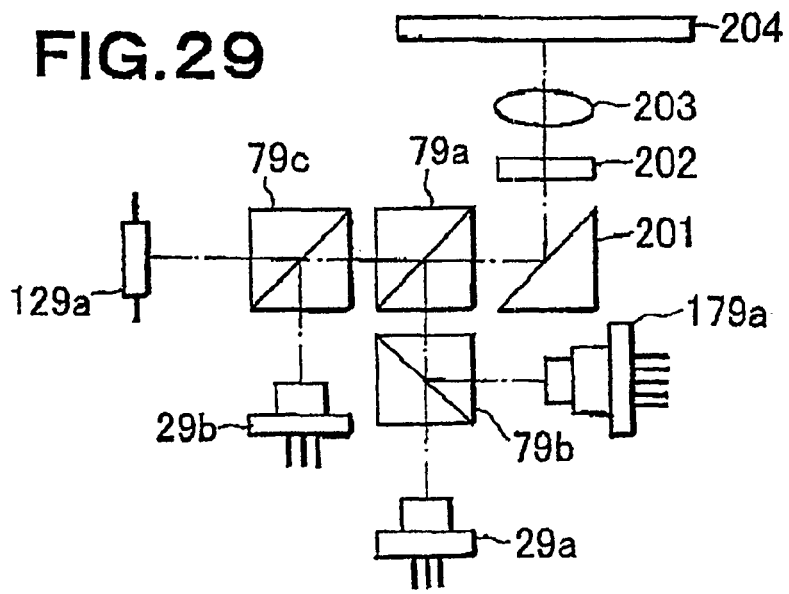
FIG. 29 is a diagram showing the twenty-ninth embodiment of the optical head apparatus according to the present invention.

FIG. 29 shows the twenty-ninth embodiment of the optical head apparatus according to the present invention. The modules 179*a* integrates one semiconductor laser and one photodetector. The structure of the module will be described later with reference to FIG. 74. The wavelength of the semiconductor laser integrated in the module 179a is 400 nm. The wavelengths of the semiconductor lasers 29a and 29b are 660 nm and 780 nm, respectively. The beam splitter P is used as a beam splitter 79a. Any of the beam splitters A, E, R, K, P, and V, is used as a beam splitter 79b. Any of the beam splitters I, R, T, S, V and Y is used as a beam splitter 79c.

Almost all of light having a wavelength of 400 nm and emitted from the semiconductor laser in the module 179a is reflected by the beam splitter 79b and by the beam splitter 79a, and is further reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in) the forward path. The light is then reflected by the mirror 201. Almost all of the light is reflected by the beam splitter 79a and by the beam splitter 79b, and is received by the photodetector in the module 179a.

Almost all of light having a wavelength of 660 nm and emitted from the semiconductor laser 29a passes through the beam splitter 79b and enters, as S-polarized, into the beam splitter 79a. Almost all of the light is reflected therefrom. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. The light enters, as P-polarized, into the beam splitter 79a. Almost all of the light passes through the beam splitter 79a and enters, as P-polarized, into the beam splitter 79c. Almost all of the light passes through the beam splitter 79c and is received by the photodetector 129a.

In case of using any of the beam splitters K, P, and V as the beam splitter 79b, a half-wave plate for turning, by 90°, the polarization direction of the light which has been emitted from the semiconductor laser 29a and passed through the beam splitter 79b, may be inserted between the beam splitters 79b and 79a, in order that the light is reflected by the beam splitter 79a.

Light having a wavelength of 780 nm and emitted from the semiconductor laser 29b enters, as S-polarized, into the beam splitter 79c. About 50% of the light is reflected therefrom. Almost all of the light passes through the beam splitter 79a. The light is reflected by the mirror 201 and is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 79a, and enters, as P-polarized, into the beam splitter 79c. About 50% of the light passes through the beam splitter 79c and is received by the photodetector 129a.

In the present embodiment, the wavelength of the semiconductor laser integrated in the module 179a may be 400 nm, and the wavelengths of the semiconductor lasers 29a and 29b may be 780 nm and 660 nm, respectively. At this time, the beam splitter R is used as the beam splitter 79a. Any of the beam splitters A, F, and P is used as the beam splitter 79b. Any of the beam splitters H, P, and U is used as the beam splitter 79c.

In the present embodiment, the wavelength of the semiconductor laser integrated in the module 179a may be 660 nm, and the wavelengths of the semiconductor lasers 29a and 29b may be 400 nm and 780 nm, respectively. At this time, the beam splitter N is used as the beam splitter 79a. Any of the beam splitters B, D, Q, J, N, and W is used as the beam splitter 79b. Any of the beam splitters I, Q, S, T, W and Y is used as the beam splitter 79c.

In the present embodiment, the wavelength of the semiconductor laser integrated in the modulo 179a may be 660 nm, and the wavelengths of the semiconductor lasers 29a and 29b may be 780 nm and 400 nm, respectively. At this time, the beam splitter Q is used as the beam splitter 79a. Any of the beam splitters B, F, and N is used as the beam splitter 79b. Any of the beam splitters G, N, and U is used as the beam splitter 79c.

In the present embodiment, the wavelength of the semiconductor laser integrated in the module 179a may be 780 nm, and the wavelengths of the semiconductor lasers 29a and 29b may be 400 nm and 660 nm, respectively. At this time, the beam splitter M is used as the beam splitter 79a. Any of the beam splitters C, D, O, J, M, and X is used as the beam splitter 79b. Any of the beam splitters H, O, S, U, X, and Y is used as the beam splitter 79c.

In the present embodiment, the wavelength of the semiconductor laser integrated in the module 179a may be 780 nm, and the wavelengths of the semiconductor lasers 29a and 29b may be 660 nm and 400 nm, respectively. At this time, the beam splitter O is used as the beam splitter 79a. Any of the beam splitters C, E, M, K, O, and X is used as the beam splitter 79b. Any of the beam splitters G, M, T, U, X, and Y is used as the beam splitter 79c.

Further, the modules 179a, semiconductor lasers 29a and 29b, and photodetector 129a can be replaced with each other, in the present embodiment.

In the present embodiment in which the module 179a, semiconductor laser 29a, semiconductor laser 29b, and photodetector 129a are respectively replaced with the semiconductor laser 29a or 29b, module 179a, photodetector 129a, and semiconductor laser 29b or 29a, a half-wave plate for turning, by 90°, the polarization direction of the light which has been emitted from the semiconductor laser 29a or 29b, reflected by the disk 204, and passed through the beam splitter 79a, may be inserted between the beam splitters 79a and 79c, if necessary, in order that the light is reflected by the beam splitter 79c.

In the present embodiment in which the module 179a, semiconductor laser 29a, semiconductor laser 29b, and photodetector 129a are respectively replaced with the semiconductor laser 29a or 29b, photodetector 129a, module 179a, and semiconductor laser 29b or 29a, a half-wave plate for turning, by 90°, the polarization direction of the light which has been emitted from the semiconductor laser 29b or 29a, reflected by the disk 204, and reflected by the beam splitter 79c, may be inserted between the beam splitters 79a and 79b, if necessary, in order that the light passes through the beam splitter 79b.

In the present embodiment in which the module 179a, semiconductor laser 29a, semiconductor laser 29b, and photodetector 129*a* are respectively replaced with the photodetector 129*a*, semiconductor laser 29*a*, semiconductor laser 29*b*, and module 179*a*, a half-wave plate for turning, by 90°, the polarization direction of the light which has been emitted from the semiconductor laser 29*b* and reflected by the beam splitter 79*c*, may be inserted between the beam splitters 79*c* and 79*a*, if necessary, in order that the light passes through the beam splitter 79*a*.

In the present embodiment in which the module 179*a*, semiconductor laser 29*a*, semiconductor laser 29*b*, and photodetector 129*a* are respectively replaced with the semiconductor laser 29*b*, semiconductor laser 29*a*, module 179*a*, and photodetector 129*a*, a half-wave plate for turning, by 90°, the polarization direction of the light which has been emitted from the semiconductor laser 29*a* and passed through the beam splitter 79*b*, may be inserted between the beam splitters 79*b* and 79*a*, if necessary, in order that the light is reflected by the beam splitter 79*a*.

In the present embodiment in which the module 179*a*, semiconductor laser 29*a*, semiconductor laser 29*b*, and photodetector 129*a* are respectively replaced with the photodetector 129*a*, module 179*a*, semiconductor laser 29*b*, and semiconductor laser 29*a*, a half-wave plate for turning, by 90°, the polarization direction of the light which has been emitted from the semiconductor laser 29*b* and reflected by the beam splitter 79*c*, may be inserted between the beam splitters 79*c* and 79*a*, if necessary, in order that the light passes through the beam splitter 79*a*.

In the present embodiment in which the module 179*a*, semiconductor laser 29*a*, semiconductor laser 29*b*, and photodetector 129*a* are respectively replaced with the module 179*a*, semiconductor laser 29*a*, photodetector 129*a*, and semiconductor laser 29*b*, a half-wave plate for turning, by 90°, the polarization direction of the light which has been emitted from the semiconductor laser 29*a*, reflected by the disk 204, and passed through the beam splitter 79*a*, may be inserted between the beam splitters 79*a* and 79*c*, if necessary, in order that the light is reflected by the beam splitter 79*c*. In addition, a half-wave plate for turning, by 90°, the polarization direction of the light which has been emitted from the semiconductor laser 29*a* and passed through the beam splitter 79*b*, may be inserted between the beam splitters 79*b* and 79*a*, if necessary, in order that the light is reflected by the beam splitter 79*a*.

In the present embodiment in which the module 179*a*, semiconductor laser 29*a*, semiconductor laser 29*b*, and photodetector 129*a* are respectively replaced with the semiconductor laser 29*a*, photodetector 129*a*, semiconductor laser 29*b*, and module 179*a*, A half-wave plate for turning, by 90°, the polarization direction of the light which has been emitted from the semiconductor laser 29*b*, reflected by the disk 204, and reflected by the beam splitter 79*a*, may be inserted between the beam splitters 79*a* and 79*b*, if necessary, in order that the light passes through the beam splitter 79*b*. In addition, a half-wave plate for turning, by 90°, the polarization direction of the light which has been emitted from the semiconductor laser 29*b* and reflected by the beam splitter 79*c*, may be inserted between the beam splitters 79*c* and 79*a*, if necessary, in order that the light passes through the beam splitter 79*a*.

In the present embodiment in which the module 179*a*, semiconductor laser 29*a*, semiconductor laser 29*b*, and photodetector 129*a* are respectively replaced with the semiconductor laser 29*b*, semiconductor laser 29*a*, photodetector 129*a*, and module 179*a*, a half-wave plate for turning, by 90°, the polarization direction of the light which has been emitted from the semiconductor lasers 29*a* and 29*b*, reflected by the disk 204, and passed through the beam splitter 79*a*, may be inserted between the beam splitters 79*a* and 79*c*, if necessary, in order that the light is reflected by the beam splitter 79*c*. In addition, a half-wave plate for turning, by 90°, the polarization direction of the light which has been emitted from the semiconductor lasers 29*a* and passed through the beam splitter 79*b*, may be inserted between the beam splitters 79*b* and 79*a*, if necessary, in order that the light is reflected by the beam splitter 79*a*.

In the present embodiment in which the module 179*a*, semiconductor laser 29*a*, semiconductor laser 29*b*, and photodetector 129*a* are respectively replaced with the module 179*a*, photodetector 129*a*, semiconductor laser 29*b*, and semiconductor laser 29*a*, a half-wave plate for turning, by 90°, the polarization direction of the light which has been emitted from the semiconductor lasers 29*a* and 29*b*, reflected by the disk 204, and reflected by the beam splitter 79*a*, may be inserted between the beam splitters 79*a* and 79*b*, if necessary, in order that the light passes through the beam splitter 79*b*. In addition, a half-wave plate for turning, by 90°, the polarization direction of the light which has been emitted from the semiconductor laser 29*b* and reflected by the beam splitter 79*c*, may be inserted between the beam splitters 79*c* and 79*a*, if necessary, in order that the light passes through the beam splitter 79*a*.

In the twenty-ninth embodiment of the optical head apparatus according to the present invention, the semiconductor lasers 29*a* and 29*b* are not integrated with other light sources or photodetectors. Therefore, the semiconductor lasers 29*a* and 29*b* can have a high heat radiation characteristic. In addition, the total number of elements, i.e., the module, light sources, and photodetector is only four. Therefore, the optical head apparatus can be downsized. Further, the photodetector integrated in the module 179*a* can be designed to have an optimal sensitivity or the like for the wavelength of the semiconductor laser integrated also in the module 179*a*, and the photodetector 129*a* can be designed to have an optimal sensitivity or the like for the wavelengths of the semiconductor lasers 29*a* and 29*b*.

11. Thirtieth and Thirty-First Embodiments

Type 9

The thirtieth and thirty-first embodiments of the optical head apparatus according to the present invention each have three modules. However, the three modules each integrate one light source and one photodetector.

Thirtieth Embodiment

Figure 30:
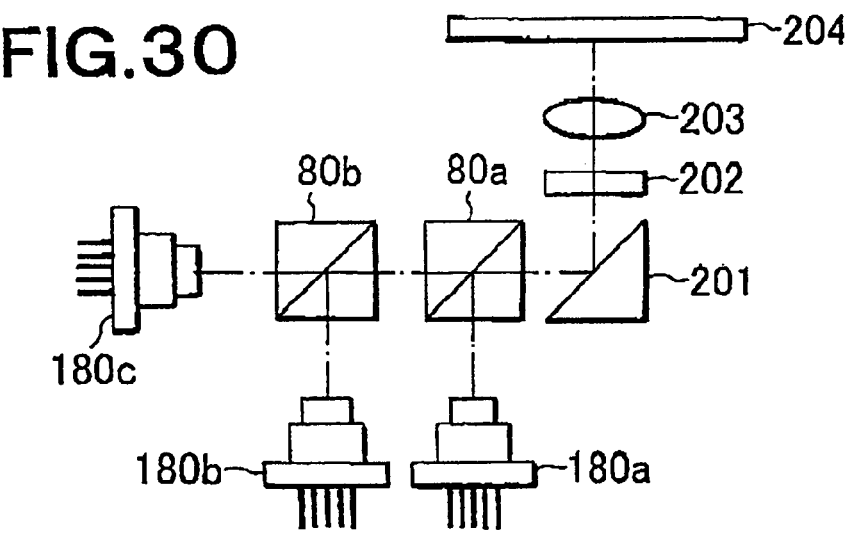
FIG. 30 is a diagram showing the thirtieth embodiment of the optical head apparatus according to the present invention.

FIG. 30 shows the thirtieth embodiment of the optical head apparatus according to the present invention. The modules 180*a*, 180*b*, and 180*c* each integrate one semiconductor laser and one photodetector. The structure of the module will be described later with reference to FIG. 74. The wavelengths of the semiconductor lasers integrated in the modules 180*a*, 180*b*, and 180*c* are 780 nm, 660 nm, and 400 nm, respectively. The beam splitter C is used as a beam splitter 80*a*. Any of the beam splitters B, D, and Q is used as a beam splitter 80*b*. Almost all of light having a wavelength of 400 nm and emitted from the semiconductor laser in the module 180*c* passes through the beam splitters 80*b* and 80*a* and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitters 80a and 80b, and is received by the photodetector in the module 180c.

Almost all of light having a wavelength of 660 nm and emitted from the semiconductor laser integrated in the module 180b is reflected by the beam splitter 80b, and passes through the beam splitter 80a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 80a and is reflected by the beam splitter 80b. The light is then received by the photodetector in the module 180b.

Almost all of light having a wavelength of 780 nm and emitted from the semiconductor laser in the module 180a is reflected by the beam splitter 80a and is further reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 80a and is received by the photodetector in the module 180a.

In the present embodiment, the wavelengths of the semiconductor lasers integrated in the modules 180 a, 180b, and 180c may be 660 nm, 780 nm, and 400 nm, respectively. At this time, the beam splitter B is used as the beam splitter 80a. Any of the beam splitters C, D, and O is used as the beam splitter 80b.

In the present embodiment, the wavelengths of the semiconductor lasers integrated in the modules 180a, 180b, and 180c may be 780 nm, 400 nm, and 660 nm, respectively. At this time, the beam splitter C is used as the beam splitter 80a. Any of the beam splitters A, E, and R is used as the beam splitter 80b.

In the present embodiment, the wavelengths of the semiconductor lasers integrated in the modules 180a, 180b, and 180c may be 400 nm, 780 nm, and 660 nm, respectively. At this time, the beam splitter A is used as the beam splitter 80a. Any of the beam splitters C, E, and M is used as the beam splitter 80b.

In the present embodiment, the wavelengths of the semiconductor lasers integrated in the modules 180a, 180b, and 180c may be 660 nm, 400 nm, and 780 nm, respectively. At this time, the beam splitter B is used as the beam splitter 80a. Any of the beam splitters A, F, and P is used as the beam splitter 80b.

In the present embodiment, the wavelengths of the semiconductor lasers integrated in the modules 180a, 180b, and 180c may be 400 nm, 660 nm, and 780 nm, respectively. At this time, the beam splitter A is used as the beam splitter 80a. Any of the beam splitters B, F, and N is used as the beam splitter 80b.

In the thirtieth embodiment of the optical head apparatus according to the present invention, only three modules are used and no light source or photodetector is required. Therefore, the optical head apparatus can be downsized. Further, the photodetectors in the modules 180a, 180b, and 180c can respectively be designed to have optimal sensitivities or the like for the wavelengths of the semiconductor lasers in the modules 180a, 180b, and 180c.

Thirty-First Embodiment

Figure 31:
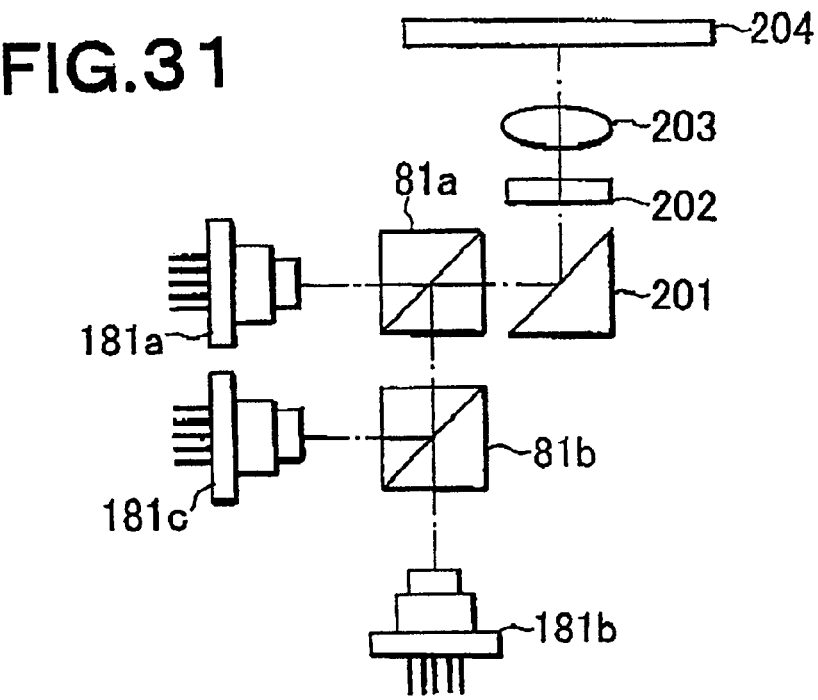
FIG. 31 is a diagram showing the thirty-first embodiment of the optical head apparatus according to the present invention.

FIG. 31 shows the thirty-first embodiment of the optical head apparatus according to the present invention. The modules 181a, 181b, and 181c each integrate one semiconductor laser and one photodetector. The structure of the module will be described later with reference to FIG. 74. The wavelengths of the semiconductor lasers integrated in the modules 181a, 181b, and 181c are 780 nm, 660 nm, and 400 nm, respectively. The beam splitter F is used as a beam splitter 81a. Any of the beam splitters A, E, and R is used as a beam splitter 81b.

Almost all of light having a wavelength of 400 nm and emitted from the semiconductor laser in the module 181c is reflected by the beam splitters 81b and 81a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitters 81a and then 81b, and is received by the photodetector in the module 181c.

Light having a wavelength of 660 nm and emitted from the semiconductor laser in the module 181b passes through the beam splitter 81b and is reflected by the beam splitter 81a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 81a and passes through the beam splitter 81b. The light is then received by the photodetector in the module 181b.

Almost all of light having a wavelength of 780 nm and emitted from the semiconductor laser in the module 181a passes through the beam splitter 81a and is reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 81a and is received by the photodetector in the module 181a.

In the present embodiment, the wavelengths of the semiconductor lasers integrated in the modules 181a, 181b, and 181c may be 660 nm, 780 nm, and 400 nm, respectively. At this time, the beam splitter E is used as the beam splitter 81a. Any of the beam splitters A, F, and P is used as the beam splitter 81b.

In the present embodiment, the wavelengths of the semiconductor lasers integrated in the modules 181a, 181b, and 181c may be 780 nm, 400 nm, and 660 nm, respectively. At this time, the beam splitter F is used as the beam splitter 81a. Any of the beam splitters B, D, and Q is used as the beam splitter 81b.

In the present embodiment, the wavelengths of the semiconductor lasers integrated in the modules 181a, 181b, and 181c may be 400 nm, 780 nm, and 660 nm, respectively. At this time, the beam splitter D is used as the beam splitter 81a. Any of the beam splitters B, F, and N is used as the beam splitter 81b.

In the present embodiment, the wavelengths of the semiconductor lasers integrated in the modules 181a, 181b, and 181c may be 660 nm, 400 nm, and 780 nm, respectively. At this time, the beam splitter E is used as the beam splitter 81a. Any of the beam splitters C, D, and O is used as the beam splitter 81b.

In the present embodiment, the wavelengths of the semiconductor lasers integrated in the modules 181a, 181b, and 181c may be 400 nm, 660 nm, and 780 nm, respectively. At this time, the beam splitter D is used as the beam splitter 81a. Any of the beam splitters C, B, and M is used as the beam splitter 81b.

In the thirty-first embodiment of the optical head apparatus according to the present invention, only three modules are used and no light source or photodetector is required. Therefore, the optical head apparatus can be downsized. Further, the photodetectors in the modules 181a, 181b, and 181c can respectively be designed to have optimal sensitivities or the like for the wavelengths of the semiconductor lasers in the modules 181a, 181b, and 181c.

12. Thirty-Second and Thirty-Third Embodiments

Type 10

The thirty-second and thirty-third embodiments of the optical head apparatus according to the present invention each have one light source, one photodetector, and one module. However, the one light source integrates two light sources. The one module integrates one light source and one photodetector.

Thirty-Second Embodiment

Figure 32:
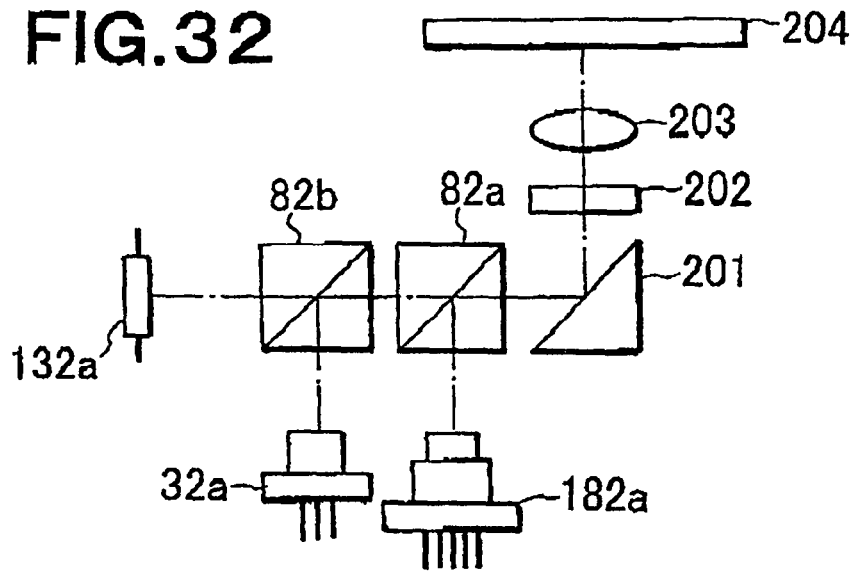
FIG. 32 is a diagram showing the thirty-second embodiment of the optical head apparatus according to the present invention.

FIG. 32 shows the thirty-second embodiment of the optical head apparatus according to the present invention. The module 182a integrates one semiconductor laser and one photodetector. The structure of the module will be described later with reference to FIG. 74. The semiconductor laser 32a integrates two semiconductor lasers. The structure of the laser will be described later with reference to FIG. 72. The wavelength of the semiconductor laser integrated in the module 182a is 400 nm, and the wavelengths of the semiconductor laser 32a are 660 nm and 780 nm. The beam splitter A is used as a beam splitter 82a. Any of the beam splitters S, V, and Y is used as a beam splitter 82b.

Almost all of light having a wavelength of 400 nm and emitted from the semiconductor laser in the module 182a is reflected by the beam splitters 82a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 82a, and is received by the photodetector in the module 182a.

Almost all of light having a wavelength of 660 nm and emitted from the semiconductor laser 32a enters, as S-polarized, into the beam splitter 82b, and is reflected therefrom. Almost all of the light passes through the beam splitter 82a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 82a and enters, as P-polarized, into the beam splitter 82b. Almost all of the light passes through the beam splitter 82b and is then received by the photodetector 132a.

Light having a wavelength of 780 nm and emitted from the semiconductor laser 32a enters, as S-polarized, into the beam splitter 82b. About 50% of the light is reflected therefrom. Almost all of the light passes through the beam splitter 82a. The light is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 82a and enters, as P-polarized, into the beam splitter 82b. About 50% of the light passes through the beam splitter 82b and is received by the photodetector 132a.

In the present embodiment, the wavelength of the semiconductor laser in the module 182a may be 660 nm and the wavelengths of the semiconductor laser 32a may be 400 nm and 780 nm. At this time, the beam splitter B is used as the beam splitter 82a. Any of the beam splitters T, W, and Y is used as the beam splitter 82b.

In the present embodiment, the wavelength of the semiconductor laser in the module 182a may be 780 nm and the wavelengths of the semiconductor laser 32a may be 400 nm and 660 nm. At this time, the beam splitter C is used as the beam splitter 82a. Any of the beam splitters U, X and Y is used as the beam splitter 82b.

Further, the module 182a, semiconductor laser 32a, and photodetector 132a can be replaced with each other, in the present embodiment.

In the present embodiment in which the module 182a, semiconductor laser 32a, and photodetector 132a are respectively replaced with the semiconductor laser 32a, photodetector 132a, and module 182a, a half-wave plate for turning, by 90°, the polarization direction of the light which has been emitted from the semiconductor laser 32a, reflected by the disk 204, and passed through the team splitter 82a, may be inserted between the beam splitters 82a and 82b, if necessary, in order that the light is reflected by the beam splitter 82b.

In the present embodiment in which the module 182a, semiconductor laser 32a, and photodetector 132a are respectively replaced with the photodetector 132a, semiconductor laser 32a, and module 182a, a half-wave plate for turning, by 90°, the polarization direction of the light which has been emitted from the semiconductor laser 32a and reflected by the beam splitter 82b, may be inserted between the beam splitters 82b and 82a, if necessary, in order that the light passes through the beam splitter 82a.

In the thirty-second embodiment of the optical head apparatus according to the present invention, the total number of elements, i.e., the module, light source, and photodetector is only three. Therefore, the optical head apparatus can be downsized. In addition, the photodetector in the module 182a can be designed to have an optimal sensitivity or the like for the wavelength of the semiconductor laser in the module 182a, and the photodetector 132a can be designed to have an optimal sensitivity or the like for the wavelength of the semiconductor laser 32a.

Thirty-Third Embodiment

Figure 33:
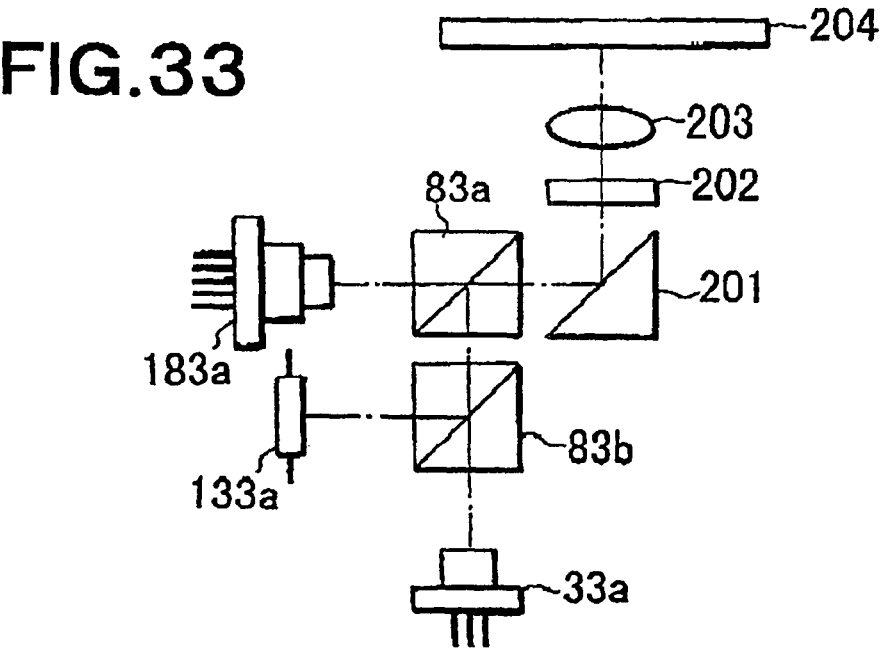
FIG. 33 is a diagram showing the thirty-third embodiment of the optical head apparatus according to the present invention.

FIG. 33 shows the thirty-third embodiment of the optical head apparatus according to the present invention. The module 183a integrates one semiconductor laser and one photodetector. The structure of the module will be described later with reference to FIG. 74. The semiconductor laser 33a integrates two semiconductor lasers. The structure of the laser will be described later with reference to FIG. 72. The wavelength of the semiconductor laser integrated in the module 183a is 400 nm, and the wavelengths of the semiconductor laser 33a are 660 nm and 780 nm. The beam splitter D is used as a beam splitter 83a. Any of the beam splitters S, V and Y is used as a beam splitter 83b.

Almost all of light having a wavelength of 400 nm and emitted from the semiconductor laser in the module 183a passes through the beam splitter 83a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 83a, and is received by the photodetector in the module 183a.

Light having a wavelength of 660 nm and emitted from the semiconductor laser 33a enters, as P-polarized, into the beam splitter 83b. Almost all of the light passes through the beam splitter 83b and is then reflected by the beam splitter 83a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 83a and enters, as S-polarized, into the beam splitter 83b. Almost all of the light is reflected therefrom and is then received by the photodetector 133a.

Light having a wavelength of 780 nm and emitted from the semiconductor laser 33a enters, as P-polarized, into the beam splitter 83b. About 50% of the light passes through the beam splitter 63b. Almost all of the light is reflected by the beam splitter 93a. The light is then reflected by the mirror 201. The light is transformed from linearly polarized light into circularly polarized light by the wavelength plate 202. The light is then converged on a disk 204 according to the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 83a and enters, as S-polarized, into the beam splitter 83b. About 50% of the light is reflected therefrom and is received by the photodetector 133a.

In the present embodiment, the wavelength of the semiconductor laser in the module 183a may be 660 nm and the wavelengths of the semiconductor laser 33a may be 400 nm and 780 nm. At this time, the beam splitter E is used as the beam splitter 63a. Any of the beam splitters T, W, and Y is used as the beam splitter 83b.

In the present embodiment, the wavelength of the semiconductor laser in the module 183a may be 780 nm and the wavelengths of the semiconductor laser 33a may be 400 nm and 660 nm. At this time, the beam splitter F is used as the beam splitter 83a. Any of the beam splitters U, X, and Y is used as the beam splitter 83b.

Further, the module 183a, semiconductor laser 33a, and photodetector 133a can be replaced with each other, in the present embodiment.

In the present embodiment in which the module 183a, semiconductor laser 33a, and photodetector 133a are respectively replaced with the semiconductor laser 33a, photodetector 133a, and module 183a, a half-wave plate for turning, by 90°, the polarization direction of the light which has been emitted from the semiconductor laser 33a, reflected by the disk 204, and reflected by the beam splitter 83a, may be inserted between the beam splitters 83a and 83b, if necessary, in order that the light passes through the beam splitter 83b.

In the present embodiment in which the module 183a, semiconductor laser 33a, and photodetector 133a are respectively replaced with the photodetector 133a, semiconductor laser 33a, and module 183a, a half-wave plate for turning, by 90°, the polarization direction of the light which has been emitted from the semiconductor laser 33a and passed through the beam splitter 83b, may be inserted between the beam splitters 83b and 83a, if necessary, in order that the light is reflected by the beam splitter 83a.

In the thirty-third embodiment of the optical head apparatus according to the present invention, the total number of elements, i.e., the module, light source, and photodetector is only three. Therefore, the optical head apparatus can be downsized. In addition, the photodetector in the module 183a can be designed to have an optimal sensitivity or the like for the wavelength of the semiconductor laser in the module 183a, and the photodetector 133a can be designed to have an optimal sensitivity or the like for the wavelength of the semiconductor laser 33a.

13. Thirty-Fourth and Thirty-Fifth Embodiments

Type 11

The thirty-fourth and thirty-fifth embodiments of the optical head apparatus according to the present invention each have one light source, one photodetector, and one module. However, the module integrates two light sources and one photodetector.

Thirty-Fourth Embodiment

Figure 34:
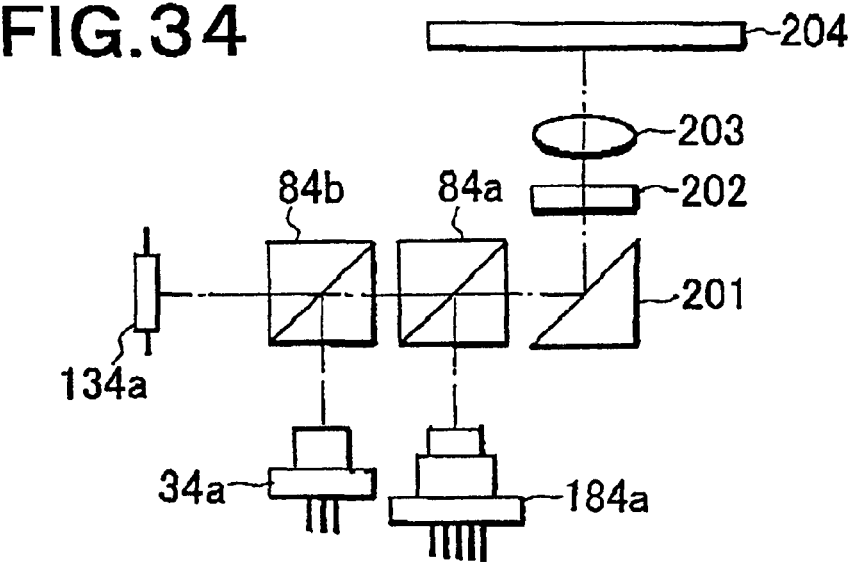
FIG. 34 is a diagram showing the thirty-fourth embodiment of the optical head apparatus according to the present invention.

FIG. 34 shows the thirty-fourth embodiment of the optical head apparatus according to the present invention. The module 184a integrates two semiconductor lasers and one photodetector the structure of the module will be described later with reference to FIG. 75. The wavelengths of the semiconductor lasers integrated in the module 184a are 660 nm and 780 nm, and the wavelength of the semiconductor laser 34a is 400 nm. The beam splitter D is used as a beam splitter 84a. Any of the beam splitters G, J, M, N, T, U, W, X and Y is used as a beam splitter 84b.

Light having a wavelength of 400 nm and emitted from the semiconductor laser 34a enters, as S-polarized, into the beam splitter 84b. Almost all of the light passes through the beam splitter 84b and then passes through the beam splitter 84a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light passes through the beam splitter 84a, and enters, as P-polarized, into the beam splitter 84b. Almost all of the light passes through the beam splitter 84b and is then received by the photodetector 134a.

Almost all of light having a wavelength of 660 nm or light having a wavelength of 780 nm, emitted from any of the semiconductor lasers in the module 184a, is reflected by the beam splitter 84a and is reflected by the mirror 201. The light is then transformed from linearly polarized light into circularly polarized light by the wavelength plate 202. The light is then converged on a disk 204 according to the DVD standard or the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 84a and is then received by the photodetector in the module 184a.

In the present embodiment, the wavelengths of the semiconductor lasers in the module 184a may be 400 nm and 780 nm and the wavelength of the semiconductor laser 34a may be 660 nm. At this time, the beam splitter E is used as the beam splitter 84a. Any of the beam splitters H, K, O, P, S, U, V, X and Y is used as the beam splitter 84b.

In the present embodiment, the wavelengths of the semiconductor lasers in the module 184a may be 400 nm and 660 nm and the wavelength of the semiconductor laser 34a may be 780 nm. At this time, the beam splitter F is used as the beam splitter 84a. Any of the beam splitters I, L, Q, R, S, T, V, W and Y is used as the beam splitter 84b.

Further, the module 184a, semiconductor laser 34a, and photodetector 134a can be replaced with each other, in the present embodiment.

In the present embodiment in which the module 184a, semiconductor laser 34a, and photodetector 134a are respectively replaced with the semiconductor laser 34a, photodetector 134a, and module 184a, a half-wave plate for turning, by 90°, the polarization direction of the light which has been emitted from the semiconductor laser 34a, reflected by the disk 204, and passed through the beam splitter 84a, may be inserted between the beam splitters 84a and 84b, if necessary, in order that the light is reflected by the beam splitter 84b.

In the present embodiment in which the module 184a, semiconductor laser 34a, and photodetector 134a are respectively replaced with the photodetector 134a, semiconductor laser 34a, and module 184a, a half-wave plate for turning, by 90°, the polarization direction of the light which has been emitted from the semiconductor laser 34a and reflected by the beam splitter 84b, may be inserted between the beam splitters 84b and 84a, if necessary, in order that the light passes through the beam splitter 84a.

In the thirty-fourth embodiment of the optical head apparatus according to the present invention, the semiconductor laser 34a is not integrated with other light sources or photodetectors. Therefore, the semiconductor laser 34a can have a high heat radiation characteristic. In addition, the total number of elements, i.e., the module, light source, and photodetector is only three. Therefore, the optical head apparatus can be downsized. Further, the photodetector integrated in the module 184a can be designed to have an optimal sensitivity or the like for the wavelengths of the semiconductor lasers integrated also in the module 184a, and the photodetector 134a can be designed to have an optimal sensitivity or the like for the wavelength of the semiconductor laser 34a.

Thirty-Fifth Embodiment

Figure 35:
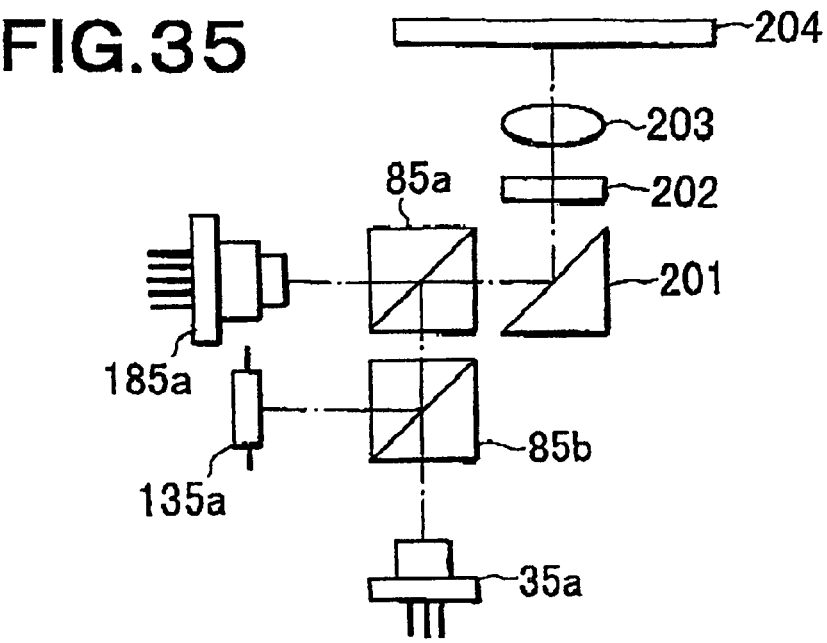
FIG. 35 is a diagram showing the thirty-fifth embodiment of the optical head apparatus according to the present invention.

FIG. 35 shows the thirty-fifth embodiment of the optical head apparatus according to the present invention. The module 185a integrates two semiconductor lasers and one photodetector. The structure of the module will be described later with reference to FIG. 75. The wavelengths of the semiconductor lasers integrated in the module 185a are 660 nm and 780 nm, and the wavelength of the semiconductor laser 35a is 400 nm. The beam splitter A is used as a beam splitter 85a. Any of the beam splitters G, J, M, N, T, U, W, X and Y is used as a beam splitter 85b.

Light having a wavelength of 400 nm and emitted from the semiconductor laser 35a enters, as P-polarized, into the beam splitter 85b. Almost all of the light passes through the beam splitter 85b and is reflected by the beam splitter 85a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 85a, and enters, as S-polarized, into the beam splitter 85b. Almost all of the light is reflected therefrom and is then received by the photodetector 135a.

Almost all of light having a wavelength of 660 nm or light having a wavelength of 780 nm, emitted from any of the semiconductor lasers in the module 185a, passes through the beam splitter 85a and is reflected by the mirror 201. The light is then transformed from linearly polarized light into circularly polarized light by the wavelength plate 202. The light is then converged on a disk 204 according to the DVD standard or the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 85a and is then received by the photodetector in the module 185a.

In the present embodiment, the wavelengths of the semiconductor lasers in the module 185a may be 400 nm and 780 nm and the wavelength of the semiconductor laser 35a may be 660 nm. At this time, the beam splitter B is used as the beam splitter 85a. Any of the beam splitters H, K, O, P, S, U, V, X and Y is used as the beam splitter 85b.

In the present embodiment, the wavelengths of the semiconductor lasers in the module 185a may be 400 nm and 660 nm and the wavelength of the semiconductor laser 35a may be 780 nm. At this time, the beam splitter C is used as the beam splitter 85a. Any of the beam splitters I, L, Q, R, S, T, V, W and Y is used as the beam splitter 85b.

Further, the module 185a, semiconductor laser 35a, and photodetector 135a can be replaced with each other, in the present embodiment.

In the present embodiment in which the module 185a, semiconductor laser 35a, and photodetector 135a are respectively replaced with the semiconductor laser 35a, photodetector 135a, and module 185a, a half-wave plate for turning, by 90°, the polarization direction of the light which has been emitted from the semiconductor laser 35a, reflected by the disk 204, and reflected by the beam splitter 85a, may be inserted between the beam splitters 85a and 85b, if necessary, in order that the light passes through the beam splitter 85b.

In the present embodiment in which the module 185a, semiconductor laser 35a, and photodetector 135a are respectively replaced with the photodetector 135a, semiconductor laser 35a, and module 185a, a half-wave plate for turning, by 90°, the polarization direction of the light which has been emitted from the semiconductor laser 35a and passed through the beam splitter 85b, may be inserted between the beam splitters 85b and 85a, if necessary, in order that the light is reflected by the beam splitter 85a.

In the thirty-fifth embodiment of the optical head apparatus according to the present invention, the semiconductor laser 35a is not integrated with other light sources or photodetectors. Therefore, the semiconductor laser 35a can have a high heat radiation characteristic In addition, the total number of elements, i.e., the module, light source, and photodetector is only three. Therefore, the optical head apparatus can be downsized. Further, the photodetector integrated in the module 185a can be designed to have an optimal sensitivity or the like for the wavelengths of the semiconductor lasers integrated also in the module 185a, and the photodetector 135a can be designed to have an optimal sensitivity or the like for the wavelength of the semiconductor laser 35a.

14. Thirty-Sixth Embodiment

Type 12

The thirty-sixth embodiment of the optical head apparatus according to the present invention has two modules. However, one of the two modules integrates two light sources and one photodetector. The other one of the two modules integrates one light source and one photodetector.

Figure 36:
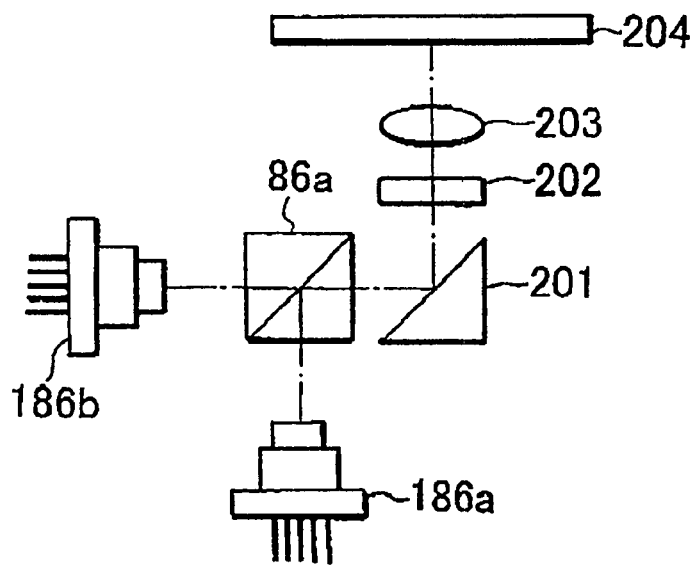
FIG. 36 is a diagram showing the thirty-sixth embodiment of the optical head apparatus according to the present invention.

FIG. 36 shows the thirty-sixth embodiment of the optical head apparatus according to the present invention The module 186b integrates two semiconductor lasers and one photodetector. The structure of the module will be described later with reference to FIG. 75. The module 186a integrates one semiconductor laser and one photodetector. The structure of the module will be described later with reference to FIG. 74. The wavelength of the semiconductor laser integrated in the module 186a is 400 nm, and the wavelengths of the semiconductor lasers integrated in the module 186b are 660 nm and 780 nm. The beam splitter A is used as a beam splitter 86a.

Almost all of light having a wavelength of 400 nm and emitted from the semiconductor laser in the module 186a is reflected by the beam splitter 86a and is reflected by the mirror 201. The light is then transformed into circularly polarized light from linearly polarized light by a wavelength plate 202, and is converged on a disk 204 according to the next-generation standard by an objective lens 203. Reflection light from the disk 204 passes through the objective lens 203 in a reverse direction and is transformed, by the wavelength plate 202, from the circularly polarized light into linearly polarized light whose polarization direction is perpendicular to that in the forward path. The light is then reflected by the mirror 201. Almost all of the light is reflected by the beam splitter 86a, and is then received by the photodetector in the module 186a.

Almost all of light having a wavelength of 660 nm or light having a wavelength of 780 nm, emitted from any of the semiconductor lasers in the module 186b, passes through by the beam splitter 86a and is reflected by the mirror 201. The light is then transformed from linearly polarized light into circularly polarized light by the wavelength plate 202. The light is then converged on a disk 204 according to the DVD standard or the CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 86a and is then received by the photodetector in the module 186b.

In the present embodiment, the wavelength of the semiconductor laser in the module 186a may be 660 nm, and the wavelengths of the semiconductor lasers in the module 186b may be 400 nm and 780 nm. At this time, the beam splitter B is used as the beam splitter 86a.

In the present embodiment, the wavelength of the semiconductor laser in the module 186a may be 780 nm, and the wavelengths of the semiconductor lasers in the module 186b may be 400 nm and 660 nm. At this time, the beam splitter C is used as the beam splitter 86a.

In the present embodiment, the module 186a may be a module which integrates two semiconductor lasers and one photodetector, and the module 186b may be a module which integrates one semiconductor laser and one photodetector.

The wavelengths of the semiconductor lasers in the module 186a may be 660 nm and 780 nm, and the wavelength of the semiconductor laser in the module 186b may be 400 nm. At this time, the beam splitter D is used as the beam splitter 86a.

In the present embodiment, the module 186a may be a module which integrates two semiconductor lasers and one photodetector, and the module 186b may be a module which integrates one semiconductor laser and one photodetector. The wavelengths of the semiconductor lasers in the module 186a may be 400 nm and 780 nm, and the wavelength of the semiconductor laser in the module 186b may be 660 nm. At this time, the beam splitter E is used as the beam splitter 86a.

In the present embodiment, the module 186a may be a module which integrates two semiconductor lasers and one photodetector, and the module 186b may be a module which integrates one semiconductor laser and one photodetector. The wavelengths of the semiconductor lasers in the module 186a may be 400 nm and 660 nm, and the wavelength of the semiconductor laser in the module 186b may be 780 nm. At this time, the beam splitter F is used as the beam splitter 86a.

In the thirty-sixth embodiment of the optical head apparatus according to the present invention, only two modules are used and no light source or photodetector is required. Therefore, the optical head apparatus can be downsized. Further, the photodetectors integrated in the module 186a and 186b can respectively be designed to have optimal sensitivities or the like for the wavelengths of the semiconductor lasers integrated also in the modules 186a and 186b.

15. Thirty-Seventh Embodiment

Type 13

The thirty-sixth embodiment of the optical head apparatus according to the present invention has one module However, one module integrates three light sources and one photodetector.

Figure 37:
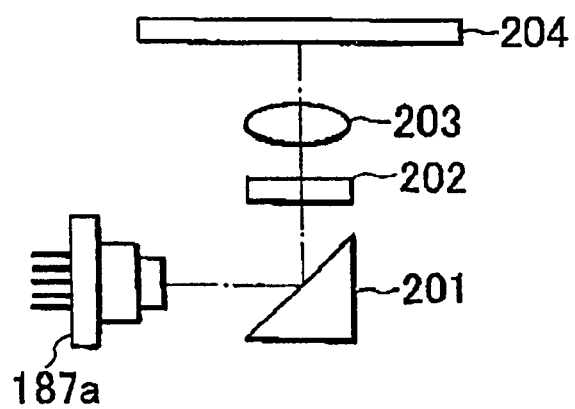
FIG. 37 is a diagram showing the thirty-seventh embodiment of the optical head apparatus according to the present invention.

FIG. 37 shows the thirty-seventh embodiment of the optical head apparatus according to the present invention. The module 187a integrates three semiconductor lasers and one photodetector. The structure of the module will be described later with reference to FIG. 76. The wavelengths of the semiconductor lasers integrated in the module 187a are 400 nm, 660 nm, and 780 nm.

Light having a wavelength of 400 nm, 660 nm, or 780 nm, emitted from any of the semiconductor lasers in the module 187a, is reflected by the mirror 201. The light is then transformed from linearly polarized light into circularly polarized light by the wavelength plate 202. The light is then converged on a disk 204 according to the next-generation standard, DVD standard, or CD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201 and is further received by the photodetector in the module 187a.

In the thirty-seventh embodiment of the optical head apparatus according to the present invention, only one module is used and no light source or photodetector is required. Therefore, the optical head apparatus can be downsized.

16. Thirty-Eighth to Forty-First Embodiment

Type 14

The thirty-eighth to forty-first embodiments of the optical head apparatus according to the present invention each have three light sources and two photodetectors.

Thirty-Eighth Embodiment

The thirty-eighth embodiment of the optical head apparatus according to the present invention is basically the same as the embodiment shown in FIG. 1. The wavelengths of the semiconductor lasers 1a, 1b, and 1c are 780 nm, 660 nm, and 400 nm, respectively. The beam splitter D is used as a beam splitter 51a. Any of the beam splitters k, o, and x is used as a beam splitter 51b. Any of the beam splitters L, Q, W, s, v, and y is used as a beam splitter 51c. Any of the beam splitters G, J, M, N, T, u, W, x and y is used as a beam splitter 51d.

Descriptions concerning light having a wavelength of 400 nm and light having a wavelength of 780 nm will be the same as those made in the first embodiment of the optical head apparatus according to the present invention, and will therefore be omitted herefrom.

Light having a wavelength of 660 nm and emitted from the semiconductor laser 1b enters, as P-polarized, into the beam splitter 51b. About 50% of the light passes through the beam splitter 51b. Almost all of the light is reflected by the beam splitter 51a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 51a and enters, as S-polarized, into the beam splitter 51b. About 50% of the light is reflected therefrom, and enters, as S-polarized, into the beam splitter 51c. Almost all of the light is reflected therefrom, and is received by the photodetector 101a.

In the present embodiment, the wavelengths of the semiconductor lasers 1a, 1b, and 1c may be 660 nm, 780 nm, and 400 nm, respectively. At this time, the beam splitter D is used as the beam splitter 51a. Any of the beam splitters L, Q, and W is used as the beam splitter 51b. Any of the beam splitters k, o, and x is used as the beam splitter 51c. Any of the beam splitters G, J, M, N, T, u, W, x, and y is used as the beam splitter 51d.

In the present embodiment, the wavelengths of the semiconductor lasers 1a, 1b, and 1c may be 780 nm, 400 nm, and 660 nm, respectively. At this time, the beam splitter E is used as the beam splitter 51a. Any of the beam splitters J, M, and x is used as the beam splitter 51b. Any of the beam splitters L, R, v, T, W, and y is used as the beam splitter 51c. Any of the beam splitters h, k, o, p, s, u, v, x, and y is used as the beam splitter 51d.

In the present embodiment, the wavelengths of the semiconductor lasers 1a, 1b, and 1c may be 400 nm, 780 nm, and 660 nm, respectively. At this time, the beam splitter E is used as the beam splitter 51a. Any of the beam splitters L, R, and V is used as the beam splitter 51b. Any of the beam splitters J, M, and x is used as the beam splitter 51c. Any of the beam splitters h, k, o, p, s, u, v, x, and y is used as the beam splitter 51d.

In the present embodiment, the wavelengths of the semiconductor lasers 1a, 1b, and 1c may be 660 nm, 400 nm, and 780 nm, respectively. At this time, the beam splitter F is used as the beam splitter 51a. Any of the beam splitters J, N, and W is used as the beam splitter 51b. Any of the beam splitters k, p, v, u, x and y is used as the beam splitter 51c. Any of the beam splitters I, L, Q, R, s, T, v, W and y is used as the beam splitter 51d.

In the present embodiment, the wavelengths of the semiconductor lasers 1a, 1b, and 1c may be 400 nm, 660 nm, and 780 nm, respectively. At this time, the beam splitter F is used as the beam splitter 51a. Any of the beam splitters k, p, and v is used as the beam splitter 51b. Any of the beam splitters J, N, W, u, x and y is used as the beam splitter 51c. Any of the beam splitters I, L, Q, R, s, T, v, W and y is used as the beam splitter 51d.

Further, the semiconductor laser 1c and the photodetector 101b can be replaced with each other, in the present embodiment. In addition, one of the semiconductor lasers 1a and 1b can be replaced with the photodetector 101a, in the present embodiment.

In the thirty-eighth embodiment of the optical head apparatus according to the present invention has the same characteristics as the first embodiment.

Thirty-Ninth Embodiment

The thirty-ninth embodiment of the optical head apparatus according to the present invention is basically the same as the embodiment shown in FIG. 2. The wavelengths of the semiconductor lasers 2a, 2b, and 2c are 780 nm, 660 nm, and 400 nm, respectively. The beam splitter D is used as a beam splitter 52a. Any of the beam splitters h, p and u is used as a beam splitter 52b. Any of the beam splitters I, R, T, s, v and y is used as a beam splitter 52c. Any of the beam splitters G, J, M, N, T, u, W, x and y is used as a beam splitter 52d.

Descriptions concerning light having a wavelength of 400 nm and light having a wavelength of 780 nm will be the same as those made in the second embodiment of the optical head apparatus according to the present invention, and will therefore be omitted herefrom.

Light having a wavelength of 660 nm and emitted from the semiconductor laser 2b enters, as S-polarized, into the beam splitter 52b. About 50% of the light is reflected therefrom. Almost all of the light is reflected by the beam splitter 52a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 52a and enters, as P-polarized, into the beam splitter 52b. About 50% of the light passes through the beam splitter 52b, and enters, as P-polarized, into the beam splitter 52c. Almost all of the light passes through the beam splitter 52c, and is received by the photodetector 102a.

In the present embodiment, the wavelengths of the semiconductor lasers 2a, 2b, and 2c may be 660 nm, 780 nm, and 400 nm, respectively. At this time, the beam splitter D is used as the beam splitter 52a. Any of the beam splitters I, R, and T is used as the beam splitter 52b. Any of the beam splitters h, p, and u is used as the beam splitter 52c. Any of the beam splitters G, J, M, N, T, u, W, x, and y is used as the beam splitter 52d.

In the present embodiment, the wavelengths of the semiconductor lasers 2a, 2b, and 2c may be 780 nm, 400 nm, and 660 nm, respectively. At this time, the beam splitter E is used as the beam splitter 52a. Any of the beam splitters G, N, and u is used as the beam splitter 52b. Any of the beam splitters I, Q, s, T, W, and y is used as the beam splitter 52c. Any of the beam splitters h, k, o, p, s, u, v, x, and y is used as the beam splitter 52d.

In the present embodiment, the wavelengths of the semiconductor lasers 2a, 2b, and 2c may be 400 nm, 780 nm, and 660 nm, respectively. At this time, the beam splitter E is used as the beam splitter 52a. Any of the beam splitters I, Q, and s is used as the beam splitter 52b. Any of the beam splitters G, N, and u is used as the beam splitter 52c. Any of the beam splitters h, k, o, p, s, u, v, x, and y is used as the beam splitter 52d.

In the present embodiment, the wavelengths of the semiconductor lasers 2a, 2b, and 2c may be 660 nm, 400 nm, and 780 nm, respectively. At this time, the beam splitter F is used as the beam splitter 52a. Any of the beam splitters G, M, and T is used as the beam splitter 52b. Any of the beam splitters h, o, s, u, x and y is used as the beam splitter 52c. Any of the beam splitters I, L, Q, R, s, T, v, W and y is used as the beam splitter 52d.

In the present embodiment, the wavelengths of the semiconductor lasers 2a, 2b, and 2c may be 400 nm, 660 nm, and 780 nm, respectively. At this time, the beam splitter F is used as the beam splitter 52a. Any of the beam splitters h, o, and s is used as the beam splitter 52b. Any of the beam splitters G, M, T, u, x and y is used as the beam splitter 52c. Any of the beam splitters I, L, Q, R, s, T, v, W and y is used as the beam splitter 52d.

Further, the semiconductor laser 2c and the photodetector 102b can be replaced with each other, in the present embodiment. In addition, one of the semiconductor lasers 2a and 2b can be replaced with the photodetector 102a, in the present embodiment.

In the thirty-ninth embodiment of the optical head apparatus according to the present invention has the same characteristics as the second embodiment.

Fortieth Embodiment

The fortieth embodiment of the optical head apparatus according to the present invention is basically the same as the embodiment shown in FIG. 3. The wavelengths of the semiconductor lasers 3a, 3b, and 3c are 400 nm, 660 nm, and 780 nm, respectively. The beam splitter A is used as a beam splitter 53a. Any of the beam splitters G, J, M, N, T, u, W, x, and y is used as a bean splitter 53b. Any of the beam splitters h, p, and u is used as a beam splitter 53c. Any of the beam splitters I, R, T, s, v, and y is used as a beam splitter 53d.

Descriptions concerning light having a wavelength of 400 nm and light having a wavelength of 780 nm will be the same as those made in the third embodiment of the optical head apparatus according to the present invention, and will therefore be omitted herefrom.

Light having a wavelength of 660 nm and emitted from the semiconductor laser 3b enters, as S-polarized, into the beam splitter 53c. About 50% of the light is reflected therefrom. Almost all of the light passes through the beam splitter 53a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 53a and enters, as P-polarized, into the beam splitter 53c. About 50% of the light passes through the beam splitter 53c, and enters, as P-polarized, into the beam splitter 53d. Almost all of the light passes through the beam splitter 53d, and is received by the photodetector 103b.

In the present embodiment, the wavelengths of the semiconductor lasers 3a, 3b, and 3c may be 400 nm, 780 nm, and 660 nm, respectively. At this time, the beam splitter A is used as the beam splitter 53a. Any of the beam splitters G, J, M, N, T, u, W, x, and y is used as the beam splitter 53b. Any of the beam splitters I, R and T is used as the beam splitter 53c. Any of the beam splitters h, p, and u is used as the beam splitter 53d.

In the present embodiment, the wavelengths of the semiconductor lasers 3a, 3b, and 3c may be 660 nm, 400 nm, and 780 nm, respectively. At this time, the beam splitter B is used as the beam splitter 53a. Any of the beam splitters h, k, o, p, s, u, v, x, and y is used as the beam splitter 53b. Any of the beam splitters G, N, and u is used as the beam splitter 53c. Any of the beam splitters r, Q, s, T, W and y is used as the beam splitter 53d.

In the present embodiment, the wavelengths of the semiconductor lasers 3a, 3b, and 3c may be 660 nm, 780 nm, and 400 nm, respectively. At this time, the beam splitter B is used as the beam splitter 53a. Any of the beam splitters h, k, o, p, s, u, v, x, and y is used as the beam splitter 53b. Any of the beam splitters I, Q, and s is used as the beam splitter 53c. Any of the beam splitters G, N, and u is used as the beam splitter 53d.

In the present embodiment, the wavelengths of the semiconductor lasers 3a, 3b, and 3c may be 780 nm, 400 nm, and 660 nm, respectively. At this time, the beam splitter C is used as the beam splitter 53a. Any of the beam splitters I, L, Q, R, s, T, v, W and y is used as the beam splitter 53b. Any of the beam splitters G, M, and T is used as the beam splitter 53c. Any of the beam splitters h, o, s, u, x and y is used as the beam splitter 53d.

In the present embodiment, the wavelengths of the semiconductor lasers 3a, 3b, and 3c may be 780 nm, 660 nm, and 400 nm, respectively. At this time, the beam splitter C is used as the beam splitter 53a. Any of the beam splitters I, L, Q, R, s, T, v, W and y is used as the beam splitter 53b. Any of the beam splitters h, o, and s is used as the beam splitter 53c. Any of the beam splitters C, M, T, u, x, and y is used as the beam splitter 53d.

Further, the semiconductor laser 3a and the photodetector 103a can be replaced with each other, in the present embodiment. In addition, one of the semiconductor lasers 3b and 3c can be replaced with the photodetector 103b in the present embodiment.

In the fortieth embodiment of the optical head apparatus according to the present invention has the same characteristics as the third embodiment.

Forty-First Embodiment

The forty-first embodiment of the optical head apparatus according to the present invention is basically the same as the embodiment shown in FIG. 4. The wavelengths of the semiconductor lasers 4a, 4b, and 4c are 400 nm, 660 nm, and 780 nm, respectively. The beam splitter A is used as a beam splitter 54a. Any of the beam splitters G, J, M, N, T, u, W, x and y is used as a beam splitter 54b. Any of the beam splitters k, o, and x is used as a beam splitter 54c. Any of the beam splitters L, Q, W, s, v and y is used as a beam splitter 54d.

Descriptions concerning light having a wavelength of 400 nm and light having a wavelength of 780 nm will be the same as those made in the fourth embodiment of the optical head apparatus according to the present invention, and will therefore be omitted herefrom.

Light having a wavelength of 660 nm and emitted from the semiconductor laser 4b enters, as P-polarized, into the beam splitter 54c. About 50% of the light passes through the beam splitter 54c. Almost all of the light passes through the beam splitter 54a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 54a and enters, as S-polarized, into the beam splitter 54c. About 50% of the light is reflected therefrom, and enters, as S-polarized, into the beam splitter 54d. Almost all of the light is reflected therefrom, and is received by the photodetector 104b.

In the present embodiment, the wavelengths of the semiconductor lasers 4a, 4b, and 4c may be 400 nm, 780 nm, and 660 nm, respectively. At this time, the beam splitter A is used as the beam splitter 54a. Any of the beam splitters G, J, M, N, T, u, W, x, and y is used as the beam splitter 54b. Any of the beam splitters L, Q, and W is used as the beam splitter 54c. Any of the beam splitters k, o, and x is used as the beam splitter 54d.

In the present embodiment, the wavelengths of the semiconductor lasers 4a, 4b, and 4c may be 660 nm, 400 nm, and 780 nm, respectively. At this time, the beam splitter B is used as the beam splitter 54a. Any of the beam splitters h, k, o, p, s, u, v, x, and y is used as the beam splitter 54b. Any of the beam splitters J, M, and x is used as the beam splitter 54c. Any of the beam splitters L, R, v, T, W, and y is used as the beam splitter 54d.

In the present embodiment, the wavelengths of the semiconductor lasers 4a, 4b, and 4c may be 660 nm, 780 nm, and 400 nm, respectively. At this time, the beam splitter B is used as the beam splitter 54a. Any of the beam splitters h, k, o, p, s, u, v, x, and y is used as the beam splitter 54b. Any of the beam splitters L, R, and v is used as the beam splitter 54c. Any of the beam splitters J, M, and x is used as the beam splitter 54d.

In the present embodiment, the wavelengths of the semiconductor lasers 4a, 4b, and 4c may be 780 nm, 400 nm, and 660 nm, respectively. At this time, the beam splitter C is used as the beam splitter 54a. Any of the beam splitters I, L, Q, R, s, T, v, W and y is used as the beam splitter 54b. Any of the beam splitters J, N, and W is used as the beam splitter 54c. Any of the beam splitters k, p, v, u, x, and y is used as the beam splitter 54d.

In the present embodiment, the wavelengths of the semiconductor lasers 4a, 4b, and 4c may be 780 nm, 660 nm, and 400 nm, respectively. At this time, the beam splitter C is used as the beam splitter 54a. Any of the beam splitters I, L, Q, R, s, T, v, w and y is used as the beam splitter 54b. Any of the beam splitters k, p, and v is used as the beam splitter 54c. Any of the beam splitters J, N, W, u, x and y is used as the beam splitter 54d.

Further, the semiconductor laser 4a and the photodetector 104a can be replaced with each other, in the present embodiment. In addition, one of the semiconductor lasers 4b and 4c can be replaced with the photodetector 104b, in the present embodiment.

In the forty-first embodiment of the optical head apparatus according to the present invention has the same characteristics as the fourth embodiment.

17. Forty-Second to Forty-Sixth Embodiments

Type 15

The forty-second to forty-sixth embodiments of the optical head apparatus according to the present invention each have three light sources and one photodetector.

Forty-Second Embodiment

The forty-second embodiment of the optical head apparatus according to the present invention is basically the same as the embodiment shown in FIG. 5. The wavelengths of the semiconductor lasers 5a, 5b, and 5c are 400 nm, 660 nm, and 780 nm, respectively. The beam splitter G is used as a beam splitter 55a. Any of the beam splitters h and u is used as a beam splatter 55b. Any of the beam splitters I, s, T and y is used as a beam splitter 55c.

Descriptions concerning light having a wavelength of 400 nm and light having a wavelength of 780 nm will be the same as those made in the fifth embodiment of the optical head apparatus according to the present invention, and will therefore be omitted herefrom.

Light having a wavelength of 660 nm and emitted from the semiconductor laser 5b enters, as S-polarized, into the beam splitter 55b. About 50% of the light is reflected therefrom. Almost all of the light passes through the beam splitter 55a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 55a and enters, as P-polarized, into the beam splitter 55b. About 50% of the light passes through the beam splitter 55b, and enters, as P-polarized, into the beam splitter 55c. Almost all of the light passes through the beam splitter 55c, and is received by the photodetector 105a.

In the present embodiment, the wavelengths of the semiconductor lasers 5a, 5b, and 5c may be 400 nm, 780 nm, and 660 nm, respectively. At this time, the beam splitter G is used as the beam splitter 55a. Any of the beam splitters I and T is used as the beam splitter 55b. Any of the beam splitters h and u is used as the beam splitter 55c.

In the present embodiment, the wavelengths of the semiconductor lasers 5a, 5b, and 5c may be 660 nm, 400 nm, and 780 nm, respectively. At this time, the beam splitter h is used as the beam splitter 55a. Any of the beam splitters G and u is used as the beam splitter 55b. Any of the beam splitters I, s, T and y is used as the beam splitter 55c.

In the present embodiment, the wavelengths of the semiconductor lasers 5a, 5b, and 5c may be 660 nm, 780 nm, and 400 nm, respectively. At this time, the beam splitter h is used as the beam splitter 55a. Any of the beam splitters I and s is used as the beam splitter 55b. Any of the beam splitters G and u is used as the beam splitter 55c.

In the present embodiment, the wavelengths of the semiconductor lasers 5a, 5b, and 5c may be 780 nm, 400 nm, and 660 nm, respectively. At this time, the beam splitter I is used as the beam splitter 55a. The beam splitter G is used as the beam splitter 55b. Any of the beam splitters h and u is used as the beam splitter 55c.

In the present embodiment, the wavelengths of the semiconductor lasers 5a, 5b, and 5c may be 780 nm, 660 nm, and 400 nm, respectively. At this time, the beam splitter I is used as the beam splitter 55a. The beam splitter h is used as the beam splitter 55b. Any of the beam splitters G and u is used as the beam splitter 55c.

Further, one of the semiconductor lasers 5a, 5b, and 5c can be replaced with the photodetector 105a, in the present embodiment.

In the forty-second embodiment of the optical head apparatus according to the present invention has the same characteristics as the fifth embodiment.

Forty-Third Embodiment

The forty-third embodiment of the optical head apparatus according to the present invention is basically the same as the embodiment shown in FIG. 6. The wavelengths of the semiconductor lasers 6a, 6b, and 6c are 400 nm, 660 nm, and 780 nm, respectively. The beam splitter J is used as a beam splitter 56a. Any of the beam splitters k and x is used as a beam splitter 56b. Any of the beam splitters L, v, W, and y is used as a beam splitter 56c.

Descriptions concerning light having a wavelength of 400 nm and light having a wavelength of 780 nm will be the same as those made in the sixth embodiment of the optical head apparatus according to the present invention, and will therefore be omitted herefrom.

Light having a wavelength of 660 nm and emitted from the semiconductor laser 6b enters, as P-polarized, into the beam splitter 56b. About 50% of the light passes through the beam splitter 56b. Almost all of the light is reflected by the beam splitter 56a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 56a and enters, as S-polarized, into the beam splitter 56b. About 50% of the light is reflected therefrom, and enters, as S-polarized, into the beam splitter 56c. Almost all of the light is reflected therefrom, and is received by the photodetector 106a.

In the present embodiment, the wavelengths of the semiconductor lasers 6a, 6b, and 6c may be 400 nm, 780 nm, and 660 nm, respectively. At this time, the beam splitter J is used as the beam splitter 56a. Any of the beam splitters L and W is used as the beam splitter 56b. Any of the beam splitters k and x is used as the beam splitter 56c.

In the present embodiment, the wavelengths of the semiconductor lasers 6a, 6b, and 6c may be 660 nm, 400 nm, and 780 nm, respectively. At this time, the beam splitter k is used as the beam splitter 56a. Any of the beam splitters J and x is used as the beam splitter 56b. Any of the beam splitters L, v, W, and y is used as the beam splitter 56c.

In the present embodiment, the wavelengths of the semiconductor lasers 6a, 6b, and 6c may be 660 nm, 780 nm, and 400 nm, respectively. At this time, the beam splitter k is used as the beam splitter 56a. Any of the beam splitters L and v is used as the beam splitter 56b. Any of the beam splitters J and x is used as the beam splitter 56c.

In the present embodiment, the wavelengths of the semiconductor lasers 6a, 6b, and 6c may be 780 nm, 400 nm, and 660 nm, respectively. At this time, the beam splitter L is used as the beam splitter 56a. The beam splitter J is used as the beam splitter 56b. Any of the beam splitters k and x is used as the beam splitter 56c.

In the present embodiment, the wavelengths of the semiconductor lasers 6a, 6b, and 6c may be 780 nm, 660 nm, and 400 nm, respectively. At this time, the beam splitter L is used as the beam splitter 56a. The beam splitter k is used as the beam splitter 56b. Any of the beam splitters J and x is used as the beam splitter 56c.

Further, one of the semiconductor lasers 6a, 6b, and 6c can be replaced with the photodetector 106a, in the present embodiment.

In the forty-third embodiment of the optical head apparatus according to the present invention has the same characteristics as the sixth embodiment.

Forty-Fourth Embodiment

The forty-fourth embodiment of the optical head apparatus according to the present invention is basically the same as the embodiment shown in FIG. 7. The wavelengths of the semiconductor lasers 7a, 7b, and 7c are 400 nm, 660 nm, and 780 nm, respectively. The beam splitter G is used as a beam splitter 57a. Any of the beam splitters s and y is used as a beam splitter 57b. Any of the beam splitters C, E, M, k, O and x is used as a beam splitter 57c.

Descriptions concerning light having a wavelength of 400 nm and light having a wavelength of 780 nm will be the same as those made in the seventh embodiment of the optical head apparatus according to the present invention, and will therefore be omitted herefrom.

Almost all of light having a wavelength of 660 nm and emitted from the semiconductor laser 7b passes through the beam splitter 57c, and enters, as S-polarized, into the beam splitter 57b. About 50% of the light is reflected therefrom. Almost all of the light passes through the beam splitter 57a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 57a and enters, as P-polarized, into the beam splitter 57b. About 50% of the light passes through the beam splitter 57b, and is received by the photodetector 107a.

In the present embodiment, the wavelengths of the semiconductor lasers 7a, 7b, and 7c may be 400 nm, 780 nm, and 660 nm, respectively. At this time, the beam splitter G is used as the beam splitter 57a. Any of the beam splitters s and y is used as the beam splitter 57b. Any of the beam splitters B, F, N, h, p, and u is used as the beam splitter 57c.

In the present embodiment, the wavelengths of the semiconductor lasers 7a, 7b, and 7c may be 660 nm, 400 nm, and 780 nm, respectively. At this time, the beam splitter h is used as the beam splitter 57a. Any of the beam splitters T and y is used as the beam splitter 57b. Any of the beam splitters C, D, o, J, M and x is used as the beam splitter 57c.

In the present embodiment, the wavelengths of the semiconductor lasers 7a, 7b, and 7c may be 660 nm, 780 nm, and 400 nm, respectively. At this time, the beam splitter h is used as the beam splitter 57a. Any of the beam splitters T and y is used as the beam splitter 57b. Any of the beam splitters A, F, p, G, N and u is used as the beam splitter 57c.

In the present embodiment, the wavelengths of the semiconductor lasers 7a, 7b and 7c may be 780 nm, 400 nm, and 660 nm, respectively. At this time, the beam splitter I is used as the beam splitter 57a. The beam splitter u is used as the beam splitter 57b. Any of the beam splitters B, D, Q, h, o, s, J, N, W, u, x and y is used as the beam splitter 57c.

In the present embodiment, the wavelengths of the semiconductor lasers 7a, 7b, and 7c may be 780 nm, 660 nm, and 400 nm, respectively. At this time, the beam splitter I is used as the beam splitter 57a. The beam splitter u is used as the beam splitter 57b. Any of the beam splitters A, E, R, G, M, T, k, p, v, u, x and y is used as the beam splitter 57c.

Further, one of the semiconductor lasers 7a, 7b and 7c can be replaced with the photodetector 107a, in the present embodiment.

The forty-fourth embodiment of the optical head apparatus according to the present invention has the same characteristics as the seventh embodiment.

Forty-Fifth Embodiment

The forty-fifth embodiment of the optical head apparatus according to the present invention is basically the same as the embodiment shown in FIG. 8. The wavelengths of the semiconductor lasers 8a, 8b, and 8c are 400 nm, 660 nm, and 780 nm, respectively. The beam splitter J is used as a beam splitter 58a. Any of the beam splitters v and y is used as a beam splitter 58b. Any of the beam splitters B, F, N, h, p and u is used as a beam splitter 58c.

Descriptions concerning light having a wavelength of 400 nm and light having a wavelength of 780 nm will be the same as those made in the eighth embodiment of the optical head apparatus according to the present invention, and will therefore be omitted herefrom.

Almost all of light having a wavelength of 660 nm and emitted from the semiconductor laser 8b is reflected by the beam splitter 58c, and enters, as P-polarized, into the beam splitter 58b. About 50% of the light passes through the beam splitter 58b. Almost all of the light is reflected by the beam splitter 58a. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 58a and enters, as S-polarized, into the beam splitter 58b. About 50% of the light is reflected therefrom, and is received by the photodetector 108a.

In the present embodiment, the wavelengths of the semiconductor lasers 8a, 8b and 8c may be 400 nm, 780 nm, and 660 nm, respectively. At this time, the beam splitter J is used as the beam splitter 58a. Any of the beam splitters v and y is used as the beam splitter 58b. Any of the beam splitters C, E, M, k, o and x is used as the beam splitter 58c.

In the present embodiment, the wavelengths of the semiconductor lasers 8a, 8b and 8c may be 660 nm, 400 nm, and 780 nm, respectively. At this time, the beam splitter k is used as the beam splitter 58a. Any of the beam splitters W and y is used as the beam splitter 58b. Any of the beam splitters A, F, p, G, N and u is used as the beam splitter 58c.

In the present embodiment, the wavelengths of the semiconductor lasers 8a, 8b and 8c may be 660 nm, 780 nm, and 400 nm, respectively. At this time, the beam splitter k is used as the beam splitter 58a. Any of the beam splitters W and y is used as the beam splitter 8b. Any of the beam splitters C, D, o, J, M and x is used as the beam splitter 58c.

In the present embodiment, the wavelengths of the semiconductor lasers 8a, 8b, and 8c may be 780 nm, 400 nm, and 660 nm, respectively. At this time, the beam splitter L is used as the beam splitter 55a. The beam splitter x is used as the beam splitter 58b. Any of the beam splitters A, E, R, k, p, v, G, M, T, u, x and y is used as the beam splitter 58c.

In the present embodiment, the wavelengths of the semiconductor lasers 8a, 8b and 8c may be 780 nm, 660 nm, and 400 nm, respectively. At this time, the beam splitter L is used as the beam splitter 58a. The beam splitter x is used as the beam splitter 58b. Any of the beam splitters B, D, Q, J, N, W, h, o, s, u, x and y is used as the beam splitter 58c.

Further, one of the semiconductor lasers 8a, 8b, and 8c can be replaced with the photodetector 108a, in the present embodiment.

The forty-fifth embodiment of the optical head apparatus according to the present invention has the same characteristics as the eighth embodiment.

Forty-Sixth Embodiment

The forty-sixth embodiment of the optical head apparatus according to the present invention is basically the same as the embodiment shown in FIG. 9. The wavelengths of the semiconductor lasers 9a, 9b, and 9c are 400 nm, 660 nm, and 780 nm, respectively. The beam splitter v is used as a beam splitter 59a. Any of the beam splitters A, E, R, G, M, T, k, p, v, u, x and y is used as a beam splitter 59b. Any of the beam splitters I, s, T and y is used as a beam splitter 59c.

Descriptions concerning light having a wavelength of 400 nm and light having a wavelength of 780 nm will be the same as those made in the ninth embodiment of the optical head apparatus according to the present invention, and will therefore be omitted herefrom.

Almost all of light having a wavelength of 660 nm and emitted from the semiconductor laser 9b passes through the beam splitter 59b, and enters, as S-polarized, into the beam splitter 59a. About 50% of the light is reflected therefrom. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. The light enters, as P-polarized, into the beam splitter 59a. About 50% of the light passes through the beam splitter 59a, and enters, as P-polarized, into the beam splitter 59c. Almost all of the light passes through the beam splitter 59c and is then received by the photodetector 109a.

In the present embodiment, the wavelengths of the semiconductor lasers 9a, 9b and 9c may be 400 nm, 780 nm, and 660 nm, respectively. At this time, the beam splitter T is used as the beam splitter 59a. Any of the beam splitters A, F, p, G, N and u is used as the beam splitter 59b. Any of the beam splitters h and u is used as the beam splitter 59c.

In the present embodiment, the wavelengths of the semiconductor lasers 9a, 9b and 9c may be 660 nm, 400 nm, and 780 nm, respectively. At this time, the beam splitter u is used as the beam splitter 59a. Any of the beam splitters B, D, Q, h, o, s, J, N, W, u, x and y is used as the beam splitter 59b. Any of the beam splitters I, s, T and y is used as the beam splitter 59c.

In the present embodiment, the wavelengths of the semiconductor lasers 9a, 9b and 9c may be 660 nm, 780 nm, and 400 nm, respectively. At this time, the beam splitter s is used as the beam splitter 59a. Any of the beam splitters B, F, N, h, p and u is used as the beam splitter 59b. Any of the beam splitters G and u is used as the beam splitter 59e.

In the present embodiment, the wavelengths of the semiconductor lasers 9a, 9b and 9c may be 780 nm, 400 nm, and 660 nm, respectively. At this time, the beam splitter T is used as the beam splitter 59a. Any of the beam splitters C, D, o, J, M and x is used as the beam splitter 59b. Any of the beam splitters h and u is used as the beam splitter 59c.

In the present embodiment, the wavelengths of the semiconductor lasers 9a, 9b, and 9c may be 780 nm, 660 nm, and 400 nm, respectively. At this time, the beam splitter s is used as the beam splitter 59a. Any of the beam splitters C, E, M, k, o, and x is used as the beam splitter 59b. Any of the beam splitters G and u is used as the beam splitter 59c.

Further, one of the semiconductor lasers 9a, 9b, and 9c can be replaced with the photodetector 109a, in the present embodiment.

The forty-sixth embodiment of the optical head apparatus according to the present invention has the same characteristics as the ninth embodiment.

18. Forty-Seventh Embodiment

Type 16

The forty-seventh embodiment of the optical head apparatus according to the present invention has two light sources and two photodetectors. However, one of the two light sources integrates two light sources.

The forty-seventh embodiment of the optical head apparatus according to the present invention is basically the same as the embodiment shown in FIG. 10. The semiconductor laser 10b integrates two semiconductor lasers. The structure of the semiconductor laser will be described later with reference to FIG. 72. The wavelength of the semiconductor laser 10a is 400 nm, and the wavelengths of the semiconductor laser 10b are 660 nm and 780 nm. The beam splitter A is used as a beat splitter 60*a*. Any of the beam splitters J, M, N, T, u, W, x, and y is used as a beam splitter 60*b*. Any of the beam splitters s, v, and y is used as a beam splitter 60*c*.

Descriptions concerning light having a wavelength of 400 nm and light having a wavelength of 780 nm will be the same as those made in the tenth embodiment of the optical head apparatus according to the present invention, and will therefore be omitted herefrom.

Light having a wavelength of 660 nm and emitted from the semiconductor laser 10*b* enters, as S-polarized, into the beam splitter 60*c*. About 50% of the light is reflected therefrom. Almost all of the light passes through the beam splitter 60*a*. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 60*a* and enters, as P-polarized, into the beam splitter 60*c*. About 50% of the light passes through the beam splitter 60*c*, and is received by the photodetector 110*b*.

In the present embodiment, the wavelength of the semiconductor laser 10*a* may be 660 nm, and the wavelengths of the semiconductor laser 10*b* may be 400 nm and 780 nm. At this time, the beam splitter B is used as the beam splitter 60*a*. Any of the beam splitters h, k, o, p, s, u, v, x and y is used as the beam splitter 60*b*. Any of the beam splitters T, W, and y is used as the beam splitter 60*c*.

In the present embodiment, the wavelength of the semiconductor laser 10*a* may be 780 nm, and the wavelengths of the semiconductor laser 10*b* may be 400 nm and 660 nm. At this time, the beam splitter C is used as the beam splitter 60*a*. Any of the beam splitters I, L, Q, R, s, T, v, W and y is used as the beam splitter 60*b*. Any of the beam splitters u, x, and y is used as the beam splitter 60*c*.

Further, the semiconductor laser 10*a* can be replaced with the photodetector 110*a*, in the present embodiment. Also, the semiconductor laser 10*b* can be replaced with the photodetector 10*b*, in the present embodiment.

The forty-seventh embodiment of the optical head apparatus according to the present invention has the same characteristics as the tenth embodiment.

19. Forty-Eighth and Forty-Ninth Embodiments

Type 17

Each of the forty-eighth and forty-ninth embodiments of the optical head apparatus according to the present invention has two light sources and one photodetector. However, one of the two light sources is constructed by integrating two light sources.

Forty-Eighth Embodiment

The forty-eighth embodiment of the optical head apparatus according to the present invention is basically the same as the embodiment shown in FIG. 11. The semiconductor laser 11*b* is a semiconductor laser which integrates two semiconductor lasers. The structure of the laser will be described later with reference to FIG. 72. The wavelength of the semiconductor laser 11*a* is 400 nm, and the semiconductor laser 11*b* has wavelengths of 660 nm and 780 nm. The beam splitter G is used as a beam splitter 61*a*. Any of the beam splitters s and y is used as a beam splitter 61*b*.

Descriptions concerning light having a wavelength of 400 nm and light having a wavelength of 780 nm will be the same as those made in the eleventh embodiment of the optical head apparatus according to the present invention, and will therefore be omitted herefrom.

Light having a wavelength of 660 nm and emitted from the semiconductor laser 11*b* enters, as S-polarized, into the beam splitter 61*b*. About 50% of the light is reflected therefrom. Almost all of the light then passes through the beam splitter 61*a*. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 61*a* and enters, as P-polarized, into the beam splitter 61*b*. About 50% of the light passes through the beam splitter 61*b* and is received by the photodetector 111*a*.

In the present embodiment, the wavelength of the semiconductor laser 11*a* may be 660 nm and the wavelengths of the semiconductor laser 11*b* may be 400 nm and 780 nm. At this time, the beam splitter h is used as the beam splitter 61*a*. Any of the beam splitters T and y is used as the beam splitter 61*b*. In the present embodiment, the wavelength of the semiconductor laser 11*a* may be 780 nm and the wavelengths of the semiconductor laser 11*b* may be 400 nm and 660 nm. At this time, the beam splitter I is used as the beam splitter 61*a*. The beam splitter u is used as the beam splitter 61*b*.

Further, one of the semiconductor lasers 11*a* and 11*b* can be replaced with the photodetector 111*a*, in the present embodiment.

In the present embodiment, the semiconductor laser 11*a* may be a semiconductor laser integrating two semiconductor lasers. The wavelengths of the semiconductor laser 11*a* may be 660 nm and 780 nm, and the wavelength of the semiconductor laser 11*b* may be 400 nm. At this time, the beam splitter s is used as the beam splitter 61*a*. Any of the beam splitters G and u is used as the beam splitter 61*b*.

In the present embodiment, the semiconductor laser 11*a* may be a semiconductor laser integrating two semiconductor lasers. The wavelengths of the semiconductor laser 11*a* may be 400 nm and 780 nm, and the wavelength of the semiconductor laser 11*b* may be 660 nm. At this time, the beam splitter T is used as the beam splitter 61*a*. Any of the beam splitters h and u is used as the beam splitter 61*b*.

In the present embodiment, the semiconductor laser 11*a* may be a semiconductor laser integrating two semiconductor lasers. The wavelengths of the semiconductor laser 11*a* may be 400 nm and 660 nm, and the wavelength of the semiconductor laser 11*b* may be 780 nm. At this time, the beam splitter u is used as the beam splitter 61*a*. Any of the beam splitters I, s, T and y is used as the beam splitter 61*b*.

Further, the semiconductor laser 11*a* may be a semiconductor laser integrating two semiconductor lasers, and one of the semiconductor lasers 11*a* and 11*b* may be replaced with the photodetector 111*a*, in the present embodiment.

The forty-eighth embodiment of the optical head apparatus according to the present invention has the same characteristics as the eleventh embodiment.

Forty-Ninth Embodiment

The forty-ninth embodiment of the optical head apparatus according to the present invention is basically the same as the embodiment shown in FIG. 12. The semiconductor laser 12*b* is a semiconductor laser which integrates two semiconductor lasers. The structure of the laser will be described later with reference to FIG. 72. The wavelength of the semiconductor laser 12*a* is 400 nm, and the semiconductor laser 12*b* has wavelengths of 660 nm and 780 nm. The beam splitter J is used as a beam splitter 62*a*. Any of the beam splitters v and y is used as a beam splitter 62*b*.

Descriptions concerning light having a wavelength of 400 nm and light having a wavelength of 780 nm will be the same as those made in the twelfth embodiment of the optical head apparatus according to the present invention, and will therefore be omitted herefrom.

Light having a wavelength of 660 nm and emitted from the semiconductor laser 12*b* enters, as P-polarized, into the beam splitter 62*b*. About 50% of the light passes through the beam splitter 62*b*. Almost all of the light is reflected by the beam splitter 62*a*. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 62*a* and enters, as S-polarized, into the beam splitter 62*b*. About 50% of the light is reflected therefrom and is received by the photodetector 112*a*.

In the present embodiment, the wavelength of the semiconductor laser 12*a* may be 660 nm and the wavelengths of the semiconductor laser 12*b* may be 400 nm and 780 nm. At this time, the beam splitter k is used as the beam splitter 62*a*. Any of the beam splitters W and y is used as the beam splitter 62*b*. In the present embodiment, the wavelength of the semiconductor laser 12*a* may be 780 nm and the wavelengths of the semiconductor laser 12*b* may be 400 nm and 660 nm. At this time, the beam splitter L is used as the beam splitter 62*a*. The beam splitter x is used as the beam splitter 62*b*.

Further, one of the semiconductor lasers 12*a* and 12*b* can be replaced with the photodetector 112*a*, in the present embodiment.

In the present embodiment, the semiconductor laser 12*a* may be a semiconductor laser integrating two semiconductor lasers. The wavelengths of the semiconductor laser 12*a* may be 660 nm and 780 nm, and the wavelength of the semiconductor laser 12*b* may be 400 nm. At this time, the beam splitter v is used as the beam splitter 62*a*. Any of the beam splitters J and x is used as the beam splitter 62*b*.

In the present embodiment, the semiconductor laser 12*a* may be a semiconductor laser integrating two semiconductor lasers. The wavelengths of the semiconductor laser 12*a* may be 400 nm and 780 nm, and the wavelength of the semiconductor laser 12*b* may be 660 nm. At this time, the beam splitter w is used as the beam splitter 62*a*. Any of the beam splitters k and x is used as the beam splitter 62*b*.

In the present embodiment, the semiconductor laser 12*a* may be a semiconductor laser integrating two semiconductor lasers. The wavelengths of the semiconductor laser 12*a* may be 400 nm and 660 nm, and the wavelength of the semiconductor laser 12*b* may be 780 nm. At this time, the beam splitter x is used as the beam splitter 62*a*. Any of the beam splitters L, v, W and y is used as the beam splitter 62*b*.

Further, the semiconductor laser 12*a* may be a semiconductor laser integrating two semiconductor lasers, and one of the semiconductor lasers 12*a* and 12*b* may be replaced with the photodetector 112*a*, in the present embodiment.

The forty-ninth embodiment of the optical head apparatus according to the present invention has the same characteristics as the twelfth embodiment.

20. Fiftieth Embodiment

Type 18

The fiftieth embodiment of the optical head apparatus according to the present invention has one light source and one photodetector. However, the one light source integrates three light sources.

The fiftieth embodiment of the optical head apparatus according to the present invention is basically the same as the embodiment shown in FIG. 13. The semiconductor laser 13*a* integrates three semiconductor lasers. The structure of the laser will be described later with reference to FIG. 73. The wavelengths of the semiconductor laser 13*a* are 400 nm, 660 nm, and 780 nm. The beam splitter y is used as a beam splitter 63*a*.

Descriptions concerning light having a wavelength of 400 nm and light having a wavelength of 780 nm will be the same as those made in the thirteenth embodiment of the optical head apparatus according to the present invention, and will therefore be omitted herefrom.

Light having a wavelength of 660 nm and emitted from the semiconductor laser 13*a* enters, as S-polarized, into the beam splitter 63*a*. About 50% of the light is reflected therefrom. The light is further reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201 and enters, as P-polarized, into the beam splitter 63*a*. About 50% of the light passes through the beam splitter 63*a* and is received by the photodetector 113*a*.

The fiftieth embodiment of the optical head apparatus according to the present invention has the same characteristics as the thirteenth embodiment.

21. Fifty-First to Fifty-Sixth Embodiments

Type 19

The fifty-first to fifty-sixth embodiments of the optical head apparatus according to the present invention each have two light sources, two photodetectors, and one module. The one module integrates one light source and one photodetector.

Fifty-First Embodiment

The fifty-first embodiment of the optical head apparatus according to the present invention is basically the same as the embodiment shown in FIG. 14. The module 164a is a module which integrates one semiconductor laser and one photodetector. The structure of the module will be described later with reference to FIG. 74. The wavelength of the semiconductor laser integrated in the module 164a is 400 nm. The wavelengths of the semiconductor lasers 14a and 14b are 660 nm and 780 nm, respectively. The beam splitter A is used as a beam splitter 64a. Any of the beam splitters B, F, and N is used as a beam splitter 64b. Any of the beam splitters h, k, o, p, s, u, v, x, and y is used as a beam splitter 64c. Any of the beam splitters I, L, Q, R, s, T, v, w and y is used as a beam splitter 64d.

Descriptions concerning light having a wavelength of 400 nm and light having a wavelength of 780 nm will be the same as those made in the fourteenth embodiment of the optical head apparatus according to the present invention, and will therefore be omitted herefrom.

Light having a wavelength of 660 nm and emitted from the semiconductor laser 14a enters, as P-polarized, into the beam splitter 64c. About 50% of the light passes through the beam splitter 64c. Almost all of the light is reflected by the beam splitter 64b. Almost all of the light further passes through the beam splitter 64a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 64a and is reflected by the beam splitter 64b. The light then enters, as S-polarized, into the beam splitter 64c. About 50% of the light is reflected therefrom and is received by the photodetector 114a.

In the present embodiment, the wavelength of the semiconductor laser integrated in the module 164a may be 400 nm, and the wavelengths of the semiconductor lasers 14a and 14b may be 780 nm and 660 nm, respectively. At this time, the beam splitter A is used as the beam splitter 64a. Any of the beam splitters C, E, and M is used as the beam splitter 64b. Any of the beam splitters I, L, Q, R, s, T, v, W and y is used as the beam splitter 64c. Any of the beam splitters h, k, o, p, s, v, v, x, and y is used as the beam splitter 64d.

In the present embodiment, the wavelength of the semiconductor laser integrated in the module 164a may be 660 nm, and the wavelengths of the semiconductor lasers 14a and 14b may be 400 nm and 780 nm, respectively. At this time, the beam splitter B is used as the beam splitter 64a. Any of the beam splitters A, F, and p is used as the beam splitter 64b. Any of the beam splitters G, J, M, N, T, u, W, x, and y is used as the beam splitter 64c. Any of the beam splitters I, L, Q, R, s, T, v, W and y is used as the beam splitter 64d.

In the present embodiment, the wavelength of the semiconductor laser integrated in the module 164a may be 660 nm, and the wavelengths of the semiconductor lasers 14a and 14b may be 780 nm and 400 nm, respectively. At this time, the beam splitter B is used as the beam splitter 64a. Any of the beam splitters C, D, and o is used as the beam splitter 64b. Any of the beam splitters I, L, Q, R, s, T, v, W and y is used as the beam splitter 64c. Any of the beam splitters G, J, M, N, T, u, W, x, and y is used as the beam splitter 64d.

In the present embodiment, the wavelength of the semiconductor laser integrated in the module 164a may be 780 nm, and the wavelengths of the semiconductor lasers 14a and 14b may be 400 nm and 660 nm, respectively. At this time, the beam splitter C is used as the beam splitter 64a. Any of the beam splitters A, E, and R is used as the beam splitter 64b. Any of the beam splitters G, J, M, N, T, u, W, x, and y is used as the beam splitter 64c. Any of the beam splitters h, k, o, p, s, u, v, x, and y is used as the beam splitter 64d.

In the present embodiment, the wavelength of the semiconductor laser integrated in the module 164a may be 780 nm, and the wavelengths of the semiconductor lasers 14a and 14b may be 660 nm and 400 nm, respectively. At this time, the beam splitter C is used as the beam splitter 64a. Any of the beam splitters B, D, and Q is used as the beam splitter 64b. Any of the beam splitters h, k, o, p, s, u, v, x, and y is used as the beam splitter 64c. Any of the beam splitters G, J, M, N, T, u, W, x, and y is used as the beam splitter 64d.

Further, the semiconductor laser 14a can be replaced with a photodetector 114a, in the present embodiment. Also, in the present embodiment, the semiconductor laser 14b can be replaced with a photodetector 114b.

The fifty-first embodiment of the optical head apparatus according to the present invention has the same characteristics as the fourteenth embodiment.

Fifty-Second Embodiment

The fifty-second embodiment of the optical head apparatus according to the present invention is basically the same as the embodiment shown in FIG. 15. The module 165a is a module which integrates one semiconductor laser and one photodetector. The structure of the module will be described later with reference to FIG. 74. The wavelength of the semiconductor laser integrated in the module 165a is 400 nm. The wavelengths of the semiconductor lasers 15a and 15b are 660 nm and 780 nm, respectively. The beam splitter D is used as a beam splitter 65a. Any of the beam splitters C, E, and M is used as a beam splitter 65b. Any of the beam splitters h, k, o, p, s, u, v, x, and y is used as a beam splitter 65c. Any of the beam splitters I, L, Q, R, s, T, v, W and y is used as a beam splitter 65d.

Descriptions concerning light having a wavelength of 400 nm and light having a wavelength of 780 nm will be the same as those made in the fifteenth embodiment of the optical head apparatus according to the present invention, and will therefore be omitted herefrom.

Light having a wavelength of 660 nm and emitted from the semiconductor laser 15a enters, as S-polarized, into the beam splitter 65c. About 50% of the light is reflected therefrom. Almost all of the light then passes through the beam splitter 65b and is then reflected by the beam splitter 65a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 65a and passes through the beam splitter 65b. The light then enters, as P-polarized, into the beam splitter 65c. About 50% of the light passes through the beam splitter 65c and is received by the photodetector 115a.

In the present embodiment, the wavelength of the semiconductor laser integrated in the module 165a may be 400 nm, and the wavelengths of the semiconductor lasers 15a and 15b may be 780 nm and 660 nm, respectively. At this time, is the beam splitter D is used as the beam splitter 65a. Any of the beam splitters B, F, and N is used as the beam splitter 65b. Any of the beam splitters I, L, Q, R, s, T, v, W and y is used as the beam splitter 65c. Any of the beam splitters h, k, o, p, s, u, v, x, and y is used as the beam splitter 65d.

In the present embodiment, the wavelength of the semiconductor laser integrated in the module 165a may be 660 nm, and the wavelengths of the semiconductor lasers 15a and 15b may be 400 nm and 780 nm, respectively. At this time, the beam splitter E is used as the beam splitter 65a. Any of the beam splitters C, D, and o is used as the beam splitter 65b. Any of the beam splitters G, J, M, N, T, u, W, x, and y is used as the beam splitter 65c. Any of the beam splitters I, L, Q, R, s, T, v, W and y is used as the beam splitter 65d.

In the present embodiment, the wavelength of the semiconductor laser integrated in the module 165a may be 660 nm, and the wavelengths of the semiconductor lasers 15a and 15b may be 780 nm and 400 nm, respectively. At this time, the beam splitter E is used as the beam splitter 65a. Any of the beam splitters A, F, and p is used as the beam splitter 65b. Any of the beam splitters I, L, Q, R, s, T, v, W and y is used as the beam splitter 65c. Any of the beam splitters G, J, M, N, T, u, W, x and y is used as the beam splitter 65d.

In the present embodiment, the wavelength of the semiconductor laser integrated in the module 165a may be 780 nm, and the wavelengths of the semiconductor lasers 15a and 15b may be 400 nm and 660 nm, respectively. At this time, the beam splitter E is used as the beam splitter 65a. Any of the beam splitters B, D, and Q is used as the beam splitter 65b. Any of the beam splitters G, J, M, N, T, u, W, x, and y is used as the beam splitter 65c. Any of the beam splitters h, k, o, p, s, u, v, x, and y is used as the beam splitter 65d.

In the present embodiment, the wavelength of the semiconductor laser integrated in the module 165a may be 780 nm, and the wavelengths of the semiconductor lasers 15a and 15b may be 660 nm and 400 nm, respectively. At this time, the beam splitter F is used as the beam splitter 65a. Any of the beam splitters A, E, and R is used as the beam splitter 65b. Any of the beam splitters h, k, o, p, s, u, v, x, and y is used as the beam splitter 65c. Any of the beam splitters G, J, M, N, T, u, W, x, and y is used as the beam splitter 65d.

Further, the semiconductor laser 15a can be replaced with a photodetector 115a in the present embodiment. Also, in the present embodiment, the semiconductor laser 15b can be replaced with a photodetector 115b.

The fifty-second embodiment of the optical head apparatus according to the present invention has the same characteristics as the fifteenth embodiment.

Fifty-Third Embodiment

The fifty-third embodiment of the optical head apparatus according to the present invention is basically the same as the embodiment shown in FIG. 16. The module 166a is a module which integrates one semiconductor laser and one photodetector. The structure of the module will be described later with reference to FIG. 74. The wavelength of the semiconductor laser integrated in the module 166a is 780 nm. The wavelengths of the semiconductor lasers 16a and 16b are 660 nm and 400 nm, respectively. The beam splitter D is used as a beam splitter 66a. Any of the beam splitters k, o, and x is used as a beam splitter 66b. Any of the beam splitters B, F, N, h, p, and U is used as a beam splitter 66c. Any of the beam splitters G, J, M, N, T, u, W, x, and y is used as a beam splitter 66d.

Descriptions concerning light having a wavelength of 400 nm and light having a wavelength of 780 nm will be the same as those made in the sixteenth embodiment of the optical head apparatus according to the present invention, and will therefore be omitted herefrom.

Light having a wavelength of 660 nm and emitted from the semiconductor laser 16a enters, as P-polarized, into the beam splitter 66b. About 50% of the light passes through the beam splitter 66b. Almost all of the light is then reflected by the beam splitter 66a. The light is reflected by the mirror 201 and is transformed from linearly polarized light into circularly polarized light by the wavelength plate 202. The light is then converged on a disk 204 according to the DVD standard by the objective lens 205. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 66a and enters, as S-polarized, into the beam splitter 66b. About 50% of the light is reflected therefrom and enters, as S-polarized, into the beam splitter 66c. Almost all of the light is reflected therefrom and is received by the photodetector 116a.

In the present embodiment, the wavelength of the semiconductor laser integrated in the module 166a may be 660 nm, and the wavelengths of the semiconductor lasers 16a and 16b may be 780 nm and 400 nm, respectively. At this time, the beam splitter D is used as the beam splitter 66a. Any of the beam splitters L, Q, and W is used as the beam splitter 66b. Any of the beam splitters C, E, and M is used as the beam splitter 66c. Any of the beam splitters G, J, M, N, T, u, W, x, and y is used as the beam splitter 66d.

In the present embodiment, the wavelength of the semiconductor laser integrated in the module 166a may be 780 nm, and the wavelengths of the semiconductor lasers 16a and 16b may be 400 nm and 660 nm, respectively. At this time, the beam splitter E is used as the beam splitter 66a. Any of the beam splitters J, M, and x is used as the beam splitter 66b. Any of the beam splitters A, F, p, G, N, and u is used as the beam splitter 66c. Any of the beam splitters h, k, o, p, s, u, v, x, and y is used as the beam splitter 66d.

In the present embodiment, the wavelength of the semiconductor laser integrated in the module 166a may be 400 nm, and the wavelengths of the semiconductor lasers 16a and 16b may be 780 nm and 660 nm, respectively. At this time, the beam splitter E is used as the beam splitter 66a. Any of the beam splitters L, R, and v is used as the beam splitter 66b. Any of the beam splitters C, D, and o is used as the beam splitter 66c. Any of the beam splitters h, k, o, p, s, u, v, x, and y is used as the beam splitter 66d.

In the present embodiment, the wavelength of the semiconductor laser integrated in the module 166a may be 660 nm, and the wavelengths of the semiconductor lasers 16a and 16b may be 400 nm and 780 nm, respectively. At this time, the beam splitter F is used as the beam splitter 66a. Any of the beam splitters J, N, and W is used as the beam splitter 66b. Any of the beam splitters A, E, R, G, M, and T is used as the beam splitter 66c. Any of the beam splitters I, L, Q, R, s, T, v, W and y is used as the beam splitter 66d.

In the present embodiment, the wavelength of the semiconductor laser integrated in the module 16a may be 400 nm, and the wavelengths of the semiconductor lasers 16a and 16b may be 660 nm and 780 nm, respectively. At this time, the beam splitter F is used as the beam splitter 66a. Any of the beam splitters k, p, and v is used as the beam splitter 66b. Any of the beam splitters B, D, Q, h, o, and s is used as the beam splitter 66c. Any of the beam splitters I, L, Q, R, s, T, v, W and y is used as the beam splitter 66d.

Further, the semiconductor laser 16b can be replaced with a photodetector 116b in the present embodiment. Also, in the present embodiment, the module 166a, semiconductor laser 16a, and photodetector 116a can be replaced with each other.

The fifty-third embodiment of the optical head apparatus according to the present invention has the same characteristics as the sixteenth embodiment.

Fifty-Fourth Embodiment

The fifty-fourth embodiment of the optical head apparatus according to the present invention is basically the same as the embodiment shown in FIG. 17. The module 167a is a module which integrates one semiconductor laser and one photodetector. The structure of the module will be described later with reference to FIG. 74. The wavelength of the semiconductor laser integrated in the module 167a is 780 nm. The wavelengths of the semiconductor lasers 17a and 17b are 660 nm and 400 nm, respectively. The beam splitter D is used as a beam splitter 67a. Any of the beam splitters h, p, and u is used as a beam splitter 67b. Any of the beam splitters C, E, M, k, o, and x is used as a beam splitter 67c. Any of the beam splitters G, J, M, N, T, u, W, x, and y is used as a beam splitter 67d.

Descriptions concerning light having a wavelength of 400 nm and light having a wavelength of 780 nm will be the same as those made in the seventeenth embodiment of the optical head apparatus according to the present invention, and will therefore be omitted herefrom.

Light having a wavelength of 660 nm and emitted from the semiconductor laser 17a enters, as S-polarized, into the beam splitter 67b. About 50% of the light is reflected therefrom and is then reflected by the beam splitter 67a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 67a and enters, as P-polarized, into the beam splitter 67b. About 50% of the light passes through the beam splitter 67b and enters, as P-polarized, into the beam splitter 67c. Almost all of the light passes through the beam splitter 67c and is received by the photodetector 117a.

In the present embodiment, the wavelength of the semiconductor laser integrated in the module 167a may be 660 nm, and the wavelengths of the semiconductor lasers 17a and 17b may be 780 nm and 400 nm, respectively. At this time, the beam splitter D is used as the beam splitter 67a. Any of the beam splitters I, R and T is used as the beam splitter 67b. Any of the beam splitters B, F, and N is used as the beam splitter 67c. Any of the beam splitters G, J, M, N, T, u, W, x, and y is used as the beam splitter 67d.

In the present embodiment, the wavelength of the semiconductor laser integrated in the module 167a may be 780 nm, and the wavelengths of the semiconductor lasers 17a and 17b may be 400 nm and 660 nm, respectively. At this time, the beam splitter E is used as the beam splitter 67a. Any of the beam splitters G, N, and u is used as the beam splitter 67b. Any of the beam splitters C, D, o, J, M, and x is used as the beam splitter 67c. Any of the beam splitters h, k, o, p, s, u, v, x, and y is used as the beam splitter 67d.

In the present embodiment, the wavelength of the semiconductor laser integrated in the module 167a may be 400 nm, and the wavelengths of the semiconductor lasers 17a and 17b may be 780 nm and 660 nm, respectively. At this time, the beam splitter E is used as the beam splitter 67a. Any of the beam splitters I, Q and a is used as the beam splitter 67b. Any of the beam splitters A, F, and p is used as the beam splitter 67c. Any of the beam splitters h, k, o, p, s, u, v, x, and y is used as the beam splitter 67d.

In the present embodiment, the wavelength of the semiconductor laser integrated in the module 167a may be 660 nm, and the wavelengths of the semiconductor lasers 17a and 17b may be 400 nm and 780 nm, respectively. At this time, the beam splitter F is used as the beam splitter 67a. Any of the beam splitters G, M, and T is used as the beam splitter 67b. Any of the beam splitters B, D, Q, J, N, and W is used as the beam splitter 67c. Any of the beam splitters I, L, Q, R, s, T, v, W and y is used as the beam splitter 67d.

In the present embodiment, the wavelength of the semiconductor laser integrated in the module 167a may be 400 nm, and the wavelengths of the semiconductor lasers 17a and 17b may be 660 nm and 780 nm, respectively. At this time, the beam splitter F is used as the beam splitter 67a. Any of the beam splitters h, o, and s is used as the beam splitter 67b. Any of the beam splitters A, E, R, k, p, and v is used as the beam splitter 67c. Any of the beam splitters I, L, Q, R, s, T, v, W and y is used as the beam splitter 67d.

Further, the semiconductor laser 17b can be replaced with a photodetector 117b in the present embodiment. Also, in the present embodiment, the module 167a, semiconductor laser 17a, and photodetector 117a can be replaced with each other.

The fifty-fourth embodiment of the optical head apparatus according to the present invention has the same characteristics as the seventeenth embodiment.

Fifty-Fifth Embodiment

The fifty-fifth embodiment of the optical head apparatus according to the present invention is basically the same as the embodiment shown in FIG. 18. The module 168a is a module which integrates one semiconductor laser and one photodetector. The structure of the module will be described later with reference to FIG. 74. The wavelength of the semiconductor laser integrated in the module 168a is 780 nm. The wavelengths of the semiconductor lasers 18a and 18b are 400 nm and 660 nm, respectively. The beat splitter A is used as a beam splitter 68a. Any of the beam splitters G, J, M, N, T, u, W, x, and y is used as a beam splitter 68b. Any of the beam splitters h, p, and u is used as a beam splitter 68c. Any of the beam splitters C, E, M, k, o, and x is used as a beam splitter 68d.

Descriptions concerning light having a wavelength of 400 nm and light having a wavelength of 780 nm will be the same as those made in the eighteenth embodiment of the optical head apparatus according to the present invention, and will therefore be omitted herefrom.

Light having a wavelength of 660 nm and emitted from the semiconductor laser 18b enters, as S-polarized, into the beam splitter 68a. About 50% of the light is reflected therefrom. Almost all of the light passes through the beam splitter 68a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 68a and enters, as P-polarized, into the beam splitter 68c. About 50% of the light passes through the beam splitter 68c and enters, as P-polarized, into the beam splitter 68d. Almost all of the light passes through the beam splitter 68d and is received by the photodetector 118b.

In the present embodiment, the wavelength of the semiconductor laser integrated in the module 168a may be 660 nm, and the wavelengths of the semiconductor lasers 18a and 18b may be 400 nm and 780 nm, respectively. At this time, the beam splitter A is used as the beam splitter 68a. Any of the beam splitters G, J, M, N, T, u, W, x, and y is used as the beam splitter 68b. Any of the beam splitters I, R and T is used as the beam splitter 68c. Any of the beam splitters B, F, and N is used as the beam splitter 68d.

In the present embodiment, the wavelength of the semiconductor laser integrated in the module 16a may be 780 nm, and the wavelengths of the semiconductor lasers 18a and 18b may be 660 nm and 400 nm, respectively. At this time, the beam splitter B is used as the beam splitter 68a. Any of the beam splitters h, k, o, p, s, u, v, x, and y is used as the beam splitter 68b. Any of the beam splitters G, N, and u is used as the beam splitter 68c. Any of the beam splitters C, D, o, J, M, and x is used as the beam splitter 68d.

In the present embodiment, the wavelength of the semiconductor laser integrated in the module 168a may be 400 nm, and the wavelengths of the semiconductor lasers 18a and 18b may be 660 nm and 780 nm, respectively. At this time, the beam splitter B is used as the beam splitter 68a. Any of the beam splitters h, k, o, p, s, u, v, x, and y is used as the beam splitter 68b. Any of the beam splitters I, Q and s is used as the beam splitter 68c. Any of the beam splitters A, F, and p is used as the beam splitter 68d.

In the present embodiment, the wavelength of the semiconductor laser integrated in the module 168a may be 660 nm, and the wavelengths of the semiconductor lasers 18a and 18b may be 780 nm and 400 nm, respectively. At this time, the beam splitter C is used as the beam splitter 68a. Any of the beam splitters I, L, Q, R, s, T, v, W and y is used as the beam splitter 68b. Any of the beam splitters G, M, and T is used as the beam splitter 68c. Any of the beam splitters B, D, Q, J, N, and W is used as the beam splitter 68d.

In the present embodiment, the wavelength of the semiconductor laser integrated in the module 168a may be 400 nm, and the wavelengths of the semiconductor lasers 18a and 18b may be 780 nm and 660 nm, respectively. At this time, the beam splitter C is used as the beam splitter 68a. Any of the beam splitters I, L, Q, R, s, T, v, W and y is used as the beam splitter 68b. Any of the beam splitters h, o, and s is used as the beam splitter 68c. Any of the beam splitters A, E, R, k, p, and v is used as the beam splitter 68d.

Further, the semiconductor laser 18a can be replaced with a photodetector 118a in the present embodiment. Also, in the present embodiment, the module 168a, semiconductor laser 18b, and photodetector 118b can be replaced with each other.

The fifty-fifth embodiment of the optical head apparatus according to the present invention has the same characteristics as the eighteenth embodiment.

Fifty-Sixth Embodiment

The fifty-sixth embodiment of the optical head apparatus according to the present invention is basically the same as the embodiment shown in FIG. 19. The module 169a is a module which integrates one semiconductor laser and one photodetector. The structure of the module will be described later with reference to FIG. 74. The wavelength of the semiconductor laser integrated in the module 169a is 780 nm. The wavelengths of the semiconductor lasers 19a and 19b are 400 nm and 660 nm, respectively. The beam splitter A is used as a beam splitter 69a. Any of the beam splitters G, J, M, N, T, u, W, x, and y is used as a beam splitter 69b. Any of the beam splitters k, o, and x is used as a beam splitter 69c. Any of the beam splitters B, F, N, h, p, and u is used as a beam splitter 69d.

Descriptions concerning light having a wavelength of 400 nm and light having a wavelength of 780 nm will be the same as those made in the nineteenth embodiment of the optical head apparatus according to the present invention, and will therefore be omitted herefrom.

Light having a wavelength of 660 nm and emitted from the semiconductor laser 19b enters, as P-polarized, into the beam splitter 69c. About 50% of the light passes through the beam splitter 69c. Almost all of the light further passes through the beam splitter 69a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 69a and enters, as S-polarized, into the beam splitter 69c. About 50% of the light is reflected therefrom and enters, as S-polarized, into the beam splitter 69d. Almost all of the light is reflected therefrom and is received by the photodetector 119b.

In the present embodiment, the wavelength of the semiconductor laser integrated in the module 169a may be 660 nm, and the wavelengths of the semiconductor lasers 19a and 19b may be 400 nm and 780 nm, respectively. At this time, the beam splitter A is used as the beam splitter 69a. Any of the beam splitters G, J, M, N, T, u, W, x, and y is used as the beam splitter 69b. Any of the beam splitters L, Q, and W is used as the beam splitter 69c. Any of the beam splitters C, E, and M is used as the beam splitter 69d.

In the present embodiment, the wavelength of the semiconductor laser integrated in the module 169a may be 780 nm, and the wavelengths of the semiconductor lasers 19a and 19b may be 660 nm and 400 nm, respectively. At this time, the beam splitter B is used as the beam splitter 69a. Any of the beam splitters h, k, o, p, s, u, v, x, and y is used as the beam splitter 69b. Any of the beam splitters J, M, and x is used as the beam splitter 69c. Any of the beam splitters A, F, p, G, N, and u is used as the beam splitter 69d.

In the present embodiment, the wavelength of the semiconductor laser integrated in the module 169a may be 400 nm, and the wavelengths of the semiconductor lasers 19a and 19b may be 660 nm and 780 nm, respectively. At this time, the beam splitter B is used as the beam splitter 69a. Any of the beam splitters h, k, o, p, s, u, v, x, and y is used as the beam splitter 69b. Any of the beam splitters L, R, and v is used as the beam splitter 69c. Any of the beam splitters C, D, and o is used as the beam splitter 69d.

In the present embodiment, the wavelength of the semiconductor laser integrated in the module 169a may be 660 nm, and the wavelengths of the semiconductor lasers 19a and 19b may be 780 nm and 400 nm, respectively. At this time, the beam splitter C is used as the beam splitter 69a. Any of the beam splitters I, L, Q, R, s, T, v, W and y is used as the beam splitter 69b. Any of the beam splitters J, N, and W is used as the beam splitter 69c. Any of the beam splitters A, E, R, G, M, and T is used as the beam splitter 69d.

In the present embodiment, the wavelength of the semiconductor laser integrated in the module 169a may be 400 nm, and the wavelengths of the semiconductor lasers 19a and 19b may be 780 nm and 660 nm, respectively. At this time, the beam splitter C is used as the beam splitter 69a. Any of the beam splitters I, L, Q, R, s, T, v, W and y is used as the beam splitter 69b. Any of the beam splitters k, p, and v is used as the beam splitter 69c. Any of the beam splitters B, D, Q, h, o, and s is used as the beam splitter 69d.

Further, the semiconductor laser 19a can be replaced with a photodetector 119a in the present embodiment. Also, in the present embodiment, the module 169a, semiconductor laser 19b, and photodetector 119b can be replaced with each other.

The fifty-sixth embodiment of the optical head apparatus according to the present invention has the same characteristics as the nineteenth embodiment.

22. Fifty-Seventh to Sixty-First Embodiments

Type 20

The fifty-seventh to sixty-first embodiments of the optical head apparatus according to the present invention each have one light source, one photodetector, and two modules. However, each of the two modules integrates one light source and one photodetector.

Fifty-Seventh Embodiment

The fifty-seventh embodiment of the optical head apparatus according to the present invention is basically the same as the embodiment shown in FIG. 20. The modules 170a and 170b are modules each of which integrates one semiconductor laser and one photodetector. The structure of each module will be described later with reference to FIG. 74. The wavelengths of the semiconductor lasers integrated in the modules 170a and 170b are 780 nm and 660 nm, respectively. The wavelength of the semiconductor laser 20a is 400 nm. The beam splitter C is used as a beam splitter 70a. Any of the beam splitters B, D, and Q is used as a beam splitter 70b. Any of the beam splitters G, J, M, N, T, u, W, x, and y is used as a beam splitter 70c.

Descriptions concerning light having a wavelength of 400 nm, light having a wavelength of 660 nm, and light having a wavelength of 780 nm will be the same as those made in the twentieth embodiment of the optical head apparatus according to the present invention, and will therefore be omitted herefrom.

In the present embodiment, the wavelengths of the semiconductor lasers integrated in the modules 170a and 170b may be 660 nm and 780 nm, respectively, and the wavelength of the semiconductor laser 20a may be 400 nm. At this time, the beam splitter B is used as the beam splitter 70a. Any of the beam splitters C, D, and o is used as the beam splitter 70b. Any of the beam splitters G, J, M, N, T, u, W, x, and y is used as the beam splitter 70c.

In the present embodiment, the wavelengths of the semiconductor lasers in the modules 170a and 170b may be 780 nm and 400 nm, respectively, and the wavelength of the semiconductor laser 20a may be 660 nm. At this time, the beam splitter C is used as the beam splitter 70a. Any of the beam splitters A, E, and R is used as the beam splitter 70b. Any of the beam splitters h, k, o, p, s, u, v, x, and y is used as the beam splitter 70c.

In the present embodiment, the wavelengths of the semiconductor lasers in the modules 170a and 170b may be 400 nm and 780 nm, respectively, and the wavelength of the semiconductor laser 20a may be 660 nm. At this time, the beam splitter A is used as the beam splitter 70a. Any of the beam splitters C, E, and M is used as the beam splitter 70b. Any of the beam splitters h, k, o, p, s, u, v, x, and y is used as the beam splitter 70c.

In the present embodiment, the wavelengths of the semiconductor lasers 170a and 170b may be 660 nm and 400 nm, respectively, and the wavelength of the semiconductor laser 20a may be 780 nm. At this time, the beam splitter B is used as the beam splitter 70a. Any of the beam splitters A, F, and p is used as the beam splitter 70b. Any of the beam splitters I, L, Q, R, s, T, v, W and y is used as the beam splitter 70c.

In the present embodiment, the wavelengths of the semiconductor lasers 170a and 170b may be 400 nm and 660 nm, respectively, and the wavelength of the semiconductor laser 20a may be 780 nm. At this time, the beam splitter A is used as the beam splitter 70a. Any of the beam splitters B, F, and N is used as the beam splitter 70b. Any of the beam splitters I, L, Q, R, s, T, v, W and y is used as the beam splitter 70c.

Further, the modules 170a and 170b, semiconductor laser 20a, and photodetector 120a can be replaced with each other, in the present embodiment.

The fifty-seventh embodiment of the optical head apparatus according to the present invention has the same characteristics as the twentieth embodiment.

Fifty-Eighth Embodiment

The fifty-eighth embodiment of the optical head apparatus according to the present invention is basically the same as the embodiment shown in FIG. 21. The modules 171a and 171b are modules each of which integrates one semiconductor laser and one photodetector. The structure of each module will be described later with reference to FIG. 74. The wavelengths of the semiconductor lasers integrated in the modules 171a and 171b are 780 nm and 660 nm, respectively. The wavelength of the semiconductor laser 21a is 400 nm. The beam splitter F is used as a beam splitter 71a. Any of the beam splitters A, E, and R is used as a beam splitter 71b. Any of the beam splitters G, J, M, N, T, u, W, x, and y is used as a beam splitter 71c.

Descriptions concerning light having a wavelength of 400 nm, light having a wavelength of 660 nm, and light having a wavelength of 780 nm will be the same as those made in the twenty-first embodiment of the optical head apparatus according to the present invention, and will therefore be omitted herefrom.

In the present embodiment, the wavelengths of the semiconductor lasers integrated in the modules 171a and 171b may be 660 nm and 780 nm, respectively, and the wavelength of the semiconductor laser 21a may be 400 nm. At this time, the beam splitter E is used as the beam splitter 71a. Any of the beam splitters A, F, and p is used as the beam splitter 71b. Any of the beam splitters G, J, M, N, T, u, W, x, and y is used as the beam splitter 71c.

In the present embodiment, the wavelengths of the semiconductor lasers integrated in the modules 171a and 171b may be 780 nm and 400 nm, respectively, and the wavelength of the semiconductor laser 21a may be 660 nm. At this time, the beam splitter F is used as the beam splitter 71a. Any of the beam splitters B, D, and Q is used as the beam splitter 71b. Any of the beam splitters h, k, o, p, s, u, v, x, and y is used as the beam splitter 71c.

In the present embodiment, the wavelengths of the semiconductor lasers in the modules 171a and 171b may be 400 nm and 780 nm, respectively, and the wavelength of the semiconductor laser 21a may be 660 nm. At this time, the beam splitter D is used as the beam splitter 71a. Any of the beam splitters B, F, and N is used as the beam splitter 71b. Any of the beam splitters h, k, o, p, s, u, v, x, and y is used as the beam splitter 71c.

In the present embodiment, the wavelengths of the semiconductor lasers 171a and 171b may be 660 nm and 400 nm, respectively, and the wavelength of the semiconductor laser 21a may be 780 nm. At this time, the beam splitter E is used as the beam splitter 71a. Any of the beam splitters C, D, and o is used as the beam splitter 71b. Any of the beam splitters I, L, Q, R, s, T, v, W and y is used as the beam splitter 71c.

In the present embodiment, the wavelengths of the semiconductor lasers 171a and 171b may be 400 nm and 660 nm, respectively, and the wavelength of the semiconductor laser 21a may be 780 nm. At this time, the beam splitter D is used as the beam splitter 71a. Any of the beam splitters C, E, and M is used as the beam splitter 71b. Any of the beam splitters I, L, Q, R, s, T, v, W and y is used as the beam splitter 71c.

Further, the modules 171a and 171b, semiconductor laser 21a, and photodetector 121a can be replaced with each other, in the present embodiment.

The fifty-eighth embodiment of the optical head apparatus according to the present invention has the same characteristics as the twenty-first embodiment.

Fifty-Ninth Embodiment

The fifty-ninth embodiment of the optical head apparatus according to the present invention is basically the same as the embodiment shown in FIG. 22. The modules 172a and 172b are modules each of which integrates one semiconductor laser and one photodetector. The structure of each module will be described later with reference to FIG. 74. The wavelengths of the semiconductor lasers integrated in the modules 172a and 172b are 780 nm and 660 nm, respectively. The wavelength of the semiconductor laser 22a is 400 nm. The beam splitter C is used as a beam splitter 72a. Any of the beam splitters A, E, and R is used as a beam splitter 72b. Any of the beam splitters G, J, M, N, T, u, W, x, and y is used as a beam splitter 72c.

Descriptions concerning light having a wavelength of 400 nm, light having a wavelength of 660 nm, and light having a wavelength of 780 nm will be the same as those made in the twenty-second embodiment of the optical head apparatus according to the present invention, and will therefore be omitted herefrom.

In the present embodiment, the wavelengths of the semiconductor lasers integrated in the modules 172a and 172b may be 660 nm and 780 nm, respectively, and the wavelength of the semiconductor laser 22a may be 400 nm. At this time, the beam splitter B is used as the beam splitter 72a. Any of the beam splitters A, F, and p is used as the beam splitter 72b. Any of the beam splitters G, J, M, N, T, u, W, x, and y is used as the beam splitter 72c.

In the present embodiment, the wavelengths of the semiconductor lasers integrated in the modules 172a and 172b may be 780 nm and 400 nm, respectively, and the wavelength of the semiconductor laser 22a may be 660 nm. At this time, the beam splitter C is used as the beam splitter 72a. Any of the beam splitters B, D, and Q is used as the beam splitter 72b. Any of the beam splitters h, k, o, p, s, u, v, x, and y is used as the beam splitter 72c.

In the present embodiment, the wavelengths of the semiconductor lasers in the modules 172a and 172b may be 400 nm and 780 nm, respectively, and the wavelength of the semiconductor laser 22a may be 660 nm. At this time, the beam splitter A is used as the beam splitter 72a. Any of the beam splitters B, F, and N is used as the beam splitter 72b. Any of the beam splitters h, k, o, p, s, u, v, x, and y is used as the beam splitter 72c.

In the present embodiment, the wavelengths of the semiconductor lasers 172a and 172b may be 660 nm and 400 nm, respectively, and the wavelength of the semiconductor laser 22a may be 780 nm. At this time, the beam splitter B is used as the beam splitter 72a. Any of the beam splitters C, D, and o is used as the beam splitter 72b. Any of the beam splitters I, L, Q, R, s, T, v, W and y is used as the beam splitter 72c.

In the present embodiment, the wavelengths of the semiconductor lasers 172a and 172b may be 400 nm and 660 nm, respectively, and the wavelength of the semiconductor laser 22a may be 760 nm. At this time, the beam splitter A is used as the beam splitter 72a. Any of the beam splitters C, E, and M is used as the beam splitter 72b. Any of the beam splitters I, L, Q, R, s, T, v, W and y is used as the beam splitter 72c.

Further, the modules 172a and 172b, semiconductor laser 22a, and photodetector 122a can be replaced with each other, in the present embodiment.

The fifty-ninth embodiment of the optical head apparatus according to the present invention has the same characteristics as the twenty-second embodiment.

Sixtieth Embodiment

The sixtieth embodiment of the optical head apparatus according to the present invention is basically the same as the embodiment shown in FIG. 23. The modules 173a and 173b are modules each of which integrates one semiconductor laser and one photodetector. The structure of each module will be described later with reference to FIG. 74. The wavelengths of the semiconductor lasers integrated in the modules 173a and 173b are 780 nm and 660 nm, respectively. The wavelength of the semiconductor laser 23a is 400 nm. The beam splitter F is used as a beam splitter 73a. Any of the beam splitters B, D, and Q is used as a beam splitter 73b. Any of the beam splitters G, J, M, N, T, u, W, x, and y is used as a beam splitter 73c.

Descriptions concerning light having a wavelength of 400 nm, light having a wavelength of 660 nm, and light having a wavelength of 780 nm will be the same as those made in the twenty-third embodiment of the optical head apparatus according to the present invention, and will therefore be omitted herefrom.

In the present embodiment, the wavelengths of the semiconductor lasers integrated in the modules 173a and 173b may be 660 nm and 780 nm, respectively, and the wavelength of the semiconductor laser 23a may be 400 nm. At this time, the beam splitter E is used as the beam splitter 73a. Any of the beam splitters C, D, and o is used as the beam splitter 73b. Any of the beam splitters G, J, M, N, T, u, W, x, and y is used as the beam splitter 73c.

In the present embodiment, the wavelengths of the semiconductor lasers integrated in the modules 173a and 173b may be 780 nm and 400 nm, respectively, and the wavelength of the semiconductor laser 23a may be 660 nm. At this time, the beam splitter F is used as the beam splitter 73a. Any of the beam splitters A, E, and R is used as the beam splitter 73b. Any of the beam splitters h, k, o, p, s, u, v, x, and y is used as the beam splitter 73c.

In the present embodiment, the wavelengths of the semiconductor lasers in the modules 173a and 173b may be 400 nm and 780 nm, respectively, and the wavelength of the semiconductor laser 23a may be 660 nm. At this time, the beam splitter D is used as the beam splitter 73a. Any of the beam splitters C, E, and M is used as the beam splitter 73b. Any of the beam splitters h, k, o, p, s, u, v, x, and y is used as the beam splitter 73c.

In the present embodiment, the wavelengths of the semiconductor lasers 173a and 173b may be 660 nm and 400 nm, respectively, and the wavelength of the semiconductor laser 23a may be 780 nm. At this time, the beam splitter E is used as the beam splitter 73a. Any of the beam splitters A, F, and p is used as the beam splitter 73b. Any of the beam splitters I, L, Q, R, s, T, v, W and y is used as the beam splitter 73c.

In the present embodiment, the wavelengths of the semiconductor lasers 173a and 173b may be 400 nm and 660 nm, respectively, and the wavelength of the semiconductor laser 23a may be 780 nm. At this time, the beam splitter D is used as the beam splitter 73a. Any of the beam splitters B, F, and N is used as the beam splitter 73b. Any of the beam splitters I, L, Q, R, s, T, v, W, and y is used as the beam splitter 73c.

Further, the modules 173a and 173b, semiconductor laser 23a, and photodetector 123a can be replaced with each other, in the present embodiment.

The sixtieth embodiment of the optical head apparatus according to the present invention has the same characteristics as the twenty-third embodiment.

Sixty-First Embodiment

The sixty-first embodiment of the optical head apparatus according to the present invention is basically the same as the embodiment shown in FIG. 24. The modules 174a and 174b are modules each of which integrates one semiconductor laser and one photodetector. The structure of each module will be described later with reference to FIG. 74. The wavelengths of the semiconductor lasers integrated in the modules 174a and 174b are 780 nm and 660 nm, respectively. The wavelength of the semiconductor laser 24a is 400 nm. The beam splitter D is used as a beam splitter 74a. Any of the beam splitters C, E, and M is used as a beam splitter 74b. Any of the beam splitters G, J, M, N, T, u, W, x, and y is used as a beam splitter 74c.

Descriptions concerning light having a wavelength of 400 nm, light having a wavelength of 660 nm, and light having a wavelength of 780 nm will be the same as those made in the twenty-fourth embodiment of the optical head apparatus according to the present invention, and will therefore be omitted herefrom.

In the present embodiment, the wavelengths of the semiconductor lasers integrated in the modules 174a and 174b may be 660 nm and 780 nm, respectively, and the wavelength of the semiconductor laser 24a may be 400 nm. At this time, the beam splitter D is used as the beam splitter 74a. Any of the beam splitters B, F, and N is used as the beam splitter 74b. Any of the beam splitters G, J, M, N, T, u, W, x, and y is used as the beam splitter 74c.

In the present embodiment, the wavelengths of the semiconductor lasers integrated in the modules 174a and 174b may be 780 nm and 400 nm, respectively, and the wavelength of the semiconductor laser 24a may be 660 nm. At this time, the beam splitter E is used as the beam splitter 74a. Any of the beam splitters C, D, and o is used as the beam splitter 74b. Any of the beam splitters h, k, o, p, s, u, v, x, and y is used as the beam splitter 74c.

In the present embodiment, the wavelengths of the semiconductor lasers in the modules 174a and 174b may be 400 nm and 780 nm, respectively, and the wavelength of the semiconductor laser 24a may be 660 nm. At this time, the beam splitter E is used as the beam splitter 74a. Any of the beam splitters A, F, and p is used as the beam splitter 74b. Any of the beam splitters h, k, o, p, s, u, v, x, and y is used as the beam splitter 74c.

In the present embodiment, the wavelengths of the semiconductor lasers 174a and 174b may be 660 nm and 400 nm, respectively, and the wavelength of the semiconductor laser 24a may be 780 nm. At this time, the beam splitter F is used as the beam splitter 74a. Any of the beam splitters B, D, and Q is used as the beam splitter 74b. Any of the beam splitters I, L, Q, R, s, T, v, W and y is used as the beam splitter 74c.

In the present embodiment, the wavelengths of the semiconductor lasers 174a and 174b may be 400 nm and 660 nm, respectively, and the wavelength of the semiconductor laser 24a may be 780 nm. At this time, the beam splitter F is used as the beam splitter 74a. Any of the beam splitters A, E, and R is used as the beam splitter 74b. Any of the beam splitters I, L, Q, R, s, T, v, W and y is used as the beam splitter 74c.

Further, the semiconductor laser 24a and the photodetector 124a can be replaced with each other, in the present embodiment. Also, one of the modules 174a and 174b can be replaced with the semiconductor laser 24a, and the other one of the modules 174a and 174b can be replaced with the photodetector 124a, in the present embodiment.

The sixty-first embodiment of the optical head apparatus according to the present invention has the same characteristics as the twenty-fourth embodiment.

23. Sixty-Second to Sixty-Sixth Embodiments

Type 21

The sixty-second to sixty-sixth embodiments of the optical head apparatus according to the present invention each have two light sources, one photodetector, and one module. However, the one module integrates one light source and one photodetector.

Sixty-Second Embodiment

The sixty-second embodiment of the optical head apparatus according to the present invention is basically the same as the embodiment shown in FIG. 25. The module 175a integrates one semiconductor laser and one photodetector. The structure of the module will be described later with reference to FIG. 74. The wavelength of the semiconductor laser integrated in the module 175a is 400 nm. The wavelengths of the semiconductor lasers 25a and 25b are 660 nm and 780 nm, respectively. The beam splitter A is used as a beam splitter 75a. Any of the beam splitters h, p, and u is used as a beam splitter 75b. Any of the beam splitters I, R, T, s, v and y is used as a beam splitter 75c.

Descriptions concerning light having a wavelength of 400 nm and light having a wavelength of 780 nm will be the same as those made in the twenty-fifth embodiment of the optical head apparatus according to the present invention, and will therefore be omitted herefrom.

Light having a wavelength of 660 nm and emitted from the semiconductor laser 25a enters, as S-polarized, into the beam splitter 75b. About 50% of the light is reflected therefrom.

Almost all of the light then passes through the beam splitter 75a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 75a and enters, as P-polarized, into the beam splitter 75b. About 50% of the light passes through the beam splitter 75b, and enters, as P-polarized, into the beam splitter 75c. Almost all of the light passes through the beam splitter 75c and is received by the photodetector 125a.

In the present embodiment, the wavelength of the semiconductor laser integrated in the module 175a may be 400 nm, and the wavelengths of the semiconductor lasers 25a and 25b may be 780 nm and 660 nm, respectively. At this time, the beam splitter A is used as the beam splitter 75a. Any of the beam splitters I, R and T is used as the beam splitter 75b. Any of the beam splitters h, p, and u is used as the beam splitter 75c.

In the present embodiment, the wavelength of the semiconductor laser integrated in the module 175a may be 660 nm, and the wavelengths of the semiconductor lasers 25a and 25b may be 400 nm and 780 nm, respectively. At this time, the beam splitter B is used as the beam splitter 75a. Any of the beam splitters G, N, and u is used as the beam splitter 75b. Any of the beam splitters I, Q, s, T, W and y is used as the beam splitter 75c.

In the present embodiment, the wavelength of the semiconductor laser integrated in the module 175a may be 660 nm, and the wavelengths of the semiconductor lasers 25a and 25b may be 780 nm and 400 nm, respectively. At this time, the beam splitter B is used as the beam splitter 75a. Any of the beam splitters I, Q and s is used as the beam splitter 75b. Any of the beam splitters G, N, and u is used as the beam splitter 75c.

In the present embodiment, the wavelength of the semiconductor laser integrated in the module 175a may be 780 nm, and the wavelengths of the semiconductor lasers 25a and 25b may be 400 nm and 660 nm, respectively. At this time, the beam splitter C is used as the beam splitter 75a. Any of the beam splitters G, M, and T is used as the beam splitter 75b. Any of the beam splitters h, o, s, u, x, and y is used as the beam splitter 75c.

In the present embodiment, the wavelength of the semiconductor laser integrated in the module 175a may be 780 nm, and the wavelengths of the semiconductor lasers 25a and 25b may be 660 nm and 400 nm, respectively. At this time, the beam splitter C is used as the beam splitter 75a. Any of the beam splitters h, o, and s is used as the beam splitter 75b. Any of the beam splitters G, M, T, u, x, and y is used as the beam splitter 75c.

Further, the module 175a, semiconductor lasers 25a and 25b, and photodetector 125a can be replaced with each other, in the present embodiment.

The sixty-second embodiment of the optical head apparatus according to the present invention has the same characteristics as the twenty-fifth embodiment.

Sixty-Third Embodiment

The sixty-third embodiment of the optical head apparatus according to the present invention is basically the same as the embodiment shown in FIG. 26. The module 176a integrates one semiconductor laser and one photodetector. The structure of the module will be described later with reference to FIG. 74. The wavelength of the semiconductor laser integrated in the module 176a is 400 nm. The wavelengths of the semiconductor lasers 26a and 26b are 660 nm and 780 nm, respectively. The beam splitter D is used as a beam splitter 76a. Any of the beam splitters k, o, and x is used as a beam splitter 76b. Any of the beam splitters L, Q, W, s, v, and y is used as a beam splitter 76c.

Descriptions concerning light having a wavelength of 400 nm and light having a wavelength of 780 nm will be the same as those made in the twenty-sixth embodiment of the optical head apparatus according to the present invention, and will therefore be omitted herefrom.

Light having a wavelength of 660 nm and emitted from the semiconductor laser 26a enters, as P-polarized, into the beam splitter 76b. About 50% of the light passes through the beam splitter 76b. Almost all of the light is reflected by the beam splitter 76a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 76a and enters, as S-polarized, into the beam splitter 76b. About 50% of the light is reflected therefrom, and enters, as S-polarized, into the beam splitter 76c. Almost all of the light is reflected therefrom and is received by the photodetector 126a.

In the present embodiment, the wavelength of the semiconductor laser integrated in the module 176a may be 400 nm, and the wavelengths of the semiconductor lasers 26a and 26b may be 780 nm and 660 nm, respectively. At this time, the beam splitter D is used as the beam splitter 76a. Any of the beam splitters L, Q, and W is used as the beam splitter 76b. Any of the beam splitters k, o, and x is used as the beam splitter 76c.

In the present embodiment, the wavelength of the semiconductor laser integrated in the module 176a may be 660 nm, and the wavelengths of the semiconductor lasers 26a and 26b may be 400 nm and 780 nm, respectively. At this time, the beam splitter E is used as the beam splitter 76a. Any of the beam splitters J, M, and x is used as the beam splitter 76b. Any of the beam splitters L, R, v, T, W, and y is used as the beam splitter 76c.

In the present embodiment, the wavelength of the semiconductor laser integrated in the module 176a may be 660 nm, and the wavelengths of the semiconductor lasers 26a and 26b may be 780 nm and 400 nm, respectively. At this time, the beam splitter E is used as the beam splitter 76a. Any of the beam splitters L, R, and v is used as the beam splitter 76b. Any of the beam splitters J, M, and x is used as the beam splitter 76c.

In the present embodiment, the wavelength of the semiconductor laser integrated in the module 176a may be 780 nm, and the wavelengths of the semiconductor lasers 26a and 26b may be 400 nm and 660 nm, respectively. At this time, the beam splitter F is used as the beam splitter 76a. Any of the beam splitters J, N, and W is used as the beam splitter 76b. Any of the beam splitters k, p, v, u, x, and y is used as the beam splitter 76c.

In the present embodiment, the wavelength of the semiconductor laser integrated in the module 176a may be 780 nm, and the wavelengths of the semiconductor lasers 26a and 26b may be 660 nm and 400 nm, respectively. At this time, the beam splitter F is used as the beam splitter 76a. Any of the beam splitters k, p, and v is used as the beam splitter 76b. Any of the beam splitters J, N, W, u, x, and y is used as the beam splitter 76c.

Further, the modules 176a, semiconductor lasers 26a and 26b, and photodetector 126a can be replaced with each other, in the present embodiment.

The sixty-third embodiment of the optical head apparatus according to the present invention has the same characteristics as the twenty-sixth embodiment.

Sixty-Fourth Embodiment

The sixty-fourth embodiment of the optical head apparatus according to the present invention is basically the same as the embodiment shown in FIG. 27. The module 177a integrates one semiconductor laser and one photodetector. The structure of the module will be described later with reference to FIG. 74. The wavelength of the semiconductor laser integrated in the module 177a is 400 nm The wavelengths of the semiconductor lasers 27a and 27b are 660 nm and 780 nm, respectively. The beam splitter A is used as a beam splitter 77a. Any of the beam splitters s, v, and y is used as a beam splitter 77b. Any of the beam splitters C, E, M, k, o, and x is used as a beam splitter 77c.

Descriptions concerning light having a wavelength of 400 nm and light having a wavelength of 780 nm will be the same as those made in the twenty-seventh embodiment of the optical head apparatus according to the present invention, and will therefore be omitted herefrom.

Light having a wavelength of 660 nm and emitted from the semiconductor laser 27a passes through the beam splitter 77c and enters, as S-polarized, into the beam splitter 77b. About 50% of the light is reflected therefrom. Almost all of the light passes through the beam splitter 77a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 77a and enters, as P-polarized, into the beam splitter 77b. About 50% of the light passes through the beam splitter 77b and is received by the photodetector 127a.

In the present embodiment, the wavelength of the semiconductor laser integrated in the module 177a may be 400 nm, and the wavelengths of the semiconductor lasers 27a and 27b may be 780 nm and 660 nm, respectively. At this time, the beam splitter A is used as the beam splatter 77a. Any of the beam splitters s, v, and y is used as the beam splitter 77b. Any of the beam splitters B, F, N, h, p, and u is used as the beam splitter 77c.

In the present embodiment, the wavelength of the semiconductor laser integrated in the module 177a may be 660 nm, and the wavelengths of the semiconductor lasers 27a and 27b may be 400 nm and 780 nm, respectively. At this time, the beam splitter B is used as the beam splitter 77a. Any of the beam splitters T, W, and y is used as the beam splitter 77b. Any of the beam splitters C, D, o, J, M, and x is used as the beam splitter 77c.

In the present embodiment, the wavelength of the semiconductor laser integrated in the module 177a may be 660 nm, and the wavelengths of the semiconductor lasers 27a and 27b may be 780 nm and 400 nm, respectively. At this time, the beam splitter B is used as the beam splitter 77a. Any of the beam splitters T, W, and y is used as the beam splitter 77b. Any of the beam splitters A, F, p, G, N, and u is used as the beam splitter 77c.

In the present embodiment, the wavelength of the semiconductor laser integrated in the module 177a may be 780 nm, and the wavelengths of the semiconductor lasers 27a and 27b may be 400 nm and 660 nm, respectively. At this time, the beam splitter C is used as the beam splitter 77a. Any of the beam splitters u, x, and y is used as the beam splitter 77b. Any of the beam splitters B, D, Q, h, o, s, J, N, W, u, x, and y is used as the beam splitter 77c.

In the present embodiment, the wavelength of the semiconductor laser integrated in the module 177a may be 780 nm, and the wavelengths of the semiconductor lasers 27a and 27b may be 660 nm and 400 nm, respectively. At this time, the beam splitter C is used as the beam splitter 77a. Any of the beam splitters u, x, and y is used as the beam splitter 77b. Any of the beam splitters A, E, R, G, M, T, k, p, v, u, x, and y is used as the beam splitter 77c.

Further, the modules 177a, semiconductor lasers 27a and 27b, and photodetector 127a ran be replaced with each other, in the present embodiment.

The sixty-fourth embodiment of the optical head apparatus according to the present invention has the same characteristics as the twenty-seventh embodiment.

Sixty-Fifth Embodiment

The sixty-fifth embodiment of the optical head apparatus according to the present invention is basically the same as the embodiment shown in FIG. 28. The module 178a integrates one semiconductor laser and one photodetector. The structure of the module will be described later with reference to FIG. 74. The wavelength of the semiconductor laser integrated in the module 178a is 400 nm. The wavelengths of the semiconductor lasers 28a and 28b are 660 nm and 780 nm, respectively. The beam splitter D is used as a beam splitter 78a. Any of the beam splitters S, v, and y is used as a beam splitter 78b. Any of the beam splitters B, F, N, h, p, and u is used as a beam splitter 78c.

Descriptions concerning light having a wavelength of 400 nm and light having a wavelength of 780 nm will be the same as those made in the twenty-eighth embodiment of the optical head apparatus according to the present invention, and will therefore be omitted herefrom.

Almost all of light having a wavelength of 660 nm and emitted from the semiconductor laser 28a is reflected by the beam splitter 78a and enters, as P-polarized, into the beam splitter 78b. About 50% of the light passes through the beam splitter 78b. Almost all of the light is reflected by the beam splitter 78a. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 78a and enters, as S-polarized, into the beam splitter 78b. About 50% of the light is reflected therefrom and is received by the photodetector 128a.

In the present embodiment, the wavelength of the semiconductor laser integrated in the module 176a may be 400 nm, and the wavelengths of the semiconductor lasers 28a and 28b may be 780 nm and 660 nm, respectively. At this time, the beam splitter D is used as the beam splitter 78a. Any of the beam splitters s, v, and y is used as the beam splitter 78b. Any of the beam splitters C, E, M, k, o, and x is used as the beam splitter 78c.

In the present embodiment, the wavelength of the semiconductor laser integrated in the module 178a may be 660 nm, and the wavelengths of the semiconductor lasers 28a and 28b may be 400 nm and 780 nm, respectively. At this time, the beam splitter E is used as the beam splitter 78a. Any of the beam splitters T, W, and y is used as the beam splitter 78b. Any of the beam splitters A, F, p, G, N, and u is used as the beam splitter 78c.

In the present embodiment, the wavelength of the semiconductor laser integrated in the module 178a may be 660 nm, and the wavelengths of the semiconductor lasers 28a and 28b may be 780 nm and 400 nm, respectively. At this time, the beam splitter E is used as the beam splitter 78a. Any of the beam splitters T, W, and y is used as the beam splitter 78b. Any of the beam splitters C, D, o, J, X, and x is used as the beam splitter 78c.

In the present embodiment, the wavelength of the semiconductor laser integrated in the module 178a may be 780 nm, and the wavelengths of the semiconductor lasers 28a and 28b may be 400 nm and 660 nm, respectively. At this time, the beam splitter F is used as the beam splitter 78a. Any of the beam splitters u, x, and y is used as the beam splitter 78b. Any of the beam splitters A, E, R, k, p, v, G, M, T, u, x, and y is used as the beam splitter 78c.

In the present embodiment, the wavelength of the semiconductor laser integrated in the module 178a may be 780 nm, and the wavelengths of the semiconductor lasers 28a and 28b may be 660 nm and 400 nm, respectively. At this time, the beam splitter F is used as the beam splitter 78a. Any of the beam splitters u, x, and y is used as the beam splitter 78b. Any of the beam splitters B, D, Q, J, N, W, h, o, s, u, x, and y is used as the beam splitter 78c.

Further, the module 178a, semiconductor lasers 28a and 28b, and photodetector 128a can be replaced with each other, in the present embodiment.

The sixty-fifth embodiment of the optical head apparatus according to the present invention has the same characteristics as the twenty-eighth embodiment.

Sixty-Sixth Embodiment

The sixty-sixth embodiment of the optical head apparatus according to the present invention is basically the same as the embodiment shown in FIG. 29. The modules 179a integrates one semiconductor laser and one photodetector. The structure of the module will be described later with reference to FIG. 74. The wavelength of the semiconductor laser integrated in the module 179a is 400 nm. The wavelengths of the semiconductor lasers 29a and 29b are 660 nm and 780 nm, respectively. The beam splitter p is used as a beam splitter 79a. Any of the beam splitters A, E, R, k, p, and v, is used as a beam splitter 79b. Any of the beam splitters I, R, T, s, v and y is used as a beam splitter 79c.

Descriptions concerning light having a wavelength of 400 nm and light having a wavelength of 780 nm will be the same as those made in the twenty-ninth embodiment of the optical head apparatus according to the present invention, and will therefore be omitted herefrom.

Almost all of light having a wavelength of 660 nm and emitted from the semiconductor laser 29a passes through the beam splitter 79b and enters, as S-polarized, into the beam splitter 79a. About 50% all of the light is reflected therefrom. The light is then reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. The light enters, as P-polarized, into the beam splitter 79a. About 50% of the light passes through the beam splitter 79a and enters, as P-polarized, into the beam splitter 79c. Almost all of the light passes through the beam splitter 79c and is received by the photodetector 129a.

In the present embodiment, the wavelength of the semiconductor laser integrated in the module 179a may be 400 nm, and the wavelengths of the semiconductor lasers 29a and 29b may be 780 nm and 660 nm, respectively. At this time, the beam splitter R is used as the beam splitter 79a. Any of the beam splitters A, F, and p is used as the beam splitter 79b. Any of the beam splitters h, p, and u is used as the beam splitter 79c.

In the present embodiment, the wavelength of the semiconductor laser integrated in the module 179a may be 660 nm, and the wavelengths of the semiconductor lasers 29a and 29b may be 400 nm and 780 nm, respectively. At this time, the beam splitter N is used as the beam splitter 79a. Any of the beam splitters B, D, Q, J, N, and W is used as the beam splitter 79b. Any of the beam splitters I, Q, s, T, W and y is used as the beam splitter 79c.

In the present embodiment, the wavelength of the semiconductor laser integrated in the module 175a may be 660 nm, and the wavelengths of the semiconductor lasers 29a and 29b may be 780 nm and 400 nm, respectively. At this time, the beam splitter Q is used as the beam splitter 79a. Any of the beam splitters B, F, and N is used as the beam splitter 79b. Any of the beam splitters G, N, and u is used as the beam splitter 79c.

In the present embodiment, the wavelength of the semiconductor laser integrated in the module 179a may be 780 nm, and the wavelengths of the semiconductor lasers 29a and 29b may be 400 mm and 660 nm, respectively. At this time, the beam splitter M is used as the beam splitter 79a. Any of the beam splitters C, D, o, J, M, and x is used as the beam splitter 79b. Any of the beam splitters h, o, s, u, x, and y is used as the beam splitter 79c.

In the present embodiment, the wavelength of the semiconductor laser integrated in the module 179a may be 780 nm, and the wavelengths of the semiconductor lasers 29a and 29b may be 660 nm and 400 nm, respectively. At this time, the beam splitter o is used as the beam splitter 79a. Any of the beam splitters C, E, M, k, o, and x is used as the beam splitter 79b. Any of the beam splitters G, M, T, u, x, and y is used as the beam splitter 79c.

Further, the module 179a, semiconductor lasers 29a and 29b, and photodetector 129a can be replaced with each other, in the present embodiment.

The sixty-sixth embodiment of the optical head apparatus according to the present invention has the same characteristics as the twenty-ninth embodiment.

24. Sixty-Seventh and Sixty-Eighth Embodiments

Type 22

The sixty-seventh and sixty-eighth embodiments of the optical head apparatus according to the present invention each have three modules. However, each of the three modules integrates one light source and one photodetector.

Sixty-Seventh Embodiment

The sixty-seventh embodiment of the optical head apparatus according to the present invention is basically the same as the embodiment shown in FIG. 30. The modules 180a, 180b, and 180c each integrate one semiconductor laser and one photodetector. The structure of each module will be described later with reference to FIG. 74. The wavelengths of the semiconductor lasers integrated in the modules 180a, 180b, and 180c are 780 nm, 660 nm, and 400 nm, respectively. The beam splitter C is used as a beam splitter 80a. Any of the beam splitters B, D, and Q is used as a beam splitter 80b.

Descriptions concerning light having a wavelength of 400 nm, light having a wavelength of 660 nm, and light having a wavelength of 780 nm will be the same as those made in the thirtieth embodiment of the optical head apparatus according to the present invention, and will therefore be omitted herefrom.

In the present embodiment, the wavelengths of the semiconductor lasers integrated in the modules 180a, 180b, and 180c may be 660 nm, 780 nm, and 400 nm, respectively. At this time, the beam splitter B is used as the beam splitter 80a. Any of the beam splitters C, D, and o is used as the beam splitter 80b.

In the present embodiment, the wavelengths of the semiconductor lasers integrated in the modules 180a, 180b, and 180c may be 780 nm, 400 nm, and 660 nm, respectively. At this time, the beam splitter C is used as the beam splitter 80a. Any of the beam splitters A, E, and R is used as the beam splitter 80b.

In the present embodiment, the wavelengths of the semiconductor lasers integrated in the modules 180a, 180b, and 180c may be 400 nm, 780 nm, and 660 nm, respectively. At this time, the beam splitter A is used as the beam splitter 80a. Any of the beam splitters C, E, and M is used as the beam splitter 80b.

In the present embodiment, the wavelengths of the semiconductor lasers integrated in the modules 180a, 180b, and 180c may be 660 nm, 400 nm, and 780 nm, respectively. At this time, the beam splitter B is used as the beam splitter 80a. Any of the beam splitters A, F, and p is used as the beam splitter 80b.

In the present embodiment, the wavelengths of the semiconductor lasers integrated in the modules 180a, 180b, and 180c may be 400 nm, 660 nm, and 780 nm, respectively. At this time, the beam splitter A is used as the beam splitter 80a. Any of the beam splitters B, F, and N is used as the beam splitter 80b.

The sixty-seventh embodiment of the optical head apparatus according to the present invention has the same characteristics as the thirtieth embodiment.

Sixty-Eighth Embodiment

The sixty-eighth embodiment of the optical head apparatus according to the present invention is basically the same as the embodiment shown in FIG. 31. The modules 181a, 181b, and 181c each integrate one semiconductor laser and one photodetector. The structure of each module will be described later with reference to FIG. 74. The wavelengths of the semiconductor lasers integrated in the modules 181a, 181b, and 181c are 780 nm, 660 nm, and 400 nm, respectively. The beam splitter F is used as a beam splitter 81a. Any of the beam splitters A, E, and R is used as a beam splitter 81b.

Descriptions concerning light having a wavelength of 400 nm, light having a wavelength of 660 nm, and light having a wavelength of 780 nm will be the same as those made in the thirty-first embodiment of the optical head apparatus according to the present invention, and will therefore be omitted herefrom.

In the present embodiment, the wavelengths of the semiconductor lasers integrated in the modules 181a, 181b, and 181c may be 660 nm, 780 nm, and 400 nm, respectively. At this time, the beam splitter E is used as the beam splitter 81a. Any of the beam splitters A, F, and p is used as the beam splitter 81b.

In the present embodiment, the wavelengths of the semiconductor lasers integrated in the modules 181a, 181b, and 181c may be 780 nm, 400 nm, and 660 nm, respectively. At this time, the beam splitter F is used as the beam splitter 81a. Any of the beam splitters B, D, and Q is used as the beam splitter 81b.

In the present embodiment, the wavelengths of the semiconductor lasers integrated in the modules 181a, 181b, and 181c may be 400 nm, 780 nm, and 660 nm, respectively. At this time, the beam splitter D is used as the beam splitter 81a. Any of the beam splitters B, F, and N is used as the beam splitter 81b.

In the present embodiment, the wavelengths of the semiconductor lasers integrated in the modules 181a, 181b, and 181c may be 660 nm, 400 nm, and 780 nm, respectively. At this time, the beam splitter S is used as the beam splitter 81a. Any of the beam splitters C, D, and o is used as the beam splitter 81b.

In the present embodiment, the wavelengths of the semiconductor lasers integrated in the modules 181a, 181b, and 181c may be 400 nm, 660 nm, and 780 nm, respectively. At this time, the beam splitter D is used as the beam splitter 81a. Any of the beam splitters C, E, and M is used as the beam splitter 81b.

The sixty-eighth embodiment of the optical head apparatus according to the present invention has the same characteristics as the thirty-first embodiment.

25. Sixty-Ninth and Seventieth Embodiments

Type 23

The sixty-ninth and seventieth embodiments of the optical head apparatus according to the present invention each have one light source, one photodetector, and one module. However, the one light source integrates two light sources. The one module integrates one light source and one photodetector.

Sixty-Ninth Embodiment

The sixty-ninth embodiment of the optical head apparatus according to the present invention is basically the same as the embodiment shown in FIG. 32. The module 192a integrates one semiconductor laser and one photodetector. The structure of the module will be described later with reference to FIG. 74. The semiconductor laser 32a integrates two semiconductor lasers. The structure of the laser will be described later with reference to FIG. 72. The wavelength of the semiconductor laser integrated in the module 182a is 400 nm, and the wavelengths of the semiconductor laser 32a are 660 nm and 780 nm. The beam splitter A is used as a beam splitter 82a. Any of the beam splitters s, v, and y is used as a beam splitter 82b.

Descriptions concerning light having a wavelength of 400 nm and light having a wavelength of 780 nm will be the same as those made in the thirty-second embodiment of the optical head apparatus according to the present invention, and will therefore be omitted herefrom.

Light having a wavelength of 660 nm and emitted from the semiconductor laser 32a enters, as S-polarized, into the beam splitter 82b. About 50% of the light is reflected therefrom. Almost all of the light passes through the beam splitter 82a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light passes through the beam splitter 82a and enters, as P-polarized, into the beam splitter 82b. About 50% of the light passes through the beam splitter 82b and is then received by the photodetector 132a.

In the present embodiment, the wavelength of the semiconductor laser in the module 182a may be 660 nm and the wavelengths of the semiconductor laser 32a may be 400 nm and 780 nm. At this time, the beam splitter B is used as the beam splitter 82a. Any of the beam splitters T, W, and y is used as the beam splitter 82b.

In the present embodiment, the wavelength of the semiconductor laser in the module 182a may be 780 nm and the wavelengths of the semiconductor laser 32a may be 400 nm and 660 nm. At this time, the beam splitter C is used as the beam splitter 82a. Any of the beam splitters u, x, and y is used as the beam splitter 82b.

Further, the module 182a, semiconductor laser 32a, and photodetector 132a can be replaced with each other, in the present embodiment.

The sixty-ninth embodiment of the optical head apparatus according to the present invention has the same characteristics as the thirty-second embodiment.

Seventieth Embodiment

The seventieth embodiment of the optical head apparatus according to the present invention is basically the same as the embodiment shown in FIG. 33. The module 183a integrates one semiconductor laser and one photodetector. The structure of the module will be described later with reference to FIG. 74. The semiconductor laser 33a integrates two semiconductor lasers. The structure of the laser will be described later with reference to FIG. 72. The wavelength of the semiconductor laser integrated in the module 183a is 400 nm, and the wavelengths of the semiconductor laser 33a are 660 nm and 780 nm. The beam splitter D is used as a beam splitter 83a. Any of the beam splitters s, v, and y is used as a beam splitter 83b.

Descriptions concerning light having a wavelength of 400 nm and light having a wavelength of 780 nm will be the same as those made in the thirty-third embodiment of the optical head apparatus according to the present invention, and will therefore be omitted herefrom.

Light having a wavelength of 660 nm and emitted from the semiconductor laser 33a enters, as P-polarized, into the beam splitter 83b. About 50% of the light passes through the beam splitter 83b. Almost all of the light is then reflected by the beam splitter 83a. The light is reflected by the mirror 201 and is transformed from linearly polarized light into circularly polarized light by the wavelength plate 202. The light is then converged on a disk 204 according to the DVD standard by the objective lens 203. Reflection light from the disk 204 passes through the objective lens 203 in a reverse direction and is transformed, by the wavelength plate 202, from circularly polarized light into linearly polarized light whose polarization direction is perpendicular to that in the forward path. The light is then reflected by the mirror 201. Almost all of the light is reflected by the beam splitter 83a and enters, as S-polarized, into the beam splitter 83b. About 50% of the light is reflected therefrom and is then received by the photodetector 133a.

In the present embodiment, the wavelength of the semiconductor laser in the module 183a may be 660 nm, and the wavelengths of the semiconductor laser 33a may be 400 nm and 780 nm. At this time, the beam splitter E is used as the beam splitter 83a. Any of the beam splitters T, W, and y is used as the beam splitter 83b.

In the present embodiment, the wavelength of the semiconductor laser in the module 183a may be 780 nm, and the wavelengths of the semiconductor laser 33a may be 400 nm and 660 rm. At this time, the beam splitter F is used as the beam splitter 83a. Any of the beam splitters u, x, and y is used as the beam splitter 83b.

Further, the module 183a, semiconductor laser 33a, and photodetector 133a can be replaced with each other, in the present embodiment.

The seventieth embodiment of the optical head apparatus according to the present invention has the same characteristics as the thirty-third embodiment.

26. Seventy-First and Seventy-Second Embodiments

Type 24

The seventy-first and seventy-second embodiments of the optical head apparatus according to the present invention each have one light source, one photodetector, and one module. However, the one module integrates two light sources and one photodetector.

Seventy-First Embodiment

The seventy-first embodiment of the optical head apparatus according to the present invention is basically the same as the embodiment shown in FIG. 34. The module 184a integrates two semiconductor lasers and one photodetector. The structure of the module will be described later with reference to FIG. 75. The wavelengths of the semiconductor lasers integrated in the module 184a are 660 nm and 780 nm, and the wavelength of the semiconductor laser 34a is 400 nm. The beam splitter D is used as a beam splitter 84a. Any of the beam splitters G, J, M, N, T, u, W, x, and y is used as a beam splitter 84b.

Descriptions concerning light having a wavelength of 400 nm, light having a wavelength of 660 nm, and light having a wavelength of 780 nm will be the same as those made in the thirty-fourth embodiment of the optical head apparatus according to the present invention, and will therefore be omitted herefrom.

In the present embodiment, the wavelengths of the semiconductor lasers in the module 184a may be 400 nm and 780 nm, and the wavelength of the semiconductor laser 34a may be 660 nm. At this time, the beam splitter E is used as the beam splitter 84a. Any of the beam splitters h, k, o, p, s, u, v, x, and y is used as the beam splitter 84b.

In the present embodiment, the wavelengths of the semiconductor lasers in the module 184a may be 400 nm and 660 nm, and the wavelength of the semiconductor laser 34a may be 780 nm. At this time, the beam splitter F is used as the beam splitter 84a. Any of the beam splitters I, L, Q, R, s, T, v, W and y is used as the beam splitter 84b.

Further, the module 184a, semiconductor laser 34a, and photodetector 134a can be replaced with each other, in the present embodiment.

The seventy-first embodiment of the optical head apparatus according to the present invention has the same characteristics as the thirty-fourth embodiment.

Seventy-Second Embodiment

The seventy-second embodiment of the optical head apparatus according to the present invention is basically the same as the embodiment shown in FIG. 35. The module 185a integrates two semiconductor lasers and one photodetector. The structure of the module will be described later with reference to FIG. 75. The wavelengths of the semiconductor lasers integrated in the module 185a are 660 nm and 780 nm, and the wavelength of the semiconductor laser 35a is 400 nm. The beam splitter A is used as a beam splitter 85a. Any of the beam splitters G, J, M, N, T, u, W, x, and y is used as a beam splitter 85b.

Descriptions concerning light having a wavelength of 400 nm, light having a wavelength of 660 nm, and light having a wavelength of 780 nm will be the same as those made in the thirty-fifth embodiment of the optical head apparatus according to the present invention, and will therefore be omitted herefrom.

In the present embodiment, the wavelengths of the semiconductor lasers in the module 185a may be 400 nm and 780 nm, and the wavelength of the semiconductor laser 35a may be 660 nm. At this time, the beam splitter B is used as the beam splitter 85a. Any of the beam splitters h, k, o, p, s, u, v, x, and y is used as the beam splitter 85b.

In the present embodiment, the wavelengths of the semiconductor lasers in the module 185a may be 400 nm and 660 nm, and the wavelength of the semiconductor laser 35a may be 780 nm. At this time, the beam splitter C is used as the beam splitter 85a. Any of the beam splitters T, L, Q, R, s, T, v, W and y is used as the beam splitter 85b.

Further, the module 185a, semiconductor laser 35a, and photodetector 135a can be replaced with each other, in the present embodiment.

The seventy-second embodiment of the optical head apparatus according to the present invention has the same characteristics as the thirty-fifth embodiment.

27. Seventy-Third Embodiment

Type 25

The seventy-third embodiment of the optical head apparatus according to the present invention has two modules. However, one of the two modules integrates two light sources and one photodetector. The other of the two modules integrates one light source and one photodetector.

The seventy-third embodiment of the optical head apparatus according to the present invention is basically the same as the embodiment shown in FIG. 36. The module 186b integrates two semiconductor lasers and one photodetector. The structure of the module will be described later with reference to FIG. 75. The module 186a integrates one semiconductor laser and one photodetector. The structure of the module will be described later with reference to FIG. 74. The wavelength of the semiconductor laser integrated in the module 186a is 400 nm, and the wavelengths of the semiconductor lasers integrated in the module 186b are 660 nm and 780 nm. The beam splitter A is used as a beam splitter 86a.

Descriptions concerning light having a wavelength of 400 nm, light having a wavelength of 660 nm, and light having a wavelength of 780 nm will be the same as those made in the thirty-sixth embodiment of the optical head apparatus according to the present invention, and will therefore be omitted herefrom.

In the present embodiment, the wavelength of the semiconductor laser in the module 186a may be 660 nm, and the wavelengths of the semiconductor lasers in the module 186b may be 400 nm and 780 nm. At this time, the beam splitter B is used as the beam splitter 86a.

In the present embodiment, the wavelength of the semiconductor laser in the module 186a may be 780 nm, and the wavelengths of the semiconductor lasers in the module 186b may be 400 nm and 660 nm. At this time, the beam splitter C is used as the beam splitter 86a.

In the present embodiment, the module 186a may be a module which integrates two semiconductor lasers and one photodetector, and the module 186b may be a module which integrates one semiconductor laser and one photodetector. The wavelengths of the semiconductor lasers in the module 186a may be 660 nm and 780 nm, and the wavelength of the semiconductor laser in the module 186b may be 400 nm. At this time, the beam splitter D is used as the beam splitter 86a.

In the present embodiment, the module 186a may be a module which integrates two semiconductor lasers and one photodetector, and the module 186b may be a module which, integrates one semiconductor laser and one photodetector. The wavelengths of the semiconductor lasers in the module 186a may be 400 nm and 780 nm, and the wavelength of the semiconductor laser in the module 186b may be 660 nm. At this time, the beam splitter E is used as the beam splitter 86a.

In the present embodiment, the module 186a may be a module which integrates two semiconductor lasers and one photodetector, and the module 186b may be a module which integrates one semiconductor laser and one photodetector. The wavelengths of the semiconductor lasers in the module 186a may be 400 nm and 660 nm, and the wavelength of the semiconductor laser in the module 186b may be 780 nm. At this time, the beam splitter F is used as the beam splitter 86a.

The seventy-third embodiment of the optical head apparatus according to the present invention has the same characteristics as the thirty-sixth embodiment.

28. Seventy-Fourth Embodiment

Type 26

The seventy-fourth embodiment of the optical head apparatus according to the present invention has one module. However, the one module integrates three light sources and one photodetector.

The seventy-fourth embodiment of the optical head apparatus according to the present invention is basically the same as the embodiment shown in FIG. 37. The module 187a integrates three semiconductor lasers and one photodetector.

The structure of the module will be described later with reference to FIG. 76. The wavelengths of the semiconductor lasers integrated in the module 187a are 400 nm, 660 nm, and 780 nm.

Descriptions concerning light having a wavelength of 400 nm, light having a wavelength of 660 nm, and light having a wavelength of 780 nm will be the same as those made in the thirty-seventh embodiment of the optical head apparatus according to the present invention, and will therefore be omitted herefrom.

The seventy-fourth embodiment of the optical head apparatus according to the present invention has the same characteristics as the thirty-seventh embodiment.

The first to seventy-fourth embodiments (Type 1 to Type 26) described above will be summarized in the following Tables 3 and 4.

TABLE 3

Figure 72:
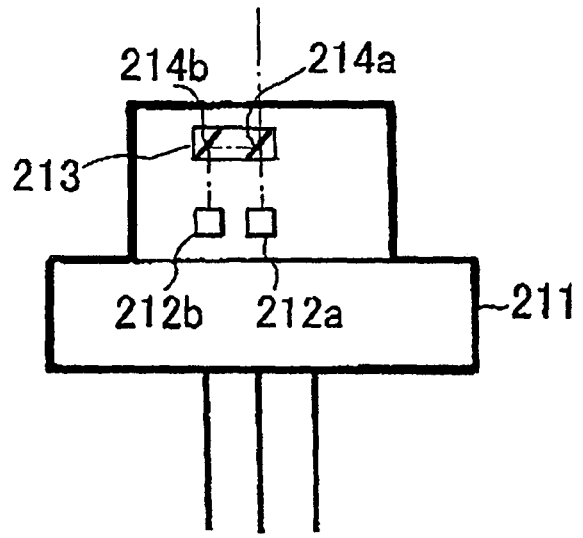
FIG. 72 is a graph showing a semiconductor laser which is used in the embodiments of the optical head apparatus according to the present invention and integrates two semiconductor lasers.
Figure 73:
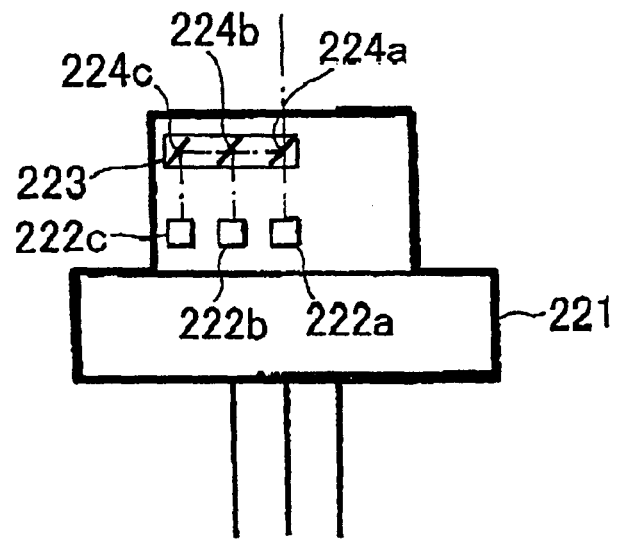
FIG. 73 is a graph showing a semiconductor laser which is used in the embodiments of the optical head apparatus according to the present invention and integrates three semiconductor lasers.
Figure 74:
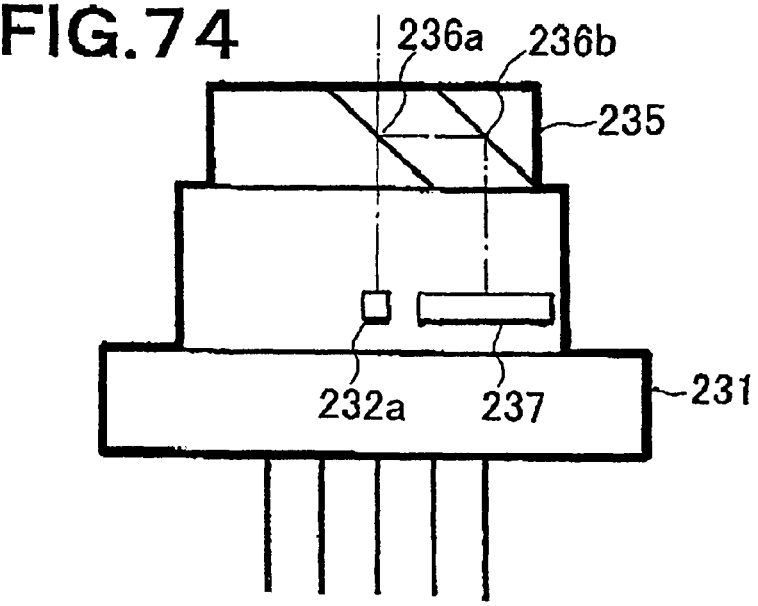
FIG. 74 is a graph showing a semiconductor laser which is used in the embodiments of the optical head apparatus according to the present invention and integrates one semiconductor laser and one photodetector.
Figure 75:
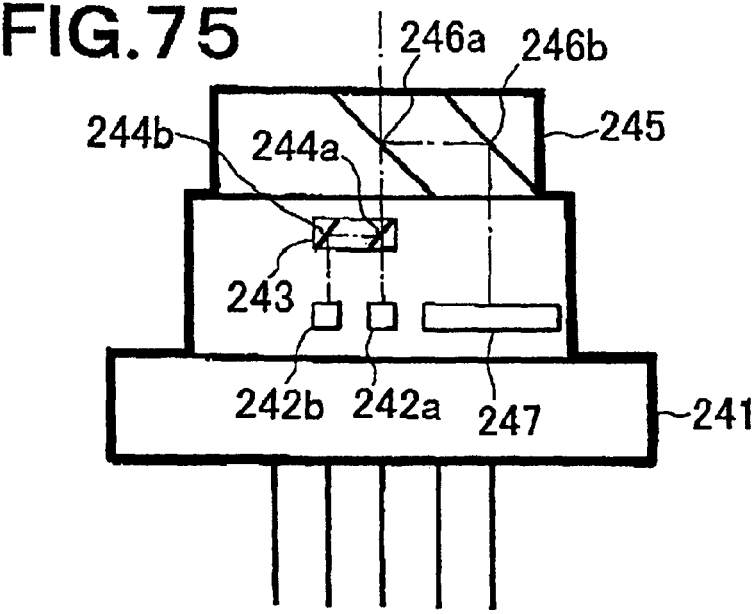
FIG. 75 is a graph showing a semiconductor laser which is used in the embodiments of the optical head apparatus according to the present invention and integrates two semiconductor lasers and one photodetector.

| | | Light source (number) | Photo-detector (number) | Module (number) | Total number |
|---|---|---|---|---|---|
| Type 1 | Embodiments 1 to 4 | 3 | 2 | — | 5 |
| Type 2 | Embodiments 5 to 9 | 3 | 1 | — | 4 |
| Type 3 | Embodiment 10 | 2 (one of the two light sources integrates two light sources: FIG. 72) | 2 | — | 4 |
| Type 4 | Embodiments 11 and 12 | 2 (one of the two light sources integrates two light sources: FIG. 72) | 1 | — | 3 |
| Type 5 | Embodiment 13 | 1 (three light sources are integrated: FIG. 73) | 1 | — | 2 |
| Type 6 | Embodiments 14 to 19 | 2 | 2 | 1 (one light source and one photodectector are integrated: FIG. 74) | 5 |
| Type 7 | Embodiments 20 to 24 | 1 | 1 | 2 (one light source and one photodectector are integrated: FIG. 74) | 4 |
| Type 8 | Embodiments 25 to 29 | 2 | 1 | 1 (one light source and one photodectector are integrated: FIG. 74) | 4 |
| Type 9 | Embodiments 30 to 31 | — | — | 3 (one light source and one photodectector are integrated: FIG. 74) | 3 |
| Type 10 | Embodiments 33 to 34 | 1 (two light sources are integrated: FIG. 72) | 1 | 1 (one light source and one photodectector are integrated: FIG. 74) | 3 |
| Type 11 | Embodiments 34 to 35 | 1 | 1 | 1 (two light source and one photodectector are integrated: FIG. 75) | 3 |
| Type 12 | Embodiment 36 | — | — | 2 (one light source and one photodectector are integrated: FIG. 74, two light sources and one photodectector: FIG. 75) | 2 |
| Type 37 | Embodiments 37 | — | — | 1 (three light source and one photodectector are integrated: FIG. 76) | 1 |

TABLE 4

| | | Light source (number) | Photo-detector (number) | Module (number) | Total Number |
|---|---|---|---|---|---|
| Type 14 | Embodiments 38 to 41 | 3 | 2 | — | 5 |
| Type 15 | Embodiments 42 to 46 | 3 | 1 | — | 4 |
| Type 16 | Embodiment 47 | 2 (one of the two light sources are integrated: FIG. 72) | 2 | — | 4 |
| Type 17 | Embodiments 48 and 49 | 2 (one of the two light sources are integrated: FIG. 72) | 1 | — | 3 |
| Type 18 | Embodiment 50 | 1 (three light sources are integrated: FIG. 73) | 1 | — | 2 |
| Type 19 | Embodiments 51 to 56 | 2 | 2 | 1 (one light source and one photodetector are integrated: FIG. 74) | 5 |
| Type 20 | Embodiments 57 to 61 | 1 | 1 | 2 (one light source and one photodetector are integrated: FIG. 74) | 4 |
| Type 21 | Embodiments 62 to 66 | 2 | 1 | 1 (one light source and one photodetector are integrated: FIG. 74) | 4 |
| Type 22 | Embodiments 30 to 31 | — | — | 3 (one light source and one photodetector are integrated: FIG. 74) | 3 |
| Type 23 | Embodiments 69 to 70 | 1 (two light sources are integrated: FIG. 72) | 1 | 1 (one light source and one photodetector are integrated: FIG. 74) | 3 |
| Type 24 | Embodiments 71 to 72 | 1 | 1 | 1 (two light source and one photodetector are integrated: FIG. 75) | 3 |
| Type 25 | Embodiments 73 | — | — | 2 (one light source and one photodetector are integrated: FIG. 74, two light sources and one photodetector: FIG. 75) | 2 |
| Type 26 | Embodiments 74 | — | — | 1 (three light source and one photodetector are integrated: FIG. 76) | 1 |

29. Light Source Integrating Two Light Sources

FIG. 72 shows the structure of a semiconductor laser which integrates two semiconductor lasers and is used in the embodiments of the optical head apparatus according to the present invention. Semiconductor laser chips 212a and 212b and a beam splitter 213 are integrated in the semiconductor laser 211. The beam splitter 213 has adhesion surfaces 214a and 214b.

Almost all of light emitted from the semiconductor laser chip 212a passes through the adhesion surface 214a of the beam splitter 213 and emitted from the semiconductor laser 211. Almost all of light emitted from the semiconductor laser chip 212b is reflected by the adhesion surface 214b of the beam splitter 213 and then by the adhesion surface 214a of the beam splitter 213. The light is then emitted from the semiconductor laser 211.

The wavelengths of the semiconductor laser chips 212a and 212b may respectively be 660 nm and 780 nm. At this time, the adhesion surface 214a of the beam splitter 213 has the same characteristic as any of the beam splitters C, E, and M. The adhesion surface 214b of the beam splitter 213 has the same characteristic as any of the beam splitters C, D, E, J, K, k, M, O, o, X, and x.

The wavelengths of the semiconductor laser chips 212a and 212b may respectively be 400 nm and 780 nm. At this time, the adhesion surface 214a of the beam splitter 213 has the same characteristic as any of the beam splitters C, D, O, and o. The adhesion surface 214b of the beam splitter 213 has the Same characteristic as any of the beam splitters C, D, E, J, K, k, M, O, o, X, and x.

The wavelengths of the semiconductor laser chips 212a and 212b may respectively be 400 nm and 660 nm. At this time, the adhesion surface 214a of the beam splitter 213 has the same characteristic as any of the beam splitters B, D, and Q. The adhesion surface 214b of the beam splitter 213 has the same characteristic as any of the beam splitters B, D, F, J, L, N, Q, and W.

From the semiconductor laser 211, the beam splitter 213 may be removed.

30. Light Source Integrating Three Light Sources

FIG. 73 shows the structure of the semiconductor laser which integrates three semiconductor lasers and is used in the embodiments of the optical head apparatus according to the present invention. Semiconductor laser chips 222a, 222b, and 222c and a beam splitter 223 are integrated in the semiconductor laser 221. The beam splitter 223 has adhesion surfaces 224a, 224b, and 224c.

Almost all of light emitted from the semiconductor laser chip 222a passes through the adhesion surface 224a of the beam splitter 223 and is emitted from the semiconductor laser 221. Almost all of light emitted from the semiconductor laser chip 222b is reflected by the adhesion surface 224b of the beam splitter 223 and then by the adhesion surface 224a of the beam splitter 223, and is emitted from the semiconductor laser 221. Almost all of light emitted from the semiconductor laser chip 222c is reflected by the adhesion surface 224c of the beam splitter 223, passes through the adhesion surface 224b of the beam splitter 223, is then reflected by the adhesion surface 224a of the beam splitter 223, and is then emitted from the semiconductor laser 221.

The wavelengths of the semiconductor laser chips 222a, 222b, and 222c can respectively be 400 nm, 660 nm, and 780 nm. At this time, the adhesion surface 224a of the beam splitter 223 has the same characteristic as the beam splitter D. The adhesion surface 224b of the beam splitter 223 has the same characteristic as any of the beam splitters B, F, and N. The adhesion surface 224c of the beam splitter 223 has the same characteristic as any of the beam splitters C, D, E, J, K, k, M, O, o, X, and x.

From the semiconductor laser 221, the beam splitter 223 can be removed.

31. Module Integrating One Light Source and One Photodetector

FIG. 74 shows the structure of the module which integrates one semiconductor laser and one photodetector and is used in the embodiments of the optical head apparatus according to the present invention. A semiconductor laser chip 232a, photodetector chip 237, and beam splitter 235 are integrated in the module 231. The beam splitter 235 has adhesion surfaces 236a and 236b.

The wavelength of the semiconductor laser chip 232a can be 400 nm. At this time, light emitted from the semiconductor laser chip 232a enters, as P-polarized, into the adhesion surface 236a of the beam splitter 235, and almost all of the light passes there. The light is then emitted out of the module 231. Light entering into the module 231 enters, as S-polarized, into the adhesion surface 236a of the beam splitter 235. Almost all of the light is reflected therefrom and by the adhesion surface 236b of the beam splitter 235, and is received by the photodetector chip 237.

In this case, the adhesion surface 236a of the beam splitter 235 has the same characteristic as any of the beam splitters G, J, M, N, T, U, u, W, X, x, Y, and y. The adhesion surface 236b of the beam splitter 235 has the same characteristic as any of the beam splitters A, E, F, G, J, K, k, L, M, N, P, p, R, T, U, u, V, v, W, X, x, Y, and y.

The wavelength of the semiconductor laser chip 232a can be 660 nm. At this time, light emitted from the semiconductor laser chip 232a enters, as P-polarized, into the adhesion surface 236a of the beam splitter 235, and almost all of the light passes there. The light is then emitted out of the module 231. Light entering into the module 231 enters, as S-polarized, into the adhesion surface 236a of the beam splitter 235. Almost all of the light is reflected therefrom and by the adhesion surface 236b of the beam splitter 235, and is received by the photodetector chip 237.

In this case, the adhesion surface 236a of the beam splitter 235 has the same characteristic as any of the beam splitters H, K, O, P, S, X, V, X, and Y. The adhesion surface 236b of the beam splitter 235 has the same characteristic as any of the beam splitters B, D, F, H, J, K, L, N, O, P, Q, S, U, V, W, x, and Y.

Alternatively, the light emitted from the semiconductor laser chip 232a enters, as P-polarized, into the adhesion surface 236a of the beam splitter 235. About 50% of the light passes there and is emitted of the module 231. The light entering into the module 231 enters, as S-polarized, into the adhesion surface 236a of the beam splitter 235. About 50% of the light is reflected therefrom. Almost all of the light is then reflected by the adhesion surface 236b of the beam splitter 235, and is received by the photodetector chip 237.

In this case, the adhesion surface 236a of the beam splitter 235 has the same characteristic as any of the beam splitters h, k, o, p, s, u, v, x, and y. The adhesion surface 236b of the beam splitter 235 has the same characteristic as any of the beam splitters B, D, F, J, L, N, Q, and W.

The wavelength of the semiconductor laser chip 232a can be 780 nm. At this time, light emitted from the semiconductor laser chip 232a enters, as P-polarized, into the adhesion surface 236a of the beam splitter 235, and about 50% of the light passes there. The light is then emitted of the module 231. Light entering into the module 231 enters, as S-polarized, into the adhesion surface 236a of the beam splitter 235. About 50% of the light is reflected therefrom. Almost all of the light is then reflected by the adhesion surface 236b of the beam splitter 235, and is received by the photodetector chip 237.

In this case, the adhesion surface 236a of the beam splitter 235 has the same characteristic as any of the beam splitters I, L, Q, R, S, s, T, V, v, W, Y and y. The adhesion surface 236b of the beam splitter 235 has the same characteristic as any of the beam splitters C, D, E, J, K, k, M, O, o, X, and x.

In the module 231, a diffraction optical element can be used as a beam splitter in place of the beam splitter 235. One of the beam splitter 235 and the diffraction optical element need not always be integrated in the module 231 but can be provided outside the module 231.

32. Module Integrating Two Light Sources and One Photodetector

FIG. 75 shows the structure of the module which integrates two semiconductor lasers and one photodetector and is used in the embodiments of the optical head apparatus according to the present invention. Semiconductor laser chips 242a and 242b, a photodetector chip 247, and beam splitters 243 and 245 are integrated in the module 241. The beam splitter 243 has adhesion surfaces 244a and 244b. The beam splitter 245 has adhesion surfaces 246a and 246b.

The wavelengths of the semiconductor laser chips 242a and 242b can be 660 nm and 780 nm, respectively. At this time, almost all of light emitted from the semiconductor laser chip 242a passes through the adhesion surface 244a of the beam splitter 243, and enters, as P-polarized, into the adhesion surface 246a of the beam splitter 245. Almost all of the light passes there. The light is then emitted of the module 241. Light entering into the module 241 enters, as S-polarized, into the adhesion surface 246a of the beam splitter 245. Almost all of the light is reflected therefrom and is reflected by the adhesion surface 246b of the beam splitter 245, and is received by the photodetector chip 247. Almost all of light emitted from the semiconductor laser chip 242b is reflected by the adhesion surface 244b of the beam splitter 243, and is also reflected by the adhesion surface 244a of the beam splitter 243. The light enters, as P-polarized, into the adhesion surface 246a of the beam splitter 245, and about 50% of the light passes there. The light is then emitted of the module 241. Light entering into the module 241 enters, as S-polarized, into the adhesion surface 246a of the beam splitter 245. About 50% of the light is reflected therefrom. Almost all of the light is reflected by the adhesion surface 246b of the beam splitter 245, and is received by the photodetector chip 247.

In this case, the adhesion surface 244a of the beam splitter 243 has the same characteristic as any of the beam splitters C, E, and M. The adhesion surface 244b of the beam splitter 243 has the same characteristic as any of the beam splitters C, D, E, J, K, k, M, O, o, X, and x. The adhesion surface 246a of the beam splitter 245 has the same characteristic as any of the beam splitters S, V, and Y. The adhesion surface 246b of the beam splitter 245 has the same characteristic as any of the beam splitters D, J, K, O, and X.

Alternatively, almost all of light emitted from the semiconductor laser chip 242a passes through the adhesion surface 244a of the beam splitter 243, and enters, as P-polarized, into the adhesion surface 246a of the beam splitter 245. About 50% of the light passes there. The light is then emitted of the module 241. Light entering into the module 241 enters, as S-polarized, into the adhesion surface 246a of the beam splitter 245. About 50% of the light is reflected therefrom. Almost all of the light is reflected by the adhesion surface 246b of the beam splitter 245, and is received by the photodetector chip 247. Almost all of light emitted from the semiconductor laser chip 242b is reflected by the adhesion surface 244b of the beam splitter 243, and is also reflected by the adhesion surface 244a of the beam splitter 243. The light enters, as P-polarized, into the adhesion surface 246a of the beam splitter 245, and about 50% of the light passes there. The light is then emitted of the module 241. Light entering into the module 241 enters, as S-polarized, into the adhesion surface 246a of the beam splitter 245. About 50% of the light is reflected therefrom. Almost all of the light is reflected by the adhesion surface 246b of the beam splitter 245, and is received by the photodetector chip 247.

In this case, the adhesion surface 244a of the beam splitter 243 has the same characteristic as any of the beam splitters C, E, and M. The adhesion surface 244b of the beam splitter 243 has the same characteristic as any of the beam splitters C, D, E, J, K, k, M, O, o, X, and x. The adhesion surface 246a of the beam splitter 245 has the same characteristic as any of the beam splitters s, v, and y. The adhesion surface 246b of the beam splitter 245 has the same characteristic as any of the beam splitters D and J.

The wavelengths of the semiconductor laser chips 242a and 242b can be 400 nm and 780 nm, respectively. At this time, almost all of light emitted from the semiconductor laser chip 242a passes through the adhesion surface 244a of the beam splitter 243, and enters, as P-polarized, into the adhesion surface 246a of the beam splitter 245. Almost all of the light passes there. The light is then emitted of the module 241. Light entering into the module 241 enters, as S-polarized, into the adhesion surface 246a of the beam splitter 245. Almost all of the light is reflected therefrom and reflected by the adhesion surface 246b of the beam splitter 245, and is received by the photodetector chip 247. Almost all of light emitted from the semiconductor laser chip 242b is reflected by the adhesion surface 244b of the beam splitter 243, and is also reflected by the adhesion surface 244a of the beam splitter 243. The light enters, as P-polarized, into the adhesion surface 246a of the beam splitter 245, and about 50% of the light passes there. The light is then emitted of the module 241. Light entering into the module 241 enters, as S-polarized, into the adhesion surface 246a of the beam splitter 245. About 50% of the light is reflected therefrom. Almost all of the light is reflected by the adhesion surface 246b of the beam splitter 245, and is received by the photodetector chip 247.

In this case, the adhesion surface 244a of the beam splitter 243 has the same characteristic as any of the beam splitters C, D, O, and o The adhesion surface 244b of the beam splitter 243 has the same characteristic as any of the beam splitters C, D, E, J, K, k, M, O, o, X, and x. The adhesion surface 246a of the beam splitter 245 has the same characteristic as any of the beam splitters T, W, Y, and y. The adhesion surface 246b of the beam splitter 245 has the same characteristic as any of the beam splitters E, J, K, k, M, X, and x.

The wavelengths of the semiconductor laser chips 242a and 242b can be 400 nm and 660 nm, respectively. At this time, almost all of light emitted from the semiconductor laser chip 242a passes through the adhesion surface 244a of the beam splitter 243, and enters, as P-polarized, into the adhesion surface 246a of the beam splitter 245. Almost all of the light passes there. The light is then emitted of the module 241. Light entering into the module 241 enters, as S-polarized, into the adhesion surface 246a of the beam splitter 245. Almost all of the light is reflected therefrom and reflected by the adhesion surface 246b of the beam splitter 245, and is received by the photodetector chip 247. Almost all of light emitted from the semiconductor laser chip 242b is reflected by the adhesion surface 244b of the beam splitter 243, and is also reflected by the adhesion surface 244a of the beam splitter 243. The light enters, as P-polarized, into the adhesion surface 246a of the beam splitter 245, and almost all of the light passes there. The light is then emitted of the module 241. Light entering into the module 241 enters, as S-polarized, into the adhesion surface 246a of the beam splitter 245. Almost all of the light is reflected therefrom. Almost all of the light is reflected by the adhesion surface 246b of the beam splitter 245, and is received by the photodetector chip 247.

In this case, the adhesion surface 244a of the beam splitter 243 has the same characteristic as any of the beam splitters B, D, and Q. The adhesion surface 244b of the beam splitter 243 has the same characteristic as any of the beam splitters B, D, F, J, L, N, Q, and W. The adhesion surface 246a of the beam splitter 245 has the same characteristic as any of the beam splatters U, X, and Y. The adhesion surface 246b of the beam splitter 245 has the same characteristic as any of the beam splitters F, J, K, L, N, P, U, V, W, X, and Y.

Alternatively, almost all of light emitted from the semiconductor laser chip 242a passes through the adhesion surface 244a of the beam splitter 243, and enters, as P-polarized, into the adhesion surface 246a of the beam splitter 245. Almost all of the light passes there. The light is then emitted out of the module 241. Light entering into the module 241 enters, as S-polarized, into the adhesion surface 246a of the beam splitter 245. Almost all of the light is reflected therefrom and is reflected by the adhesion surface 246b of the beam splitter 245, and is received by the photodetector chip 247. Almost all of light emitted from the semiconductor laser chip 242b is reflected by the adhesion surface 244b of the beam splitter 243, and is also reflected by the adhesion surface 244a of the beam splitter 243. The light enters, as P-polarized, into the adhesion surface 246a of the beam splitter 245, and about 50% of the light passes there. The light is then emitted out of the module 241. Light entering into the module 241 enters, as S-polarized, into the adhesion surface 246a of the beam splitter 245. About 50% of the light is reflected therefrom. Almost all of the light is reflected by the adhesion surface 246b of the beam splitter 245, and is received by the photodetector chip 247.

In this case, the adhesion surface 244a of the beam splitter 243 has the same characteristic as any of the beam splitters B, D, and Q. The adhesion surface 244b of the beam splitter 243 has the same characteristic as any of the beam splitters B, D, F, J, L, N, Q, and W. The adhesion surface 246a of the beam splitter 245 has the same characteristic as any of the beam splitters u, x, and y. The adhesion surface 246b of the beam splitter 245 has the same characteristic as any of the beam splitters F, J, L, N, and W.

In the module 241, a diffraction optical element can be used as a beam splitter in place of the beam splitter 245. One of the beam splitter 245 and the diffraction optical element need not always be integrated in the module 241 but can be provided outside the module 241. From the module 241, the beam splitter 243 can be removed.

33. Module Integrating Three Light Sources and One Photodetector

Figure 76:
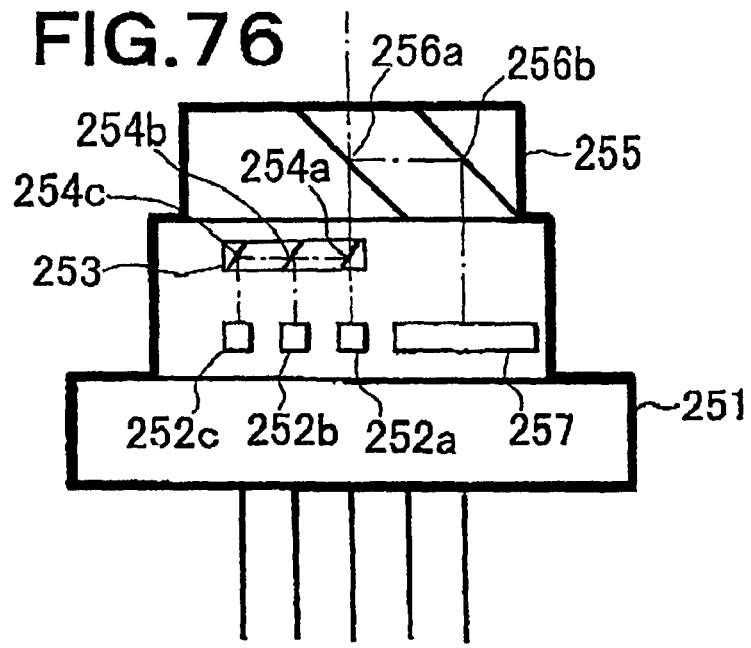
FIG. 76 is a graph showing a semiconductor laser which is used in the embodiments of the optical head apparatus according to the present invention and integrates three semiconductor lasers and one photodetector.

FIG. 76 shows the structure of the module which integrates three semiconductor lasers and one photodetector and is used in the embodiments of the optical head apparatus according to the present invention. Semiconductor laser chips 252a, 252b, and 252c, a photodetector chip 257, and beam splitters 253 and 255 are integrated in the module 251. The beam splitter 253 has adhesion surfaces 254a, 254b and 254c. The beam splitter 255 has adhesion surfaces 256a and 256b.

The wavelengths of the semiconductor laser chips 252a, 252b, and 252c can be 400 nm, 660 nm, and 780 nm, respectively. At this time, almost all of light emitted from the semiconductor laser chip 252a passes through the adhesion surface 254a of the beam splitter 253, and enters, as P-polarized, into the adhesion surface 256a of the beam splitter 255. Almost all of the light passes there. The light is then emitted out of the module 251. Light entering into the module 251 enters, as S-polarized, into the adhesion surface 256a of the beam splitter 255. Almost all of the light is reflected therefrom and reflected by the adhesion surface 256b of the beam splitter 255, and is received by the photodetector chip 257. Almost all of light emitted from the semiconductor laser chip 252b is reflected by the adhesion surface 254b of the beam splitter 253, and is also reflected by the adhesion surface 254a of the beam splitter 253. The light enters, as P-polarized, into the adhesion surface 256a of the beam splitter 255, and almost all of the light passes there. The light is then emitted out of the module 251. Light entering into the module 251 enters, as S-polarized, into the adhesion surface 256a of the beam splitter 255. Almost all of the light is reflected therefrom. Almost all of the light is reflected by the adhesion surface 256b of the beam splitter 255, and is received by the photodetector chip 257. Almost all of light emitted from the semiconductor laser chip 252c is reflected by the adhesion surface 254c of the beam splitter 253, and passes through the adhesion surface 254b of the beam splitter 253. Almost all of the light is reflected by the adhesion surface 254a of the beam splitter 253. The light enters, as P-polarized, into the adhesion surface 256a of the beam splitter 255, and about 50% of the light passes there. The light is then emitted out of the module 251. Light entering into the module 251 enters, as S-polarized, into the adhesion surface 256a of the beam splitter 255. About 50% of the light is reflected therefrom. Almost all of the light is reflected by the adhesion surface 256b of the beam splitter 255, and is received by the photodetector chip 257.

In this case, the adhesion surface 254a of the beam splitter 253 has the same characteristic as any of the beam splitter D. The adhesion surface 254b of the beam splitter 253 has the same characteristic as any of the beam splitters B, F, and N. The adhesion surface 254c of the beam splitter 253 has the same characteristic as any of the beam splitters C, D, E, J, K, k, M, O, o, X, and x. The adhesion surface 256a of the beam splitter 255 has the same characteristic as the beam splitter Y. The adhesion surface 256b of the beam splitter 255 has the same characteristic as any of the beam splitters J, K, and X.

Alternatively, almost all of light emitted from the semiconductor laser chip 252a passes through the adhesion surface 254a of the beam splitter 253, and enters, as P-polarized, into the adhesion surface 256a of the beam splitter 255. Almost all of the light passes there. The light is then emitted out of the module 251. Light entering into the module 251 enters, as S-polarized, into the adhesion surface 256a of the beam splitter 255. Almost all of the light is reflected therefrom and is reflected by the adhesion surface 256b of the beam splitter 255, and is received by the photodetector chip 257. Almost all of light emitted from the semiconductor laser chip 252b is reflected by the adhesion surface 254b of the beam splitter 253, and is also reflected by the adhesion surface 254a of the beam splitter 253. The light enters, as P-polarized, into the adhesion surface 256a of the beam splitter 255, and about 50% of the light passes there. The light is then emitted out of the module 251. Light entering into the module 251 enters, as S-polarized, into the adhesion surface 256a of the beam splitter 255. About 50% of the light is reflected therefrom. Almost all of the light is reflected by the adhesion surface 256b of the beam splitter 255, and is received by the photodetector chip 257. Almost all of light emitted from the semiconductor laser chip 252c is reflected by the adhesion surface 254c of the beam splitter 253, and passes through the adhesion surface 254b of the beam splitter 253. Almost all of the light is reflected by the adhesion surface 254a of the beam splitter 253. The light enters, as P-polarized, into the adhesion surface 256a of the beam splitter 255, and about 50% of the light passes there. The light is then emitted out of the module 251. Light entering into the module 251 enters, as S-polarized, into the adhesion surface 256a of the beam splitter 255. About 50% of the light is reflected therefrom. Almost all of the light is reflected by the adhesion surface 256b of the beam splitter 255, and is received by the photodetector chip 257.

In this case, the adhesion surface 254a of the beam splitter 253 has the same characteristic as any of the beam splitter D. The adhesion surface 254b of the beam splitter 253 has the same characteristic as any of the beam splitters B, F, and N. The adhesion surface 254c of the beam splitter 253 has the same characteristic as any of the beam splitters C, D, E, J, K, k, M, O, o, X, and x. The adhesion surface 256a of the beam splitter 255 has the same characteristic as the beam splitter y. The adhesion surface 256b of the beam splitter 255 has the same characteristic as the beam splitter J.

In the module 251, a diffraction optical element can be used as a beam splitter in place of the beam splitter 255. One of the beam splitter 255 and the diffraction optical element need not always be integrated in the module 251 but can be provided outside the module 251. From the module 251, the beam splitter 253 can be removed.

34. Spherical Aberration Corrector

According to the next-generation standard, DVD standard, and CD standard, disks are 0.6 mm thick (AOD standard) or 0.1 mm thick (BRD standard), 0.6 mm thick, and 1.2 mm thick, respectively. The objective lens for use in optical head apparatuses is designed to correct the spherical aberration with respect to a particular wavelength and particular protect-layer thickness. Spherical aberration is therefore caused with respect to other wavelengths or other protect-layer thickness. It is hence necessary to correct the spherical aberration depending on disks, in order to perform recording on and reproducing from all of the disks according to the next-generation standard, DVD standard, and CD standard.

Figure 77:
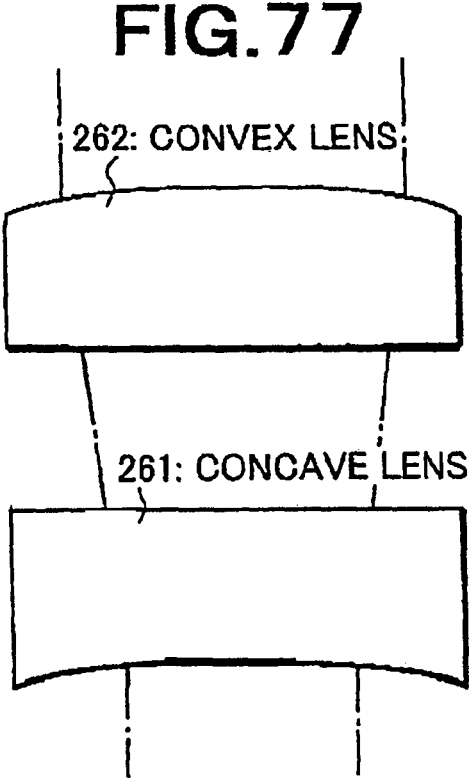
FIG. 77 is a diagram showing a constitution of an expander lens used in the embodiments of the optical head apparatus according to the present invention.

As the first method of correcting spherical aberration depending on disks, there is a known method of providing an expander lens in the optical system of the optical head apparatus. FIG. 77 shows the structure of the expander lens. The expander lens is constructed by a concave lens 261 and a convex lens 262, and is provided between the wavelength plate 202 and the objective lens 203.

The objective lens of the optical head apparatus is designed to correct spherical aberration when light having a wavelength of 400 nm which has entered as parallel light into the objective lens passes through the protect layer of a disk according to the next-generation standard. When recording or reproducing is performed on a disk according to the next-generation standard, the distance between the concave lens 261 and the convex lens 262 is controlled such that light having a wavelength 400 nm, which is emitted from a semiconductor laser and enters as parallel light into the concave lens 261, is emitted as parallel light out of the convex lens 262 and enters into the objective lens.

The spherical aberration still remains when light having a wavelength of 660 nm which has entered as parallel light into the objective lens passes through the protect layer of a disk according to the DVD standard. However, if light having a wavelength of 660 nm is let enter as divergent light having a suitable spreading angle into the objective lens, new spherical aberration is caused in accordance with a magnification change. The remaining spherical aberration is thereby corrected. When recording or reproducing is performed on a disk according to the DVD standard, the distance between the concave lens 261 and the convex lens 262 is controlled such that light having a wavelength of 660 nm, which is emitted from a semiconductor laser and enters as parallel light into the concave lens 261, is emitted as divergent light having a suitable spreading angle from the convex lens 262 and enters into the objective lens.

Also, the spherical aberration still remains when light having a wavelength of 780 nm which has entered as parallel light into the objective lens passes through the protect layer of a disk according to the CD standard. However, if light having a wavelength of 780 nm is let enter as divergent light having a suitable spreading angle into the objective lens, new spherical aberration is caused in accordance with a magnification change. The remaining spherical aberration is thereby corrected. When recording or reproducing is performed on a disk according to the CD standard, the distance between the concave lens 261 and the convex lens 262 is controlled such that light having a wavelength of 780 nm, which is emitted from a semiconductor laser and enters as parallel light into the concave lens 261, is emitted as divergent light having a suitable spreading angle from the convex lens 262 and enters into the objective lens.

Figure 78A:
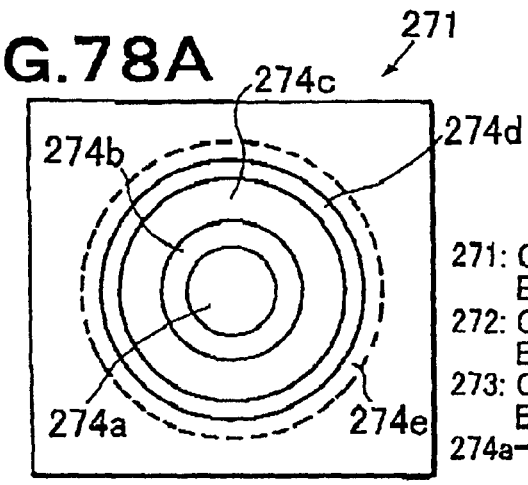
FIG. 78A is a plan view and FIG. 78B is a side view.
Figure 78B:
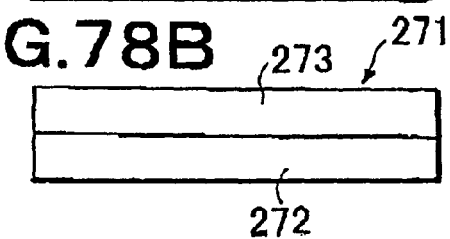

As the second method of correcting spherical aberration depending on disks, there is a known method of providing a optical liquid crystal element in the optical system of the optical head apparatus. FIG. 78 shows the structure of the optical liquid crystal element FIG. 78A is a plan view and FIG. 78B is a side view. The optical liquid crystal element 271 is constructed by an forward path optical liquid crystal element 272 and a backward path optical liquid crystal element 273 which are adhered to each other, and is provided between the mirror 201 and the wavelength plate 202. The forward path optical liquid crystal element 272 works on the linearly polarized light on the forward path. The backward path optical liquid crystal element 273 works on the linearly polarized light on the backward path, whose polarization angle is perpendicular to that of the forward path. The forward path optical liquid crystal element 272 and the backward path optical liquid crystal element 273 each are divided into five regions 274a to 274e. A voltage V1 is applied to the region 274c. A voltage V2 is applied to the regions 274b and 274d. A voltage V3 is applied to the regions 274a and 274e. Note that the dotted-line in the figure depicts the effective diameter of the objective lens.

The objective lens of the optical head apparatus is designed to correct spherical aberration when light having a wavelength of 400 nm which has entered into the objective lens passes through the protect layer of a disk according to the next-generation standard. When recording or reproducing is performed on a disk according to the next-generation standard, the voltages applied to the regions of the optical liquid crystal element 271 satisfy V1=V2=V3.

The spherical aberration still remains when light having a wavelength of 660 nm which has entered into the objective lens passes through the protect layer of a disk according to the DVD standard. However, if V1−V2=V2−V3=V is set and the voltage V is set to a suitable value, new spherical aberration is caused with respect to the light having a wavelength of 660 nm which passes through the optical liquid crystal element 271. The remaining spherical aberration is thereby corrected. When recording or reproducing is performed on a disk according to the DVD standard, the voltages applied to the regions of the optical liquid crystal element 271 are controlled such that the voltage V is a suitable value.

Also, the spherical aberration still remains when light having a wavelength of 780 nm which has entered into the objective lens passes through the protect layer of a disk according to the CD standard. However, if V1−V2=V2−V3=V is set and the voltage V is set to a suitable value, new spherical aberration is caused with respect to the light having a wavelength of 780 nm which passes through the optical liquid crystal element 271. The remaining spherical aberration is thereby corrected. When recording or reproducing is performed on a disk according to the CD standard, the voltages applied to the regions of the optical liquid crystal element 271 are controlled such that the voltage V is a suitable value.

35. Numerical Aperture Controller

As described above, the numerical apertures of the objective lens are 0.65 (AOD standard) or 0.85 (BRD standard), 0.6, and 0.45 according to the next-generation standard, DVD standard, and CD standard, respectively. Therefore, it is necessary to control the numerical aperture depending on disks, in order to perform recording and reproducing with respect to disks according to the next-generation standard, DVD standard, and CD standard.

Figure 79A:
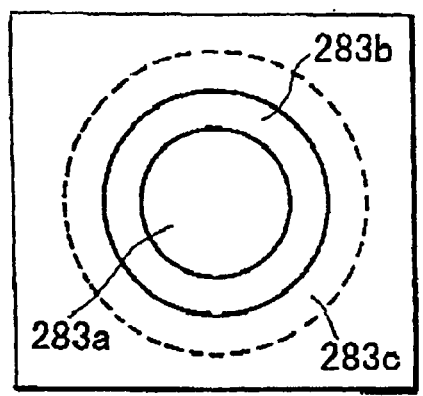
FIG. 79 is a diagram showing a constitution of an aperture control element used in the embodiments of the optical head apparatus according to the present invention, where
Figure 79B:
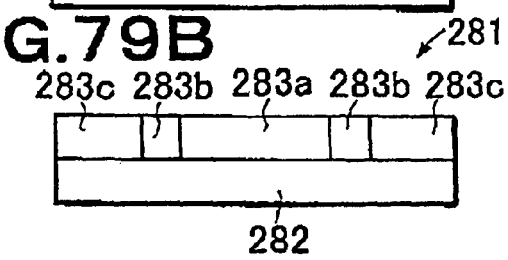

As a method of controlling the numerical aperture depending on disks, there is a known method of providing an aperture control element in the optical system of the optical head apparatus. FIG. 79 shows the structure of the aperture control element. FIG. 79A is a plan view and FIG. 79B is a side view. The aperture control element 281 is constructed by a glass substrate 282 and dielectric multilayered films 283a to 283c formed on the glass substrate 282, and is provided between the wavelength plate 202 and the objective lens 203. The dotted-line in the figure depicts the effective diameter of the objective lens.

Figure 80:
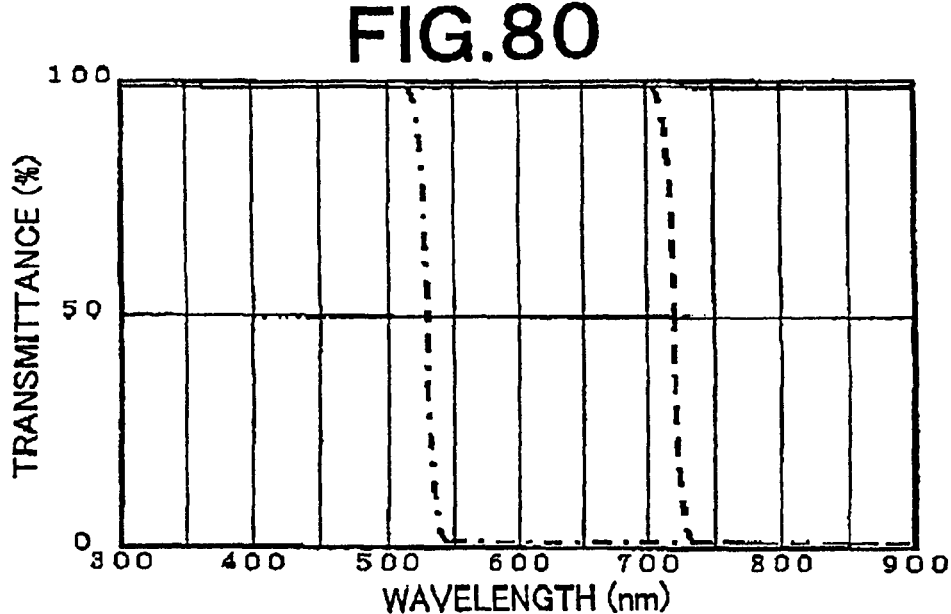
FIG. 80 is a graph showing the wavelength dependence of the transmittance of dielectric multilayered films in the aperture control element used in the embodiments of the optical head apparatus according to the present invention.

FIG. 80 shows the dependence of the transmittance of the dielectric multilayered films 283a to 281c upon the wavelength plate. In the figure, the continuous line, dotted-line, and dashed-line are characteristics with respect to the dielectric multilayered films 283a, 283b, and 283c, respectively. The dielectric multilayered film 283a transmits almost all of light having a wavelength of 400 nm, light having a wavelength of 660 nm, and light having a wavelength of 780 nm. The dielectric multilayered film 283b transmits almost all of light having a wavelength of 400 nm and light having a wavelength of 660 nm and reflects almost all of light having a wavelength of 780 nm. The dielectric multilayered film 283c transmits almost all of light having a wavelength of 400 nm and reflects almost all of light having a wavelength of 660 nm and light having a wavelength of 780 nm.

Therefore, the numerical aperture with respect to light having a wavelength of 400 nm when recording or reproducing is performed on a disk according to the next-generation standard is determined by the effective diameter of the objective lens. The numerical aperture with respect to light having a wavelength of 660 nm when recording or reproducing is performed on a disk according to the DVD standard is determined by the diameter of the circle which is the boundary between the dielectric multilayered films 283b and 283c. The numerical aperture with respect to light having a wavelength of 780 nm when recording or reproducing is performed on a disk according to the CD standard is determined by the diameter of the circle which is the boundary between the dielectric multilayered films 283a and 283b.

36. Collimator Lens

In the embodiments of the optical head apparatus according to the present invention, if necessary, a collimator lens for transforming light emitted from a semiconductor laser into parallel light is provided in the optical system. For example, in the embodiment shown in FIG. 5, a first collimator lens is provided between the semiconductor laser 5a and the beam splitter 55a, a second collimator lens is provided between the semiconductor laser 5b and the beam splitter 55b, as well as a third collimator lens is provided between the semiconductor laser 5c and the beam splitter 55c.

Thus, the semiconductor lasers 5a to 5c are respectively provided with collimator lenses, and the numerical apertures of the corresponding collimator lenses are set independently. Therefore, the efficiency of the light emitted from each of the semiconductor lasers 5a to 5c in the forward path can be independently set to a desired value.

37. Coupling Lens

In the embodiments of the optical head apparatus according to the present invention, if necessary, a coupling lens for reducing or increasing the spreading angle of light emitted from a semiconductor laser is provided in the optical system, in addition to a collimator lens. For example, in the embodiment shown in FIG. 5, a collimator lens is provided between the beam splitter 55a and the mirror 201. In addition, a first coupling lens is provided between the semiconductor laser 5a and the beam splitter 55a, a second coupling lens is provided between the semiconductor laser 5b and the beam splitter 55b, as well as a third coupling lens is provided between the semiconductor laser 5c and the beam splitter 55c.

Thus, the semiconductor lasers 5a to 5c are respectively provided with coupling lenses, and the magnifications of corresponding coupling lenses are set independently. Therefore, the efficiency of the light emitted from the semiconductor lasers 5a to 5c can be designed independently to a desired value.

38. Monitor Photodetector

In the embodiments of the optical head apparatus according to the present invention, if necessary, a monitor photodetector for monitoring the power of light emitted from a semiconductor laser is provided in the optical system. For example, in the embodiment shown in FIG. 5, a first monitor photodetector is provided near the surface opposite to the semiconductor laser 5a of the beam splitter 55a. A second monitor photodetector is provided near the surface opposite to the semiconductor laser 5b of the beam splitter 55b. A third monitor photodetector is provided near the surface opposite to the semiconductor laser 5c of the beam splitter 55c.

Almost all or about 50% of light emitted from the semiconductor lasers 5a to 5c is respectively reflected by the beam splitters 55a to 55c. However, a slight amount or about 50% of the light passes through the beam splitters 55a to 55c. The light thus transmitted is received by the first to third monitor photodetectors. By feeding back the outputs from the monitor detectors to the drive currents for the semiconductor lasers, the power of light emitted from each semiconductor laser can be controlled to a constant value.

Light which has been emitted from the semiconductor laser 5a and passed through the beam splitter 55a and light which has been emitted from the semiconductor lasers 5b and 5c and reflected by the beam splitter 55a are received by the first monitor photodetector. In this manner, this monitor photodetector can be shared to function in place of plural monitor photodetectors.

39. Cylindrical Lens and Diffraction Optical Element

In the embodiments of the optical head apparatus according to the present invention, if necessary, a cylindrical lens for applying astigmatism to reflection light from disks is provided in the optical system. For example, in the embodiment shown in FIG. 5, a cylindrical lens (not shown) is provided between the beam splitter 55c and photodetector 105a.

The photodetector 105a is installed between two focal lines created by the cylindrical lens. By applying astigmatism to the reflection light from a disk 204, focus error signals according to an astigmatism method can be generated, based on the output from the photodetector 105a.

In the embodiments of the optical head apparatus according to the present invention, if necessary, a diffraction optical element for dividing light emitted from a semiconductor laser is provided in the optical system. For example, in the embodiment shown in FIG. 5, a first diffraction optical element (not shown) is provided between the semiconductor laser 5a and the beam splitter 55a, a second diffraction optical element (not shown) is provided between the semiconductor laser 5b and the beam splitter 55b, as well as a third diffraction optical element (not shown) is provided between the semiconductor laser 5c and the beam splitter 55c.

The light emitted from each of the semiconductor lasers 5a to 5c is divided into three rays of 0th-order light and ±1st-order diffraction light, by corresponding one of the first to third diffraction optical elements. The three rays reflected by a disk 204 are received by the photodetector 105a. Thus, the light emitted from each of the semiconductor lasers 5a to 5c is divided into three rays by a diffraction optical element. In this manner, track error signals can be generated in a differential push-pull method, based on the output from the photodetector 105a.

Figure 81:
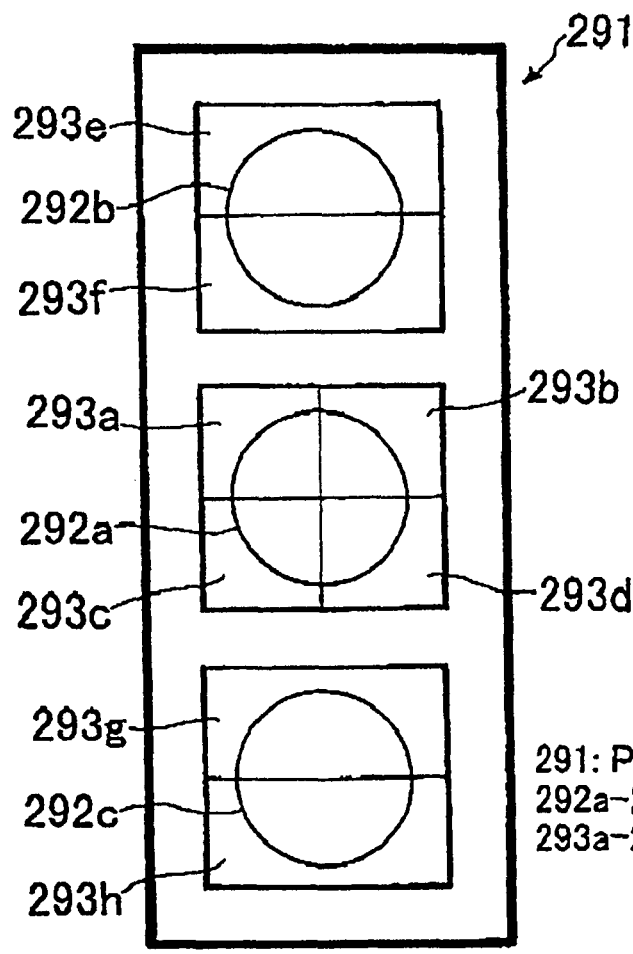
FIG. 81 is a diagram showing a pattern of a light receiving portion of a photodetector and layout of light spots in the photodetector, used in the embodiments of the present invention.

FIG. 81 shows patterns of Light receiving portions of a photodetector and layout of light spots in the photodetector, used in the embodiments of the optical head apparatus according to the present invention. The patterns of the Light receiving portions of the photodetector 291 deal with the case where astigmatism is applied to reflection light from disks and light emitted from the semiconductor laser is divided into three rays by a diffraction optical element.

The light spot 292a corresponds to 0th-order light from the diffraction optical element and is received by the right receiving parts 293a to 293d i.e., four parts divided by a division line parallel to the radial direction of disks 204 and a division line parallel to the tangential direction thereof. The light spot 292b corresponds to +1st-order diffraction light from the diffraction optical element and is received by Light receiving portions 293e and 293f, i.e., two parts divided by a division line parallel to the radial direction of the disks 204. The light spot 292c corresponds to −1st-order diffraction light from the diffraction optical element and is received by Light receiving portions 293g and 293h, i.e., two parts divided by a division line parallel to the radial direction of the disks 204. Due to the function of the cylindrical lens, the intension distribution in the radial direction of the disks 204 and that in the tangential direction change alternately, between the light spots 292a to 292c each other.

Where the outputs from the Light receiving portions 293a to 293h are expressed as V293a to V293h, focus error signals are generated in the astigmatism method by a calculation of (V293a+V293d)−(V293b+V293c). Track error signals are generated in the differential push-pull method by a calculation of (V293a+V293b)−(V293c+V293d)−K{(V293e+V293g)−(V293f+V293h)}. K is a light amount ratio between the 0th-order light and ±1st-order diffraction light from the diffraction optical element. Signals reproduced from the disks 204 are generated by a calculation of V293a+V293b+V293c+V293d.

As another method of generating focus error signals, a Foucault method, spot-size method, or the like can be used in place of the astigmatism method. As another method of generating track error signals, a differential phase detection method, three-beam method, or the like can be used in place of the differential push-pull method.

40. Optical Information Recording or Reproducing Apparatus

Figure 82:
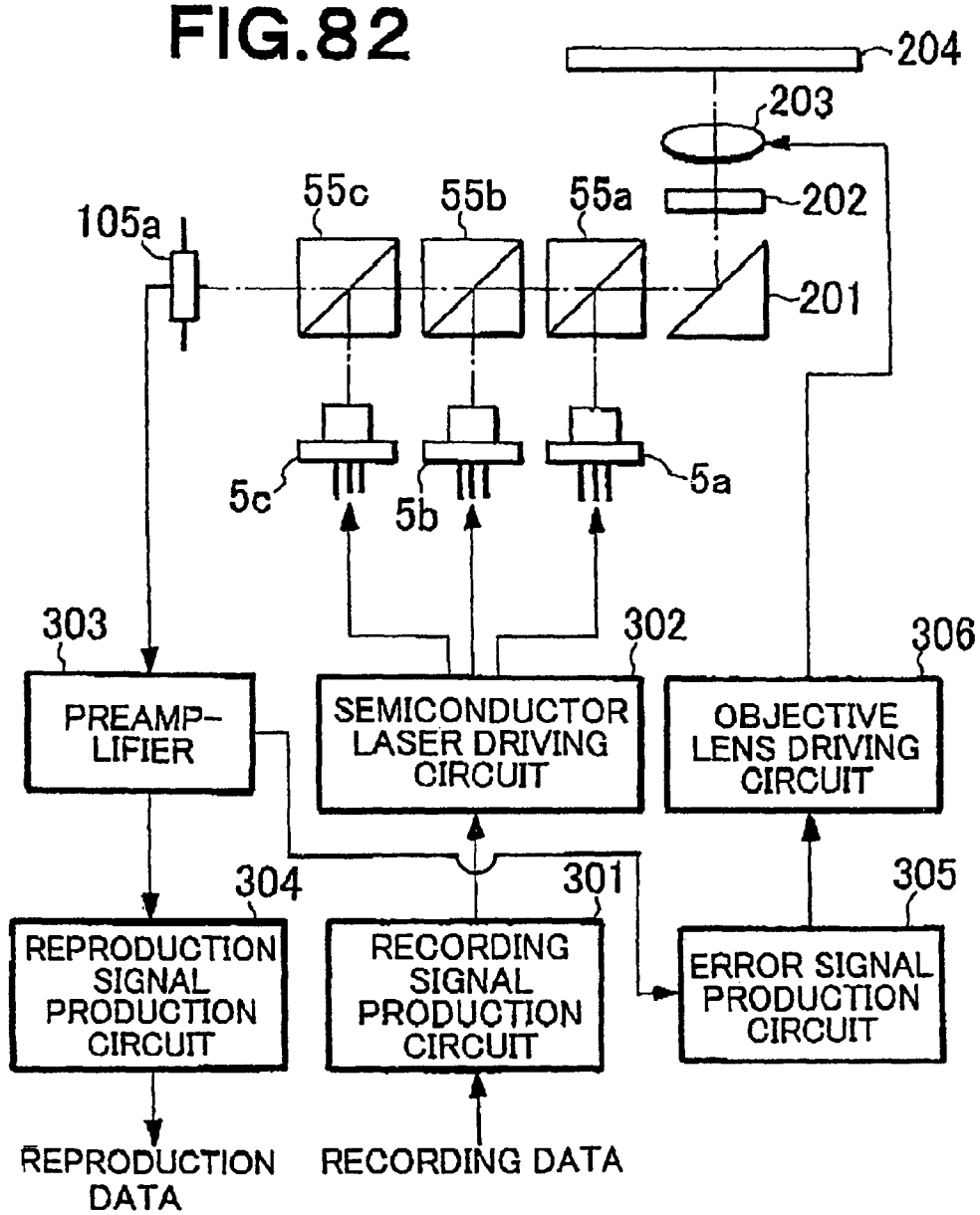
FIG. 82 is a diagram showing a constitution of an embodiment of an optical information recording or reproducing apparatus according to the present invention.
Figure 83:
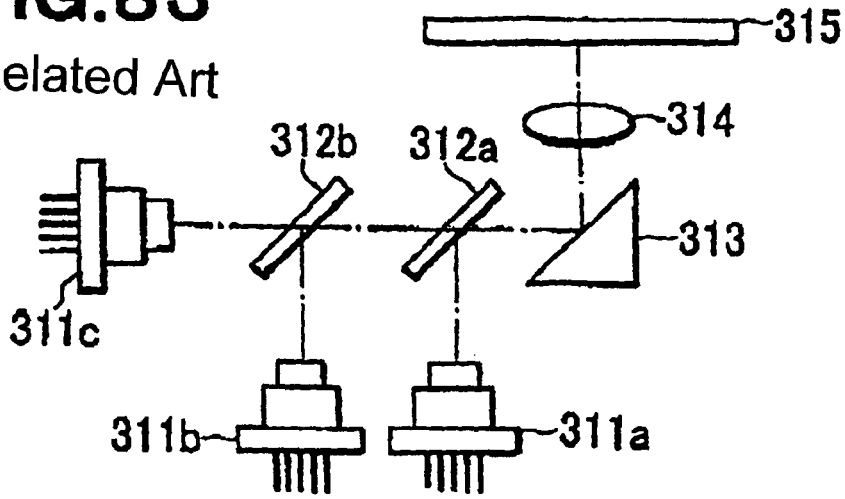
FIG. 83 is a diagram showing a constitution of a first example of a conventional optical head apparatus.
Figure 84:
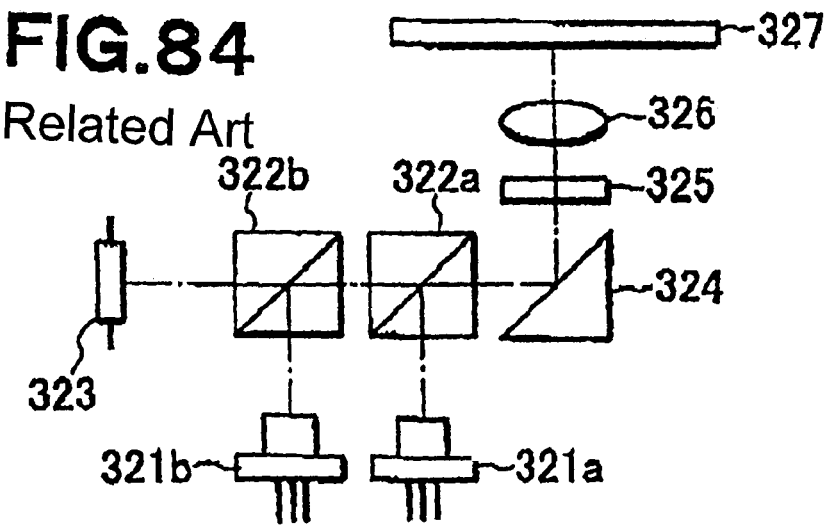
FIG. 84 is a diagram showing a constitution of a second example of a conventional optical head apparatus.

FIG. 82 shows an embodiment of the optical information recording or reproducing apparatus according to the present invention. In the present embodiment, a recording signal production circuit 301, a semiconductor laser driving circuit 302, a preamplifier 303, a reproduction signal production circuit 304, an error signal production circuit 305, and an objective lens drive circuit 306 are added to the embodiment of the optical head apparatus according to the present invention shown in FIG. 5.

The recording signal production circuit 301 generates recoding signals for driving the semiconductor lasers 5a to 5c, based on recording data inputted from the outside. The semiconductor laser driving circuit 302 drives the semiconductor lasers 5a to 5c, based on recording signals inputted from the recording signal production circuit 301. In this manner, signals are recorded in the disks 204.

The preamplifier 303 converts current signals inputted from the photodetector 105a into voltage signals. The reproduction signal production circuit 304 generates reproduction signals, based on voltage signals inputted from the preamplifier 303, and outputs the signals to the outside. Thus, signals are reproduced from the disks 204.

The error signal production circuit 305 generates focus error signals and track error signals for driving the objective lens 203, based on voltage signals inputted from the preamplifier 303. The objective lens drive circuit 306 drives the objective lens 203 by an actuator not shown, based on focus error signals and track error signals inputted from the error signal production circuit 305. Thus, the focus servo and track servo are operated.

The above embodiments further include a spindle control circuit for rotating the disk 204, a positional control circuit for moving the whole optical head apparatus except the disk 204, relative to the disk 204, etc.

The above embodiments relate to a recording or reproducing apparatus which performs recording and reproducing with respect to disks 204. However, there can be a reproduction-only apparatus which performs only reproducing from disks 204, as another embodiment of the optical information recording or reproducing apparatus according to the present invention. In this case the semiconductor lasers 5a to 5c are not driven on the bases of recording signals by the semiconductor laser driving circuit 302 but are driven such that the power of emitted light is kept constant.

There can be another embodiment of the optical information recording or reproducing apparatus according to the present invention, in which a recording signal production circuit, a semiconductor laser driving circuit, a preamplifier, a reproduction signal production circuit, an error signal production circuit, and an objective lens drive circuit are added to any of the embodiment other than the foregoing fifth embodiment of the optical head apparatus according to the present invention.

The embodiments have been described with reference to the case where optical recording media to be dealt with are disks according to the next-generation standard (AOD standard, BRD standard, or the like), DVD standard, and CD standard, and the first, second, and third wavelengths of light are 400 nm, 660 nm, and 780 nm, respectively. However, the present invention is not limited hitherto but is applicable to the other cases. For example, disks according to other standards (including ones to be developed in the future) are dealt with as optical recording media, and light having the other wavelengths is used.

What is claimed is:

1. An optical head apparatus comprising:
   a first light source which emits light having a first wavelength;
   a second light source which emits light having a second wavelength;
   at least one photodetector which receives the light having the first wavelength and the light having the second wavelength, which have been reflected by an optical recording medium;
   an objective lens provided, opposed to the optical recording medium; and
   an optical wave synthesizing/separating system which synthesizes/separates the light having the first and second wavelengths and traveling toward the objective lens from the first and second light sources, and the light having the first and second wavelengths and traveling toward the photodetector from the objective lens,
   wherein
   the optical wave synthesizing/separating system includes
   at least one beam splitter including a polarizing beam splitter for the light having the first wavelength and a polarizing beam splitter for the light having the second wavelength, and
   a quarter-wave plate of a wide band for the different wavelengths, which is provided between the at least one beam splitter and the objective lens, and the optical wave synthesizing/separating system emits the light having the first and second wavelengths, applied from the side of the first and second light sources, to the side of the objective lens with a quantity of light larger than 50% of a quantity of incident light, emits the light having the first and second wavelengths, applied from the side of the objective lens, to the side of the photodetector with a quantity of light larger than 50% of a quantity of incident light;

wherein the polarizing beam splitter for the light having the first wavelength transmits almost all of the P-polarized component and reflects almost all of the S-polarized component of light having the first wavelength, transmits almost all of both the P-polarized component and S-polarized component of incident light having the second wavelength, transmits almost all of the P-polarized component thereof and reflects almost all of the S-polarized component thereof, or reflects almost all of both the P-polarized component and S-polarized component thereof, the polarizing beam splitter for the light having the second wavelength transmits almost all of the P-polarized component of light having the second wavelength and reflects almost all of the S-polarized component thereof, transmits almost all of both the P-polarized component and S-polarized component of incident light having the first wavelength, transmits almost all of the P-polarized component thereof and reflects almost all of the S-polarized component thereof, or reflects almost all of both the P-polarized component and S-polarized component thereof.

2. An optical head apparatus comprising:

a first light source which emits light having a first wavelength;

a second light source which emits light having a second wavelength;

at least one photodetector which receives the light having the first wavelength and the light having the second wavelength, which have been reflected by an optical recording medium;

an objective lens provided, opposed to the optical recording medium; and an optical wave synthesizing/separating system which synthesizes/separates the light having the first and second wavelengths and traveling toward the objective lens from the first and second light sources, and the light having the first and second wavelengths and traveling toward the photodetector from the objective lens, wherein the optical wave synthesizing/separating system includes at least one beam splitter including a polarizing beam splitter for the light having the first wavelength and a non-polarization beam splitter for the light having the second wavelength, and a quarter-wave plate of a wide band for the different wavelengths, which is provided between the at least one beam splitter and the objective lens, and the optical wave synthesizing/separating system emits the light having the first wavelength, applied from the side of the first light source, to the side of the objective lens with a quantity of light larger than 50% of a quantity of incident light, emits the light having the first wavelength, applied from the side of the objective lens, to the side of the photodetector with a quantity of light larger than 50% of a quantity of incident light, and emits the light having the second wavelength, applied from the side of the objective lens, to the side of the photodetector with a predetermined ratio substantially independent of a polarization state;

wherein the polarizing beam splitter for the light having the first wavelength transmits almost all of the P-polarized component of light having the first wavelength and reflects almost all of the S-polarized component thereof, transmits almost all of both the P-polarized component and S-polarized component of incident light having the second wavelength, reflects almost all of both the P-polarized component and S-polarized component thereof, or transmits and reflects both the P-polarized component and S-polarized component thereof at predetermined rates, the non-polarization beam splitter for the light having the second wavelength transmits and reflects both the P-polarized component and S-polarized component of light having the second wavelength at predetermined rates, transmits almost all of both the P-polarized component and S-polarized component of incident light having the first wavelength, transmits almost all of the P-polarized component thereof and reflects almost all of the S-polarized component thereof, or reflects almost all of both the P-polarized component and S-polarized component thereof.

* * * * *